(12) United States Patent
Perlman et al.

(10) Patent No.: US 9,314,691 B2
(45) Date of Patent: *Apr. 19, 2016

(54) SYSTEM AND METHOD FOR COMPRESSING VIDEO FRAMES OR PORTIONS THEREOF BASED ON FEEDBACK INFORMATION FROM A CLIENT DEVICE

(75) Inventors: Stephen G. Perlman, Palo Alto, CA (US); Roger van der Laan, Menlo Park, CA (US); Timothy Cotter, Sunnyvale, CA (US); Scott Furman, Menlo Park, CA (US); Robert McCool, Menlo Park, CA (US); Ian Buckley, San Carlos, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 661 days.

This patent is subject to a terminal disclaimer.

(21) Appl. No.: 12/538,054

(22) Filed: Aug. 7, 2009

(65) Prior Publication Data

US 2010/0166063 A1   Jul. 1, 2010

Related U.S. Application Data

(63) Continuation-in-part of application No. 12/359,150, filed on Jan. 23, 2009, which is a continuation of application No. 11/999,475, filed on Dec. 5, 2007, which is a continuation-in-part of application No. (Continued)

(51) Int. Cl.
*H04B 1/66* (2006.01)
*A63F 13/30* (2014.01)
(Continued)

(52) U.S. Cl.
CPC ............... *A63F 13/12* (2013.01); *H04L 65/403* (2013.01); *H04L 65/4076* (2013.01);
(Continued)

(58) Field of Classification Search
CPC ............... A63F 13/12; A63F 2300/407; A63F 2300/534; A63F 2300/535; A63F 2300/538; A63F 2300/552; A63F 2300/577; H04L 65/403; H04L 65/4076; H04L 65/605; H04L 67/38; H04N 19/0003; H04N 19/00127; H04N 19/00169; H04N 19/00254; H04N 19/00266; H04N 19/00327; H04N 19/00521; H04N 19/00781; H04N 21/2343; H04N 21/23439

USPC .................. 348/387.1, 390.1, 423, 845, 419; 375/240.01–240.24; 370/230–235, 370/252–253, 260–261, 465, 468, 477

See application file for complete search history.

(56) References Cited

U.S. PATENT DOCUMENTS

| | | |
|---|---|---|
| 4,539,706 A | 9/1985 | Mears et al. |
| 4,573,074 A | 2/1986 | Alaria et al. |

(Continued)

FOREIGN PATENT DOCUMENTS

| | | |
|---|---|---|
| CN | 1280310 | 2/1999 |
| CN | 1469251 | 3/2004 |

(Continued)

OTHER PUBLICATIONS

PCT/US2010/027716 Notification of Transmittal of the International Search Report and the Written Opinion of the International Searching Authority, or the Declaration, Mailed May 17, 2010, 8 pages.

(Continued)

*Primary Examiner* — Behrooz Senfi
(74) *Attorney, Agent, or Firm* — Martine Penilla Group, LLP

(57) ABSTRACT

A computer-implemented system and method are described for performing video compression. For example, a method according to one embodiment comprises: encoding a plurality of video frames or portions thereof according to a first encoding format; transmitting the plurality of encoded video frames or portions to a client device; receiving feedback information from the client device, the feedback information usable to determine whether data contained in the video frames or portions has not been successfully received and/or decoded; in response to detecting that a video frame or portion thereof has not been successfully received and/or decoded, encoding a video frame or portion thereof according to a second encoding format; and transmitting the video frames or portions thereof to the client device.

31 Claims, 55 Drawing Sheets

Related U.S. Application Data

10/315,460, filed on Dec. 10, 2002, now Pat. No. 7,849,491.

(60) Provisional application No. 61/210,888, filed on Mar. 23, 2009.

(51) Int. Cl.

| | | |
|---|---|---|
| *H04N 21/2343* | (2011.01) | |
| *H04N 21/2381* | (2011.01) | |
| *H04N 21/266* | (2011.01) | |
| *H04N 21/6377* | (2011.01) | |
| *H04N 21/658* | (2011.01) | |
| *H04N 21/6583* | (2011.01) | |
| *H04N 21/6587* | (2011.01) | |
| *H04L 29/06* | (2006.01) | |
| *H04N 19/172* | (2014.01) | |
| *H04N 19/169* | (2014.01) | |
| *H04N 19/61* | (2014.01) | |
| *H04N 19/107* | (2014.01) | |
| *H04N 19/132* | (2014.01) | |
| *H04N 19/146* | (2014.01) | |
| *H04N 19/436* | (2014.01) | |
| *H04N 7/12* | (2006.01) | |
| *H04N 7/10* | (2006.01) | |

(52) U.S. Cl.
CPC ............ *H04L 65/605* (2013.01); *H04L 67/38* (2013.01); *H04N 19/107* (2014.11); *H04N 19/132* (2014.11); *H04N 19/146* (2014.11); *H04N 19/169* (2014.11); *H04N 19/172* (2014.11); *H04N 19/188* (2014.11); *H04N 19/436* (2014.11); *H04N 19/61* (2014.11); *H04N 21/2343* (2013.01); *H04N 21/2381* (2013.01); *H04N 21/23439* (2013.01); *H04N 21/266* (2013.01); *H04N 21/6377* (2013.01); *H04N 21/658* (2013.01); *H04N 21/6583* (2013.01); *H04N 21/6587* (2013.01); *A63F 2300/407* (2013.01); *A63F 2300/534* (2013.01); *A63F 2300/535* (2013.01); *A63F 2300/538* (2013.01); *A63F 2300/552* (2013.01); *A63F 2300/577* (2013.01); *H04N 7/106* (2013.01)

(56) References Cited

U.S. PATENT DOCUMENTS

| | | |
|---|---|---|
| 4,582,324 A | 4/1986 | Koza et al. |
| 4,616,263 A | 10/1986 | Eichelberger |
| 5,058,199 A | 10/1991 | Grube |
| 5,129,096 A | 7/1992 | Burns |
| 5,222,246 A | 6/1993 | Wolkstein |
| 5,225,904 A | 7/1993 | Golin et al. |
| 5,357,604 A | 10/1994 | San et al. |
| 5,408,679 A | 4/1995 | Masuda |
| 5,493,644 A | 2/1996 | Thayer et al. |
| 5,509,028 A | 4/1996 | Marque-Pucheu |
| 5,558,339 A | 9/1996 | Perlman |
| 5,586,247 A | 12/1996 | Yoshifuji et al. |
| 5,586,257 A | 12/1996 | Perlman |
| 5,599,232 A | 2/1997 | Darling |
| 5,603,012 A | 2/1997 | Sotheran |
| 5,608,412 A | 3/1997 | Welles, II et al. |
| 5,608,458 A | 3/1997 | Chen et al. |
| 5,618,045 A | 4/1997 | Kagan et al. |
| 5,623,424 A | 4/1997 | Azadegan et al. |
| 5,640,386 A | 6/1997 | Wiedeman |
| 5,646,676 A | 7/1997 | ***Dewkett et al. |
| 5,654,746 A | 8/1997 | McMullan, Jr. et al. |
| 5,654,747 A | 8/1997 | Ottesen et al. |
| 5,710,719 A | 1/1998 | Houle |
| 5,712,976 A | 1/1998 | Falcon, Jr. et al. |
| 5,732,076 A | 3/1998 | Ketseoglou et al. |
| 5,742,289 A | 4/1998 | Naylor et al. |
| 5,742,680 A | 4/1998 | Wilson |
| 5,745,180 A | 4/1998 | Kwon |
| 5,751,378 A | 5/1998 | Chen et al. |
| 5,790,176 A | 8/1998 | Craig |
| 5,793,985 A | 8/1998 | Natarajan et al. |
| 5,815,146 A | 9/1998 | Youden et al. |
| 5,828,370 A | 10/1998 | Moeller et al. |
| 5,870,665 A | 2/1999 | Uchikawa |
| 5,872,575 A | 2/1999 | Segal |
| 5,884,101 A | 3/1999 | Wu |
| 5,890,055 A | 3/1999 | Chu et al. |
| 5,915,020 A | 6/1999 | Tilford et al. |
| 5,915,090 A | 6/1999 | Joseph et al. |
| 5,926,208 A | 7/1999 | Noonen et al. |
| 5,956,088 A | 9/1999 | Shen et al. |
| 5,959,592 A | 9/1999 | Petruzzelli |
| 5,974,503 A | 10/1999 | Venkatesh et al. |
| 5,987,376 A | 11/1999 | Olson et al. |
| 5,999,808 A | 12/1999 | LaDue |
| 6,009,060 A | 12/1999 | Kim |
| 6,014,706 A | 1/2000 | Cannon et al. |
| 6,052,814 A | 4/2000 | Karasawa |
| 6,057,850 A | 5/2000 | Kichury |
| 6,092,117 A | 7/2000 | Gladwin et al. |
| 6,110,041 A | 8/2000 | Walker et al. |
| 6,115,369 A | 9/2000 | Oura |
| 6,128,660 A | 10/2000 | Grimm et al. |
| 6,132,306 A | 10/2000 | Trompower |
| 6,148,142 A | 11/2000 | Anderson |
| 6,160,993 A | 12/2000 | Wilson |
| 6,166,703 A | 12/2000 | Muterspaugh |
| 6,173,317 B1 | 1/2001 | Chaddha et al. |
| 6,175,854 B1 | 1/2001 | Bretscher |
| 6,188,571 B1 | 2/2001 | Roganti et al. |
| 6,205,185 B1 | 3/2001 | Kajiwara |
| 6,241,612 B1 | 6/2001 | Heredia |
| 6,263,503 B1 | 7/2001 | Margulis |
| 6,292,589 B1 | 9/2001 | Chow et al. |
| 6,292,847 B1 | 9/2001 | Nishimoto et al. |
| 6,307,567 B1 | 10/2001 | Cohen-Or |
| 6,323,909 B1 | 11/2001 | Michener et al. |
| 6,331,856 B1 | 12/2001 | Van Hook et al. |
| 6,347,216 B1 | 2/2002 | Marko et al. |
| 6,397,038 B1 | 5/2002 | Green, Sr. et al. |
| 6,404,775 B1 | 6/2002 | Leslie et al. |
| 6,409,602 B1 | 6/2002 | Wiltshire et al. |
| 6,412,112 B1 | 6/2002 | Barrett et al. |
| 6,414,725 B1 | 7/2002 | Clarin |
| 6,421,385 B1 | 7/2002 | Uenoyama et al. |
| 6,424,817 B1 | 7/2002 | Hadden et al. |
| 6,430,233 B1 | 8/2002 | Dillon et al. |
| 6,445,679 B1 | 9/2002 | Taniguchi et al. |
| 6,466,248 B1 | 10/2002 | Spann et al. |
| 6,473,858 B1 | 10/2002 | Shimomura et al. |
| 6,585,596 B1 | 7/2003 | Leifer et al. |
| 6,594,313 B1 | 7/2003 | Hazra et al. |
| 6,597,891 B2 | 7/2003 | Tantawy et al. |
| 6,600,730 B1 | 7/2003 | Davis et al. |
| 6,614,768 B1 | 9/2003 | Mahany et al. |
| 6,631,410 B1 | 10/2003 | Kowalski et al. |
| 6,650,869 B2 | 11/2003 | Kelly et al. |
| 6,664,969 B1 | 12/2003 | Emerson et al. |
| 6,665,872 B1 * | 12/2003 | Krishnamurthy et al. ...... 725/95 |
| 6,667,944 B2 | 12/2003 | Monden et al. |
| 6,671,186 B2 | 12/2003 | Kopf |
| 6,678,502 B1 | 1/2004 | Sugaya et al. |
| 6,684,058 B1 | 1/2004 | Karacaoglu et al. |
| 6,690,657 B1 | 2/2004 | Lau et al. |
| 6,690,726 B1 | 2/2004 | Yavits et al. |
| 6,690,926 B2 | 2/2004 | Tawil et al. |
| 6,692,359 B1 | 2/2004 | Williams et al. |
| 6,699,127 B1 | 3/2004 | Lobb et al. |
| 6,715,145 B1 | 3/2004 | Bowman-Amuah |
| 6,721,260 B2 | 4/2004 | ***Hanks |
| 6,721,280 B1 * | 4/2004 | Mauro et al. .................. 370/252 |
| 6,724,826 B1 | 4/2004 | Varian |

(56) References Cited

U.S. PATENT DOCUMENTS

| | | | |
|---|---|---|---|
| 6,728,541 B2 | 4/2004 | Ohkura et al. | |
| 6,741,841 B1 | 5/2004 | Mitchell | |
| 6,745,050 B1 | 6/2004 | Forsythe et al. | |
| 6,745,364 B2 | 6/2004 | Bhatt et al. | |
| 6,754,241 B1 * | 6/2004 | Krishnamurthy et al. | 370/537 |
| 6,757,913 B2 | 6/2004 | Knox | |
| 6,760,487 B1 | 7/2004 | Linares | |
| 6,785,262 B1 | 8/2004 | Yao et al. | |
| 6,788,882 B1 | 9/2004 | Geer et al. | |
| 6,792,615 B1 | 9/2004 | Rowe et al. | |
| 6,810,528 B1 | 10/2004 | Chatani | |
| 6,811,113 B1 | 11/2004 | Silansky et al. | |
| 6,820,218 B1 | 11/2004 | Barga et al. | |
| 6,830,515 B2 | 12/2004 | Rowe | |
| 6,832,071 B1 | 12/2004 | Nakamura et al. | |
| 6,836,658 B1 | 12/2004 | Sharon et al. | |
| 6,842,617 B2 | 1/2005 | Williams et al. | |
| 6,845,090 B1 | 1/2005 | Takabatake et al. | |
| 6,850,285 B2 | 2/2005 | Eaton et al. | |
| 6,853,197 B1 | 2/2005 | McFarland et al. | |
| 6,856,786 B2 | 2/2005 | Belostotsky et al. | |
| 6,859,498 B1 | 2/2005 | Choi | |
| 6,873,654 B1 | 3/2005 | Rackett | |
| 6,886,029 B1 | 4/2005 | Pecus et al. | |
| 6,908,390 B2 | 6/2005 | Nguyen et al. | |
| 6,925,285 B2 | 8/2005 | Kim | |
| 6,944,785 B2 | 9/2005 | Gadir et al. | |
| 6,963,353 B1 | 11/2005 | Firestone | |
| 6,968,153 B1 | 11/2005 | Heinonen et al. | |
| 6,973,667 B2 | 12/2005 | Fritsch et al. | |
| 6,993,353 B2 | 1/2006 | Desai et al. | |
| 6,996,742 B2 | 2/2006 | Lerman et al. | |
| 7,016,419 B2 | 3/2006 | Tardif | |
| 7,016,970 B2 | 3/2006 | Harumoto et al. | |
| 7,023,918 B2 | 4/2006 | Yu et al. | |
| 7,028,304 B1 | 4/2006 | Weinberger et al. | |
| 7,072,627 B2 | 7/2006 | Coffin, III | |
| 7,089,319 B2 | 8/2006 | Lysenko et al. | |
| 7,099,388 B2 | 8/2006 | Cooper | |
| 7,135,985 B2 | 11/2006 | Woolgar et al. | |
| 7,155,515 B1 | 12/2006 | Brown et al. | |
| 7,158,679 B2 | 1/2007 | Sano et al. | |
| 7,215,660 B2 | 5/2007 | Perlman | |
| 7,219,153 B1 | 5/2007 | Day | |
| 7,244,181 B2 | 7/2007 | Wang et al. | |
| 7,246,183 B2 | 7/2007 | Covington et al. | |
| 7,263,125 B2 | 8/2007 | Lainema | |
| 7,272,613 B2 | 9/2007 | Sim et al. | |
| 7,289,478 B1 | 10/2007 | Kim et al. | |
| 7,292,588 B2 | 11/2007 | Milley et al. | |
| 7,295,614 B1 | 11/2007 | Shen et al. | |
| 7,299,487 B1 | 11/2007 | Campbell et al. | |
| 7,334,868 B2 | 2/2008 | Silverbrook | |
| 7,340,764 B2 | 3/2008 | Kubota et al. | |
| 7,359,004 B2 * | 4/2008 | Yu et al. | 348/390.1 |
| 7,423,990 B2 | 9/2008 | Kelton et al. | |
| 7,430,187 B2 | 9/2008 | Holt et al. | |
| 7,461,161 B2 | 12/2008 | Horiguchi | |
| 7,471,665 B2 | 12/2008 | Perlman | |
| 7,477,688 B1 | 1/2009 | Zhang et al. | |
| 7,493,078 B2 | 2/2009 | Perlman | |
| 7,502,849 B2 | 3/2009 | Roberts et al. | |
| 7,543,326 B2 | 6/2009 | Moni | |
| 7,548,657 B2 | 6/2009 | Deaven | |
| 7,558,525 B2 | 7/2009 | Perlman | |
| 7,567,527 B2 | 7/2009 | Perlman | |
| 7,587,520 B1 | 9/2009 | Kent et al. | |
| 7,590,084 B2 | 9/2009 | Perlman | |
| 7,593,361 B2 | 9/2009 | Perlman | |
| 7,680,038 B1 | 3/2010 | Gourlay | |
| 7,684,752 B2 | 3/2010 | Perlman | |
| 7,702,006 B2 | 4/2010 | Kunii et al. | |
| 7,715,336 B2 | 5/2010 | Perlman | |
| 7,738,391 B2 * | 6/2010 | Melpignano et al. | 370/252 |
| 7,791,641 B2 | 9/2010 | Voronov et al. | |
| 7,841,946 B2 | 11/2010 | Walker et al. | |
| 7,848,409 B2 | 12/2010 | Wang et al. | |
| 7,878,908 B2 | 2/2011 | Sloate et al. | |
| 7,916,147 B2 | 3/2011 | Clemie et al. | |
| 7,936,376 B2 | 5/2011 | Fukuhara | |
| 7,953,881 B1 | 5/2011 | Vadlakonda et al. | |
| 8,050,289 B1 | 11/2011 | Masterson | |
| 8,051,448 B2 | 11/2011 | Goldschmidt Iki et al. | |
| 8,147,339 B1 | 4/2012 | Perry | |
| 8,179,962 B2 | 5/2012 | Lim et al. | |
| 8,366,552 B2 * | 2/2013 | Perlman et al. | 463/42 |
| 8,423,071 B1 | 4/2013 | Sun | |
| 8,711,923 B2 * | 4/2014 | Perlman | A63F 13/12 375/240 |
| 9,077,991 B2 * | 7/2015 | Perlman | A63F 13/12 |
| 2001/0007575 A1 | 7/2001 | Mori et al. | |
| 2001/0024974 A1 | 9/2001 | Cohen | |
| 2001/0034743 A1 | 10/2001 | Thomas | |
| 2001/0044339 A1 | 11/2001 | Cordero et al. | |
| 2002/0004838 A1 * | 1/2002 | Hakenberg et al. | 709/231 |
| 2002/0009149 A1 | 1/2002 | Rodriguez et al. | |
| 2002/0015513 A1 | 2/2002 | Ando et al. | |
| 2002/0019984 A1 | 2/2002 | Rakib | |
| 2002/0028655 A1 | 3/2002 | Rosener et al. | |
| 2002/0034803 A1 | 3/2002 | Uratani | |
| 2002/0034980 A1 | 3/2002 | Lemmons et al. | |
| 2002/0038459 A1 | 3/2002 | Talmola et al. | |
| 2002/0046285 A1 | 4/2002 | Yasushi et al. | |
| 2002/0053075 A1 | 5/2002 | Paz et al. | |
| 2002/0054578 A1 | 5/2002 | Zhang et al. | |
| 2002/0056120 A1 | 5/2002 | ***McTernan et al. | |
| 2002/0059614 A1 | 5/2002 | Lipsanen et al. | |
| 2002/0059637 A1 | 5/2002 | Rakib | |
| 2002/0061743 A1 | 5/2002 | Hutcheson et al. | |
| 2002/0068592 A1 | 6/2002 | Hutcheson et al. | |
| 2002/0069265 A1 | 6/2002 | Bountour et al. | |
| 2002/0071658 A1 | 6/2002 | Marko et al. | |
| 2002/0072329 A1 | 6/2002 | Bandeira et al. | |
| 2002/0073429 A1 | 6/2002 | Beane et al. | |
| 2002/0075382 A1 | 6/2002 | Cohen | |
| 2002/0080267 A1 | 6/2002 | Moluf | |
| 2002/0101442 A1 | 8/2002 | Costanzo et al. | |
| 2002/0103029 A1 | 8/2002 | Finlayson | |
| 2002/0106019 A1 | 8/2002 | Chaddha et al. | |
| 2002/0106023 A1 | 8/2002 | O'Neill | |
| 2002/0106119 A1 | 8/2002 | Foran et al. | |
| 2002/0114330 A1 | 8/2002 | Cheung et al. | |
| 2002/0115409 A1 | 8/2002 | Khayrallah | |
| 2002/0118758 A1 | 8/2002 | Sekiguchi et al. | |
| 2002/0128065 A1 | 9/2002 | Chung et al. | |
| 2002/0133491 A1 | 9/2002 | Sim et al. | |
| 2002/0142843 A1 | 10/2002 | Roelofs | |
| 2002/0149617 A1 | 10/2002 | ***Becker | |
| 2002/0152303 A1 | 10/2002 | Dispensa | |
| 2002/0154055 A1 | 10/2002 | Davis et al. | |
| 2002/0154691 A1 | 10/2002 | Kost | |
| 2002/0156870 A1 | 10/2002 | Boroumand et al. | |
| 2002/0157115 A1 | 10/2002 | Lu | |
| 2002/0164024 A1 | 11/2002 | Arakawa et al. | |
| 2002/0165927 A1 | 11/2002 | Theriault et al. | |
| 2002/0166119 A1 | 11/2002 | Cristofalo | |
| 2002/0170065 A1 | 11/2002 | Pinnick | |
| 2002/0181189 A1 | 12/2002 | Yang et al. | |
| 2002/0181190 A1 | 12/2002 | Callado | |
| 2002/0181594 A1 | 12/2002 | Katsavounidis | |
| 2002/0184303 A1 | 12/2002 | Uner | |
| 2002/0184314 A1 | 12/2002 | Riise | |
| 2002/0188955 A1 | 12/2002 | Thompson et al. | |
| 2003/0009535 A1 | 1/2003 | Apostolopulos | |
| 2003/0017846 A1 | 1/2003 | Estevez et al. | |
| 2003/0023742 A1 | 1/2003 | Allen et al. | |
| 2003/0037156 A1 | 2/2003 | Mallart | |
| 2003/0048808 A1 | 3/2003 | Stahl et al. | |
| 2003/0054827 A1 | 3/2003 | Schmidl et al. | |
| 2003/0056168 A1 | 3/2003 | Krishnamachari et al. | |
| 2003/0065805 A1 | 4/2003 | Barnes, Jr. | |
| 2003/0078103 A1 | 4/2003 | LeMay et al. | |
| 2003/0079016 A1 | 4/2003 | Tsao | |
| 2003/0079026 A1 | 4/2003 | Watanabe et al. | |

(56) References Cited

U.S. PATENT DOCUMENTS

| | | |
|---|---|---|
| 2003/0093806 A1 | 5/2003 | Dureau et al. |
| 2003/0124977 A1 | 7/2003 | Smith et al. |
| 2003/0135860 A1 | 7/2003 | Dureau |
| 2003/0139150 A1 | 7/2003 | Rodriguez et al. |
| 2003/0158700 A1 | 8/2003 | Forler et al. |
| 2003/0174772 A1 | 9/2003 | Voronov et al. |
| 2003/0177183 A1 | 9/2003 | Cabrera et al. |
| 2003/0177187 A1 | 9/2003 | Levine et al. |
| 2003/0181162 A1 | 9/2003 | Matula |
| 2003/0181229 A1 | 9/2003 | Forster et al. |
| 2003/0207684 A1 | 11/2003 | Wesel |
| 2003/0216144 A1 | 11/2003 | Roese et al. |
| 2003/0220072 A1 | 11/2003 | Coffin, III |
| 2003/0226149 A1 | 12/2003 | Chun et al. |
| 2003/0226150 A1 | 12/2003 | Berberet et al. |
| 2003/0229719 A1 | 12/2003 | Iwata et al. |
| 2003/0231655 A1* | 12/2003 | Kelton et al. ............... 370/468 |
| 2003/0234804 A1 | 12/2003 | Parker et al. |
| 2004/0003104 A1 | 1/2004 | Boskovic et al. |
| 2004/0025184 A1 | 2/2004 | Hakenberg et al. |
| 2004/0025190 A1 | 2/2004 | McCalla et al. |
| 2004/0034865 A1 | 2/2004 | Barrett et al. |
| 2004/0043819 A1 | 3/2004 | Willis |
| 2004/0048669 A1 | 3/2004 | Rowe |
| 2004/0052371 A1 | 3/2004 | Watanabe |
| 2004/0057516 A1 | 3/2004 | Kim et al. |
| 2004/0064504 A1 | 4/2004 | Domschitz |
| 2004/0071083 A1 | 4/2004 | Li et al. |
| 2004/0080533 A1 | 4/2004 | Nishtala et al. |
| 2004/0093372 A1 | 5/2004 | Chen et al. |
| 2004/0094194 A1 | 5/2004 | Aldoretta et al. |
| 2004/0097288 A1 | 5/2004 | Sloate et al. |
| 2004/0102245 A1 | 5/2004 | Escalera et al. |
| 2004/0110469 A1 | 6/2004 | Judd et al. |
| 2004/0111755 A1 | 6/2004 | Perlman |
| 2004/0114576 A1 | 6/2004 | Itoh et al. |
| 2004/0125820 A1 | 7/2004 | Rios |
| 2004/0153764 A1 | 8/2004 | Paradkar |
| 2004/0153933 A1 | 8/2004 | Ejima et al. |
| 2004/0156550 A1 | 8/2004 | Govindaswamy et al. |
| 2004/0203694 A1 | 10/2004 | Wong et al. |
| 2004/0204102 A1 | 10/2004 | Kuehnel et al. |
| 2004/0207724 A1 | 10/2004 | Crouch et al. |
| 2004/0224769 A1 | 11/2004 | Hansen |
| 2004/0243913 A1 | 12/2004 | Budge et al. |
| 2004/0263626 A1 | 12/2004 | Piccionelli |
| 2005/0022245 A1 | 1/2005 | Nallur et al. |
| 2005/0047496 A1 | 3/2005 | McIntire et al. |
| 2005/0071851 A1 | 3/2005 | Opheim |
| 2005/0100100 A1* | 5/2005 | Unger ............... 375/240.27 |
| 2005/0100229 A1 | 5/2005 | Becker et al. |
| 2005/0104889 A1 | 5/2005 | Clemie et al. |
| 2005/0111835 A1 | 5/2005 | Friel et al. |
| 2005/0125825 A1 | 6/2005 | Nakayama et al. |
| 2005/0135480 A1 | 6/2005 | Li et al. |
| 2005/0147164 A1* | 7/2005 | Wu et al. ............... 375/240.12 |
| 2005/0183120 A1 | 8/2005 | Jain et al. |
| 2005/0188073 A1 | 8/2005 | Nakamichi et al. |
| 2005/0201460 A1 | 9/2005 | Kang et al. |
| 2005/0210515 A1 | 9/2005 | Roh et al. |
| 2005/0283734 A1 | 12/2005 | Santoro et al. |
| 2005/0286448 A1 | 12/2005 | Proctor et al. |
| 2005/0286777 A1 | 12/2005 | Kumar et al. |
| 2006/0018257 A1 | 1/2006 | Seo |
| 2006/0029034 A1 | 2/2006 | Lum |
| 2006/0029055 A1 | 2/2006 | ***Perera et al. |
| 2006/0029065 A1 | 2/2006 | Fellman |
| 2006/0038879 A1 | 2/2006 | Kremen |
| 2006/0056519 A1 | 3/2006 | Horowitz et al. |
| 2006/0069623 A1 | 3/2006 | MacDonald Korth et al. |
| 2006/0069662 A1 | 3/2006 | Laborczfalvi et al. |
| 2006/0078046 A1 | 4/2006 | Lu |
| 2006/0078051 A1 | 4/2006 | Liang et al. |
| 2006/0083315 A1 | 4/2006 | Sato |
| 2006/0098592 A1 | 5/2006 | Proctor, Jr. et al. |
| 2006/0111186 A1 | 5/2006 | Hattori |
| 2006/0116208 A1 | 6/2006 | Chen et al. |
| 2006/0117344 A1 | 6/2006 | Lamkin et al. |
| 2006/0117371 A1 | 6/2006 | Margulis |
| 2006/0136569 A1 | 6/2006 | Tenhunen et al. |
| 2006/0146830 A1* | 7/2006 | Lin et al. ............... 370/394 |
| 2006/0148571 A1 | 7/2006 | Hossack et al. |
| 2006/0150055 A1* | 7/2006 | Quinard et al. ............... 714/752 |
| 2006/0154710 A1 | 7/2006 | Serafat |
| 2006/0183421 A1 | 8/2006 | Proctor et al. |
| 2006/0195884 A1 | 8/2006 | van Zoest et al. |
| 2006/0208959 A1 | 9/2006 | Smith et al. |
| 2006/0224761 A1 | 10/2006 | Howarth et al. |
| 2006/0230428 A1 | 10/2006 | Craig et al. |
| 2006/0242240 A1 | 10/2006 | Parker et al. |
| 2006/0245444 A1 | 11/2006 | Sharpe |
| 2006/0258463 A1 | 11/2006 | Cugno et al. |
| 2006/0277248 A1 | 12/2006 | Baxter et al. |
| 2006/0282855 A1 | 12/2006 | Margulis |
| 2006/0294125 A1* | 12/2006 | Deaven ............... 707/101 |
| 2007/0009015 A1 | 1/2007 | Kunii et al. |
| 2007/0009029 A1* | 1/2007 | Craig et al. ............... 375/240.12 |
| 2007/0009035 A1 | 1/2007 | Craig et al. |
| 2007/0009113 A1 | 1/2007 | Kenoyer et al. |
| 2007/0011712 A1 | 1/2007 | White et al. |
| 2007/0025631 A1 | 2/2007 | Kim et al. |
| 2007/0036462 A1 | 2/2007 | Crandall et al. |
| 2007/0047901 A1 | 3/2007 | Ando et al. |
| 2007/0058937 A1 | 3/2007 | Ando et al. |
| 2007/0060343 A1 | 3/2007 | Sakaguchi |
| 2007/0073779 A1 | 3/2007 | Walker et al. |
| 2007/0083899 A1 | 4/2007 | Compton et al. |
| 2007/0094700 A1 | 4/2007 | Wolfe |
| 2007/0097257 A1 | 5/2007 | El-Maleh et al. |
| 2007/0121629 A1 | 5/2007 | Cuijpers et al. |
| 2007/0136480 A1 | 6/2007 | Stephenson et al. |
| 2007/0143801 A1 | 6/2007 | Madonna et al. |
| 2007/0147514 A1 | 6/2007 | Yamaguchi et al. |
| 2007/0156815 A1 | 7/2007 | Mate et al. |
| 2007/0183493 A1 | 8/2007 | Kimpe |
| 2007/0202941 A1 | 8/2007 | Miltenberger et al. |
| 2007/0206673 A1* | 9/2007 | Cipolli et al. ............... 375/240.1 |
| 2007/0211720 A1 | 9/2007 | Fuchs et al. |
| 2007/0226364 A1 | 9/2007 | Landspurg |
| 2007/0242748 A1 | 10/2007 | Mahadevan |
| 2007/0243925 A1 | 10/2007 | LeMay et al. |
| 2007/0258527 A1 | 11/2007 | Simileysky et al. |
| 2007/0259709 A1 | 11/2007 | Kelly |
| 2007/0260492 A1 | 11/2007 | Feied et al. |
| 2007/0260677 A1 | 11/2007 | DeMarco et al. |
| 2007/0265094 A1 | 11/2007 | Tone |
| 2007/0271358 A1 | 11/2007 | Gaddy |
| 2007/0297570 A1 | 12/2007 | Mizobuchi et al. |
| 2008/0008276 A1 | 1/2008 | Yokoyama |
| 2008/0025196 A1 | 1/2008 | Karaoguz et al. |
| 2008/0028458 A1 | 1/2008 | Masuhiro et al. |
| 2008/0032794 A1 | 2/2008 | Ware et al. |
| 2008/0045338 A1* | 2/2008 | Walker et al. ............... 463/40 |
| 2008/0101455 A1 | 5/2008 | Scheelke |
| 2008/0101466 A1 | 5/2008 | Swenson et al. |
| 2008/0115185 A1 | 5/2008 | Qiu et al. |
| 2008/0207322 A1 | 8/2008 | Mizrahi |
| 2008/0211901 A1 | 9/2008 | Civanlar et al. |
| 2008/0220878 A1 | 9/2008 | Michaelis |
| 2008/0225735 A1 | 9/2008 | Qiu et al. |
| 2008/0247463 A1* | 10/2008 | Buttimer et al. ............... 375/240.12 |
| 2008/0263621 A1 | 10/2008 | Austerlitz et al. |
| 2008/0268947 A1 | 10/2008 | Fyock et al. |
| 2008/0276269 A1 | 11/2008 | Miller et al. |
| 2008/0288983 A1 | 11/2008 | Johnson |
| 2008/0298376 A1 | 12/2008 | Takeda et al. |
| 2009/0003452 A1 | 1/2009 | Au et al. |
| 2009/0006736 A1 | 1/2009 | Pantos |
| 2009/0028230 A1 | 1/2009 | Leitner |
| 2009/0109988 A1* | 4/2009 | Musunuri et al. ............... 370/412 |
| 2009/0118018 A1 | 5/2009 | Perlman |
| 2009/0144425 A1* | 6/2009 | Marr et al. ............... 709/226 |
| 2009/0144792 A1 | 6/2009 | Fielibert et al. |
| 2009/0198606 A1 | 8/2009 | Craig et al. |

(56) References Cited

U.S. PATENT DOCUMENTS

| | | | |
|---|---|---|---|
| 2009/0300701 A1 | 12/2009 | Karaoguz et al. | |
| 2010/0035691 A1 | 2/2010 | Wild et al. | |
| 2010/0064002 A1 | 3/2010 | Levanon et al. | |
| 2010/0080292 A1 | 4/2010 | Coulombe | |
| 2010/0111410 A1 | 5/2010 | Iu et al. | |
| 2010/0150231 A1 | 6/2010 | Huang et al. | |
| 2010/0226262 A1 | 9/2010 | Liu et al. | |
| 2010/0248843 A1* | 9/2010 | Karsten | 463/43 |
| 2010/0250770 A1 | 9/2010 | Barreto et al. | |
| 2010/0255901 A1 | 10/2010 | Garvey et al. | |
| 2010/0306813 A1 | 12/2010 | Perry et al. | |
| 2011/0039612 A1* | 2/2011 | Pececnik | 463/17 |
| 2011/0157197 A1 | 6/2011 | Clemie et al. | |
| 2011/0228845 A1 | 9/2011 | Banerjee | |
| 2012/0004039 A1 | 1/2012 | Perry et al. | |
| 2012/0004040 A1 | 1/2012 | Pereira et al. | |
| 2012/0004041 A1 | 1/2012 | Pereira et al. | |
| 2012/0004042 A1 | 1/2012 | Perry et al. | |
| 2012/0005316 A1 | 1/2012 | Perry et al. | |
| 2012/0064975 A1 | 3/2012 | Gault et al. | |
| 2012/0064976 A1 | 3/2012 | Gault et al. | |
| 2012/0075317 A1 | 3/2012 | Clemie et al. | |
| 2012/0124573 A1 | 5/2012 | Mamtani et al. | |
| 2012/0198510 A1* | 8/2012 | Stoneback et al. | 725/129 |

FOREIGN PATENT DOCUMENTS

| | | |
|---|---|---|
| CN | 1599453 | 3/2005 |
| CN | 1674676 | 9/2005 |
| CN | 1741435 | 3/2006 |
| CN | 101180109 | 5/2008 |
| CN | 101212459 | 7/2008 |
| CN | 101359981 | 2/2009 |
| CN | 101383679 | 3/2009 |
| CN | 101385357 | 3/2009 |
| EP | 0502673 | 9/1992 |
| EP | 0554586 | 12/1992 |
| EP | 1094642 | 4/2001 |
| EP | 1098444 | 5/2001 |
| EP | 1104686 | 6/2001 |
| EP | 1120966 | 8/2001 |
| EP | 1130920 | 9/2001 |
| EP | 1132122 | 9/2001 |
| EP | 1202472 | 5/2002 |
| EP | 1351520 | 10/2003 |
| EP | 1441532 | 7/2004 |
| EP | 1637197 | 3/2006 |
| EP | 1677547 | 7/2006 |
| EP | 1768346 | 3/2007 |
| EP | 1777966 | 4/2007 |
| EP | 1780961 | 5/2007 |
| EP | 1837060 | 9/2007 |
| GB | 2347332 | 8/2000 |
| IL | 96-11928 | 12/2006 |
| JP | 08-237666 | 9/1996 |
| JP | 09-212661 | 8/1997 |
| JP | 2000-224584 | 8/2000 |
| JP | 2001111575 | 4/2001 |
| JP | 2001244864 | 9/2001 |
| JP | 2002-027483 | 1/2002 |
| JP | 2005-110146 | 4/2005 |
| JP | 2006-304204 | 11/2006 |
| JP | 2007-221411 | 8/2007 |
| JP | 2008-527862 | 7/2008 |
| KR | 20020092022 | 12/2002 |
| RU | 2121235 | 10/1998 |
| RU | 2159507 | 11/2000 |
| RU | 2282888 | 8/2006 |
| RU | 2283543 | 9/2006 |
| RU | 2 297 729 | 4/2007 |
| RU | 2 303 288 | 7/2007 |
| RU | 2326505 | 6/2008 |
| RU | 2336659 | 10/2008 |
| TW | 578416 | 3/2004 |
| TW | I241532 | 10/2005 |
| TW | 200709694 | 3/2007 |
| TW | 200731812 | 8/2007 |
| TW | 200742443 | 11/2007 |
| WO | WO-9534991 | 12/1995 |
| WO | WO-9641479 | 12/1996 |
| WO | WO-9733402 | 2/1997 |
| WO | WO-00/44169 | 7/2000 |
| WO | WO-01/41447 | 6/2001 |
| WO | WO-0141447 | 6/2001 |
| WO | WO-01/75545 | 10/2001 |
| WO | WO-01/78383 | 10/2001 |
| WO | 02/060183 | 8/2002 |
| WO | WO-02/071639 | 9/2002 |
| WO | WO-02/083254 | 10/2002 |
| WO | WO-02078369 | 10/2002 |
| WO | WO-02/092177 | 11/2002 |
| WO | WO-03009590 | 1/2003 |
| WO | WO-03/027876 | 4/2003 |
| WO | WO-03032666 | 4/2003 |
| WO | WO-03/047710 | 6/2003 |
| WO | WO-03/063505 | 7/2003 |
| WO | WO-03/067534 | 8/2003 |
| WO | WO-03/075116 | 9/2003 |
| WO | WO-03/083798 | 10/2003 |
| WO | WO-2004/045104 | 5/2004 |
| WO | WO-2004098194 | 11/2004 |
| WO | WO-2005/045551 | 5/2005 |
| WO | WO-2005/073972 | 8/2005 |
| WO | WO-2005/098756 | 10/2005 |
| WO | WO-2006/110268 | 10/2005 |
| WO | WO-2007/073616 | 12/2005 |
| WO | WO-2005114669 | 12/2005 |
| WO | WO-2006/034124 | 3/2006 |
| WO | WO-2006/042323 | 4/2006 |
| WO | WO-2006/053949 A1 | 5/2006 |
| WO | WO-2006/074408 | 7/2006 |
| WO | WO-2006/100664 | 9/2006 |
| WO | WO-2006/124811 | 11/2006 |
| WO | WO-2006134055 | 12/2006 |
| WO | WO-2007/008356 | 1/2007 |
| WO | WO-2007/025029 | 3/2007 |
| WO | WO-2007/047250 | 4/2007 |
| WO | WO-2007/119236 | 10/2007 |
| WO | WO-2007119236 | 10/2007 |
| WO | WO-2007/130012 | 11/2007 |
| WO | WO-2008042098 | 4/2008 |
| WO | WO-2008/054997 | 5/2008 |
| WO | WO-2008/070987 | 6/2008 |
| WO | WO-2009/073798 | 6/2009 |
| WO | WO 2009/073801 | 6/2009 |
| WO | WO-2009/073793 | 11/2009 |
| WO | WO-2010141492 | 12/2010 |
| WO | WO-2010141522 | 12/2010 |

OTHER PUBLICATIONS

PCT/US2010/027699 Notification of Transmittal of the International Search Report and the Written Opinion of the International Searching Authority, or the Declaration, Mailed May 17, 2010, 9 pages.

Office Action from U.S. Appl. No. 12/359,171, Sep. 1, 2010, 7 pages.

Office Action from U.S. Appl. No. 12/538,086, mailed Oct. 7, 2010), 10 pages.

Office Action from U.S. Appl. No. 12/538,076 mailed Oct. 12, 2011, 7 pages.

Office Action from U.S. Appl. No. 12/359,229, mailed Oct. 26, 2011. 8 pages.

Office Action from U.S. Appl. No. 12/359,218, mailed Sep. 13, 2011. 9 pages.

Office Action from U.S. Appl. No. 12/538,090, mailed Jan. 26, 2012, 12 pages.

Final Office Action U.S. Appl. No. 12/359,154 mailed Dec. 13, 2011, 13 pages.

Non Final Office Action U.S. Appl. No. 12/359,154 mailed Apr. 11, 2011, 7 pages.

Office Action from U.S. Appl. No. 12/359,127, mailed Mar. 6, 2012, 6 pages.

(56) References Cited

OTHER PUBLICATIONS

Office Action from U.S. Appl. No. 12/359,140, mailed Mar. 29, 2011, 6 pages.
Office Action from U.S. Appl. No. 12/359,187, mailed Mar. 29, 2011. 7 pages.
Final Office Action from U.S. Appl. No. 12/359,187, mailed Feb. 14, 2012, 9 pages.
Non-Final Office Action from U.S. Appl. No. 12/538,077 mailed Aug. 12, 2011, 7 pages.
Office Action from U.S. Appl. No. 12/359,226, mailed Apr. 3, 2012, 7 pages.
Office Action from U.S. Appl. No. 12/359,227, mailed Apr. 10, 2012, 6 pages.
Office Action from U.S. Appl. No. 12/359,150, mailed Mar. 23, 2012, 12 pages.
Office Action from U.S. Appl. No. 12/359,140, mailed Mar. 20, 2012, 13 pages.
Office Action from U.S. Appl. No. 12/538,041, mailed Mar. 19, 2012, 9 pages.
Office Action from U.S. Appl. No. 12/359,233, mailed Apr. 20, 2012, 8 pages.
Office Action from U.S. Appl. No. 12/538,062, mailed May 10, 2012, 13 pages.
"Accelerated Graphics Port Interfaces Specification", Intel Corporation, Revision 1.0, Jul. 31, 1996, 161 pgs.
"IP Multicast Technical Overview", Cisco Systems, Aug. 2007, 9 pages.
Boulware, Jack, "Power Houses", "Wired", Nov. 2002, Issue 10.11, Wired Digital, Inc., 8 pages. (Nov. 2002).
Bronez, Thomas, et al., "Shipboard experiments for a multishop 802.11 communications system-RF channel characterization and MAC performance measurement", Military Communications Conference, 2005. MILCOM 2005. IEEE. The MITRE Corporation Mclean, VA., (2005), 7 pages.
Setton, E., et al., "Peer-to-Peer Live Multicast: A Video Perspective," Proceedings of the IEEE, vol. 96 Issue: 1, [retrieved May 5, 2010] retrieved from the Internet. <URL:http://ieeexplore.ieee.org/Xplore/login.jsp? reload=true&url=http%3A %2F%2Fieeexplo, (Jan. 2008), 25-38.
Frauenfelder, M., G-Cluster Makes Games to Go, EE Times, Nov. 6, 2001, http://www.thefeaturearchives.com/13267.html, 3 pages.
Everitt, C., "Projective Texture Mapping" nVidia white paper last updated Apr. 24, 2001, 7 pages.
Levoy, M., "Polygon-Assisted JPEG and MPEG Compression of Synthetic Images", Computer and Graphics Proceedings, Los Angeles, Aug. 6-11, 1995, Computer Graphics Proceedings (SIGGRAPH), New York, IEEE, US., 8 pages.
Yoon, et al., "Web Based remote rendering with IBRAC (Image-based rendering acceleration and compression)", European Association for Computer Graphics, 21 Annual Conference, Eurographics, Interlaken, Switzerlmand, Aug. 21-25, 2000, 10 pages.
Wallach, D., et al., "Accelerated MPEG Compression of Dynamic Polygonal Scens", computer Graphics Proceedings, Annual Conference Series, SIGGRAPH, Jul. 24, 1994, pp. 193-196.
Office Action from U.S. Appl. No. 12/538,096, mailed Jun. 26, 2012), 13 pages.
Office Action from U.S. Appl. No. 12/359,218, mailed Jun. 25, 2012, 26 pages.
Office Action from U.S. Appl. No.12/538,076, mailed Jun. 25, 2012, 21 pages.
Final Office Action from U.S. Appl. No. 12/359,229, mailed Oct. 5, 2012, 2011, 15 pages.
Final Office Action from U.S. Appl. No. 12/359,171, mailed May 9, 2011, 18 pages.
Perry, David, U.S. Appl. No. 61/014,036, filed Dec. 15, 2007, entitled, "Systems and Methods of Serving Game Video", 39 pages.
Frauenfelder, M., "G-Cluster Makes Games to Go", The Feature: It's All About the Mobile Internet, http://www.thefeaturearchives.com/13267.html, 3 pages.
Notice of Allowance from U.S. Appl. No. 12/359,154 mailed Aug. 28, 2012, 28 pages.
Notice of Allowance from U.S. Appl. No. 12/538,041, mailed Sep. 19, 2012, 17 pages.
Final Office Action from U.S. Appl. No. 12/538,090, mailed Dec. 4, 2012, 22 pages.
Final Office Action from U.S. Appl. No. 12/359,127, mailed Jan. 9, 2013, 30 pages.
Final Office Action from U.S. Appl. No. 12/359,227, mailed Dec. 11, 2012, 18 pages.
Final Office Action from U.S. Appl. No. 12/359,233, mailed Jan. 28, 2013, 31 pages.
Notice of Allowance from U.S. Appl. No. 12/538,096, mailed Jun. 26, 2012, 18 pages.
Final Office Action from U.S. Appl. No. 12/359,226 mailed Mar. 22, 2013, 18 pages.
Office Action from U.S. Appl. No. 12/538,076, mailed Jan. 18, 2013, 28 pages.
Final Office Action from U.S. Appl. No. 12/359,150, mailed Feb. 4, 2013, 29 pages.
Office Action from U.S. Appl. No. 12/359,227, mailed Jul. 3, 2013, 22 pages.
Final Office Action from U.S. Appl. No. 12/538,077, mailed Jun. 19, 2013, 19 pages.
Office Action from U.S. Appl. No. 12/359,150, mailed Jul. 25, 2013, 22 pages.
Office Action from U.S. Appl. No. 12/359,218, Mailed Jun. 27, 2013, 44 pages.
Office Action from U.S. Appl. No. 12/538,062, mailed Jul. 1, 2013, 17 pages.
Office Action from U.S. Appl. No. 12/359,233, mailed Jul. 17, 2013, 20 pages.
Office Action from U.S. Appl. No. 12/359,229, mailed Jul. 30, 2013, 29 pages.
Office Action from U.S. Appl. No. 12/359,226, mailed Aug. 6, 2013, 32 pages.
Office Action from U.S. Appl. No. 12/538,081, mailed Sep. 5, 2013, 26 pages.
Final Office Action from U.S. Appl. No. 12/359,127, mailed Sep. 11, 2013, 25 pages.
Office Action from U.S. Appl. No. 12/538,090, mailed Sep. 10, 2013, 13 pages.
Office Action from U.S. Appl. No. 12/538,092, mailed Sep. 10, 2013, 10 pages.
Notice of Allowance from U.S. Appl. No. 12/359,140 mailed Sep. 18, 2013, 15 pages.
Notice of Allowance from U.S. Appl. No. 12/359,154 mailed Jul. 24, 2013, 36 pages.
Final Office Action from U.S. Appl. No. 12/538,076, mailed Oct. 10, 2013, 20 pages.
Final Office Action from U.S. Appl. No. 12/538,086, mailed Oct. 21, 2013, 27 pages.
First Office Action and Search Report from foreign counterpart Chinese Patent Application No. 201080021749.4 mailed Dec. 26, 2013, 7 pages.
Final Office Action from U.S. Appl. No. 12/359,218 mailed Nov. 26, 2013, 28 pages.
Final Office Action from U.S. Appl. No. 12/538,062, mailed Dec. 12, 2013, 25 pages.
Final Office Action from U.S. Appl. No. 12/359,227, mailed Dec. 16, 2013, 21 pages.
Final Office Action from U.S. Appl. No. 12/359,226 mailed Dec. 26, 2013, 30 pages.
Final Office Action from U.S. Appl. No. 12/359,233 mailed Dec. 16, 2013, 27 pages.
Notice of Allowance from U.S. Appl. No. 12/538,090 mailed Dec. 5, 2013, 11 pages.
Notice of Allowance from U.S. Appl. No. 12/538,092 mailed Dec. 5, 2013, 7 pages.
Final Office Action from U.S. Appl. No. 12/359,150, mailed Feb. 5, 2014, 27 pages.
Office Action from U.S. Appl. No. 12/359,127, mailed Feb. 13, 2014, 30 pages.

(56) References Cited

OTHER PUBLICATIONS

Notice of Allowance from U.S. Patent Application No. 12/359,140, mailed Feb. 27, 2014, 16 pages.
Office Action from U.S. Appl. No. 12/538,092, mailed Feb. 25, 2014, 13 pages.
Final Office Action from U.S. Appl. No. 12/538,054, mailed Mar. 5, 2014, 7 pages.
Office Action from U.S. Appl. No. 12/538,062, mailed Mar. 7, 2014, 18 pages.
Office Action from U.S. Appl. No. 12/538,077, mailed Mar. 25, 2014, 33 pages.
Office Action from U.S. Appl. No. 13/359,218, mailed Apr. 21, 2014, 31 pages.
Notice of Acceptance from foreign counterpart New Zealand Patent Application No. 595840, mailed Jul. 16, 2013, 1 page.
Further Examination Report from foreign counterpart New Zealand Patent Application No. 595840, mailed May 14, 2013, 2 pages.
Further Examination Report from foreign counterpart New Zealand Patent Application No. 595840, mailed Jun. 4, 2013, 3 pages.
Office Action from foreign counterpart Russia Patent Application No. 2011142772, mailed Apr. 30, 2014, 6 pages.
Bungie,"HALO 3 How-to: Saved Films, New ViDOC", http://www.bungie.net/News/content.aspx?type=topnews&link=h3savedfilms, Sep. 20, 2007, pp. 1-8.
Dickinson, Patrick, "Instant Replay: Building A Game Engine with Reproducible Behavior", http://www.gamasutra.com/view/feature/3057/instant_replay_building_a_game.php?print, pp. 1-6.
Duong, Ta Nguyen Binh, "A Dynamic Load Sharing Algorithm for Massively Multiplayer Online Games:", IEEE, 2003, pp. 131-136.
IDS and characterization of references submitted by Inventor in related applications, 7 pages, May 24, 2013.
Jarvinen S et al: "QoS-Aware real-time video encoding How to Improve the User Experience of a Gaming-on-Demand Service", Consumer Communications and Networking Conference, 2006. CCNC 2006. 20 06 3rd IEEE Las Vegas, NV, USA Jan. 8-10, 2006, Piscataway, NJ, pp. 994-997, XP010893324, DOI: 10.1109/CCNC.2006.15931.
Kubota, Shuji, "High-Quality Frame-Synchronization For Satellite Video Signal Transmission", IEEE Transactions on Aerospace and Electronic Systems, vol. 31, No. 1, Jan. 1995, pp. 430-440.
Laulajainen, J., et al., "Experiments with QOS-Aware Gaming-on-Demand Service" Advanced Information Networking and Applications, 2006, vol. 1, Apr. 18, 2006, pp. 805-810, XP010915314, DOI: 10.1109/AINA.2006.175, ISBN: 978-07695-2466-5.
Nguyen, Cong Duc, "Optimal Assignment of Distributed Servers to Virtual Partitions for The Provision of Immersive Voice Communication In Massively Multiplayer Games", Computer Communications 29 2006, available online Nov. 15, 2005, pp. 1260-1270.
Wang, "Error Resilient Video Coding Using Flexible Reference Frames", Proc. of SPIE vol. 5960, 596022-1, [downloaded from:http://spiedigitallibrary.org/ on Nov. 10, 2013] 12 pages.
Wu, Dapeng, "Transporting Real-time Video over the Internet: Challenges and Approaches", Proceedings of the IEEE, vol. 88,No. 12, Dec. 2000, pp. 1-18.
International Search Report and Written Opinion for foreign counterpart Patent Cooperation Treaty Application No. PCT/US2011/051368 mailed Nov. 28, 2011, 14 pages.
Office Action from counterpart U.S. Appl. No. 13/016,794 mailed Jan. 3, 2013, 19 pages.
Non-Final Office Action from U.S. Appl. No. 13/016,794 mailed Sep. 9, 2013, 14 pages.
Office Action from U.S. Appl. No. 12/232,981, mailed Nov. 19, 2013, 11 pages.
Office Action from U.S. Appl. No. 13/232,990, mailed Nov. 20, 2013, 11 pages.
Final Office Action from U.S. Appl. No. 13/016,794, mailed Dec. 27, 2013, 16 pages.
Office Action from U.S. Appl. No. 12/359,227, mailed May 20, 2014, 38 pages.
Office Action from U.S. Appl. No. 12/359,150, mailed May 30, 2014, 21 pages.
Office Action from U.S. Appl. No. 13/016,794, mailed Jun. 10, 2014, 27 pages.
Notice of Allowance from U.S. Appl. No. 12/538,092, mailed Jul. 7, 2014, 6 pages.
Office Action from U.S. Appl. No. 12/359,226, mailed May 30, 2014, 21 pages.
Office Action from U.S. Appl. No. 12/538,076, mailed Jun. 30, 2014, 21 pages.
Final Office Action from U.S. Appl. No. 12/359,127, mailed Jul. 29, 2014, 27 pages.
Office Action from U.S. Appl. No. 12/538,086, mailed Aug. 14, 2014, 36 pages.
Office Action from U.S. Appl. No. 12/359,233, mailed Aug. 25, 2014, 20 pages.
Notice of Allowance from U.S. Appl. No. 12/538,096, mailed May 3, 2013, 16 pages.
Final Office Action from U.S. Appl. No. 12/359,150 mailed Sep. 23, 2014, 24 pages.
Final Office Action from U.S. Appl. No. 12/359,226, mailed Sep. 23, 2014, 24 pages.
Final Office Action from U.S. Appl. No. 12/538,062, mailed Aug. 26, 2014, 18 pages.
Office Action from U.S. Appl. No. 12/359,171, mailed Aug. 28, 2014, 20 pages.
"Annex C "Video Buffering Verifier" and Annex D "Features supported by the alogrithm"", ITU-T Recommendation H.262—Information technology—Generic coding of moving pictures and associated audio information: Video, Feb. 17, 2000, pp. 139-158, XP0550.
Cheung, G., et al., "Low-latency Error Control of H.264 Using SP-Frames and Streaming Agent Over Wireless Networks" IEEE, ICC 2007 Proceedings, pp. 1790-1796.
Denman S: "Highly Detailed Continuous 1-25 Worlds: Streaming Game Resources From Slow Media", Internet Citation. Mar. 8, 2003, XP007901775. Retrieved from the Internet: URL:http://www.gamasutra.com/features/gdcarchive/2003/Denman Stu.ppt.
Dream Technology, fifth article "An image can be generated on a server side, the next generation game environment 'G cluster'", monthly magazine ASCII, Japan ASCII Co. Jun. 1, 2006, vol. 30 of sixth issue, pp. 95-97 (Article in Japanese).
Markus Fidler et al: "Efficient Smoothing of Robust VBR Video Traffic by Explicit Slice-based Mode Type Selection", Consumer Communications and Networking Conference, 2007. CCNC 2007. 20 07 4th IEEE, IEEE, PI, Jan. 1, 2007, pp. 880-884.
Gilge, M., et al., "Motion Video Coding for Packet-Switching Networks" An Integrated Approach, Visual Communication and Image Processing 1991: Nov. 11-13, 1991, vol. 1605, pp. 592-603, XP000431672.
Hannuksela, M et al., "Sub-picture: ROI coding and unequal error protection", International Conference on Image Processing, vol. 3, Sep. 22, 2002, pp. 537-540, XP010607773, DOI: 10.1109/ICIP.2002.1039026, ISBN: 978-0-7803-7622-9.
Haskell B., et al., "Chapter 6: Digital Compression: Fundamentals, Digital Video: An Introduction to MPEG-2", 1997, Kluwer Academic Publishers, pp. 141-142, XP-002620188, ISBN: 0-412-08411-2, Section 6.9.4. "Temporal Effects".
Haskell B G et al: "Section 8.3.3. Video Buffer Verifier", Jan. 1, 1997, Digital Video: An Introduction to MPEG-2; [Digital Multimedia Standards Series], Boston, MA: Kluwer Academic Publ, US, pp. 156-182, XP002633080, ISBN: 978-0-412-084.
Heinzelman W R et al: "Unequal error protection of MPEG-4 compressed video", Image Processing, 1999. ICIP 99. Proceedings. 1999 International Conference on—Kobe, Japan Oct. 24-28, 1999, IEEE, Piscataway, NJ, USA, vol. 2, Oct. 24, 1999, page.
"Information Technology-Generic Coding of Moving Pictures and Associated Audio Information: Video", International Telecommunication Union, Jul. 1995, pp. 1-211.
Jongwon Kim et al: "TCP-Friendly Internet Video Streaming Employing Variable Frame-Rate Encoding and Interpolation", IEEE Transactions on Circuits and Systems for Video Technology, vol. 10, No. 7, Oct. 1, 2000, XP011014118, IEEE, Piscataway.

(56) References Cited

OTHER PUBLICATIONS

Jain, M., et al., "End-to-End Available Bandwidth: Measurement Methodology, Dynamics, and Relation With TCP Throughput", Computer Communication Review, ACM New York, NY, US, vol. 32, No. 4, Oct. 1, 2002, pp. 295-308, XP001162293, ISSN: 0146-4833.
Jurgelionis, A., et al., "Platform for Distributed 3D Gaming", International Journal of Computer Games Technology—Special issue on cyber games and interactive entertainment, Jan. 2009, vol. 2009, Article ID 231863, 15 pages, doi:10.115/2009/231863.
Laulajainen J et al: "Experiments with QoS-Aware Gaming-on-Demand Service", Advanced Information Networking and Applications, 2006. Aina 2006. 20T H International Conference on Vienna, Austria Apr. 18-20, 2006, Piscataway, NJ, USA, IEEE, vol. 1, 18 Apr. 2.
Lee K et al: "Adaptive server selection for large scale interactive online games", Sep. 15, 2005, Computer Networks, Elsevier Science Publishers B.V., Amsterdam, NL, pp. 84-102, XP004967987, ISSN: 1389-1286.
Lin, Yuan, et al., "Rate-Distortion Optimized I-Slice Selection for Low Delay Video Transmission", MMSP 2007. IEEE 9th Workshop on, IEEE, Piscataway, NJ, USA, Oct. 1, 2007, pp. 115-118, XP031224790, ISBN: 978-1-4244-1274-7.
Marsh, B., et al., "Flash memory file caching for mobile computers", System Sciences, Jan. 4, 1994, vol. I: Architecture, Proceedings of the 27, Hawaiit International Conference on, IEEE Comput. Soc. Press, pp. 451-460, XP031940063, DOI: 10.1109/HIC.
Park, K., et al., "QoS-sensitive transport of real-time MPEG video using adaptive redundancy control", Computer Communications 24 (2001) pp. 78-92, Network Systems Lag, Department of Computer Sciences, Purdue University, West Lafayette, IN 47907, USA.
Schreier, R.M., et al., "Motion adaptive intra refresh for the H.264 video coding standard", IEEE Transactions on Consumer Electronics, vol. 52, No. 1, Feb. 1, 2006, pp. 100-104, XP055014318, ISSN: 0098-3063, DOI: 10.1109/TCE. 2006.1605054.
P. Pancha et al: "MPEG coding for variable bit rate video transmission", IEEE Communications Magazine, vol. 32, No. 5, May 1, 1994, pp. 54-66, XP55014387, ISSN: 0163-6804, DOI: 10.1109/35. 281579.
Tonardi, L., et al., "The use of cumulative inter-frame jitter for adapting video transmission rate", IEEE TENCON 2003, Oct. 15, 2003, York, NY: IEEE, US, vol. 1, Oct. 15, 2003, pp. 364-368. XPOI0687099. DOI: 10.1109/TENCON.2003.1273346, ISBN: 978-0-78.
Yao Wang et al: "Error Control and Concealment for Video Communication: A Review, Proceedings of the IEEE, vol. 86, No. 5, May 1, 1998, XP011044024, ISSN: 0018-9219 * section IVA "Layered Coding with Transport Prioritization" section IV.G "Transport-Level.
Wu, et al: 'Transporting Real—Time Video over the Internet: Challenges and Approaches Proceedings of the IEEE, vol. 88, No. 12, Dec. 1, 2000, XP011O44464, ISSN: 0018-9219, pp. 1855-1875.
Jin Xu, et al., "Joint Adaptive Intra Refreshment and Unequally Error Protection Algorithms for Robust Transmission of H.264/AVC Video", 2006 IEEE International Conference on Multimedia and Expo, Jul. 1, 2006, pp. 693-696, XP031032930, ISBN: 978-1-4244-0.

* cited by examiner

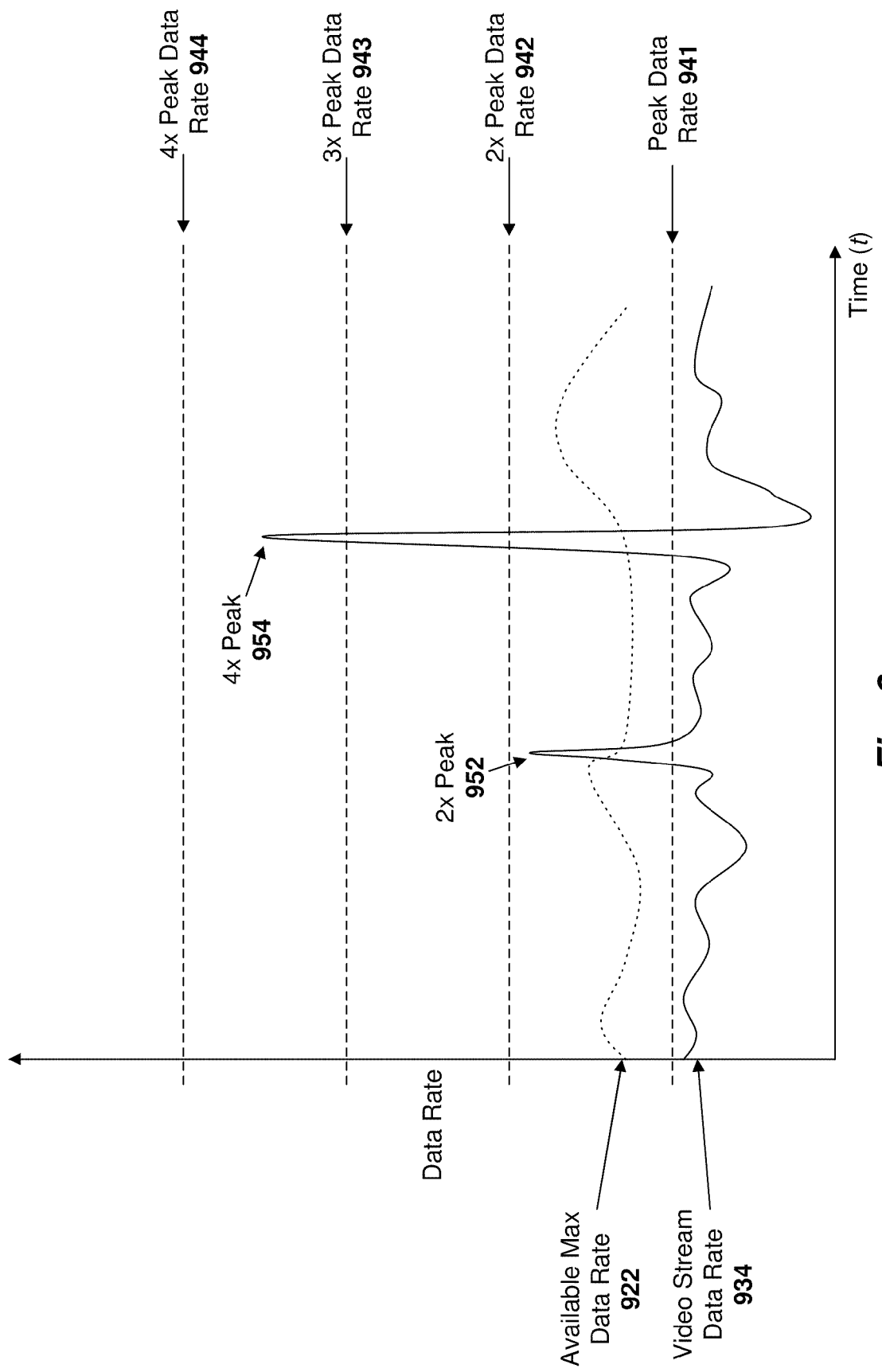

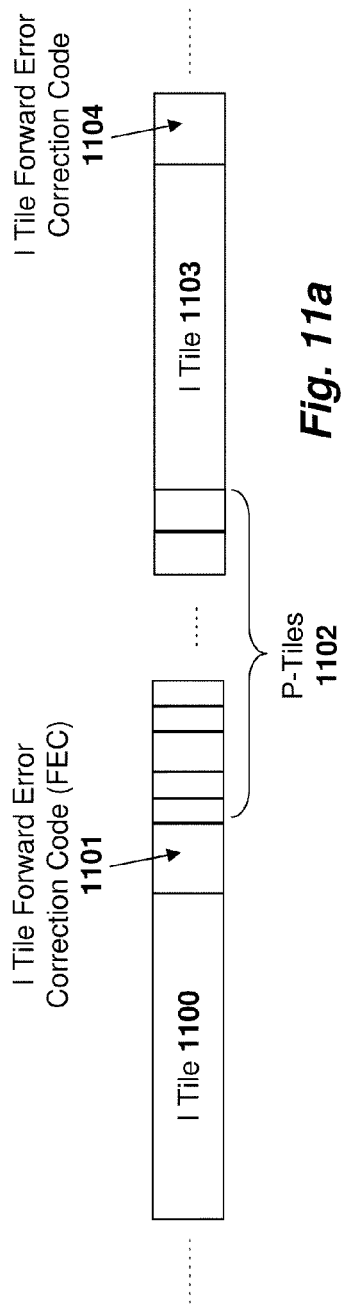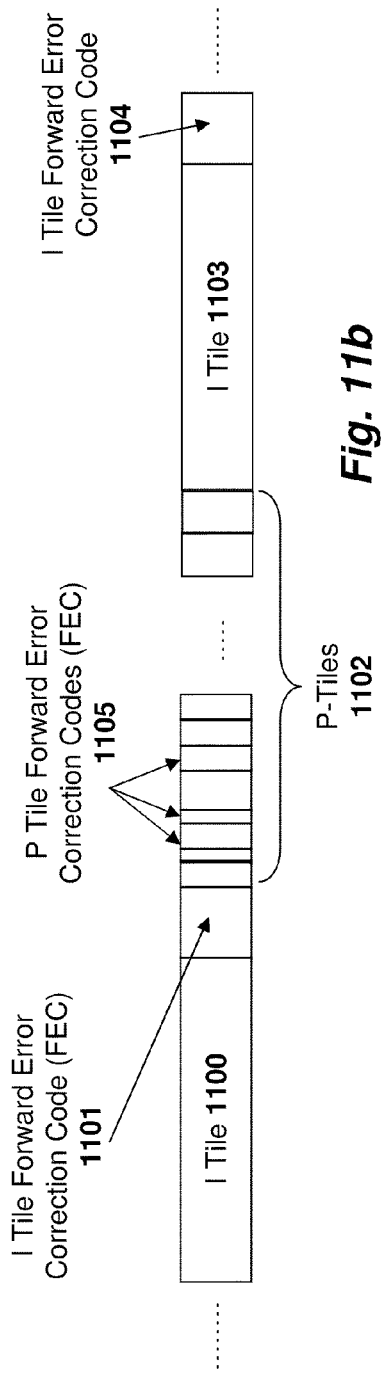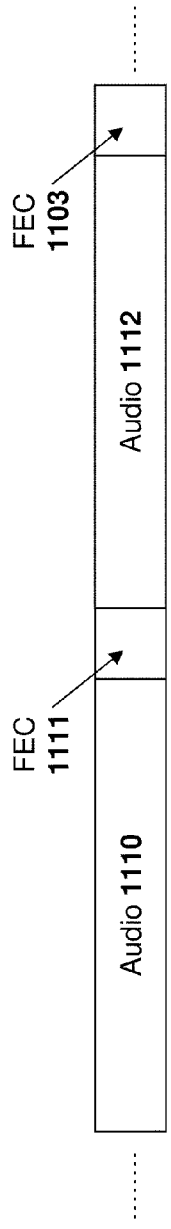
Fig. 11a
Fig. 11b
Fig. 11c

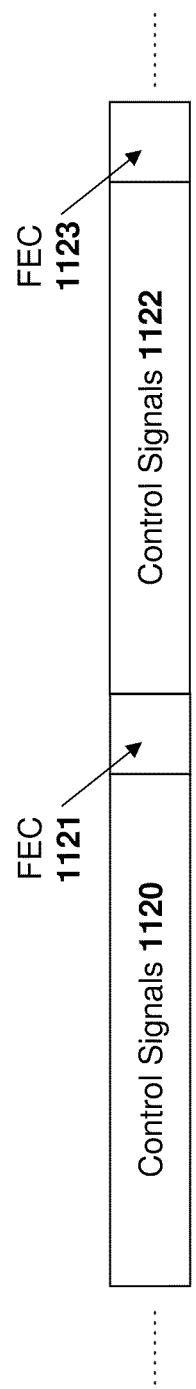

Fig. 30

SYSTEM AND METHOD FOR COMPRESSING VIDEO FRAMES OR PORTIONS THEREOF BASED ON FEEDBACK INFORMATION FROM A CLIENT DEVICE

RELATED APPLICATION

This application claims priority to U.S. Provisional Application Ser. No. 61/210,888, filed, Mar. 23, 2009, entitled, "System And Method For Compressing Video Using Feedback", and is a continuation-in-part of co-pending U.S. application Ser. No. 12/359,150, filed Jan. 23, 2009, entitled, "System And Method for Protecting Certain Types of Multimedia Data Transmitted Over A Communication Channel", which is a continuation of co-pending U.S. application Ser. No. 11/999,475, filed Dec. 5, 2007, entitled, "Hosting And Broadcasting Virtual Events Using Streaming Interactive Video" which is a continuation-in-part (CIP) application of Ser. No. 10/315,460 filed Dec. 10, 2002 now U.S. Pat. No. 7,849,491 entitled, "Apparatus and Method for Wireless Video Gaming", which is assigned to the assignee of the present CIP application.

TECHNICAL FIELD

The present disclosure relates generally to the field of data processing systems that improve a users' ability to manipulate and access audio and video media.

BACKGROUND

Recorded audio and motion picture media has been an aspect of society since the days of Thomas Edison. At the start of the 20$^{th}$ century there was wide distribution of recorded audio media (cylinders and records) and motion picture media (nickelodeons and movies), but both technologies were still in their infancy. In the late 1920s motion pictures were combined with audio on a mass-market basis, followed by color motion pictures with audio. Radio broadcasting gradually evolved into a largely advertising-supported form of broadcast mass-market audio media. When a television (TV) broadcast standard was established in the mid-1940s, television joined radio as a form of broadcast mass-market media bringing previously recorded or live motion pictures into the home.

By the middle of the 20th century, a large percentage of US homes had phonograph record players for playing recorded audio media, a radio to receive live broadcast audio, and a television set to play live broadcast audio/video (A/V) media. Very often these 3 "media players" (record player, radio and TV) were combined into one cabinet sharing common speakers that became the "media center" for the home. Although the media choices were limited to the consumer, the media "ecosystem" was quite stable. Most consumers knew how to use the "media players" and were able to enjoy the full extent of their capabilities. At the same time, the publishers of the media (largely the motion picture and televisions studios, and the music companies) were able to distribute their media both to theaters and to the home without suffering from widespread piracy or "second sales", i.e., the resale of used media. Typically publishers do not derive revenue from second sales, and as such, it reduces revenue that publishers might otherwise derive from the buyer of used media for new sales. Although there certainly were used records sold during the middle of the 20$^{th}$ century, such sales did not have a large impact on record publishers because, unlike a motion picture or video program—which is typically watched once or only a few times by an adult—a music track may be listened to hundreds or even thousands of times. So, music media is far less "perishable" (i.e., it has lasting value to an adult consumer) than motion picture/video media. Once a record was purchased, if the consumer liked the music, the consumer was likely to keep it a long time.

From the middle of the 20$^{th}$ century through the present day, the media ecosystem has undergone a series of radical changes, both to the benefit and the detriment of consumers and publishers. With the widespread introduction of audio recorders, especially cassette tapes with high-quality stereo sound, there certainly was a higher degree of consumer convenience. But it also marked the beginning of what is now a widespread practice with consumer media: piracy. Certainly, many consumers used the cassette tapes for taping their own records purely for convenience, but increasingly consumers (e.g., students in a dormitory with ready access to each others' record collections) would make pirated copies. Also, consumers would tape music played over the radio rather than buying a record or tape from the publisher.

The advent of the consumer VCR led to even more consumer convenience, since now a VCR could be set to record a TV show which could be watched at a later time, and it also led to the creation of the video rental business, where movies as well as TV programming could be accessed on an "on demand" basis. The rapid development of mass-market home media devices since the mid-1980s has led to an unprecedented level of choice and convenience for the consumer, and also has led to a rapid expansion of the media publishing market.

Today, consumers are faced with a plethora of media choices as well as a plethora of media devices, many of which are tied to particular forms of media or particular publishers. An avid consumer of media may have a stack of devices connected to TVs and computers in various rooms of the house, resulting in a "rat's nest" of cables to one or more TV sets and/or personal computers (PCs) as well as a group of remote controls. (In the context of the present application, the term "personal computer" or "PC" refers to any sort of computer suitable for us in the home or office, including a desktop, a Macintosh® or other non-Windows computers, Windows-compatible devices, Unix variations, laptops, etc.) These devices may include a video game console, VCR, DVD player, audio surround-sound processor/amplifier, satellite set-top box, cable TV set-top box, etc. And, for an avid consumer, there may be multiple similar-function devices because of compatibility issues. For example, a consumer may own both a HD-DVD and a Blu-ray DVD player, or both a Microsoft Xbox® and a Sony Playstation® video game system. Indeed, because of incompatibility of some games across versions of game consoles, the consumer may own both an XBox and a later version, such as an Xbox 360®. Frequently, consumers are befuddled as to which video input and which remote to use. Even after a disc is placed into the correct player (e.g., DVD, HD-DVD, Blu-ray, Xbox or Playstation), the video and audio input is selected for that the device, and the correct remote control is found, the consumer is still faced with technical challenges. For example, in the case of a wide-screen DVD, the user may need to first determine and then set the correct aspect ratio on his TV or monitor screen (e.g., 4:3, Full, Zoom, Wide Zoom, Cinema Wide, etc.). Similarly, the user may need to first determine and then set the correct audio surround sound system format (e.g., AC-3, Dolby Digital, DTS, etc.). Often times, the consumer is unaware that they may not be enjoying the media content to the full capability of their television or audio system (e.g., watching a movie squashed at the wrong aspect ratio, or listening to audio in stereo rather than in surround sound).

Increasingly, Internet-based media devices have been added to the stack of devices. Audio devices like the Sonos® Digital Music system stream audio directly from the Internet. Likewise, devices like the Slingbox™ entertainment player record video and stream it through a home network or out through the Internet where it can be watched remotely on a PC. And Internet Protocol Television (IPTV) services offer cable TV-like services through Digital Subscriber Line (DSL) or other home Internet connections. There have also been recent efforts to integrate multiple media functions into a single device, such as the Moxi® Media Center and PCs running Windows XP Media Center Edition. While each of these devices offers an element of convenience for the functions that it performs, each lacks ubiquitous and simple access to most media. Further, such devices frequently cost hundreds of dollars to manufacture, often because of the need for expensive processing and/or local storage. Additionally, these modern consumer electronic devices typically consume a great deal of power, even while idle, which means they are expensive over time and wasteful of energy resources. For example, a device may continue to operate if the consumer neglects to turn it off or switches to a different video input. And, because none of the devices is a complete solution, it must be integrated with the other stack of devices in the home, which still leaves the user with a rat's nest of wires and a sea of remote controls.

Furthermore, when many newer Internet-based devices do work properly, they typically offer media in a more generic form than it might otherwise be available. For example, devices that stream video through the Internet often stream just the video material, not the interactive "extras" that often accompany DVDs, like the "making of" videos, games, or director's commentary. This is due to the fact that frequently the interactive material is produced in a particular format intended for a particular device that handles interactivity locally. For example, each of DVD, HD-DVDs and Blu-ray discs have their own particular interactive format. Any home media device or local computer that might be developed to support all of the popular formats would require a level of sophistication and flexibility that would likely make it prohibitively expensive and complex for the consumer to operate.

Adding to the problem, if a new format were introduced later in the future the local device may not have the hardware capability to support the new format, which would mean that the consumer would have to purchase an upgraded local media device. For example, if higher-resolution video or stereoscopic video (e.g., one video stream for each eye) were introduced at a later date, the local device may not have the computational capability to decode the video, or it may not have the hardware to output the video in the new format (e.g., assuming stereoscopy is achieved through 120 fps video synchronized with shuttered glasses, with 60 fps delivered to each eye, if the consumer's video hardware can only support 60 fps video, this option would be unavailable absent an upgraded hardware purchase).

The issue of media device obsolescence and complexity is a serious problem when it comes to sophisticated interactive media, especially video games.

Modern video game applications are largely divided into four major non-portable hardware platforms: Sony PlayStation® 1, 2 and 3 (PS1, PS2, and PS3); Microsoft Xbox® and Xbox 360®; and Nintendo Gamecube® and Wii™; and PC-based games. Each of these platforms is different than the others so that games written to run on one platform usually do not run on another platform. There may also be compatibility problems from one generation of device to the next. Even though the majority of software game developers create software games that are designed independent of a particular platform, in order to run a particular game on a specific platform a proprietary layer of software (frequently called a "game development engine") is needed to adapt the game for use on a specific platform. Each platform is sold to the consumer as a "console" (i.e., a standalone box attached to a TV or monitor/speakers) or it is a PC itself. Typically, the video games are sold on optical media such as a Blu-ray DVD, DVD-ROM or CD-ROM, which contains the video game embodied as a sophisticated real-time software application. As home broadband speeds have increased, video games are becoming increasingly available for download.

The specificity requirements to achieve platform-compatibility with video game software is extremely exacting due to the real-time nature and high computational requirements of advanced video games. For example, one might expect full game compatibility from one generation to the next of video games (e.g., from XBox to XBox 360, or from Playstation 2 ("PS2") to Playstation 3 ("PS3"), just as there is general compatibility of productivity applications (e.g., Microsoft Word) from one PC to another with a faster processing unit or core. However, this is not the case with video games. Because the video game manufacturers typically are seeking the highest possible performance for a given price point when a video game generation is released, dramatic architectural changes to the system are frequently made such that many games written for the prior generation system do not work on the later generation system. For example, XBox was based upon the x86-family of processors, whereas XBox 360 was based upon a PowerPC-family.

Techniques can be utilized to emulate a prior architecture, but given that video games are real-time applications, it is often unfeasible to achieve the exact same behavior in an emulation. This is a detriment to the consumer, the video game console manufacturer and the video game software publisher. For the consumer, it means the necessity of keeping both an old and new generation of video game consoles hooked up to the TV to be able to play all games. For the console manufacturer it means cost associated with emulation and slower adoption of new consoles. And for the publisher it means that multiple versions of new games may have to be released in order to reach all potential consumers—not only releasing a version for each brand of video game (e.g., XBox, Playstation), but often a version for each version of a given brand (e.g., PS2 and PS3). For example, a separate version of Electronic Arts' "Madden NFL 08" was developed for XBox, XBox 360, PS2, PS3, Gamecube, Wii, and PC, among other platforms.

Portable devices, such as cellular ("cell") phones and portable media players also present challenges to game developers. Increasingly such devices are connected to wireless data networks and are able to download video games. But, there are a wide variety of cell phones and media devices in the market, with a wide range of different display resolutions and computing capabilities. Also, because such devices typically have power consumption, cost and weight constraints, they typically lack advanced graphics acceleration hardware like a Graphics Processing Unit ("GPU"), such as devices made by NVIDIA of Santa Clara, Calif. Consequently, game software developers typically develop a given game title simultaneously for many different types of portable devices. A user may find that a given game title is not available for his particular cell phone or portable media player.

In the case of home game consoles, hardware platform manufacturers typically charge a royalty to the software game developers for the ability to publish a game on their platform. Cell phone wireless carriers also typically charge a royalty to the game publisher to download a game into the cell phone. In the case of PC games, there is no royalty paid to publish games, but game developers typically face high costs due to the higher customer service burden to support the wide range of PC configurations and installation issues that may arise. Also, PCs typically present less barriers to the piracy of game software since they are readily reprogrammable by a technically-knowledgeable user and games can be more easily pirated and more easily distributed (e.g., through the Internet). Thus, for a software game developer, there are costs and disadvantages in publishing on game consoles, cell phones and PCs.

For game publishers of console and PC software, costs do not end there. To distribute games through retail channels, publishers charge a wholesale price below the selling price for the retailer to have a profit margin. The publisher also typically has to pay the cost of manufacturing and distributing the physical media holding the game. The publisher is also frequently charged a "price protection fee" by the retailer to cover possible contingencies such as where the game does not sell, or if the game's price is reduced, or if the retailer must refund part or all of the wholesale price and/or take the game back from a buyer. Additionally, retailers also typically charge fees to publishers to help market the games in advertising flyers. Furthermore, retailers are increasingly buying back games from users who have finished playing them, and then sell them as used games, typically sharing none of the used game revenue with the game publisher. Adding to the cost burden placed upon game publishers is the fact that games are often pirated and distributed through the Internet for users to download and make free copies.

As Internet broadband speeds have been increasing and broadband connectivity has become more widespread in the US and worldwide, particularly to the home and to Internet "cafes" where Internet-connected PCs are rented, games are increasingly being distributed via downloads to PCs or consoles. Also, broadband connections are increasingly used for playing multiplayer and massively multiplayer online games (both of which are referred to in the present disclosure by the acronym "MMOG"). These changes mitigate some of the costs and issues associated with retail distribution. Downloading online games addresses some of the disadvantages to game publishers in that distribution costs typically are less and there are little or no costs from unsold media. But downloaded games are still subject to piracy, and because of their size (often many gigabytes in size) they can take a very long time to download. In addition, multiple games can fill up small disk drives, such as those sold with portable computers or with video game consoles. However, to the extent games or MMOGs require an online connection for the game to be playable, the piracy problem is mitigated since the user is usually required to have a valid user account. Unlike linear media (e.g., video and music) which can be copied by a camera shooting video of the display screen or a microphone recording audio from the speakers, each video game experience is unique, and can not be copied using simple video/audio recording. Thus, even in regions where copyright laws are not strongly enforced and piracy is rampant, MMOGs can be shielded from piracy and therefore a business can be supported. For example, Vivendi SA's "World of Warcraft" MMOG has been successfully deployed without suffering from piracy throughout the world. And many online or MMOG games, such as Linden Lab's "Second Life" MMOG generate revenue for the games' operators through economic models built into the games where assets can be bought, sold, and even created using online tools. Thus, mechanisms in addition to conventional game software purchases or subscriptions can be used to pay for the use of online games.

While piracy can be often mitigated due to the nature of online or MMOGs, online game operator still face remaining challenges. Many games require substantial local (i.e., in-home) processing resources for online or MMOGs to work properly. If a user has a low performance local computer (e.g., one without a GPU, such as a low-end laptop), he may not be able to play the game. Additionally, as game consoles age, they fall further behind the state-of-the-art and may not be able to handle more advanced games. Even assuming the user's local PC is able to handle the computational requirements of a game, there are often installation complexities. There may be driver incompatibilities (e.g., if a new game is downloaded, it may install a new version of a graphics driver that renders a previously-installed game, reliant upon an old version of the graphics driver, inoperable). A console may run out of local disk space as more games are downloaded. Complex games typically receive downloaded patches over time from the game developer as bugs are found and fixed, or if modifications are made to the game (e.g., if the game developer finds that a level of the game is too hard or too easy to play). These patches require new downloads. But sometimes not all users complete downloading of all the patches. Other times, the downloaded patches introduce other compatibility or disk space consumption issues.

Also, during game play, large data downloads may be required to provide graphics or behavioral information to the local PC or console. For example, if the user enters a room in a MMOG and encounters a scene or a character made up of graphics data or with behaviors that are not available on the user's local machine, then that scene or character's data must be downloaded. This may result in a substantial delay during game play if the Internet connection is not fast enough. And, if the encountered scene or character requires storage space or computational capability beyond that of the local PC or console, it can create a situation where the user can not proceed in the game, or must continue with reduced-quality graphics. Thus, online or MMOG games often limit their storage and/or computational complexity requirements. Additionally, they often limit the amount of data transfers during the game. Online or MMOG games may also narrow the market of users that can play the games.

Furthermore, technically-knowledgeable users are increasingly reverse-engineering local copies of games and modifying the games so that they can cheat. The cheats maybe as simple as making a button press repeat faster than is humanly possible (e.g., so as to shoot a gun very rapidly). In games that support in-game asset transactions the cheating can reach a level of sophistication that results in fraudulent transactions involving assets of actual economic value. When an online or MMOGs economic model is based on such asset transactions, this can result in substantial detrimental consequences to the game operators.

The cost of developing a new game has grown as PCs and consoles are able to produce increasingly sophisticated games (e.g., with more realistic graphics, such as real-time ray-tracing, and more realistic behaviors, such as real-time physics simulation). In the early days of the video game industry, video game development was a very similar process to application software development; that is, most of the development cost was in the development of the software, as opposed to the development of the graphical, audio, and behavioral elements or "assets", such as those that may be developed for a motion picture with extensive special effects. Today, many sophisticated video game development efforts more closely resemble special effects-rich motion picture development than software development. For instance, many video games provide simulations of 3-D worlds, and generate increasingly photorealistic (i.e., computer graphics that seem as realistic as live action imagery shot photographically) characters, props, and environments. One of the most challenging aspects of photorealistic game development is creating a computer-generated human face that is indistinguishable from a live action human face. Facial capture technologies such Contour™ Reality Capture developed by Mova of San Francisco, Calif. captures and tracks the precise geometry of a performer's face at high resolution while it is in motion. This technology allows a 3D face to be rendered on a PC or game console that is virtually indistinguishable from a captured live action face. Capturing and rendering a "photoreal" human face precisely is useful in several respects. First, highly recognizable celebrities or athletes are often used in video games (often hired at a high cost), and imperfections may be apparent to the user, making the viewing experience distracting or unpleasant. Frequently, a high degree of detail is required to achieve a high degree of photorealism—requiring the rendering of a large number of polygons and high-resolution textures, potentially with the polygons and/or textures changing on a frame-by-frame basis as the face moves.

When high polygon-count scenes with detailed textures change rapidly, the PC or game console supporting the game may not have sufficient RAM to store enough polygon and texture data for the required number of animation frames generated in the game segment. Further, the single optical drive or single disk drive typically available on a PC or game console is usually much slower than the RAM, and typically can not keep up with the maximum data rate that the GPU can accept in rendering polygons and textures. Current games typically load most of the polygons and textures into RAM, which means that a given scene is largely limited in complexity and duration by the capacity of the RAM. In the case of facial animation, for example, this may limit a PC or a game console to either a low resolution face that is not photoreal, or to a photoreal face that can only be animated for a limited number of frames, before the game pauses, and loads polygons and textures (and other data) for more frames.

Watching a progress bar move slowly across the screen as a PC or console displays a message similar to "Loading . . . " is accepted as an inherent drawback by today's users of complex video games. The delay while the next scene loads from the disk ("disk" herein, unless otherwise qualified, refers to non-volatile optical or magnetic media, as well non-disk media such as semiconductor "Flash" memory) can take several seconds or even several minutes. This is a waste of time and can be quite frustrating to a game player. As previously discussed, much or all of the delay may be due to the load time for polygon, textures or other data from a disk, but it also may be the case that part of the load time is spent while the processor and/or GPU in the PC or console prepares data for the scene. For example, a soccer video game may allow the players to choose among a large number of players, teams, stadiums and weather conditions. So, depending on what particular combination is chosen, different polygons, textures and other data (collectively "objects") may be required for the scene (e.g., different teams have different colors and patterns on their uniforms). It may be possible to enumerate many or all of the various permutations and pre-compute many or all of the objects in advance and store the objects on the disk used to store the game. But, if the number of permutations is large, the amount of storage required for all of the objects may be too large to fit on the disk (or too impractical to download). Thus, existing PC and console systems are typically constrained in both the complexity and play duration of given scenes and suffer from long load times for complex scenes.

Another significant limitation with prior art video game systems and application software systems is that they are increasingly using large databases, e.g., of 3D objects such as polygons and textures, that need to be loaded into the PC or game console for processing. As discussed above, such databases can take a long time to load when stored locally on a disk. Load time, however, is usually far more severe if the database is stored a remote location and is accessed through the Internet. In such a situation it may take minutes, hours, or even days to download a large database. Further, such databases are often created a great expense (e.g., a 3D model of a detailed tall-masted sailing ship for use in a game, movie, or historical documentary) and are intended for sale to the local end-user. However, the database is at risk of being pirated once it has been downloaded to the local user. In many cases, a user wants to download a database simply for the sake of evaluating it to see if it suits the user's needs (e.g., if a 3D costume for a game character has a satisfactory appearance or look when the user performs a particular move). A long load time can be a deterrent for the user evaluating the 3D database before deciding to make a purchase.

Similar issues occur in MMOGs, particularly as games that allow users to utilize increasingly customized characters. For a PC or game console to display a character it needs to have access to the database of 3D geometry (polygons, textures, etc.) as well as behaviors (e.g., if the character has a shield, whether the shield is strong enough to deflect a spear or not) for that character. Typically, when a MMOG is first played by a user, a large number of databases for characters are already available with the initial copy of the game, which is available locally on the game's optical disk or downloaded to a disk. But, as the game progresses, if the user encounters a character or object whose database is not available locally (e.g., if another user has created a customized character), before that character or object can be displayed, its database must be downloaded. This can result in a substantial delay of the game.

Given the sophistication and complexity of video games, another challenge for video game developers and publishers with prior art video game consoles, is that it frequently takes 2 to 3 years to develop a video game at a cost of tens of millions of dollars. Given that new video game console platforms are introduced at a rate of roughly once every five years, game developers need to start development work on those games years in advance of the release of the new game console in order to have video games available concurrently when the new platform is released. Several consoles from competing manufactures are sometimes released around the same time (e.g., within a year or two of each other), but what remains to be seen is the popularity of each console, e.g., which console will produce the largest video game software sales. For example, in a recent console cycle, the Microsoft XBox 360, the Sony Playstation 3, and the Nintendo Wii were scheduled to be introduced around the same general timeframe. But years before the introductions the game developers essentially had to "place their bets" on which console platforms would be more successful than others, and devote their development resources accordingly. Motion picture production companies also have to apportion their limited production resources based on what they estimate to be the likely success of a movie well in advance of the release of the movie. Given the growing level of investment required for video games, game production is increasingly becoming like motion picture production, and game production companies routinely devote their production resources based on their estimate of the future success of a particular video game. But, unlike they motion picture companies, this bet is not simply based on the success of the production itself; rather, it is predicated on the success of the game console the game is intended to run on. Releasing the game on multiple consoles at once may mitigate the risk, but this additional effort increases cost, and frequently delays the actual release of the game.

Application software and user environments on PCs are becoming more computationally intensive, dynamic and interactive, not only to make them more visually appealing to users, but also to make them more useful and intuitive. For example, both the new Windows Vista™ operating system and successive versions of the Macintosh® operating system incorporate visual animation effects. Advanced graphics tools such as Maya™ from Autodesk, Inc., provide very sophisticated 3D rendering and animation capability which push the limits of state-of-the-art CPUs and GPUs. However, the computational requirements of these new tools create a number of practical issues for users and software developers of such products.

Since the visual display of an operating system (OS) must work on a wide range of classes of computers—including prior-generation computers no longer sold, but still upgradeable with the new OS—the OS graphical requirements are limited to a large degree by a least common denominator of computers that the OS is targeted for, which typically includes computers that do not include a GPU. This severely limits the graphics capability of the OS. Furthermore, battery-powered portable computers (e.g., laptops) limit the visual display capability since high computational activity in a CPU or GPU typically results in higher power consumption and shorter battery life. Portable computers typically include software that automatically lowers processor activity to reduce power consumption when the processor is not utilized. In some computer models the user may lower processor activity manually. For example, Sony's VGN-SZ280P laptop contains a switch labeled "Stamina" on one side (for low performance, more battery life) and "Speed" on the other (for high performance, less battery life). An OS running on a portable computer must be able to function usably even in the event the computer is running at a fraction of its peak performance capability. Thus, OS graphics performance often remains far below the state-of-the-art available computational capability.

High-end computationally-intense applications like Maya are frequently sold with the expectation that they will be used on high-performance PCs. This typically establishes a much higher performance, and more expensive and less portable, least common denominator requirement. As a consequence, such applications have a much more limited target audience than a general purpose OS (or general purpose productivity application, like Microsoft Office) and typically sell in much lower volume than general purpose OS software or general purpose application software. The potential audience is further limited because often times it is difficult for a prospective user to try out such computationally-intense applications in advance. For example, suppose a student wants to learn how to use Maya or a potential buyer already knowledgeable about such applications wants to try out Maya before making the investment in the purchase (which may well involve also buying a high-end computer capable of running Maya). While either the student or the potential buyer could download, or get a physical media copy of, a demo version of Maya, if they lack a computer capable of running Maya to its full potential (e.g., handling a complex 3D scene), then they will be unable to make an fully-informed assessment of the product. This substantially limits the audience for such high-end applications. It also contributes to a high selling price since the development cost is usually amortized across a much smaller number of purchases than those of a general-purpose application.

High-priced applications also create more incentive for individuals and businesses to use pirated copies of the application software. As a result, high-end application software suffers from rampant piracy, despite significant efforts by publishers of such software to mitigate such piracy through various techniques. Still, even when using pirated high-end applications, users cannot obviate the need to invest in expensive state-of-the-art PCs to run the pirated copies. So, while they may obtain use of a software application for a fraction of its actual retail price, users of pirated software are still required to purchase or obtain an expensive PC in order to fully utilize the application.

The same is true for users of high-performance pirated video games. Although pirates may get the games at fraction of their actual price, they are still required to purchase expensive computing hardware (e.g., a GPU-enhanced PC, or a high-end video game console like the XBox 360) needed to properly play the game. Given that video games are typically a pastime for consumers, the additional cost for a high-end video game system can be prohibitive. This situation is worse in countries (e.g., China) where the average annual income of workers currently is quite low relative to that of the United States. As a result, a much smaller percentage of the population owns a high-end video game system or a high-end PC. In such countries, "Internet cafes", in which users pay a fee to use a computer connected to the Internet, are quite common. Frequently, such Internet cafes have older model or low-end PCs without high performance features, such as a GPU, which might otherwise enable players to play computationally-intensive video games. This is a key factor in the success of games that run on low-end PCs, such as Vivendi's "World of Warcraft" which is highly successful in China, and is commonly played in Internet cafes there. In contrast, a computationally-intensive game, like "Second Life" is much less likely to be playable on a PC installed in a Chinese Internet café. Such games are virtually inaccessible to users who only have access to low-performance PCs in Internet cafes.

Barriers also exist for users who are considering purchasing a video game and would first like to try out a demonstration version of the game by downloading the demo through the Internet to their home. A video game demo is often a full-fledged version of the game with some features disabled, or with limits placed on the amount of game play. This may involve a long process (perhaps hours) of downloading gigabytes of data before the game can be installed and executed on either a PC or a console. In the case of a PC, it may also involve figuring out what special drivers are needed (e.g., DirectX or OpenGL drivers) for the game, downloading the correct version, installing them, and then determining whether the PC is capable of playing the game. This latter step may involve determining whether the PC has enough processing (CPU and GPU) capability, sufficient RAM, and a compatible OS (e.g., some games run on Windows XP, but not Vista). Thus, after a long process of attempting to run a video game demo, the user may well find out that the video game demo can't be possibly played, given the user's PC configuration. Worse, once the user has downloaded new drivers in order to try the demo, these driver versions may be incompatible with other games or applications the user uses regularly on the PC, thus the installation of a demo may render previously operable games or applications inoperable. Not only are these barriers frustrating for the user, but they create barriers for video game software publishers and video game developers to market their games.

Another problem that results in economic inefficiency has to do with the fact that given PC or game console is usually designed to accommodate a certain level of performance requirement for applications and/or games. For example, some PCs have more or less RAM, slower or faster CPUs, and slower or faster GPUs, if they have a GPUs at all. Some games or applications make take advantage of the full computing power of a given PC or console, while many games or applications do not. If a user's choice of game or application falls short of the peak performance capabilities of the local PC or console, then the user may have wasted money on the PC or console for unutilized features. In the case of a console, the console manufacturer may have paid more than was necessary to subsidize the console cost.

Another problem that exists in the marketing and enjoyment of video games involves allowing a user to watch others playing games before the user commits to the purchase of that game. Several prior art approaches exist for the recording of video games for replay at a later time. For example, U.S. Pat. No. 5,558,339 teaches recording game state information, including game controller actions, during "gameplay" in the video game client computer (owned by the same or different user). This state information can be used at a later time to replay some or all of the game action on a video game client computer (e.g., PC or console). A significant drawback to this approach is that for a user to view the recorded game, the user must possess a video game client computer capable of playing the game and must have the video game application running on that computer, such that the gameplay is identical when the recorded game state is replayed. Beyond that, the video game application has to be written in such a way that there is no possible execution difference between the recorded game and the played back game.

For example, game graphics are generally computed on a frame-by-frame basis. For many games, the game logic sometimes may take shorter or longer than one frame time to compute the graphics displayed for the next frame, depending on whether the scene is particularly complex, or if there are other delays that slow down execution (e.g., on a PC, another process may be running that takes away CPU cycles from the game applications). In such a game, a "threshold" frame that is computed in slightly less than one frame time (say a few CPU clock cycles less) can eventually occur. When that same scene is computed again using the exact same game state information, it could easily take a few CPU clock cycles more than one frame time (e.g., if an internal CPU bus is slightly out of phase with the an external DRAM bus and it introduces a few CPU cycle times of delay, even if there is no large delay from another process taking away milliseconds of CPU time from game processing). Therefore, when the game is played back the frame gets calculated in two frame times rather than a single frame time. Some behaviors are based on how often the game calculates a new frame (e.g., when the game samples the input from the game controllers). While the game is played, this discrepancy in the time reference for different behaviors does not impact game play, but it can result in the played-back game producing a different result. For example, if a basketball's ballistics are calculated at a steady 60 fps rate, but the game controller input is sampled based on rate of computed frames, the rate of computed frames may be 53 fps when the game was recorded, but 52 fps when the game is replayed, which can make the difference between whether the basketball is blocked from going into the basket or not, resulting in a different outcome. Thus, using game state to record video games requires very careful game software design to ensure that the replay, using the same game state information, produces the exact same outcome.

Another prior art approach for recording video game is to simply record the video output of a PC or video game system (e.g., to a VCR, DVD recorder, or to a video capture board on a PC). The video then can be rewound and replayed, or alternatively, the recorded video uploaded to the Internet, typically after being compressed. A disadvantage to this approach is that when a 3D game sequence is played back, the user is limited to viewing the sequence from only the point of view from which the sequence was recorded. In other words, the user cannot change the point of view of the scene.

Further, when compressed video of a recorded game sequence played on a home PC or game console is made available to other users through the Internet, even if the video is compressed in real-time, it may be impossible to upload the compressed video in real-time to the Internet. The reason why is because many homes in the world that are connected to the Internet have highly asymmetric broadband connections (e.g., DSL and cable modems typically have far higher downstream bandwidth than upstream bandwidth). Compressed high resolution video sequences often have higher bandwidths than the upstream bandwidth capacity of the network, making them impossible to upload in real-time. Thus, there would be a significant delay after the game sequence is played (perhaps minutes or even hours) before another user on the Internet would be able to view the game. Although this delay is tolerable in certain situations (e.g., to watch a game player's accomplishments that occurred at a prior time), it eliminates the ability to watch a game live (e.g., a basketball tournament, played by champion players) or with "instant replay" capability as the game is played live.

Another prior art approach allows a viewer with a television receiver to watch video games live, but only under the control of the television production crew. Some television channels, in both the US and in other countries provide video game viewing channels, where the television viewing audience is able to watch certain video game users (e.g., top-rated players playing in tournaments) on video game channels. This is accomplished by having the video output of the video game systems (PCs and/or consoles) fed into the video distribution and processing equipment for the television channel. This is not unlike when the television channel is broadcasting a live basketball game in which several cameras provide live feeds from different angles around the basketball court. The television channel then is able to make use of their video/audio processing and effects equipment to manipulate the output from the various video game systems. For example, the television channel can overlay text on top of the video from a video game that indicates the status of different players (just as they might overlay text during a live basketball game), and the television channel can overdub audio from a commentator who can discuss the action occurring during the games. Additionally, the video game output can be combined with cameras recording video of the actual players of the games (e.g., showing their emotional response to the game).

One problem with this approach is that such live video feeds must be available to the television channel's video distribution and processing equipment in real-time in order for it to have the excitement of a live broadcast. As previously discussed, however, this is often impossible when the video game system is running from the home, especially if part of the broadcast includes live video from a camera that is capturing real-world video of the game player. Further, in a tournament situation, there is a concern that an in-home gamer may modify the game and cheat, as previously described. For these reasons, such video game broadcasts on television channels are often arranged with players and video game systems aggregated at a common location (e.g., at a television studio or in an arena) where the television production equipment can accept video feeds from multiple video game systems and potentially live cameras.

Although such prior art video game television channels can provide a very exciting presentation to the television viewing audience that is an experience akin to a live sporting event, e.g., with the video game players presented as "athletes", both in terms of their actions in the video game world, and in terms of their actions in the real world, these video game systems are often limited to situations where players are in close physical proximity to one another. And, since television channels are broadcasted, each broadcasted channel can only show one video stream, which is selected by the television channel's production crew. Because of these limitations and the high cost of broadcast time, production equipment and production crews, such television channels typically only show top-rated players playing in top tournaments.

Additionally, a given television channel broadcasting a full-screen image of a video game to the entire television viewing audience shows only one video game at a time. This severely limits a television viewer's choices. For example, a television viewer may not be interested in the game(s) shown at a given time. Another viewer may only be interested in watching the game play of a particular player that is not featured by the television channel at a given time. In other cases, a viewer may only be interested in watching a how an expert player handles a particular level in a game. Still other viewers may wish to control the viewpoint that a video game is seen from, which is different from that chosen by the production team, etc. In short, a television viewer may have a myriad of preferences in watching video games that are not accommodated by the particular broadcast of a television network, even if several different television channels are available. For all of the aforementioned reasons, prior art video game television channels have significant limitations in presenting video games to television viewers.

Another drawback of prior art video games systems and application software systems is that they are complex, and commonly suffer from errors, crashes and/or unintended and undesired behaviors (collectively, "bugs"). Although games and applications typically go through a debugging and tuning process (frequently called "Software Quality Assurance" or SQA) before release, almost invariably once the game or application is released to a wide audience in the field bugs crop up. Unfortunately, it is difficult for the software developer to identify and track down many of the bugs after release. It can be difficult for software developers to become aware of bugs. Even when they learn about a bug, there may only be a limited amount of information available to them to identify what caused the bug. For example, a user may call up a game developer's customer service line and leave a message stating that when playing the game, the screen started to flash, then changed to a solid blue color and the PC froze. That provides the SQA team with very little information useful in tracking down a bug. Some games or applications that are connected online can sometimes provide more information in certain cases. For example, a "watchdog" process can sometimes be used to monitor the game or application for "crashes". The watchdog process can gather statistics about the status of the game or applications process (e.g., the status of the stack, of the memory usage, how far the game or applications has progressed, etc.) when it crashes and then upload that information to the SQA team via the Internet. But in a complex game or application, such information can take a very long time to decipher in order to accurately determine what the user was doing at the time of the crash. Even then, it may be impossible to determine what sequence of events led to the crash.

Yet another problem associated with PCs and game consoles is that they are subject to service issues which greatly inconvenience the consumer. Service issues also impact the manufacturer of the PC or game console since they typically are required to send a special box to safely ship the broken PC or console, and then incur the cost of repair if the PC or console is in warranty. The game or application software publisher can also be impacted by the loss of sales (or online service use) by PCs and/or consoles being in a state of repair.

FIG. 1 illustrates a prior art video gaming system such as a Sony Playstation® 3, Microsoft Xbox 360®, Nintendo Wii™, Windows-based personal computer or Apple Macintosh. Each of these systems includes a central processing unit (CPU) for executing program code, typically a graphical processing unit (GPU) for performing advanced graphical operations, and multiple forms of input/output (I/O) for communicating with external devices and users. For simplicity, these components are shown combined together as a single unit 100. The prior art video gaming system of FIG. 1 also is shown including an optical media drive 104 (e.g., a DVD-ROM drive); a hard drive 103 for storing video game program code and data; a network connection 105 for playing multi-player games, for downloading games, patches, demos or other media; a random access memory (RAM) 101 for storing program code currently being executed by the CPU/GPU 100; a game controller 106 for receiving input commands from the user during gameplay; and a display device 102 (e.g., a SDTV/HDTV or a computer monitor).

The prior art system shown in FIG. 1 suffers from several limitations. First, optical drives 104 and hard drives 103 tend to have much slower access speeds as compared to that of RAM 101. When working directly through RAM 101, the CPU/GPU 100 can, in practice, process far more polygons per second than is possible when the program code and data is read directly off of hard drive 103 or optical drive 104 due to the fact that RAM 101 generally has much higher bandwidth and does not suffer from the relatively long seek delays of disc mechanisms. But only a limited amount of RAM is provided in these prior art systems (e.g., 256-512 Mbytes). Therefore, a "Loading . . . " sequence in which RAM 101 is periodically filled up with the data for the next scene of the video game is often required.

Some systems attempt to overlap the loading of the program code concurrently with the gameplay, but this can only be done when there is a known sequence of events (e.g., if a car is driving down a road, the geometry for the approaching buildings on the roadside can be loaded while the car is driving). For complex and/or rapid scene changes, this type of overlapping usually does not work. For example, in the case where the user is in the midst of a battle and RAM 101 is completely filled with data representing the objects within view at that moment, if the user moves the view rapidly to the left to view objects that are not presently loaded in RAM 101, a discontinuity in the action will result since there not be enough time to load the new objects from Hard Drive 103 or Optical Media 104 into RAM 101.

Another problem with the system of FIG. 1 arises due to limitations in the storage capacity of hard drives 103 and optical media 104. Although disk storage devices can be manufactured with a relatively large storage capacity (e.g., 50 gigabytes or more), they still do not provide enough storage capacity for certain scenarios encountered in current video games. For example, as previously mentioned, a soccer video game might allow the user to choose among dozens of teams, players and stadiums throughout the world. For each team, each player and each stadium a large number of texture maps and environment maps are needed to characterize the 3D surfaces in the world (e.g., each team has a unique jersey, with each requiring a unique texture map).

One technique used to address this latter problem is for the game to pre-compute texture and environment maps once they are selected by the user. This may involve a number of computationally-intensive processes, including decompressing images, 3D mapping, shading, organizing data structures, etc. As a result, there may be a delay for the user while the video game is performing these calculations. On way to reduce this delay, in principle, is to perform all of these computations—including every permutation of team, player roster, and stadium—when the game was originally developed. The released version of the game would then include all of this pre-processed data stored on optical media 104, or on one or more servers on the Internet with just the selected pre-processed data for a given team, player roster, stadium selection downloaded through the Internet to hard drive 103 when the user makes a selection. As a practical matter, however, such pre-loaded data of every permutation possible in game play could easily be terabytes of data, which is far in excess of the capacity of today's optical media devices. Furthermore, the data for a given team, player roster, stadium selection could easily be hundreds of megabytes of data or more. With a home network connection of, say, 10 Mbps, it would take longer to download this data through network connection 105 than it would to compute the data locally.

Thus, the prior art game architecture shown in FIG. 1 subjects the user to significant delays between major scene transitions of complex games.

Another problem with prior art approaches such as that shown in FIG. 1 is that over the years video games tend to become more advanced and require more CPU/GPU processing power. Thus, even assuming an unlimited amount of RAM, video games hardware requirements go beyond the peak level of processing power available in these systems. As a result, users are required to upgrade gaming hardware every few years to keep pace (or play newer games at lower quality levels). One consequence of the trend to ever more advanced video games is that video game playing machines for home use are typically economically inefficient because their cost is usually determined by the requirements of the highest performance game they can support. For example, an XBox 360 might be used to play a game like "Gears of War", which demands a high performance CPU, GPU, and hundreds of megabytes of RAM, or the XBox 360 might be used to play Pac Man, a game from the 1970s that requires only kilobytes of RAM and a very low performance CPU. Indeed, an XBox 360 has enough computing power to host many simultaneous Pac Man games at once.

Video games machines are typically turned off for most of the hours of a week. According to a July 2006 Nielsen Entertainment study of active gamers 13 years and older, on average, active gamers spend fourteen hours/week playing console video games, or just 12% of the total hours in a week. This means that the average video game console is idle 88% of the time, which is an inefficient use of an expensive resource. This is particularly significant given that video game consoles are often subsidized by the manufacturer to bring down the purchase price (with the expectation that the subsidy will be earned back by royalties from future video game software purchases).

Video game consoles also incur costs associated with almost any consumer electronic device. For instance, the electronics and mechanisms of the systems need to be housed in an enclosure. The manufacturer needs to offer a service warranty. The retailer who sells the system needs to collect a margin on either the sale of the system and/or on the sale of video game software. All of these factors add to the cost of the video game console, which must either be subsidized by the manufacturer, passed along to the consumer, or both.

In addition, piracy is a major problem for the video game industry. The security mechanisms utilized on virtually every major video gaming system have been "cracked" over the years, resulting in unauthorized copying of video games. For example, the Xbox 360 security system was cracked in July 2006 and users are now able to download illegal copies online. Games that are downloadable (e.g., games for the PC or the Mac) are particularly vulnerable to piracy. In certain regions of the world where piracy is weakly policed there is essentially no viable market for standalone video game software because users can buy pirated copies as readily as legal copies for a tiny fraction of the cost. Also, in many parts of the world the cost of a game console is such a high percentage of income that even if piracy were controlled, few people could afford a state-of-the-art gaming system.

In addition, the used game market reduces revenue for the video game industry. When a user has become tired of a game, they can sell the game to a store which will resell the game to other users. This unauthorized but common practice significantly reduces revenues of game publishers. Similarly, a reduction in sales on the order of 50% commonly occurs when there is a platform transition every few years. This is because users stop buying games for the older platforms when they know that the newer version platform is about to be released (e.g., when Playstation 3 is about to be released, users stop buying Playstation 2 games). Combined, the loss of sales and increased development costs associated with the new platforms can have a very significant adverse impact on the profitability of game developers.

New game consoles are also very expensive. The Xbox 360, the Nintendo Wii, and the Sony Playstation 3 all retail for hundreds of dollars. High powered personal computer gaming systems can cost up to $8000. This represents a significant investment for users, particularly considering that the hardware becomes obsolete after a few years and the fact that many systems are purchased for children.

One approach to the foregoing problems is online gaming in which the gaming program code and data are hosted on a server and delivered to client machines on-demand as compressed video and audio streamed over a digital broadband network. Some companies such as G-Cluster in Finland (now a subsidiary of Japan's SOFTBANK Broadmedia) currently provide these services online. Similar gaming services have become available in local networks, such as those within hotels and offered by DSL and cable television providers. A major drawback of these systems is the problem of latency, i.e., the time it takes for a signal to travel to and from the game server, which is typically located in an operator's "head-end". Fast action video games (also known as "twitch" video games) require very low latency between the time the user performs an action with the game controller and the time the display screen is updated showing the result of the user action. Low latency is needed so that the user has the perception that the game is responding "instantly". Users may be satisfied with different latency intervals depending on the type of game and the skill level of the user. For example, 100 ms of latency may be tolerable for a slow casual game (like backgammon) or a slow-action role playing game, but in a fast action game a latency in excess of 70 or 80 ms may cause the user to perform more poorly in the game, and thus is unacceptable. For instance, in a game that requires fast reaction time there is a sharp decline in accuracy as latency increases from 50 to 100 ms.

When a game or application server is installed in a nearby, controlled network environment, or one where the network path to the user is predictable and/or can tolerate bandwidth peaks, it is far easier to control latency, both in terms of maximum latency and in terms of the consistency of the latency (e.g., so the user observes steady motion from digital video streaming through the network). Such level of control can be achieved between a cable TV network head-end to a cable TV subscriber's home, or from a DSL central office to DSL subscriber's home, or in a commercial office Local Area Network (LAN) environment from a server or a user. Also, it is possible to obtain specially-graded point-to-point private connections between businesses which have guaranteed bandwidth and latency. But in a game or application system that hosts games in a server center connected to the general Internet and then streams compressed video to the user through a broadband connection, latency is incurred from many factors, resulting in severe limitations in the deployment of prior art systems.

In a typical broadband-connected home, a user may have a DSL or cable modem for broadband service. Such broadband services commonly incur as much as a 25 ms round-trip latency (and at times more) between the user's home and the general Internet. In addition, there are round-trip latencies incurred from routing data through the Internet to a server center. The latency through the Internet varies based on the route that the data is given and the delays it incurs as it is routed. In addition to routing delays, round-trip latency is also incurred due to the speed of light traveling through the optical fiber that interconnects most of the Internet. For example, for each 1000 miles, approximately 22 ms is incurred in round-trip latency due to the speed of light through the optical fiber and other overhead.

Additional latency can occur due to the data rate of the data streamed through the Internet. For example, if a user has DSL service that is sold as "6 Mbps DSL service", in practice, the user will probably get less than 5Mbps of downstream throughput at best, and will likely see the connection degrade periodically due to various factors such as congestion during peak load times at the Digital Subscriber Line Access Multiplexer (DSLAM). A similar issue can occur reducing a the data rate of a cable modem is used for a connection sold as "6Mbps cable modem service" to far less than that, if there is congestion in the local shared coaxial cable looped through the neighborhood, or elsewhere in the cable modem system network. If data packets at a steady rate of 4 Mbps are streamed as one-way in User Datagram Protocol (UDP) format from a server center through such connections, if everything is working well, the data packets will pass through without incurring additional latency, but if there is congestion (or other impediments) and only 3.5 Mbps is available to stream data to the user, then in a typical situation either packets will be dropped, resulting in lost data, or packets will queue up at the point of congestion, until they can be sent, thereby introducing additional latency. Different points of congestion have different queuing capacity to hold delayed packets, so in some cases packets that can't make it through the congestion are dropped immediately. In other cases, several megabits of data are queued up and eventually be sent. But, in almost all cases, queues at points of congestion have capacity limits, and once those limits are exceeded, the queues will overflow and packets will be dropped. Thus, to avoid incurring additional latency (or worse, loss of packets), it is necessary to avoid exceeding the data rate capacity from the game or application server to the user.

Latency is also incurred by the time required to compress video in the server and decompress video in the client device. Latency is further incurred while a video game running on a server is calculating the next frame to be displayed. Currently available video compression algorithms suffer from either high data rates or high latency. For example, motion JPEG is an intraframe-only lossy compression algorithm that is characterized by low-latency. Each frame of video is compressed independently of each other frame of video. When a client device receives a frame of compressed motion JPEG video, it can immediately decompress the frame and display it, resulting in very low latency. But because each frame is compressed separately, the algorithm is unable to exploit similarities between successive frames, and as a result intraframe-only video compression algorithms suffer from very high data rates. For example, 60 fps (frames per second) 640×480 motion JPEG video may require 40 Mbps (megabits per second) or more of data. Such high data rates for such low resolution video windows would be prohibitively expensive in many broadband applications (and certainly for most consumer Internet-based applications). Further, because each frame is compressed independently, artifacts in the frames that may result from the lossy compression are likely to appear in different places in successive frames. This can results in what appears to the viewer as a moving visual artifacts when the video is decompressed.

Other compression algorithms, such as MPEG2, H.264 or VC9 from Microsoft Corporation as they are used in prior art configurations, can achieve high compression ratios, but at the cost of high latency. Such algorithms utilize interframe as well as intraframe compression. Periodically, such algorithms perform an intraframe-only compression of a frame. Such a frame is known as a key frame (typically referred to as an "I" frame). Then, these algorithms typically compare the I frame with both prior frames and successive frames. Rather than compressing the prior frames and successive frames independently, the algorithm determines what has changed in the image from the I frame to the prior and successive frames, and then stores those changes as what are called "B" frames for the changes preceding the I frame and "P" frames for the changes following the I frame. This results in much lower data rates than intraframe-only compression. But, it typically comes at the cost of higher latency. An I frame is typically much larger than a B or P frame (often 10 times larger), and as a result, it takes proportionately longer to transmit at a given data rate.

Consider, for example, a situation where the I frames are 10X the size of B and P frames, and there are 29 B frames+30 P frames=59 interframes for every single I intraframe, or 60 frames total for each "Group of Frames" (GOP). So, at 60 fps, there is 1 60-frame GOP each second. Suppose the transmission channel has a maximum data rate of 2 Mbps. To achieve the highest quality video in the channel, the compression algorithm would produce a 2 Mbps data stream, and given the above ratios, this would result in 2 Megabits (Mb)/(59+10)= 30,394 bits per intraframe and 303,935 bits per I frame. When the compressed video stream is received by the decompression algorithm, in order for the video to play steadily, each frame needs to decompressed and displayed at a regular interval (e.g., 60 fps). To achieve this result, if any frame is subject to transmission latency, all of the frames need to be delayed by at least that latency, so the worst-case frame latency will define the latency for every video frame. The I frames introduce the longest transmission latencies since they are largest, and an entire I frame would have to be received before the I frame could be decompressed and displayed (or any interframe dependent on the I frame). Given that the channel data rate is 2 Mbps, it will take 303,935/2 Mb=145 ms to transmit an I frame.

An interframe video compression system as described above using a large percentage of the bandwidth of the transmission channel will be subject to long latencies due to the large size of an I frame relative to the average size of a frame. Or, to put it another way, while prior art interframe compression algorithms achieve a lower average per-frame data rate than intraframe-only compression algorithms (e.g., 2 Mbps vs. 40 Mbps), they still suffer from a high peak per-frame data rate (e.g., 303,935*60=18.2 Mbps) because of the large I frames. Bear in mind, though that the above analysis assumes that the P and B frames are all much smaller than the I frames. While this is generally true, it is not true for frames with high image complexity uncorrelated with the prior frame, high motion, or scene changes. In such situations, the P or B frames can become as large as I frames (if a P or B frame gets larger than an I frame, a sophisticated compression algorithm will typically "force" an I frame and replace the P or B frame with an I frame). So, I frame-sized data rate peaks can occur at any moment in a digital video stream. Thus, with compressed video, when the average video data rate approaches data rate capacity of the transmission channels (as is frequently the case, given the high data rate demands for video) the high peak data rates from I frames or large P or B frames result in a high frame latency.

Of course, the above discussion only characterizes the compression algorithm latency created by large B, P or I frames in a GOP. If B frames are used, the latency will be even higher. The reason why is because before a B frame can be displayed, all of the B frames after the B frame and the I frame must be received. Thus, in a group of picture (GOP) sequence such as BBBBBIPPPPPBBBBBIPPPPP, where there are 5 B frames before each I frame, the first B frame can not be displayed by the video decompressor until the subsequent B frames and I frame are received. So, if video is being streamed at 60 fps (i.e., 16.67 ms/frame), before the first B frame can be decompressed, five B frames and the I frame will take 16.67*6=100 ms to receive, no matter how fast the channel bandwidth is, and this is with just 5 B frames. Compressed video sequences with 30 B frames are quite common. And, at a low channel bandwidth like 2 Mbps, the latency impact caused by the size of the I frame is largely additive to the latency impact due to waiting for B frames to arrive. Thus, on a 2 Mbps channel, with a large number of B frames it is quite easy to exceed 500 ms of latency or more using prior art video compression technology. If B frames are not used (at the cost of a lower compression ratio for given quality level), the B frame latency is not incurred, but the latency caused by the peak frame sizes, described above, is still incurred.

The problem is exacerbated by very the nature of many video games. Video compression algorithms utilizing the GOP structure described above have been largely optimized for use with live video or motion picture material intended for passive viewing. Typically, the camera (whether a real camera, or a virtual camera in the case of a computer-generated animation) and scene is relatively steady, simply because if the camera or scene moves around too jerkily, the video or movie material is (a) typically unpleasant to watch and (b) if it is being watched, usually the viewer is not closely following the action when the camera jerks around suddenly (e.g., if the camera is bumped when shooting a child blowing out the candles on a birthday cake and suddenly jerks away from the cake and back again, the viewers are typically focused on the child and the cake, and disregard the brief interruption when the camera suddenly moves). In the case of a video interview, or a video teleconference, the camera may be held in a fixed position and not move at all, resulting in very few data peaks at all. But 3D high action video games are characterized by constant motion (e.g., consider a 3D racing, where the entire frame is in rapid motion for the duration of the race, or consider first-person shooters, where the virtual camera is constantly moving around jerkily). Such video games can result in frame sequences with large and frequent peaks where the user may need to clearly see what is happening during those sudden motions. As such, compression artifacts are far less tolerable in 3D high action video games. Thus, the video output of many video games, by their nature, produces a compressed video stream with very high and frequent peaks.

Given that users of fast-action video games have little tolerance for high latency, and given all of the above causes of latency, to date there have been limitations to server-hosted video games that stream video on the Internet. Further, users of applications that require a high degree of interactivity suffer from similar limitations if the applications are hosted on the general Internet and stream video. Such services require a network configuration in which the hosting servers are set up directly in a head end (in the case of cable broadband) or the central office (in the case of Digital Subscriber Lines (DSL)), or within a LAN (or on a specially-graded private connection) in a commercial setting, so that the route and distance from the client device to the server is controlled to minimize latency and peaks can be accommodated without incurring latency. LANs (typically rated at 100 Mbps-1 Gbps) and leased lines with adequate bandwidth typically can support peak bandwidth requirements (e.g., 18 Mbps peak bandwidth is a small fraction of a 100 Mbps LAN capacity).

Peak bandwidth requirements can also be accommodated by residential broadband infrastructure if special accommodations are made. For example, on a cable TV system, digital video traffic can be given dedicated bandwidth which can handle peaks, such as large I frames. And, on a DSL system, a higher speed DSL modem can be provisioned, allowing for high peaks, or a specially-graded connection can provisioned which can handle a higher data rates. But, conventional cable modem and DSL infrastructure attached to the general Internet have far less tolerance for peak bandwidth requirements for compressed video. So, online services that host video games or applications in server centers a long distance from the client devices, and then stream the compressed video output over the Internet through conventional residential broadband connections suffer from significant latency and peak bandwidth limitations—particularly with respect to games and applications which require very low latency (e.g., first person shooters and other multi-user, interactive action games, or applications requiring a fast response time).

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

FIGS. 9a-c illustrate frame rate processing techniques employed in one embodiment of the invention.

FIGS. 11a-d illustrate embodiments which employ forward error correction techniques.

FIG. 30 illustrates how "I tiles" are interspersed across "R frames" according to one embodiment of the invention.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

Figure 2A:
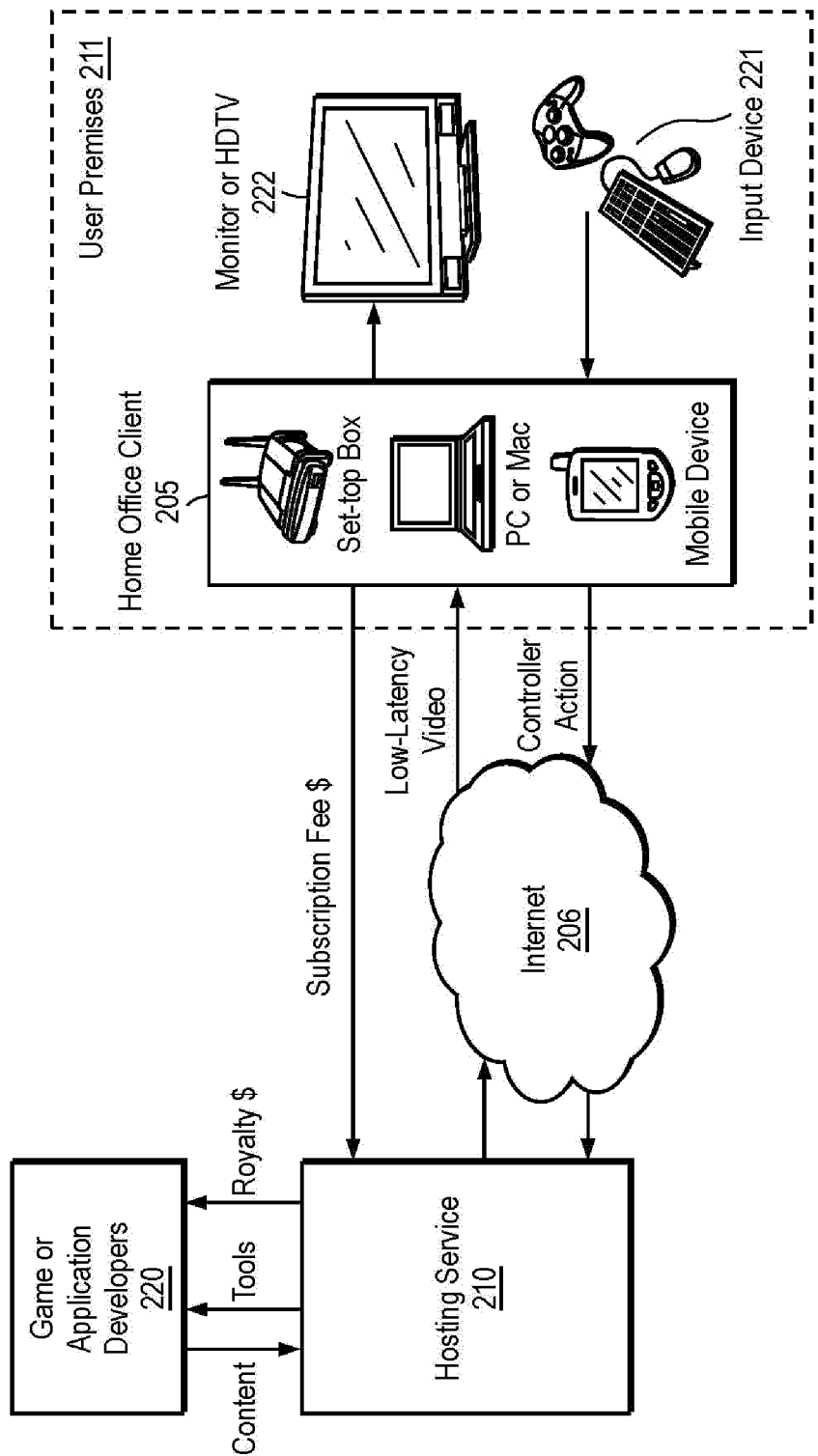
FIGS. 2a-b illustrate a high level system architecture according to one embodiment.
Figure 2B:
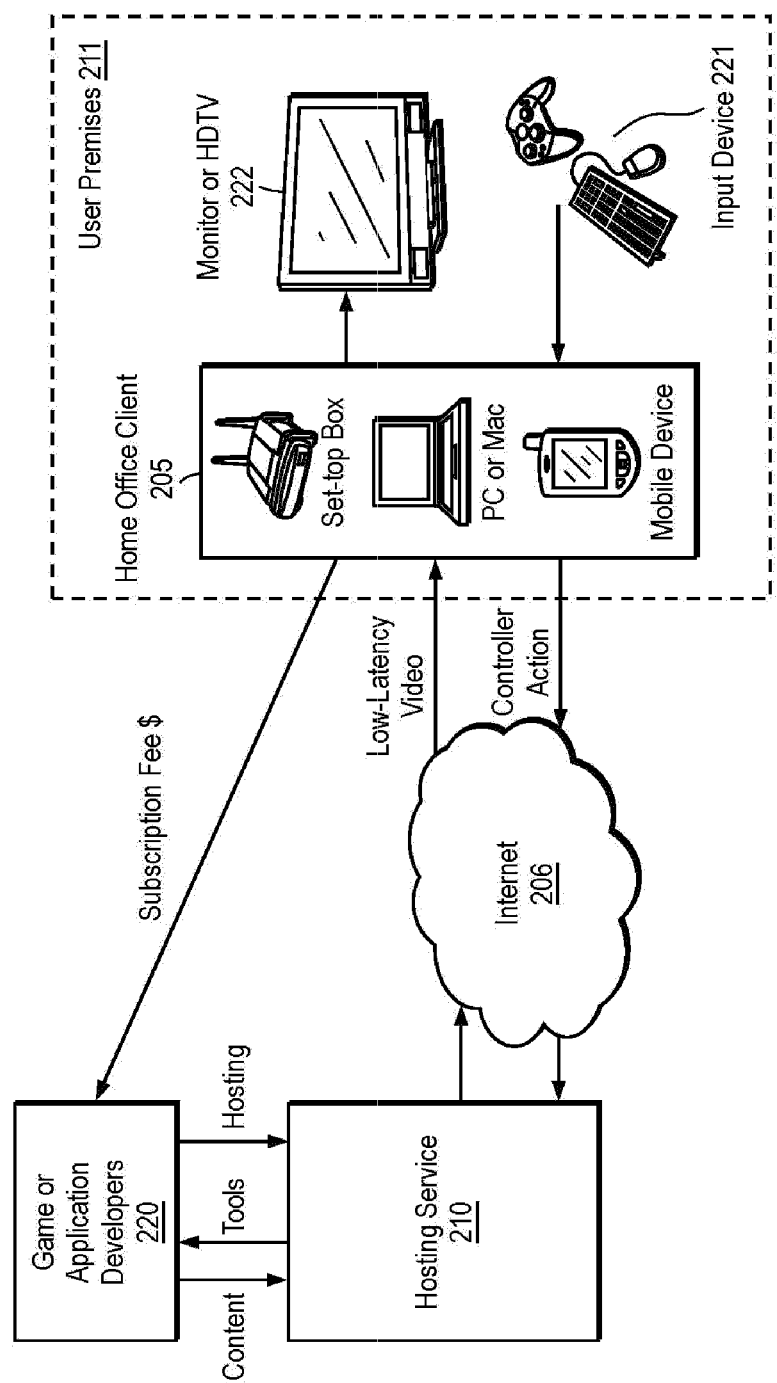

FIGS. 2a-b provide a high-level architecture of two embodiments in which video games and software applications are hosted by a hosting service 210 and accessed by client devices 205 at user premises 211 (note that the "user premises" means the place wherever the user is located, including outdoors if using a mobile device) over the Internet 206 (or other public or private network) under a subscription service. The client devices 205 may be general-purpose computers such as Microsoft Windows- or Linux-based PCs or Apple, Inc. Macintosh computers with a wired or wireless connection to the Internet either with internal or external display device 222, or they may be dedicated client devices such as a set-top box (with a wired or wireless connection to the Internet) that outputs video and audio to a monitor or TV set 222, or they may be mobile devices, presumably with a wireless connection to the Internet.

Any of these devices may have their own user input devices (e.g., keyboards, buttons, touch screens, track pads or inertial-sensing wands, video capture cameras and/or motion-tracking cameras, etc.), or they may use external input devices 221 (e.g., keyboards, mice, game controllers, inertial sensing wand, video capture cameras and/or motion tracking cameras, etc.), connected with wires or wirelessly. As described in greater detail below, the hosting service 210 includes servers of various levels of performance, including those with high-powered CPU/GPU processing capabilities. During playing of a game or use of an application on the hosting service 210, a home or office client device 205 receives keyboard and/or controller input from the user, and then it transmits the controller input through the Internet 206 to the hosting service 210 that executes the gaming program code in response and generates successive frames of video output (a sequence of video images) for the game or application software (e.g., if the user presses a button which would direct a character on the screen to move to the right, the game program would then create a sequence of video images showing the character moving to the right). This sequence of video images is then compressed using a low-latency video compressor, and the hosting service 210 then transmits the low-latency video stream through the Internet 206. The home or office client device then decodes the compressed video stream and renders the decompressed video images on a monitor or TV. Consequently, the computing and graphical hardware requirements of the client device 205 are significantly reduced. The client 205 only needs to have the processing power to forward the keyboard/controller input to the Internet 206 and decode and decompress a compressed video stream received from the Internet 206, which virtually any personal computer is capable of doing today in software on its CPU (e.g., a Intel Corporation Core Duo CPU running at approximately 2 GHz is capable of decompressing 720p HDTV encoded using compressors such as H.264 and Windows Media VC9). And, in the case of any client devices, dedicated chips can also perform video decompression for such standards in real-time at far lower cost and with far less power consumption than a general-purpose CPU such as would be required for a modern PC. Notably, to perform the function of forwarding controller input and decompressing video, home client devices 205 do not require any specialized graphics processing units (GPUs), optical drive or hard drives, such as the prior art video game system shown in FIG. 1.

As games and applications software become more complex and more photo-realistic, they will require higher-performance CPUs, GPUs, more RAM, and larger and faster disk drives, and the computing power at the hosting service 210 may be continually upgraded, but the end user will not be required to update the home or office client platform 205 since its processing requirements will remain constant for a display resolution and frame rate with a given video decompression algorithm. Thus, the hardware limitations and compatibility issues seen today do not exist in the system illustrated in FIGS. 2a-b.

Further, because the game and application software executes only in servers in the hosting service 210, there never is a copy of the game or application software (either in the form of optical media, or as downloaded software) in the user's home or office ("office" as used herein unless otherwise qualified shall include any non-residential setting, including, schoolrooms, for example). This significantly mitigates the likelihood of a game or application software being illegally copied (pirated), as well as mitigating the likelihood of a valuable database that might be use by a game or applications software being pirated. Indeed, if specialized servers are required (e.g., requiring very expensive, large or noisy equipment) to play the game or application software that are not practical for home or office use, then even if a pirated copy of the game or application software were obtained, it would not be operable in the home or office.

In one embodiment, the hosting service 210 provides software development tools to the game or application software developers (which refers generally to software development companies, game or movie studios, or game or applications software publishers) 220 which design video games so that they may design games capable of being executed on the hosting service 210. Such tools allow developers to exploit features of the hosting service that would not normally be available in a standalone PC or game console (e.g., fast access to very large databases of complex geometry ("geometry" unless otherwise qualified shall be used herein to refer to polygons, textures, rigging, lighting, behaviors and other components and parameters that define 3D datasets)).

Different business models are possible under this architecture. Under one model, the hosting service 210 collects a subscription fee from the end user and pays a royalty to the developers 220, as shown in FIG. 2a. In an alternate implementation, shown in FIG. 2b, the developers 220 collects a subscription fee directly from the user and pays the hosting service 210 for hosting the game or application content. These underlying principles are not limited to any particular business model for providing online gaming or application hosting.

Compressed Video Characteristics

As discussed previously, one significant problem with providing video game services or applications software services online is that of latency. A latency of 70-80 ms (from the point a input device is actuated by the user to the point where a response is displayed on the display device) is at the upper limit for games and applications requiring a fast response time. However, this is very difficult to achieve in the context of the architecture shown in FIGS. 2a and 2b due to a number of practical and physical constraints.

Figure 3:
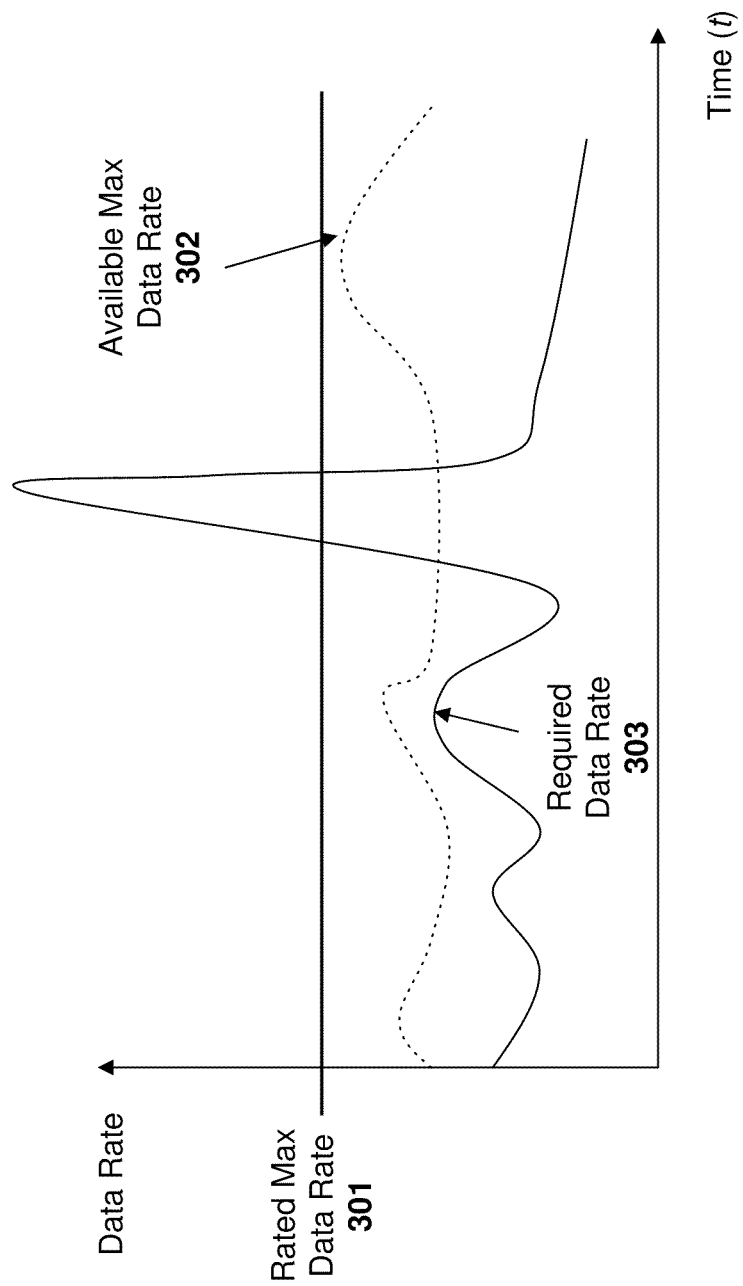
FIG. 3 illustrates actual, rated, and required data rates for communication between a client and a server.

As indicated in FIG. 3, when a user subscribes to an Internet service, the connection is typically rated by a nominal maximum data rate 301 to the user's home or office. Depending on the provider's policies and routing equipment capabilities, that maximum data rate may be more or less strictly enforced, but typically the actual available data rate is lower for one of many different reasons. For example, there may be too much network traffic at the DSL central office or on the local cable modem loop, or there may be noise on the cabling causing dropped packets, or the provider may establish a maximum number of bits per month per user. Currently, the maximum downstream data rate for cable and DSL services typically ranges from several hundred Kilobits/second (Kbps) to 30 Mbps. Cellular services are typically limited to hundreds of Kbps of downstream data. However, the speed of the broadband services and the number of users who subscribe to broadband services will increase dramatically over time. Currently, some analysts estimate that 33% of US broadband subscribers have a downstream data rate of 2 Mbps or more. For example, some analysts predict that by 2010, over 85% of US broadband subscribers will have a data rate of 2 Mbps or more.

As indicated in FIG. 3, the actual available max data rate 302 may fluctuate over time. Thus, in a low-latency, online gaming or application software context it is sometimes difficult to predict the actual available data rate for a particular video stream. If the data rate 303 required to sustain a given level of quality at given number of frames-per-second (fps) at a given resolution (e.g., 640×480 @ 60 fps) for a certain amount of scene complexity and motion rises above the actual available max data rate 302 (as indicated by the peak in FIG. 3), then several problems may occur. For example, some internet services will simply drop packets, resulting in lost data and distorted/lost images on the user's video screen. Other services will temporarily buffer (i.e., queue up) the additional packets and provide the packets to the client at the available data rate, resulting in an increase in latency—an unacceptable result for many video games and applications. Finally, some Internet service providers will view the increase in data rate as a malicious attack, such as a denial of service attack (a well known technique used by hackers to disable network connections), and will cut off the user's Internet connection for a specified time period. Thus, the embodiments described herein take steps to ensure that the required data rate for a video game does not exceed the maximum available data rate.

Hosting Service Architecture

Figure 4A:
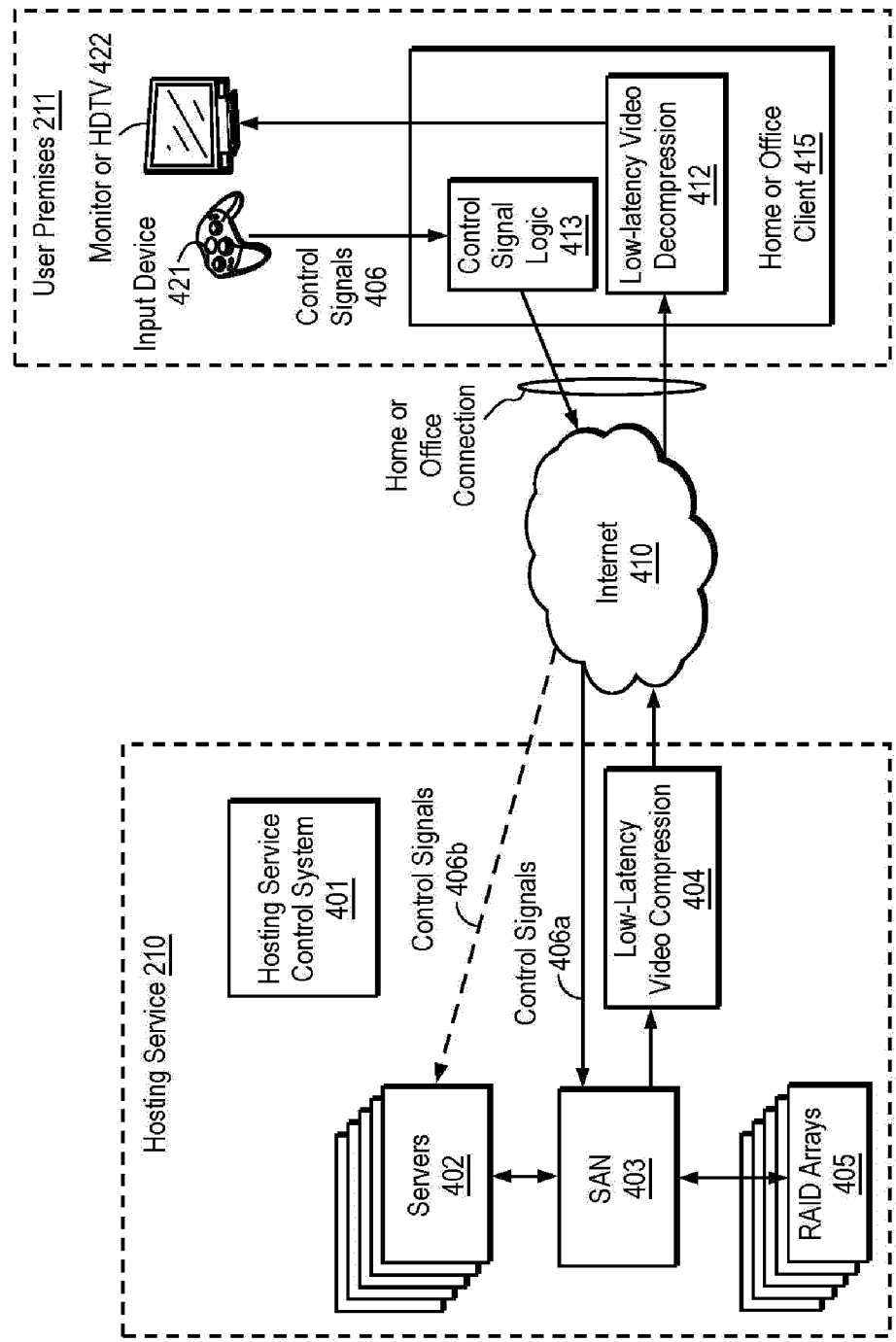
FIG. 4a illustrates a hosting service and a client employed according to one embodiment.

FIG. 4a illustrates an architecture of the hosting service 210 according to one embodiment. The hosting service 210 can either be located in a single server center, or can be distributed across a plurality of server centers (to provide for lower latency connections to users that have lower latency paths to certain server centers than others, to provide for load balancing amongst users, and to provide for redundancy in the case one or more server centers fail). The hosting service 210 may eventually include hundreds of thousands or even millions of servers 402, serving a very large user base. A hosting service control system 401 provides overall control for the hosting service 210, and directs routers, servers, video compression systems, billing and accounting systems, etc. In one embodiment, the hosting service control system 401 is implemented on a distributed processing Linux-based system tied to RAID arrays used to store the databases for user information, server information, and system statistics. In the foregoing descriptions, the various actions implemented by the hosting service 210, unless attributed to other specific systems, are initiated and controlled by the hosting service control system 401.

The hosting service 210 includes a number of servers 402 such as those currently available from Intel, IBM and Hewlett Packard, and others. Alternatively, the servers 402 can be assembled in a custom configuration of components, or can eventually be integrated so an entire server is implemented as a single chip. Although this diagram shows a small number of servers 402 for the sake of illustration, in an actual deployment there may be as few as one server 402 or as many as millions of servers 402 or more. The servers 402 may all be configured in the same way (as an example of some of the configuration parameters, with the same CPU type and performance; with or without a GPU, and if with a GPU, with the same GPU type and performance; with the same number of CPUs and GPUs; with the same amount of and type/speed of RAM; and with the same RAM configuration), or various subsets of the servers 402 may have the same configuration (e.g., 25% of the servers can be configured a certain way, 50% a different way, and 25% yet another way), or every server 402 may be different.

In one embodiment, the servers 402 are diskless, i.e., rather than having its own local mass storage (be it optical or magnetic storage, or semiconductor-based storage such as Flash memory or other mass storage means serving a similar function), each server accesses shared mass storage through fast backplane or network connection. In one embodiment, this fast connection is a Storage Area Network (SAN) 403 connected to a series of Redundant Arrays of Independent Disks (RAID) 405 with connections between devices implemented using Gigabit Ethernet. As is known by those of skill in the art, a SAN 403 may be used to combine many RAID arrays 405 together, resulting in extremely high bandwidth—approaching or potentially exceeding the bandwidth available from the RAM used in current gaming consoles and PCs. And, while RAID arrays based on rotating media, such as magnetic media, frequently have significant seek-time access latency, RAID arrays based on semiconductor storage can be implemented with much lower access latency. In another configuration, some or all of the servers 402 provide some or all of their own mass storage locally. For example, a server 402 may store frequently-accessed information such as its operating system and a copy of a video game or application on low-latency local Flash-based storage, but it may utilize the SAN to access RAID Arrays 405 based on rotating media with higher seek latency to access large databases of geometry or game state information on a less frequent bases.

In addition, in one embodiment, the hosting service 210 employs low-latency video compression logic 404 described in detail below. The video compression logic 404 may be implemented in software, hardware, or any combination thereof (certain embodiments of which are described below). Video compression logic 404 includes logic for compressing audio as well as visual material.

In operation, while playing a video game or using an application at the user premises 211 via a keyboard, mouse, game controller or other input device 421, control signal logic 413 on the client 415 transmits control signals 406a-b (typically in the form of UDP packets) representing the button presses (and other types of user inputs) actuated by the user to the hosting service 210. The control signals from a given user are routed to the appropriate server (or servers, if multiple servers are responsive to the user's input device) 402. As illustrated in FIG. 4a, control signals 406a may be routed to the servers 402 via the SAN. Alternatively or in addition, control signals 406b may be routed directly to the servers 402 over the hosting service network (e.g., an Ethernet-based local area network). Regardless of how they are transmitted, the server or servers execute the game or application software in response to the control signals 406a-b. Although not illustrated in FIG. 4a, various networking components such as a firewall(s) and/or gateway(s) may process incoming and outgoing traffic at the edge of the hosting service 210 (e.g., between the hosting service 210 and the Internet 410) and/or at the edge of the user premises 211 between the Internet 410 and the home or office client 415. The graphical and audio output of the executed game or application software—i.e., new sequences of video images—are provided to the low-latency video compression logic 404 which compresses the sequences of video images according to low-latency video compression techniques, such as those described herein and transmits a compressed video stream, typically with compressed or uncompressed audio, back to the client 415 over the Internet 410 (or, as described below, over an optimized high speed network service that bypasses the general Internet). Low-latency video decompression logic 412 on the client 415 then decompresses the video and audio streams and renders the decompressed video stream, and typically plays the decompressed audio stream, on a display device 422 Alternatively, the audio can be played on speakers separate from the display device 422 or not at all. Note that, despite the fact that input device 421 and display device 422 are shown as free-standing devices in FIGS. 2a and 2b, they may be integrated within client devices such as portable computers or mobile devices.

Home or office client 415 (described previously as home or office client 205 in FIGS. 2a and 2b) may be a very inexpensive and low-power device, with very limited computing or graphics performance and may well have very limited or no local mass storage. In contrast, each server 402, coupled to a SAN 403 and multiple RAIDs 405 can be an exceptionally high performance computing system, and indeed, if multiple servers are used cooperatively in a parallel-processing configuration, there is almost no limit to the amount of computing and graphics processing power that can be brought to bear. And, because of the low-latency video compression 404 and low-latency video compression 412, perceptually to the user, the computing power of the servers 402 is being provided to the user. When the user presses a button on input device 421, the image on display 422 is updated in response to the button press perceptually with no meaningful delay, as if the game or application software were running locally. Thus, with a home or office client 415 that is a very low performance computer or just an inexpensive chip that implements the low-latency video decompression and control signal logic 413, a user is provided with effectively arbitrary computing power from a remote location that appears to be available locally. This gives users the power to play the most advanced, processor-intensive (typically new) video games and the highest performance applications.

Figure 4B:
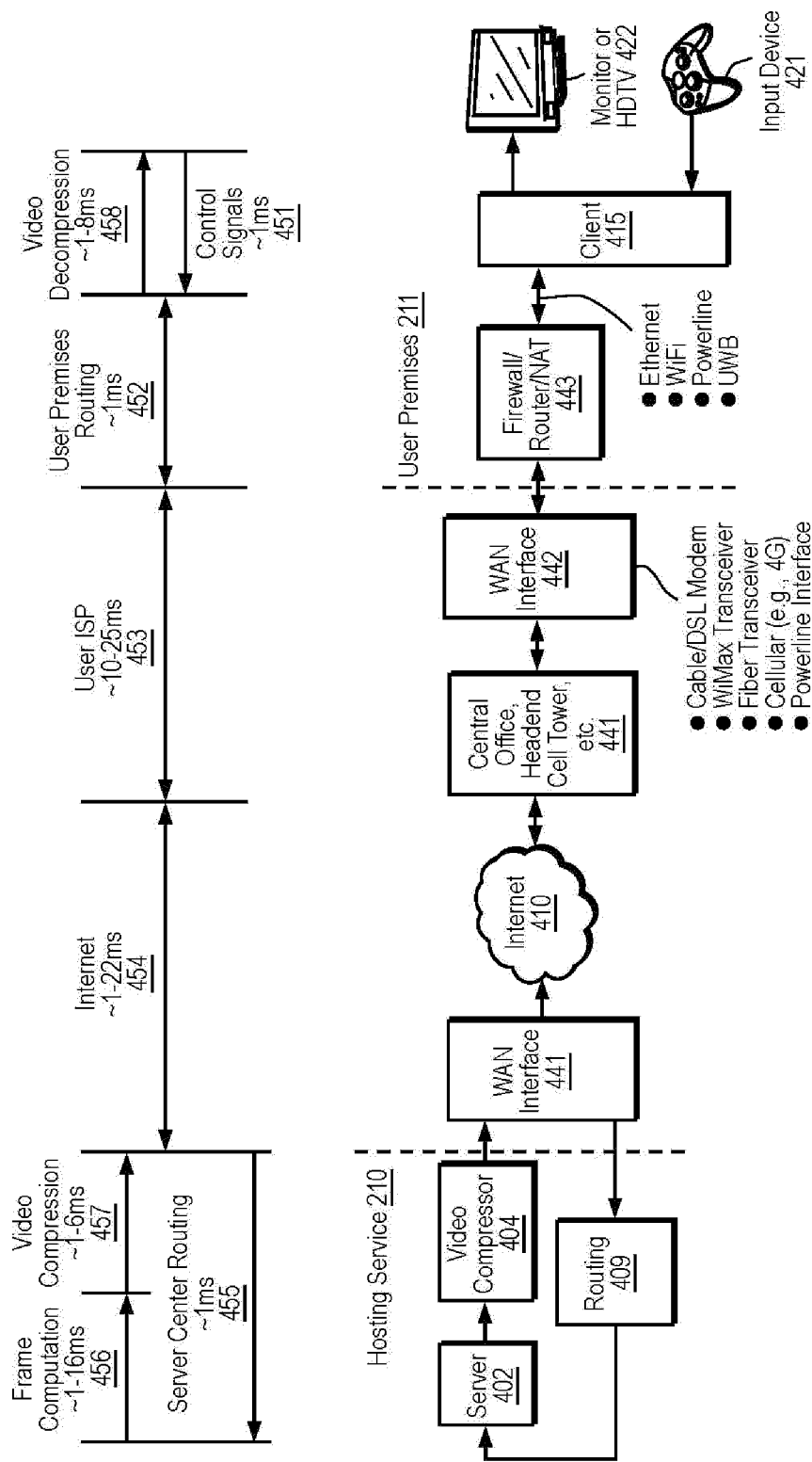
FIG. 4b illustrates exemplary latencies associated with communication between a client and hosting service.
Figure 4C:
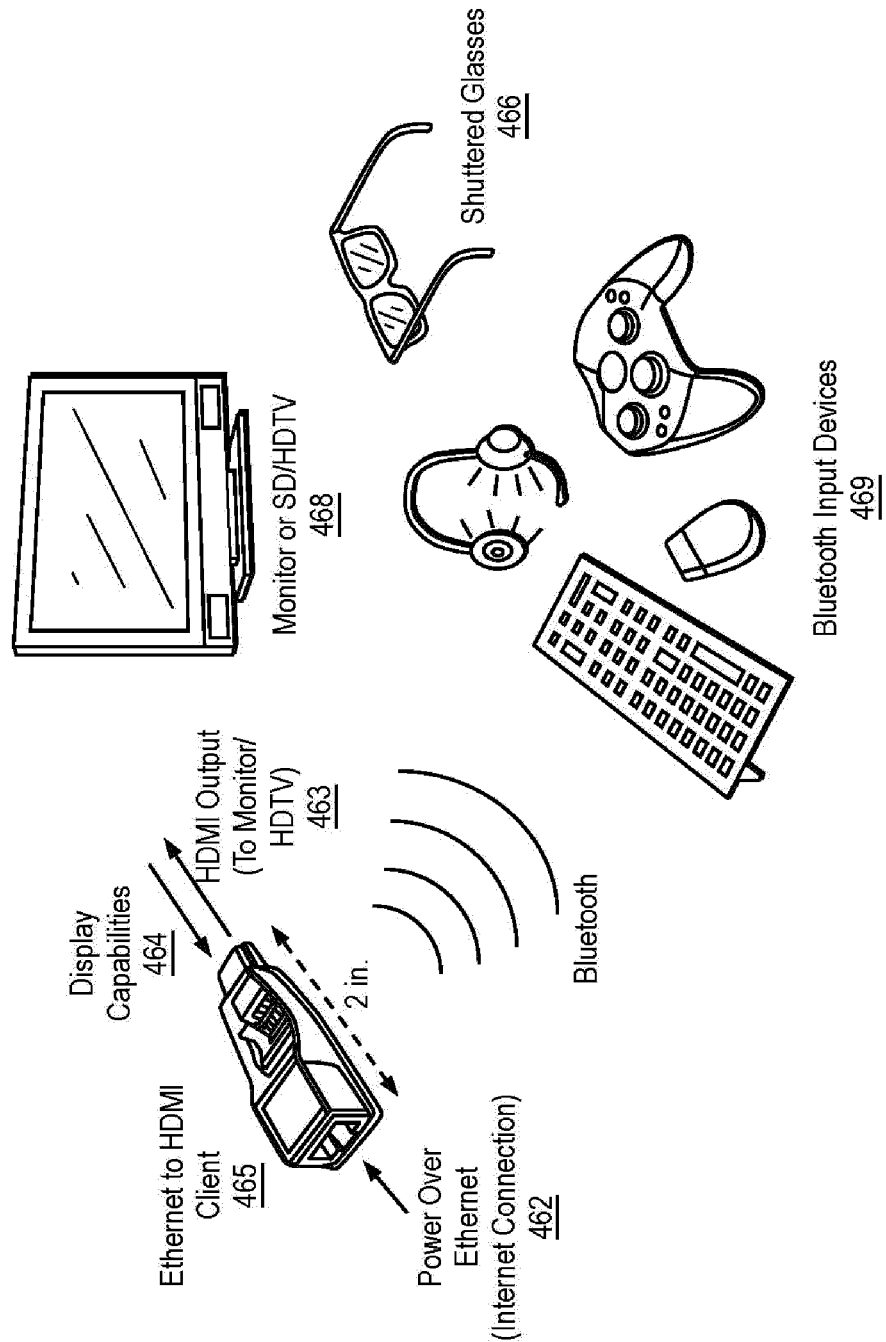
FIG. 4c illustrates a client device according to one embodiment.

FIG. 4c shows a very basic and inexpensive home or office client device 465. This device is an embodiment of home or office client 415 from FIGS. 4a and 4b. It is approximately 2 inches long. It has an Ethernet jack 462 that interfaces with an Ethernet cable with Power over Ethernet (PoE), from which it derives its power and its connectivity to the Internet. It is able to run Network Address Translation (NAT) within a network that supports NAT. In an office environment, many new Ethernet switches have PoE and bring PoE directly to a Ethernet jack in an office. It such a situation, all that is required is an Ethernet cable from the wall jack to the client 465. If the available Ethernet connection does not carry power (e.g., in a home with a DSL or cable modem, but no PoE), then there are inexpensive wall "bricks" (i.e., power supplies) available that will accept an unpowered Ethernet cable and output Ethernet with PoE.

The client 465 contains control signal logic 413 (of FIG. 4a) that is coupled to a Bluetooth wireless interface, which interfaces with Bluetooth input devices 479, such as a keyboard, mouse, game controller and/or microphone and/or headset. Also, one embodiment of client 465 is capable of outputting video at 120 fps coupled with a display device 468 able to support 120 fps video and signal (typically through infrared) a pair of shuttered glasses 466 to alternately shutter one eye, then the other with each successive frame. The effect perceived by the user is that of a stereoscopic 3D image that "jumps out" of the display screen. One such display device 468 that supports such operation is the Samsung HL-T5076S. Since the video stream for each eye is separate, in one embodiment two independent video streams are compressed by the hosting service 210, the frames are interleaved in time, and the frames are decompressed as two independent decompression processes within client 465.

The client 465 also contains low latency video decompression logic 412, which decompresses the incoming video and audio and output through the HDMI (High-Definition Multimedia Interface),connector 463 which plugs into an SDTV (Standard Definition Television) or HDTV (High Definition Television) 468, providing the TV with video and audio, or into a monitor 468 that supports HDMI. If the user's monitor 468 does not support HDMI, then an HDMI-to-DVI (Digital Visual Interface) can be used, but the audio will be lost. Under the HDMI standard, the display capabilities (e.g. supported resolutions, frame rates) 464 are communicated from the display device 468, and this information is then passed back through the Internet connection 462 back to the hosting service 210 so it can stream compressed video in a format suitable for the display device.

Figure 4D:
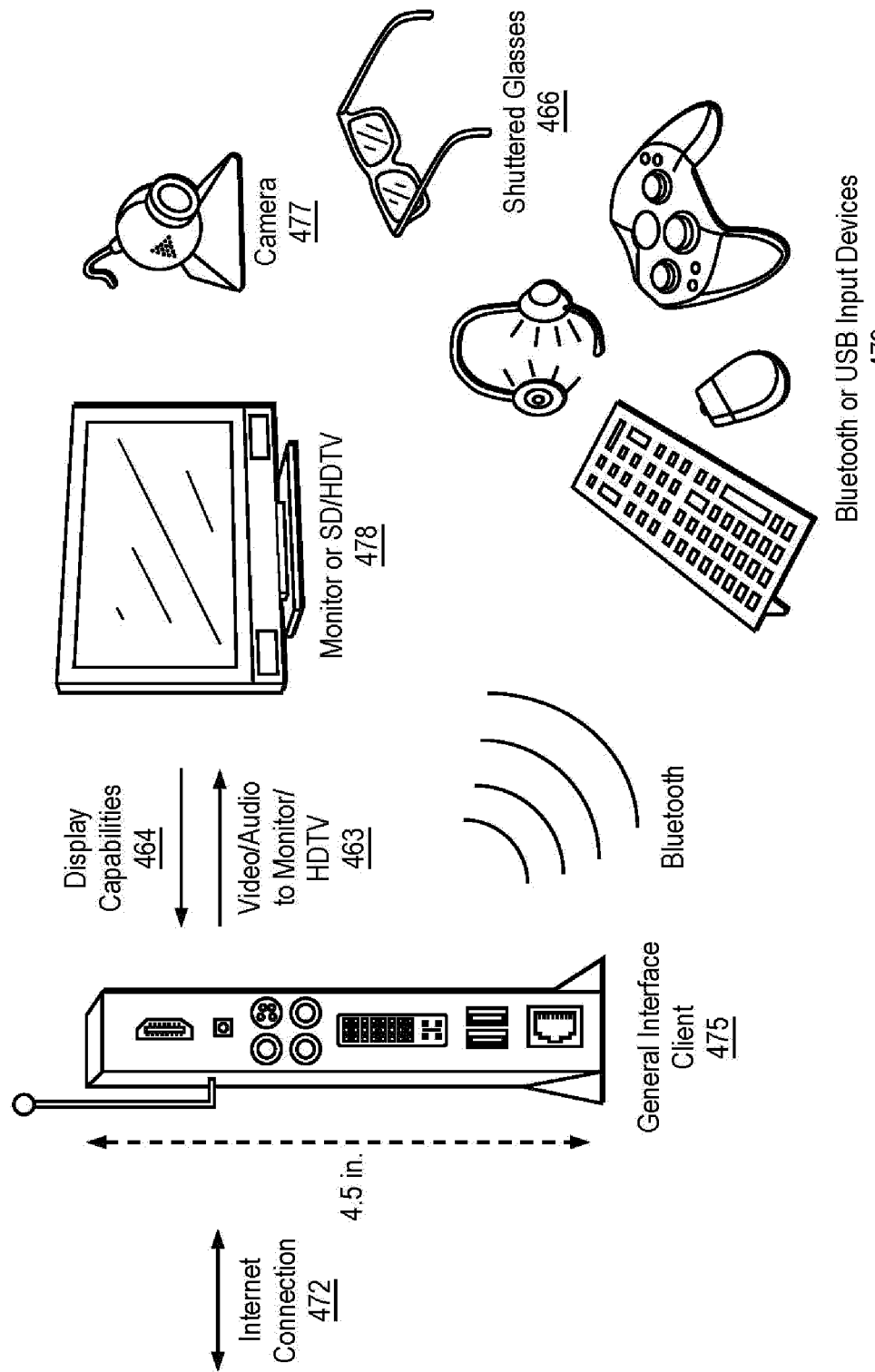
FIG. 4d illustrates a client device according to another embodiment.

FIG. 4d shows a home or office client device 475 that is the same as the home or office client device 465 shown in FIG. 4c except that is has more external interfaces. Also, client 475 can accept either PoE for power, or it can run off of an external power supply adapter (not shown) that plugs in the wall. Using client 475 USB input, video camera 477 provides compressed video to client 475, which is uploaded by client 475 to hosting service 210 for use described below. Built into camera 477 is a low-latency compressor utilizing the compression techniques described below.

In addition to having an Ethernet connector for its Internet connection, client 475 also has an 802.11g wireless interface to the Internet. Both interfaces are able to use NAT within a network that supports NAT.

Also, in addition to having an HDMI connector to output video and audio, client 475 also has a Dual Link DVI-I connector, which includes analog output (and with a standard adapter cable will provide VGA output). It also has analog outputs for composite video and S-video.

For audio, the client 475 has left/right analog stereo RCA jacks, and for digital audio output it has a TOSLINK output.

In addition to a Bluetooth wireless interface to input devices 479, it also has USB jacks to interface to input devices.

Figure 4E:
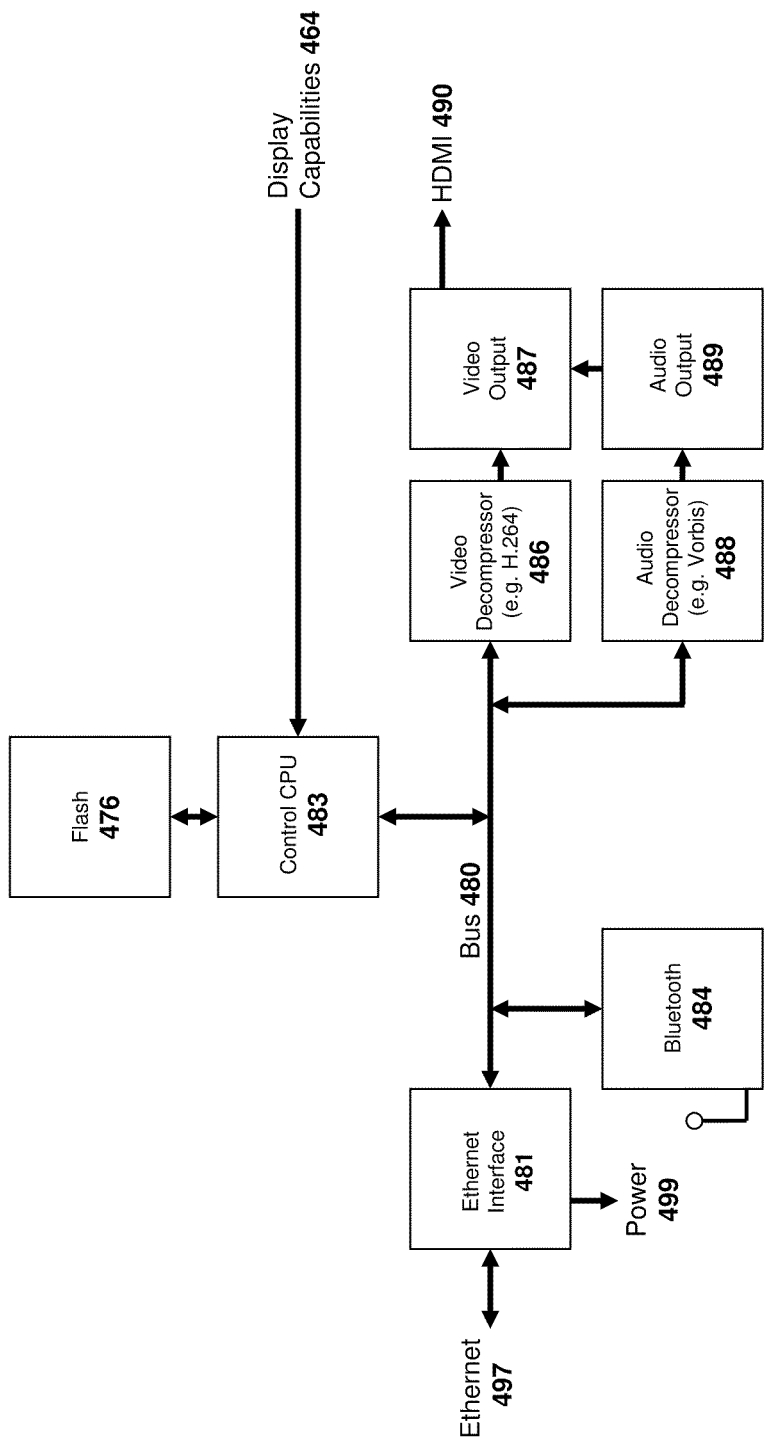
FIG. 4e illustrates an example block diagram of the client device in FIG. 4c.

FIG. 4e shows one embodiment of the internal architecture of client 465. Either all or some of the devices shown in the diagram can be implemented in a Field Programmable Logic Array, a custom ASIC or in several discrete devices, either custom designed or off-the-shelf.

Ethernet with PoE 497 attaches to Ethernet Interface 481. Power 499 is derived from the Ethernet with PoE 497 and is connected to the rest of the devices in the client 465. Bus 480 is a common bus for communication between devices.

Control CPU 483 (almost any small CPU, such as a MIPS R4000 series CPU at 100 MHz with embedded RAM is adequate) running a small client control application from Flash 476 implements the protocol stack for the network (i.e. Ethernet interface) and also communicates with the Hosting Service 210, and configures all of the devices in the client 465. It also handles interfaces with the input devices 469 and sends packets back to the hosting service 210 with user controller data, protected by Forward Error Correction, if necessary. Also, Control CPU 483 monitors the packet traffic (e.g. if packets are lost or delayed and also timestamps their arrival). This information is sent back to the hosting service 210 so that it can constantly monitor the network connection and adjust what it sends accordingly. Flash memory 476 is initially loaded at the time of manufacture with the control program for Control CPU 483 and also with a serial number that is unique to the particular Client 465 unit. This serial number allows the hosting service 210 to uniquely identify the Client 465 unit.

Bluetooth interface 484 communicates to input devices 469 wirelessly through its antenna, internal to client 465.

Video decompressor 486 is a low-latency video decompressor configured to implement the video decompression described herein. A large number of video decompression devices exist, either off-the-shelf, or as Intellectual Property (IP) of a design that can be integrated into an FPGA or a custom ASIC. One company offering IP for an H.264 decoder is Ocean Logic of Manly, NSW Australia. The advantage of using IP is that the compression techniques used herein do not conform to compression standards. Some standard decompressors are flexible enough to be configured to accommodate the compression techniques herein, but some cannot. But, with IP, there is complete flexibility in redesigning the decompressor as needed.

The output of the video decompressor is coupled to the video output subsystem 487, which couples the video to the video output of the HDMI interface 490.

The audio decompression subsystem 488 is implemented either using a standard audio decompressor that is available, or it can be implemented as IP, or the audio decompression can be implemented within the control processor 483 which could, for example, implement the Vorbis audio decompressor (available at Vorbis.com).

The device that implements the audio decompression is coupled to the audio output subsystem 489 that couples the audio to the audio output of the HDMI interface 490

Figure 4F:
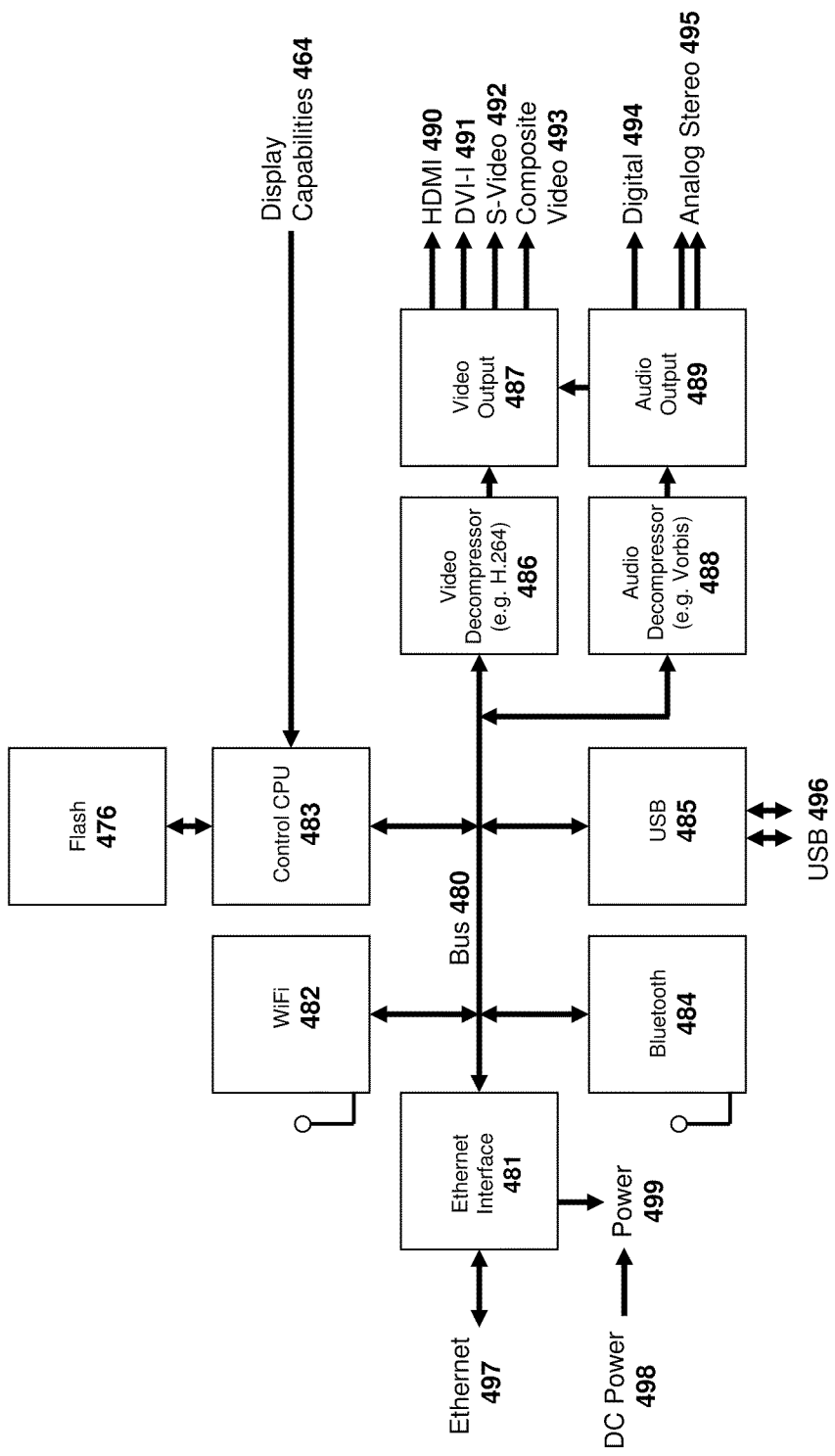
FIG. 4f illustrates an example block diagram of the client device in FIG. 4d.

FIG. 4f shows one embodiment of the internal architecture of client 475. As can be seen, the architecture is the same as that of client 465 except for additional interfaces and optional external DC power from a power supply adapter that plugs in the wall, and if so used, replaces power that would come from the Ethernet PoE 497. The functionality that is in common with client 465 will not be repeated below, but the additional functionality is described as follows.

CPU 483 communicates with and configures the additional devices.

WiFi subsystem 482 provides wireless Internet access as an alternative to Ethernet 497 through its antenna. WiFi subsystems are available from a wide range of manufacturers, including Atheros Communications of Santa Clara, Calif.

USB subsystem 485 provides an alternative to Bluetooth communication for wired USB input devices 479. USB subsystems are quite standard and readily available for FPGAs and ASICs, as well as frequently built into off-the-shelf devices performing other functions, like video decompression.

Video output subsystem 487 produces a wider range of video outputs than within client 465. In addition to providing HDMI 490 video output, it provides DVI-I 491, S-video 492, and composite video 493. Also, when the DVI-I 491 interface is used for digital video, display capabilities 464 are passed back from the display device to the control CPU 483 so that it can notify the hosting service 210 of the display device 478 capabilities. All of the interfaces provided by the video output subsystem 487 are quite standard interfaces and readily available in many forms.

Audio output subsystem 489 outputs audio digitally through digital interface 494 (S/PDIF and/or Toslink) and audio in analog form through stereo analog interface 495.

Round-Trip Latency Analysis

Of course, for the benefits of the preceding paragraph to be realized, the round trip latency between a user's action using input device 421 and seeing the consequence of that action on display device 420 should be no more than 70-80 ms. This latency must take into account all of the factors in the path from input device 421 in the user premises 211 to hosting service 210 and back again to the user premises 211 to display device 422. FIG. 4b illustrates the various components and networks over which signals must travel, and above these components and networks is a timeline that lists exemplary latencies that can be expected in a practical implementation. Note that FIG. 4b is simplified so that only the critical path routing is shown. Other routing of data used for other features of the system is described below. Double-headed arrows (e.g., arrow 453) indicate round-trip latency and a single-headed arrows (e.g., arrow 457) indicate one-way latency, and "~" denotes an approximate measure. It should be pointed out that there will be real-world situations where the latencies listed cannot be achieved, but in a large number of cases in the US, using DSL and cable modem connections to the user premises 211, these latencies can be achieved in the circumstances described in the next paragraph. Also, note that, while cellular wireless connectivity to the Internet will certainly work in the system shown, most current US cellular data systems (such as EVDO) incur very high latencies and would not be able to achieve the latencies shown in FIG. 4b. However, these underlying principles may be implemented on future cellular technologies that may be capable of implementing this level of latency. Further, there are game and application scenarios (e.g., games that do not require fast user reaction time, such as chess) where the latency incurred through a current US cellular data system, while noticeable to the user, would be acceptable for the game or application.

Starting from the input device 421 at user premises 211, once the user actuates the input device 421, a user control signal is sent to client 415 (which may be a standalone device such a set-top box, or it may be software or hardware running in another device such as a PC or a mobile device), and is packetized (in UDP format in one embodiment) and the packet is given a destination address to reach hosting service 210. The packet will also contain information to indicate which user the control signals are coming from. The control signal packet(s) are then forwarded through Firewall/Router/NAT (Network Address Translation) device 443 to WAN interface 442. WAN interface 442 is the interface device provided to the user premises 211 by the User's ISP (Internet Service Provider). The WAN interface 442 may be a Cable or DSL modem, a WiMax transceiver, a Fiber transceiver, a Cellular data interface, an Internet Protocol-over-powerline interface, or any other of many interfaces to the Internet. Further, Firewall/Router/NAT device 443 (and potentially WAN interface 442) may be integrated into the client 415. An example of this would be a mobile phone, which includes software to implement the functionality of home or office client 415, as well as the means to route and connect to the Internet wirelessly through some standard (e.g., 802.11g).

WAN Interface 442 then routes the control signals to what shall be called herein the "point of presence" 441 for the user's Internet Service Provider (ISP) which is the facility that provides an interface between the WAN transport connected to the user premises 211 and the general Internet or private networks. The point of presence's characteristics will vary depending upon nature of the Internet service provided. For DSL, it typically will be a telephone company Central Office where a DSLAM is located. For cable modems, it typically will be a cable Multi-System Operator (MSO) head end. For cellular systems, it typically will be a control room associated with cellular tower. But whatever the point of presence's nature, it will then route the control signal packet(s) to the general Internet 410. The control signal packet(s) will then be routed to the WAN Interface 441 to the hosting service 210, through what most likely will be a fiber transceiver interface. The WAN 441 will then route the control signal packets to routing logic 409 (which may be implemented in many different ways, including Ethernet switches and routing servers), which evaluates the user's address and routes the control signal(s) to the correct server 402 for the given user.

The server 402 then takes the control signals as input for the game or application software that is running on the server 402 and uses the control signals to process the next frame of the game or application. Once the next frame is generated, the video and audio is output from server 402 to video compressor 404. The video and audio may be output from server 402 to compressor 404 through various means. To start with, compressor 404 may be built into server 402, so the compression may be implemented locally within server 402. Or, the video and/or audio may be output in packetized form through a network connection such as an Ethernet connection to a network that is either a private network between server 402 and video compressor 404, or a through a shared network, such as SAN 403. Or, the video may be output through a video output connector from server 402, such as a DVI or VGA connector, and then captured by video compressor 404. Also, the audio may be output from server 402 as either digital audio (e.g., through a TOSLINK or S/PDIF connector) or as analog audio, which is digitized and encoded by audio compression logic within video compressor 404.

Once video compressor 404 has captured the video frame and the audio generated during that frame time from server 402, the video compressor will compress the video and audio using techniques described below. Once the video and audio is compressed it is packetized with an address to send it back to the user's client 415, and it is routed to the WAN Interface 441, which then routes the video and audio packets through the general Internet 410, which then routes the video and audio packets to the user's ISP point of presence 441, which routes the video and audio packets to the WAN Interface 442 at the user's premises, which routes the video and audio packets to the Firewall/Router/NAT device 443, which then routes the video and audio packets to the client 415.

The client 415 decompresses the video and audio, and then displays the video on the display device 422 (or the client's built-in display device) and sends the audio to the display device 422 or to separate amplifier/speakers or to an amplifier/speakers built in the client.

For the user to perceive that the entire process just described is perceptually without lag, the round-trip delay needs be less than 70 or 80 ms. Some of the latency delays in the described round-trip path are under the control of the hosting service 210 and/or the user and others are not. Nonetheless, based on analysis and testing of a large number of real-world scenarios, the following are approximate measurements.

The one-way transmission time to send the control signals 451 is typically less than 1 ms, the roundtrip routing through the user premises 452 is typically accomplished, using readily available consumer-grade Firewall/Router/NAT switches over Ethernet in about 1 ms. User ISPs vary widely in their round trip delays 453, but with DSL and cable modem providers, we typically see between 10 and 25 ms. The round trip latency on the general Internet 410 can vary greatly depending on how traffic is routed and whether there are any failures on the route (and these issues are discussed below), but typically the general Internet provides fairly optimal routes and the latency is largely determined by speed of light through optical fiber, given the distance to the destination. As discussed further below, we have established 1000 miles as a roughly the furthest distance that we expect to place a hosting service 210 away from user premises 211. At 1000 miles (2000 miles round trip) the practical transit time for a signal through the Internet is approximately 22 ms. The WAN Interface 441 to the hosting service 210 is typically a commercial-grade fiber high speed interface with negligible latency. Thus, the general Internet latency 454 is typically between 1 and 10 ms. The one-way routing 455 latency through the hosting service 210 can be achieved in less than 1 ms. The server 402 will typically compute a new frame for a game or an application in less than one frame time (which at 60 fps is 16.7 ms) so 16 ms is a reasonable maximum one-way latency 456 to use. In an optimized hardware implementation of the video compression and audio compression algorithms described herein, the compression 457 can be completed in 1 ms. In less optimized versions, the compression may take as much as 6 ms (of course even less optimized versions could take longer, but such implementations would impact the overall latency of the round trip and would require other latencies to be shorter (e.g., the allowable distance through the general Internet could be reduced) to maintain the 70-80 ms latency target). The round trip latencies of the Internet 454, User ISP 453, and User Premises Routing 452 have already been considered, so what remains is the video decompression 458 latency which, depending on whether the video decompression 458 is implemented in dedicated hardware, or if implemented in software on a client device 415 (such as a PC or mobile device) it can vary depending upon the size of the display and the performance of the decompressing CPU. Typically, decompression 458 takes between 1 and 8 ms.

Thus, by adding together all of the worst-case latencies seen in practice, we can determine the worst-case round trip latency that can be expected to be experience by a user of the system shown in FIG. 4a. They are: 1+1+25+22+1+16+6+8=80 ms. And, indeed, in practice (with caveats discussed below), this is roughly the round trip latency seen using prototype versions of the system shown in FIG. 4a, using off-the-shelf Windows PCs as client devices and home DSL and cable modem connections within the US. Of course, scenarios better than worst case can result in much shorter latencies, but they cannot be relied upon in developing a commercial service that is used widely.

To achieve the latencies listed in FIGS. 4b over the general Internet requires the video compressor 404 and video decompressor 412 from FIG. 4a in the client 415 to generate a packet stream which very particular characteristics, such that the packet sequence generated through entire path from the hosting service 210 to the display device 422 is not subject to delays or excessive packet loss and, in particular, consistently falls with the constraints of the bandwidth available to the user over the user's Internet connection through WAN interface 442 and Firewall/Router/NAT 443. Further, the video compressor must create a packet stream which is sufficiently robust so that it can tolerate the inevitable packet loss and packet reordering that occurs in normal Internet and network transmissions.

Low-Latency Video Compression

To accomplish the foregoing goals, one embodiment takes a new approach to video compression which decreases the latency and the peak bandwidth requirements for transmitting video. Prior to the description of these embodiments, an analysis of current video compression techniques will be provided with respect to FIG. 5 and FIGS. 6a-b. Of course, these techniques may be employed in accordance with underlying principles if the user is provided with sufficient bandwidth to handle the data rate required by these techniques. Note that audio compression is not addressed herein other than to state that it is implemented simultaneously and in synchrony with the video compression. Prior art audio compression techniques exist that satisfy the requirements for this system.

Figure 5:
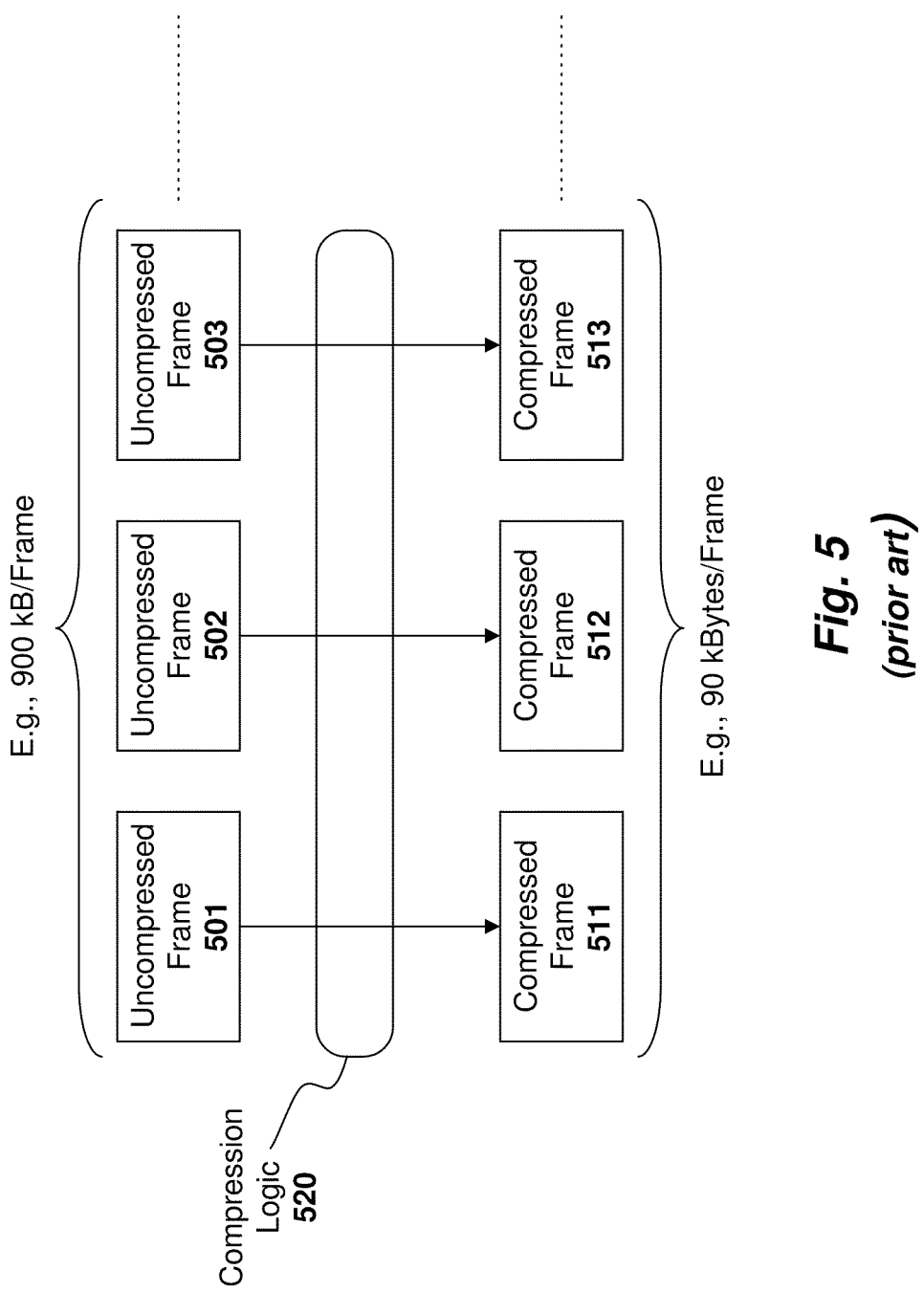
FIG. 5 illustrates an example form of video compression which may be employed according to one embodiment.

FIG. 5 illustrates one particular prior art technique for compressing video in which each individual video frame 501-503 is compressed by compression logic 520 using a particular compression algorithm to generate a series of compressed frames 511-513. One embodiment of this technique is "motion JPEG" in which each frame is compressed according to a Joint Pictures Expert Group (JPEG) compression algorithm, based upon the discrete cosine transform (DCT). Various different types of compression algorithms may be employed, however, while still complying with these underlying principles (e.g., wavelet-based compression algorithms such as JPEG-2000).

One problem with this type of compression is that it reduces the data rate of each frame, but it does not exploit similarities between successive frames to reduce the data rate of the overall video stream. For example, as illustrated in FIG. 5, assuming a frame rate of 640×480×24 bits/pixel=640*480*24/8/1024=900 Kilobytes/frame (KB/frame), for a given quality of image, motion JPEG may only compress the stream by a factor of 10, resulting in a data stream of 90 KB/frame. At 60 frames/sec, this would require a channel bandwidth of 90 KB*8 bits*60 frames/sec=42.2 Mbps, which would be far too high bandwidth for almost all home Internet connections in the US today, and too high bandwidth for many office Internet connections. Indeed, given that it would demand a constant data stream at such a high bandwidth, and it would be just serving one user, even in an office LAN environment, it would consume a large percentage of a 100 Mbps Ethernet LAN's bandwidth and heavily burden Ethernet switches supporting the LAN. Thus, the compression for motion video is inefficient when compared with other compression techniques (such as those described below). Moreover, single frame compression algorithms like JPEG and JPEG-2000 that use lossy compression algorithms produce compression artifacts that may not be noticeable in still images (e.g., an artifact within dense foliage in the scene may not appear as an artifact since the eye does not know exactly how the dense foliage should appear). But, once the scene is in motion, an artifact can stand out because the eye detects that the artifact changed from frame-to-frame, despite the fact the artifact is in an area of the scene where it might not have been noticeable in a still image. This results in the perception of "background noise" in the sequence of frames, similar in appearance to the "snow" noise visible during marginal analog TV reception. Of course, this type of compression may still be used in certain embodiments described herein, but generally speaking, to avoid background noise in the scene, a high data rate (i.e., a low compression ratio) is required for a given perceptual quality.

Other types of compression, such as H.264, or Windows Media VC9, MPEG2 and MPEG4 are all more efficient at compressing a video stream because they exploit the similarities between successive frames. These techniques all rely upon the same general techniques to compress video. Thus, although the H.264 standard will be described, the same general principles apply to various other compression algorithms. A large number of H.264 compressors and decompressor are available, including the x264 open source software library for compressing H.264 and the FFmpeg open source software libraries for decompressing H.264.

Figure 6A:
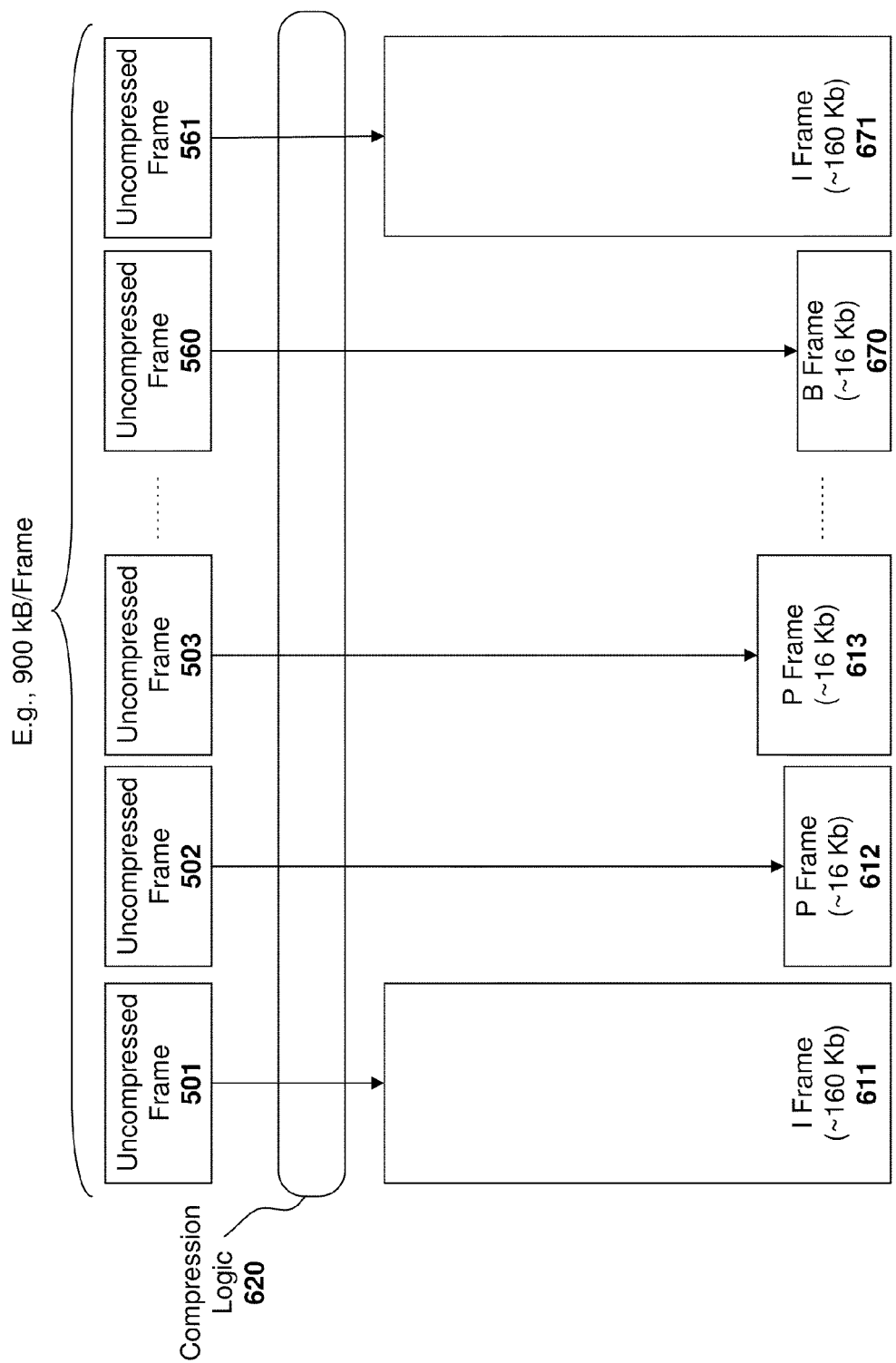
FIG. 6a illustrates an example form of video compression which may be employed in another embodiment.
Figure 6B:
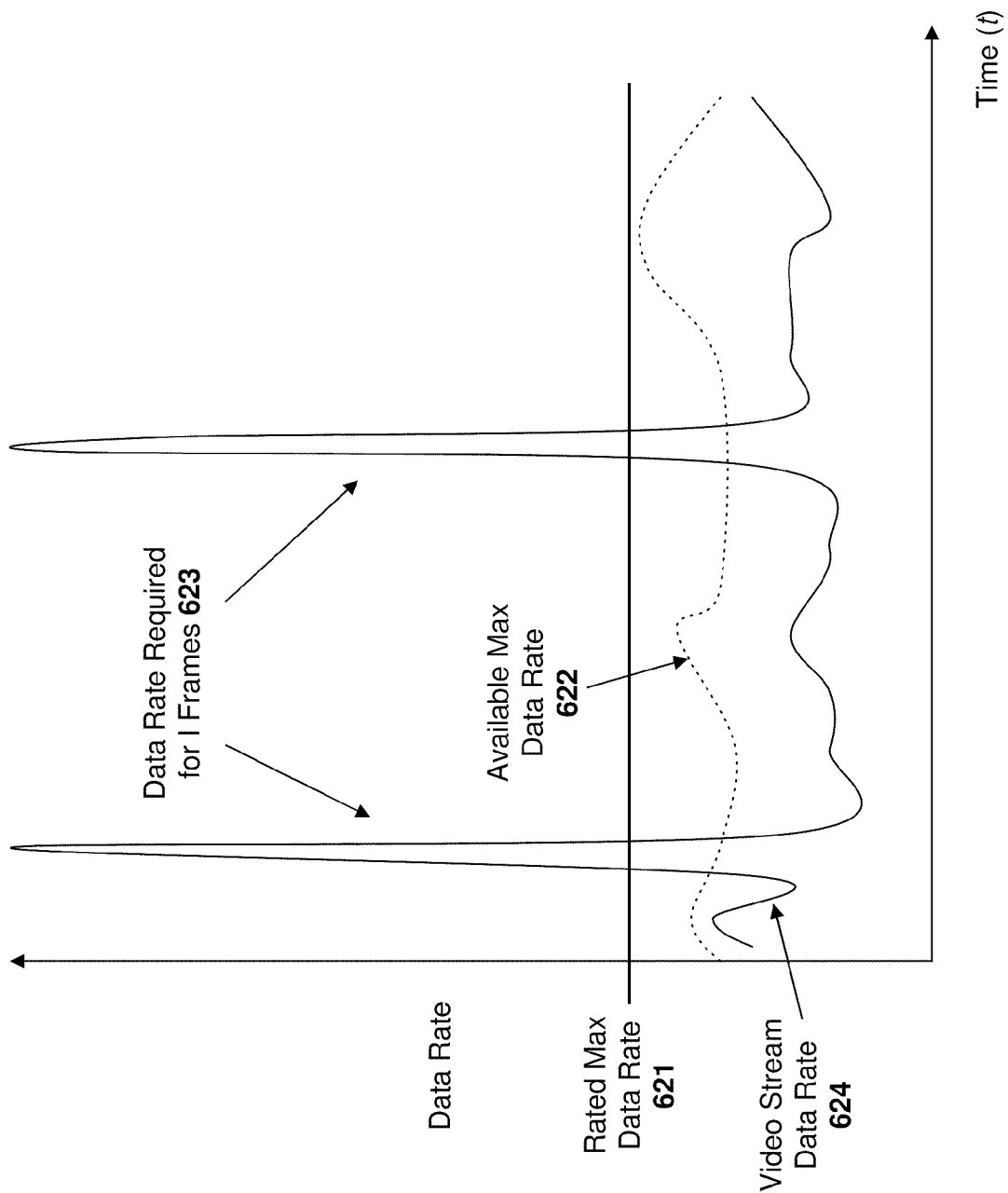
FIG. 6b illustrates peaks in data rate associated with transmitting a low complexity, low action video sequence.

FIGS. 6a and 6b illustrate an exemplary prior art compression technique in which a series of uncompressed video frames 501-503, 559-561 are compressed by compression logic 620 into a series of "I frames" 611, 671; "P frames" 612-613; and "B frames" 670. The vertical axis in FIG. 6a generally signifies the resulting size of each of the encoded frames (although the frames are not drawn to scale). As described above, video coding using I frames, B frames and P frames is well understood by those of skill in the art. Briefly, an I frame 611 is a DCT-based compression of a complete uncompressed frame 501 (similar to a compressed JPEG image as described above). P frames 612-613 generally are significantly smaller in size than I frames 611 because they take advantage of the data in the previous I frame or P frame; that is, they contain data indicating the changes between the previous I frame or P frame. B frames 670 are similar to that of P frames except that B frames use the frame in the following reference frame as well as potentially the frame in the preceding reference frame.

For the following discussion, it will be assumed that the desired frame rate is 60 frames/second, that each I frame is approximately 160 Kb, the average P frame and B frame is 16 Kb and that a new I frame is generated every second. With this set of parameters, the average data rate would be: 160 Kb+16 Kb*59=1.1 Mbps. This data rate falls well within the maximum data rate for many current broadband Internet connections to homes and offices. This technique also tends to avoid the background noise problem from intraframe-only encoding because the P and B frames track differences between the frames, so compression artifacts tend not to appear and disappear from frame-to-frame, thereby reducing the background noise problem described above.

One problem with the foregoing types of compression is that although the average data rate is relatively low (e.g., 1.1 Mbps), a single I frame may take several frame times to transmit. For example, using prior art techniques a 2.2 Mbps network connection (e.g., DSL or cable modem with 2.2 Mbps peak of max available data rate 302 from FIG. 3a) would typically be adequate to stream video at 1.1 Mbps with a 160 Kbps I frame each 60 frames. This would be accomplished by having the decompressor queue up 1 second of video before decompressing the video. In 1 second, 1.1 Mb of data would be transmitted, which would be easily accommodated by a 2.2 Mbps max available data rate, even assuming that the available data rate might dip periodically by as much as 50%. Unfortunately, this prior art approach would result in a 1-second latency for the video because of the 1-second video buffer at the receiver. Such a delay is adequate for many prior art applications (e.g., the playback of linear video), but is far too long a latency for fast action video games which cannot tolerate more than 70-80 ms of latency.

If an attempt were made to eliminate the 1-second video buffer, it still would not result in an adequate reduction in latency for fast action video games. For one, the use of B frames, as previously described, would necessitate the reception of all of the B frames preceding an I frame as well as the I frame. If we assume the 59 non-I frames are roughly split between P and B frames, then there would be at least 29 B frames and an I frame received before any B frame could be displayed. Thus, regardless of the available bandwidth of the channel, it would necessitate a delay of 29+1=30 frames of $\frac{1}{60}^{th}$ second duration each, or 500 ms of latency. Clearly that is far too long.

Thus, another approach would be to eliminate B frames and only use I and P frames. (One consequence of this is the data rate would increase for a given quality level, but for the sake of consistency in this example, let's continue to assume that each I frame is 160 Kb and the average P frame is 16 Kb in size, and thus the data rate is still 1.1 Mbps) This approach eliminates the unavoidable latency introduced by B frames, since the decoding of each P frame is only reliant upon the prior received frame. A problem that remains with this approach is that an I frame is so much larger than an average P frame, that on a low bandwidth channel, as is typical in most homes and in many offices, the transmission of the I frame adds substantial latency. This is illustrated in FIG. 6b. The video stream data rate 624 is below the available max data rate 621 except for the I frames, where the peak data rate required for the I frames 623 far exceeds the available max data rate 622 (and even the rated max data rate 621). The data rate required by the P frames is less than the available max data rate. Even if the available max data rate peaks at 2.2 Mbps remains steadily at its 2.2 Mbps peak rate, it will take 160 Kb/2.2 Mb=71 ms to transmit the I frame, and if the available max data rate 622 dips by 50% (1.1 Mbps), it will take 142 ms to transmit the I frame. So, the latency in transmitting the I frame will fall somewhere in between 71-142 ms. This latency is additive to the latencies identified in FIG. 4b, which in the worst case added up to 70 ms, so this would result in a total round trip latency of 141-222 ms from the point the user actuates input device 421 until an image appears on display device 422, which is far too high. And if the available max data rate dips below 2.2 Mbps, the latency will increase further.

Note also that there generally are severe consequences to "jamming" an ISP with peak data rate 623 that are far in excess of the available data rate 622. The equipment in different ISPs will behave differently, but the following behaviors are quite common among DSL and cable modem ISPs when receiving packets at much higher data rate than the available data rate 622: (a) delaying the packets by queuing them (introducing latency), (b) dropping some or all of the packets, (c) disabling the connection for a period of time (most likely because the ISP is concerned it is a malicious attack, such as "denial of service" attack). Thus, transmitting a packet stream at full data rate with characteristics such as those shown in FIG. 6b is not a viable option. The peaks 623 may be queued up at the hosting service 210 and sent at a data rate below the available max data rate, introducing the unacceptable latency described in the preceding paragraph.

Further, the video stream data rate sequence 624 shown in FIG. 6b is a very "tame" video stream data rate sequence and would be the sort of data rate sequence that one would expect to result from compressing the video from a video sequence that does not change very much and has very little motion (e.g., as would be common in video teleconferencing where the cameras are in a fixed position and have little motion, and the objects, in the scene, e.g., seated people talking, show little motion).

Figure 6C:
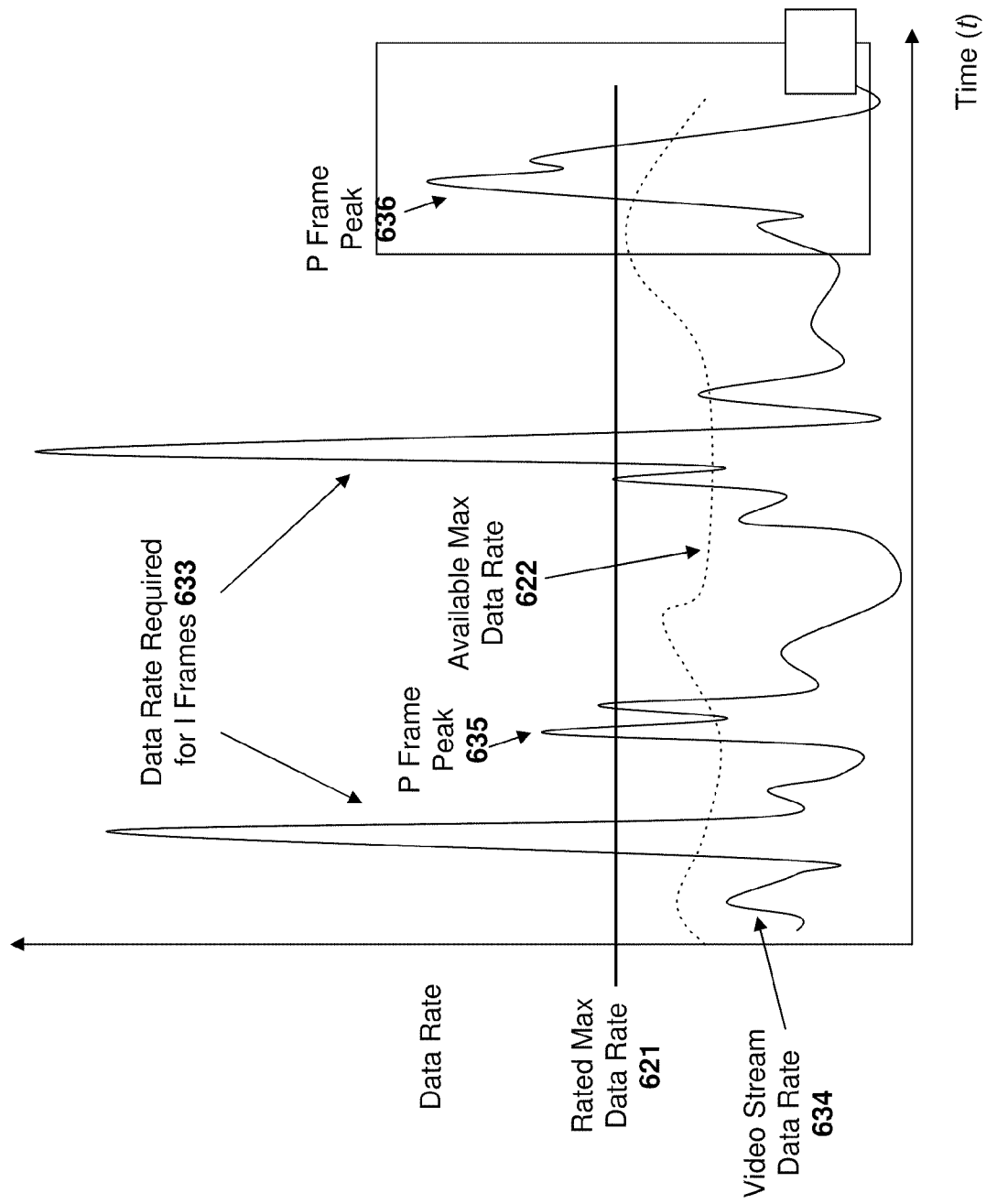
FIG. 6c illustrates peaks in data rate associated with transmitting a high complexity, high action video sequence.

The video stream data rate sequence 634 shown in FIG. 6c is a sequence typical to what one would expect to see from video with far more action, such as might be generated in a motion picture or a video game, or in some application software. Note that in addition to the I frame peaks 633, there are also P frame peaks such as 635 and 636 that are quite large and exceed the available max data rate on many occasions. Although these P frame peaks are not quite as large as the I frame peaks, they still are far too large to be carried by the channel at full data rate, and as with the I frame peaks, they P frame peaks must be transmitted slowly (thereby increasingly latency).

On a high bandwidth channel (e.g., a 100 Mbps LAN, or a high bandwidth 100Mbps private connection) the network would be able to tolerate large peaks, such as I frame peaks 633 or P frame peaks 636, and in principle, low latency could be maintained. But, such networks are frequently shared amongst many users (e.g., in an office environment), and such "peaky" data would impact the performance of the LAN, particularly if the network traffic was routed to a private shared connection (e.g., from a remote data center to an office). To start with, bear in mind that this example is of a relatively low resolution video stream of 640×480 pixels at 60 fps. HDTV streams of 1920×1080 at 60 fps are readily handled by modern computers and displays, and 2560×1440 resolution displays at 60 fps are increasingly available (e.g., Apple, Inc.'s 30" display). A high action video sequence at 1920×1080 at 60 fps may require 4.5 Mbps using H.264 compression for a reasonable quality level. If we assume the I frames peak at 10× the nominal data rate, that would result in 45 Mbps peaks, as well as smaller, but still considerable, P frame peak. If several users were receiving video streams on the same 100 Mbps network (e.g., a private network connection between an office and data center), it is easy to see how the peaks from several users' video stream could happen to align, overwhelming the bandwidth of the network, and potentially overwhelming the bandwidth of the backplanes of the switches supporting the users on the network. Even in the case of a Gigabit Ethernet network, if enough users had enough peaks aligned at once, it could overwhelm the network or the network switches. And, once 2560×1440 resolution video becomes more commonplace, the average video stream data rate may be 9.5 Mbps, resulting in perhaps a 95 Mbps peak data rate. Needless to say, a 100 Mbps connection between a data center and an office (which today is an exceptionally fast connection) would be completely swamped by the peak traffic from a single user. Thus, even though LANs and private network connections can be more tolerant of peaky streaming video, the streaming video with high peaks is not desirable and might require special planning and accommodation by an office's IT department.

Of course, for standard linear video applications these issues are not a problem because the data rate is "smoothed" at the point of transmission and the data for each frame below the max available data rate 622, and a buffer in the client stores a sequence of I, P and B frames before they are decompressed. Thus, the data rate over the network remains close to the average data rate of the video stream. Unfortunately, this introduces latency, even if B frames are not used, that is unacceptable for low-latency applications such as video games and applications require fast response time.

One prior art solution to mitigating video streams that have high peaks is to use a technique often referred to as "Constant Bit Rate" (CBR) encoding. Although the term CBR would seem to imply that all frames are compressed to have the same bit rate (i.e., size), what it usually refers to is a compression paradigm where a maximum bit rate across a certain number of frames (in our case, 1 frame) is allowed. For example, in the case of FIG. 6c, if a CBR constraint were applied to the encoding that limited the bit rate to, for example, 70% of the rated max data rate 621, then the compression algorithm would limit the compression of each of the frames so that any frame that would normally be compressed using more than 70% of the rated max data rate 621 would be compressed with less bits. The result of this is that frames that would normally require more bits to maintain a given quality level would be "starved" of bits and the image quality of those frames would be worse than that of other frames that do not require more bits than the 70% of the rate max data rate 621. This approach can produce acceptable results for certain types of compressed video where there (a) little motion or scene changes are expected and (b) the users can accept periodic quality degradation. A good example of a CBR-suited application is video teleconferencing since there are few peaks, and if the quality degrades briefly (for example, if the camera is panned, resulting in significant scene motion and large peaks, during the panning there may not be enough bits for high-quality image compression, which would result in degraded image quality), it is acceptable for most users. Unfortunately, CBR is not well-suited for many other applications which have scenes of high complexity or a great deal of motion and/or where a reasonably constant level of quality is required.

Figure 7A:
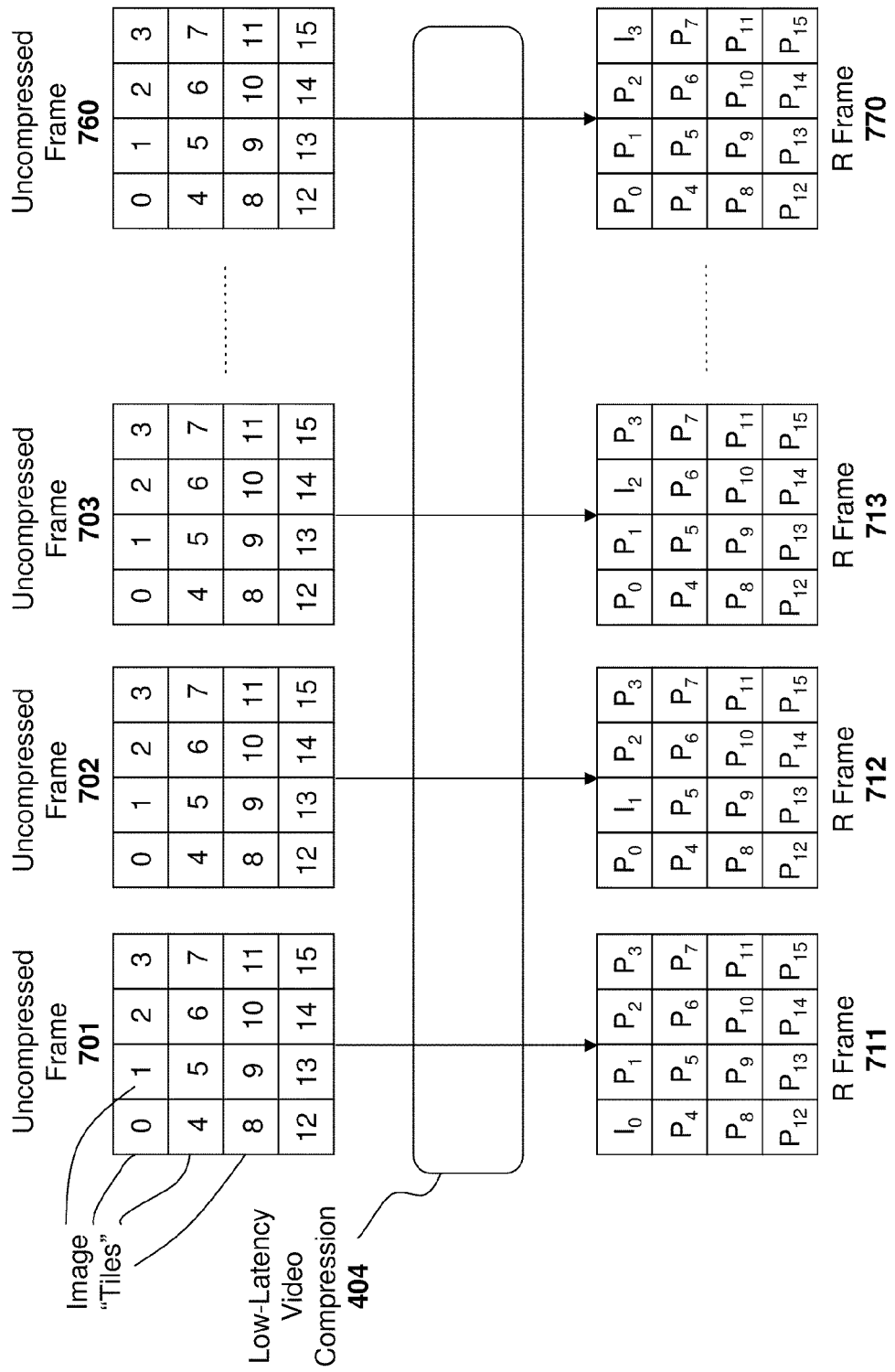
FIGS. 7a-b illustrate example video compression techniques employed in one embodiment.

The low-latency compression logic 404 employed in one embodiment uses several different techniques to address the range of problems with streaming low-latency compressed video, while maintaining high quality. First, the low-latency compression logic 404 generates only I frames and P frames, thereby alleviating the need to wait several frame times to decode each B frame. In addition, as illustrated in FIG. 7a, in one embodiment, the low-latency compression logic 404 subdivides each uncompressed frame 701-760 into a series of "tiles" and individually encodes each tile as either an I frame or a P frame. The group of compressed I frames and P frames are referred to herein as "R frames" 711-770. In the specific example shown in FIG. 7a, each uncompressed frame is subdivided into a 4×4 matrix of 16 tiles. However, these underlying principles are not limited to any particular subdivision scheme.

In one embodiment, the low-latency compression logic 404 divides up the video frame into a number of tiles, and encodes (i.e., compresses) one tile from each frame as an I frame (i.e., the tile is compressed as if it is a separate video frame of $\frac{1}{16}^{th}$ the size of the full image, and the compression used for this "mini" frame is I frame compression) and the remaining tiles as P frames (i.e., the compression used for each "mini" $\frac{1}{16}^{th}$ frame is P frame compression). Tiles compressed as I frames and as P frames shall be referred to as "I tiles" and "P tiles", respectively. With each successive video frame, the tile to be encoded as an I tile is changed. Thus, in a given frame time, only one tile of the tiles in the video frame is an I tile, and the remainder of the tiles are P tiles. For example, in FIG. 7a, tile 0 of uncompressed frame 701 is encoded as I tile $I_0$ and the remaining 1-15 tiles are encoded as P tiles $P_1$ through $P_{15}$ to produce R frame 711. In the next uncompressed video frame 702, tile 1 of uncompressed frame 701 is encoded as I tile $I_1$ and the remaining tiles 0 and 2 through 15 are encoded as P tiles, $P_0$ and $P_2$ through $P_{15}$, to produce R frame 712. Thus, the I tiles and P tiles for tiles are progressively interleaved in time over successive frames. The process continues until a R tile 770 is generated with the last tile in the matrix encoded as an I tile (i.e., $I_{15}$). The process then starts over, generating another R frame such as frame 711 (i.e., encoding an I tile for tile 0) etc. Although not illustrated in FIG. 7a, in one embodiment, the first R frame of the video sequence of R frames contains only I tiles (i.e., so that subsequent P frames have reference image data from which to calculate motion). Alternatively, in one embodiment, the startup sequence uses the same I tile pattern as normal, but does not include P tiles for those tiles that have not yet been encoded with an I tile. In other words, certain tiles are not encoded with any data until the first I tile arrives, thereby avoiding startup peaks in the video stream data rate 934 in FIG. 9a, which is explained in further detail below. Moreover, as described below, various different sizes and shapes may be used for the tiles while still complying with these underlying principles.

The video decompression logic 412 running on the client 415 decompresses each tile as if it is a separate video sequence of small I and P frames, and then renders each tile to the frame buffer driving display device 422. For example, $I_0$ and $P_0$ from R frames 711 to 770 are used to decompress and render tile 0 of the video image. Similarly, $I_1$ and $P_1$ from R frames 711 to 770 are used to reconstruct tile 1, and so on. As mentioned above, decompression of I frames and P frames is well known in the art, and decompression of I tiles and P tiles can be accomplished by having a multiple instances of a video decompressor running in the client 415. Although multiplying processes would seem to increase the computational burden on client 415, it actually doesn't because the tile themselves are proportionally smaller relative to the number of additional processes, so the number of pixels displayed is the same as if there were one process and using conventional full sized I and P frames.

This R frame technique significantly mitigates the bandwidth peaks typically associated with I frames illustrated in FIGS. 6b and 6c because any given frame is mostly made up of P frames which are typically smaller than I frames. For example, assuming again that a typical I frame is 160 Kb, then the I tiles of each of the frames illustrated in FIG. 7a would be roughly 1/16 of this amount or 10 Kb. Similarly, assuming that a typical P frame is 16 Kb, then the P frames for each of the tiles illustrated in FIG. 7a may be roughly 1 Kb The end result is an R frame of approximately 10 Kb+15*1 Kb=25 Kb. So, each 60-frame sequence would be 25 Kb*60=1.5 Mbps. So, at 60 frames/second, this would require a channel capable of sustaining a bandwidth of 1.5 Mbps, but with much lower peaks due to I tiles being distributed throughout the 60-frame interval.

Note that in previous examples with the same assumed data rates for I frames and P frames, the average data rate was 1.1 Mbps. This is because in the previous examples, a new I frame was only introduced once every 60 frame times, whereas in this example, the 16 tiles that make up an I frame cycle through in 16 frames times, and as such the equivalent of an I frame is introduced every 16 frame times, resulting in a slightly higher average data rate. In practice, though, introducing more frequent I frames does not increase the data rate linearly. This is due to the fact that a P frame (or a P tile) primarily encodes the difference from the prior frame to the next. So, if the prior frame is quite similar to the next frame, the P frame will be very small, if the prior frame is quite different from the next frame, the P frame will be very large. But because a P frame is largely derived from the previous frame, rather than from the actual frame, the resulting encoded frame may contain more errors (e.g., visual artifacts) than an I frame with an adequate number of bits. And, when one P frame follows another P frame, what can occur is an accumulation of errors that gets worse when there is a long sequence of P frames. Now, a sophisticated video compressor will detect the fact that the quality of the image is degrading after a sequence of P frames and, if necessary, it will allocate more bits to subsequent P frames to bring up the quality or, if it is the most efficient course of action, replace a P frame with an I frame. So, when long sequences of P frames are used (e.g., 59 P frames, as in prior examples above) particularly when the scene has a great deal of complexity and/or motion, typically, more bits are needed for P frames as they get further removed from an I frame.

Or, to look at P frames from the opposite point of view, P frames that closely follow an I frame tend to require less bits than P frames that are further removed from an I frame. So, in the example shown in FIG. 7a, no P frame is further than 15 frames removed from an I frame that precedes it, where as in the prior example, a P frame could be 59 frames removed from an I frame. Thus, with more frequent I frames, the P frames are smaller. Of course, the exact relative sizes will vary based on the nature of the video stream, but in the example of FIG. 7a, if an I tile is 10 Kb, P tiles on average, may be only 0.75 kb in size resulting in 10 Kb+15*0.75 Kb=21.25 Kb, or at 60 frames per second, the data rate would be 21.25 Kb*60=1.3 Mbps, or about 16% higher data rate than a stream with an I frame followed by 59 P frames at 1.1 Mbps. Once, again, the relative results between these two approaches to video compression will vary depending up on the video sequence, but typically, we have found empirically that using R-frames require about 20% more bits for a given level of quality than using I/P frame sequences. But, of course, R frames dramatically reduce the peaks which make the video sequences usable with far less latency than I/P frame sequences.

Figure 7B:
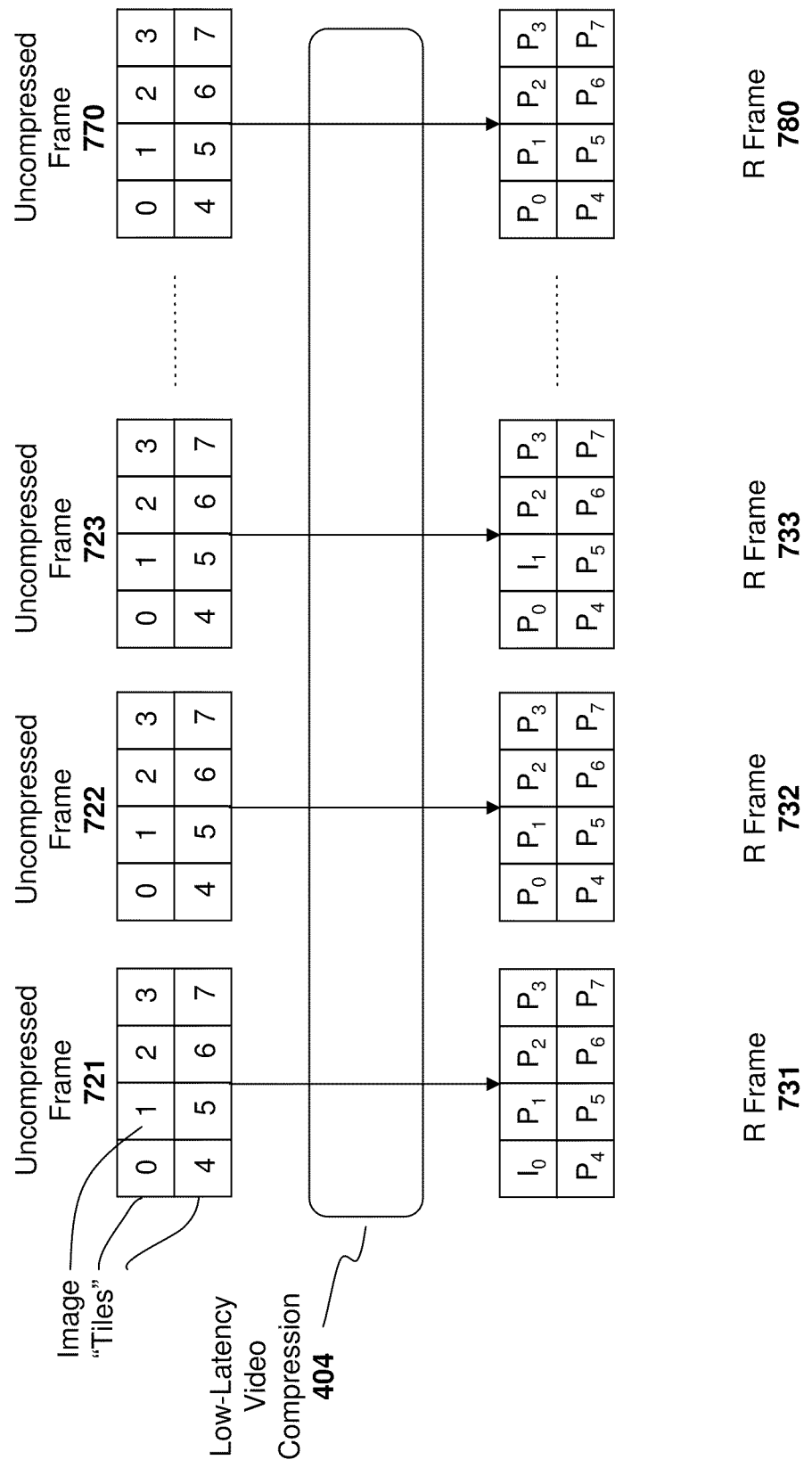

R frames can be configured in a variety of different ways, depending upon the nature of the video sequence, the reliability of the channel, and the available data rate. In an alternative embodiment, a different number of tiles is used than 16 in a 4×4 configuration. For example 2 tiles may be used in a 2×1 or 1×2 configuration, 4 tiles may be used in a 2×2, 4×1 or 1×4 configuration, 6 tiles may be used in a 3×2, 2×3, 6×1 or 1×6 configurations or 8 tiles may be used in a 4×2 (as shown in FIG. 7b), 2×4, 8×1 or 1×8 configuration. Note that the tiles need not be square, nor must the video frame be square, or even rectangular. The tiles can be broken up into whatever shape best suits the video stream and the application used.

In another embodiment, the cycling of the I and P tiles is not locked to the number of tiles. For example, in an 8-tile 4×2 configuration, a 16-cycle sequence can still be used as illustrated in FIG. 7b. Sequential uncompressed frames 721, 722, 723 are each divided into 8 tiles, 0-7 and each tile is compressed individually. From R frame 731, only tile 0 is compressed as an I tile, and the remaining tiles are compressed as P tiles. For subsequent R frame 732 all of the 8 tiles are compressed as P tiles, and then for subsequent R frame 733, tile 1 is compressed as an I tile and the other tiles are all compressed as P tiles. And, so the sequencing continues for 16 frames, with an I tile generated only every other frame, so the last I tile is generated for tile 7 during the $15^{th}$ frame time (not shown in FIG. 7b) and during the $16^{th}$ frame time R frame 780 is compressed using all P tiles. Then, the sequence begins again with tile 0 compressed as an I tile and the other tiles compressed as P tiles. As in the prior embodiment, the very first frame of the entire video sequence would typically be all I tiles, to provide a reference for P tiles from that point forward. The cycling of I tiles and P tiles need not even be an even multiple of the number of tiles. For example, with 8 tiles, each frame with an I tile can be followed by 2 frames with all P tiles, before another I tile is used. In yet another embodiment, certain tiles may be sequenced with I tiles more often than other tiles if, for example, certain areas of the screen are known to have more motion requiring from frequent I tiles, while others are more static (e.g., showing a score for a game) requiring less frequent I tiles. Moreover, although each frame is illustrated in FIGS. 7a-b with a single I tile, multiple I tiles may be encoded in a single frame (depending on the bandwidth of the transmission channel). Conversely, certain frames or frame sequences may be transmitted with no I tiles (i.e., only P tiles).

The reason the approaches of the preceding paragraph works well is that while not having I tiles distributed across every single frame would seem to be result in larger peaks, the behavior of the system is not that simple. Since each tile is compressed separately from the other tiles, as the tiles get smaller the encoding of each tile can become less efficient, because the compressor of a given tile is not able to exploit similar image features and similar motion from the other tiles. Thus, dividing up the screen into 16 tiles generally will result in a less efficient encoding than dividing up the screen into 8 tiles. But, if the screen is divided into 8 tiles and it causes the data of a full I frame to be introduced every 8 frames instead of every 16 frames, it results in a much higher data rate overall. So, by introducing a full I frame every 16 frames instead of every 8 frames, the overall data rate is reduced. Also, by using 8 larger tiles instead of 16 smaller tiles, the overall data rate is reduced, which also mitigates to some degree the data peaks caused by the larger tiles.

In another embodiment, the low-latency video compression logic 404 in FIGS. 7a and 7b controls the allocation of bits to the various tiles in the R frames either by being preconfigured by settings, based on known characteristics of the video sequence to be compressed, or automatically, based upon an ongoing analysis of the image quality in each tile. For example, in some racing video games, the front of the player's car (which is relatively motionless in the scene) takes up a large part of the lower half of the screen, whereas the upper half of the screen is entirely filled with the oncoming roadway, buildings and scenery, which is almost always in motion. If the compression logic 404 allocates an equal number of bits to each tile, then the tiles on the bottom half of the screen (tiles 4-7) in uncompressed frame 721 in FIG. 7b, will generally be compressed with higher quality than tiles than the tiles in the upper half of the screen (tiles 0-3) in uncompressed frame 721 in FIG. 7b. If this particular game, or this particular scene of the game is known to have such characteristics, then the operators of the hosting service 210 can configure the compression logic 404 to allocate more bits to the tiles in the top of the screen than to tiles at the bottom of the screen. Or, the compression logic 404 can evaluate the quality of the compression of the tiles after frames are compressed (using one or more of many compression quality metrics, such as Peak Signal-To-Noise Ratio (PSNR)) and if it determines that over a certain window of time, certain tiles are consistently producing better quality results, then it gradually allocates more bits to tiles that are producing lower quality results, until the various tiles reach a similar level of quality. In an alternative embodiment, the compressor logic 404 allocates bits to achieve higher quality in a particular tile or group of tiles. For example, it may provide a better overall perceptual appearance to have higher quality in the center of the screen than at the edges.

Figure 8:
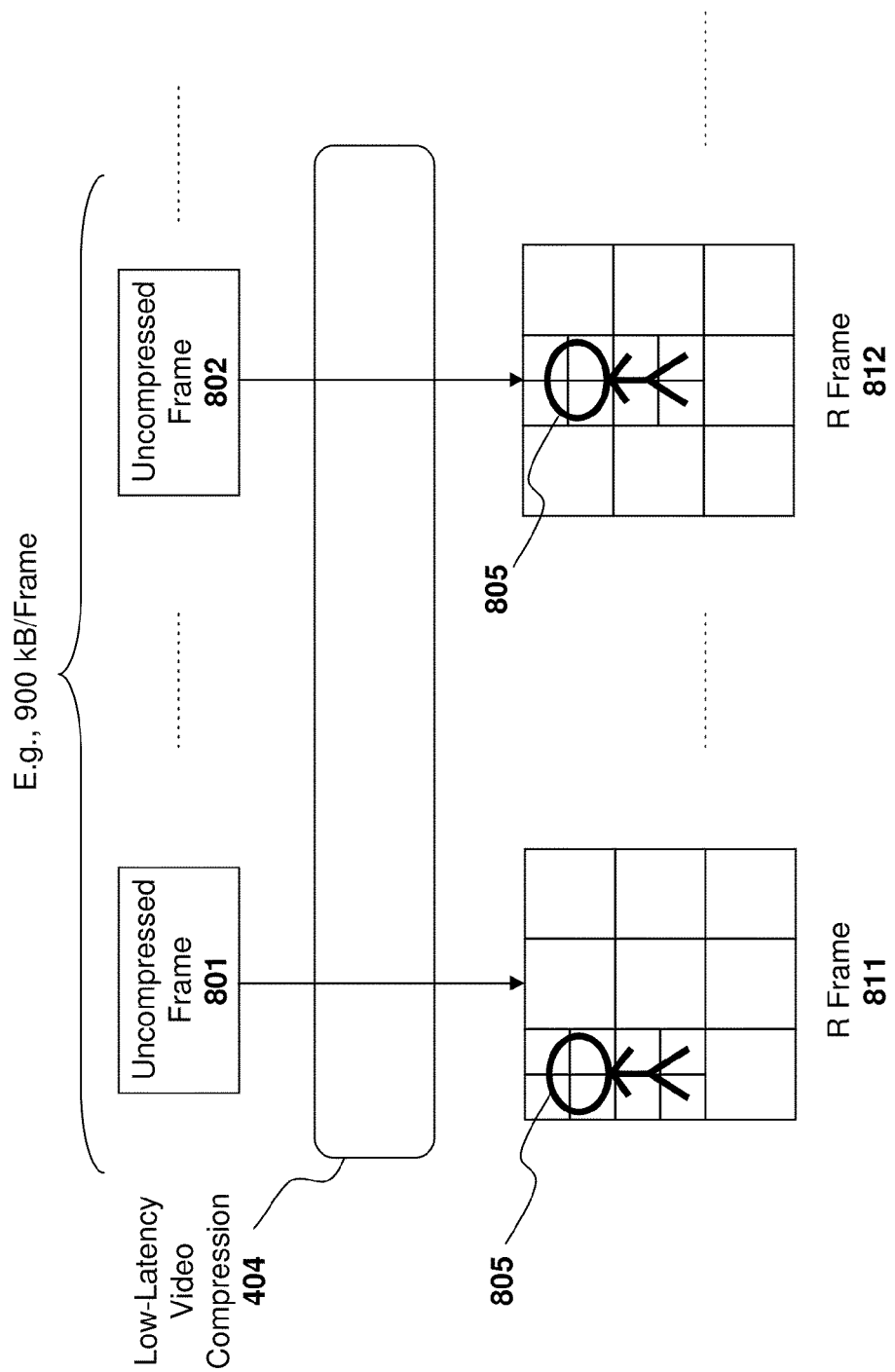
FIG. 8 illustrates additional example video compression techniques employed in one embodiment.

In one embodiment, to improve resolution of certain regions of the video stream, the video compression logic 404 uses smaller tiles to encode areas of the video stream with relatively more scene complexity and/or motion than areas of the video stream with relatively less scene complexity and/or motion. For example, as illustrated in FIG. 8, smaller tiles are employed around a moving character 805 in one area of one R frame 811 (potentially followed by a series of R frames with the same tile sizes (not shown)). Then, when the character 805 moves to a new area of the image, smaller tiles are used around this new area within another R frame 812, as illustrated. As mentioned above, various different sizes and shapes may be employed as "tiles" while still complying with these underlying principles.

While the cyclic I/P tiles described above substantially reduce the peaks in the data rate of a video stream, they do not eliminate the peaks entirely, particularly in the case of rapidly-changing or highly complex video imagery, such as occurs with motion pictures, video games, and some application software. For example, during a sudden scene transition, a complex frame may be followed by another complex frame that is completely different. Even though several I tiles may have preceded the scene transition by only a few frame times, they don't help in this situation because the new frame's material has no relation to the previous I tiles. In such a situation (and in other situations where even though not everything changes, much of the image changes), the video compressor 404 will determine that many, if not all, of the P tiles are more efficiently coded as I tiles, and what results is a very large peak in the data rate for that frame.

As discussed previously, it is simply the case that with most consumer-grade Internet connections (and many office connections), it simply is not feasible to "jam" data that exceeds the available maximum data rate shown as 622 in FIG. 6c, along with the rated maximum data rate 621. Note that the rated maximum data rate 621 (e.g., "6 Mbps DSL") is essentially a marketing number for users considering the purchase of an Internet connection, but generally it does not guarantee a level of performance. For the purposes of this application, it is irrelevant, since our only concern is the available maximum data rate 622 at the time the video is streamed through the connection. Consequently, in FIGS. 9a and 9c, as we describe a solution to the peaking problem, the rated maximum data rate is omitted from the graph, and only the available maximum data rate 922 is shown. The video stream data rate must not exceed the available maximum data rate 922.

To address this, the first thing that the video compressor 404 does is determine a peak data rate 941, which is a data rate the channel is able to handle steadily. This rate can be determined by a number of techniques. One such technique is by gradually sending an increasingly higher data rate test stream from the hosting service 210 to the client 415 in FIGS. 4a and 4b, and having the client provide feedback to the hosting service as to the level of packet loss and latency. As the packet loss and/or latency begins to show a sharp increase, that is an indication that the available maximum data rate 922 is being reached. After that, the hosting service 210 can gradually reduce the data rate of the test stream until the client 415 reports that for a reasonable period of time the test stream has been received with an acceptable level of packet loss and the latency is near minimal. This establishes a peak maximum data rate 941, which will then be used as a peak data rate for streaming video. Over time, the peak data rate 941 will fluctuate (e.g., if another user in a household starts to heavily use the Internet connection), and the client 415 will need to constantly monitor it to see whether packet loss or latency increases, indicating the available max data rate 922 is dropping below the previously established peak data rate 941, and if so the peak data rate 941. Similarly, if over time the client 415 finds that the packet loss and latency remain at optimal levels, it can request that the video compressor slowly increases the data rate to see whether the available maximum data rate has increased (e.g., if another user in a household has stopped heavy use of the Internet connection), and again waiting until packet loss and/or higher latency indicates that the available maximum data rate 922 has been exceeded, and again a lower level can be found for the peak data rate 941, but one that is perhaps higher than the level before testing an increased data rate. So, by using this technique (and other techniques like it) a peak data rate 941 can be found, and adjusted periodically as needed. The peak data rate 941 establishes the maximum data rate that can be used by the video compressor 404 to stream video to the user. The logic for determining the peak data rate may be implemented at the user premises 211 and/or on the hosting service 210. At the user premises 211, the client device 415 performs the calculations to determine the peak data rate and transmits this information back to the hosting service 210; at the hosting service 210, a server 402 at the hosting service performs the calculations to determine the peak data rate based on statistics received from the client 415 (e.g., packet loss, latency, max data rate, etc).

FIG. 9a shows an example video stream data rate 934 that has substantial scene complexity and/or motion that has been generated using the cyclic I/P tile compression techniques described previously and illustrated in FIGS. 7a, 7b and 8. The video compressor 404 has been configured to output compressed video at an average data rate that is below the peak data rate 941, and note that, most of the time, the video stream data rate remains below the peak data rate 941. A comparison of data rate 934 with video stream data rate 634 shown in FIG. 6c created using I/P/B or I/P frames shows that the cyclic I/P tile compression produces a much smoother data rate. Still, at frame 2× peak 952 (which approaches 2× the peak data rate 942) and frame 4× peak 954 (which approaches 4× the peak data rate 944), the data rate exceeds the peak data rate 941, which is unacceptable. In practice, even with high action video from rapidly changing video games, peaks in excess of peak data rate 941 occur in less than 2% of frames, peaks in excess of 2× peak data rate 942 occur rarely, and peaks in excess of 3× peak data rate 943 occur hardly ever. But, when they do occur (e.g., during a scene transition), the data rate required by them is necessary to produce a good quality video image.

One way to solve this problem is simply to configure the video compressor 404 such that its maximum data rate output is the peak data rate 941. Unfortunately, the resulting video output quality during the peak frames is poor since the compression algorithm is "starved" for bits. What results is the appearance of compression artifacts when there are sudden transitions or fast motion, and in time, the user comes to realize that the artifacts always crop up when there is sudden changes or rapid motion, and they can become quite annoying.

Although the human visual system is quite sensitive to visual artifacts that appear during sudden changes or rapid motion, it is not very sensitive to detecting a reduction in frame rate in such situations. In fact, when such sudden changes occur, it appears that the human visual system is preoccupied with tracking the changes, and it doesn't notice if the frame rate briefly drops from 60 fps to 30 fps, and returns immediately to 60 fps. And, in the case of a very dramatic transition, like a sudden scene change, the human visual system doesn't notice if the frame rate drops to 20 fps or even 15 fps, and then immediately returns to 60 fps. So long as the frame rate reduction only occurs infrequently, to a human observer, it appears that the video has been continuously running at 60 fps.

Figure 9B:
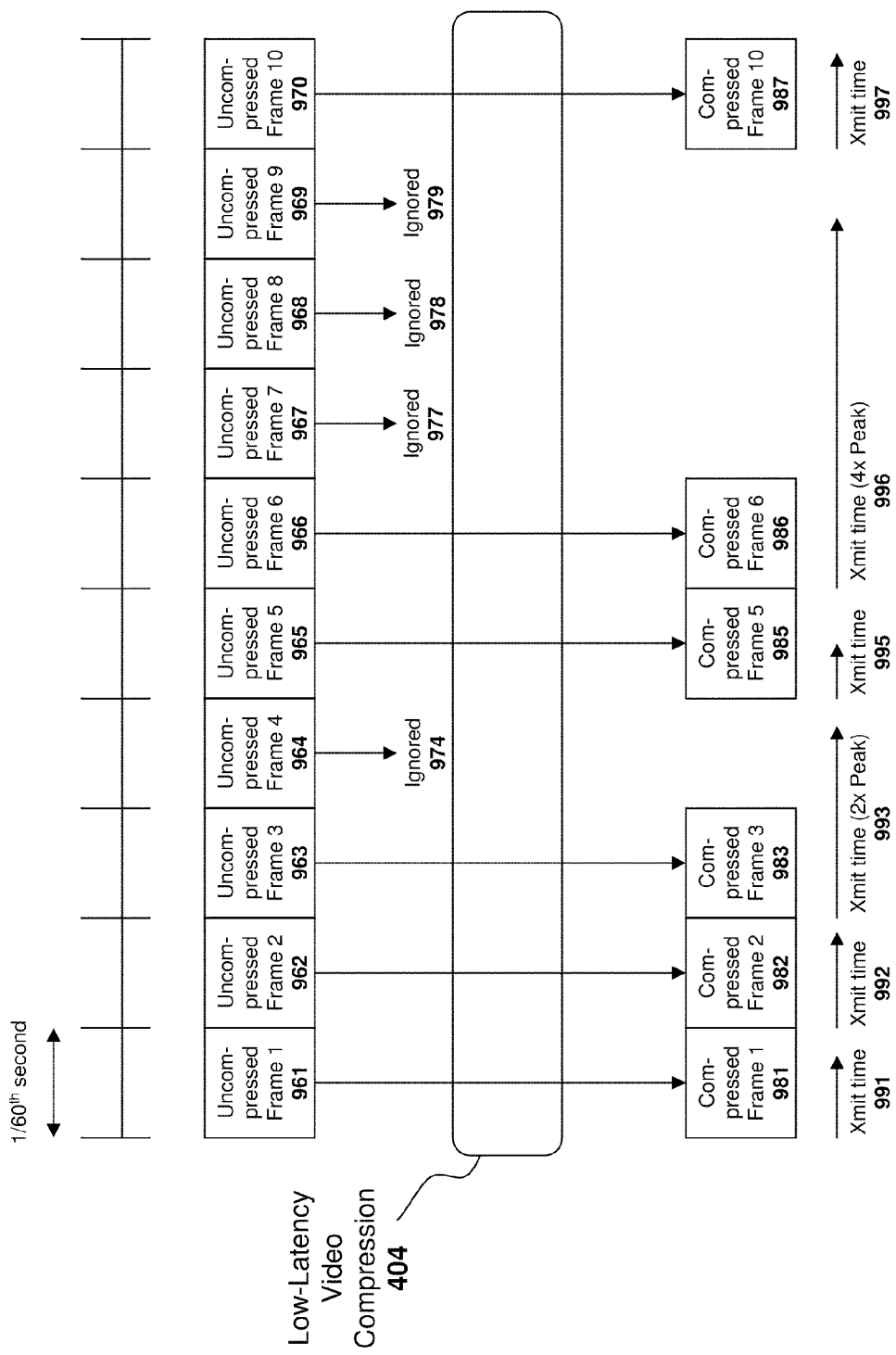

This property of the human visual system is exploited by the techniques illustrated in FIG. 9b. A server 402 (from FIGS. 4a and 4b) produces an uncompressed video output stream at a steady frame rate (at 60 fps in one embodiment). A timeline shows each frame 961-970 output each $\frac{1}{60}^{th}$ second. Each uncompressed video frame, starting with frame 961, is output to the low-latency video compressor 404, which compresses the frame in less than a frame time, producing for the first frame compressed frame 1 981. The data produced for the compressed frame 1 981 may be larger or smaller, depending upon many factors, as previously described. If the data is small enough that it can be transmitted to the client 415 in a frame time ($\frac{1}{60}^{th}$ second) or less at the peak data rate 941, then it is transmitted during transmit time (xmit time) 991 (the length of the arrow indicates the duration of the transmit time). In the next frame time, server 402 produces uncompressed frame 2 962, it is compressed to compressed frame 2 982, and it is transmitted to client 415 during transmit time 992, which is less than a frame time at peak data rate 941.

Then, in the next frame time, server 402 produces uncompressed frame 3 963. When it is compressed by video compressor 404, the resulting compressed frame 3 983 is more data than can be transmitted at the peak data rate 941 in one frame time. So, it is transmitted during transmit time (2× peak) 993, which takes up all of the frame time and part of the next frame time. Now, during the next frame time, server 402 produces another uncompressed frame 4 964 and outputs it to video compressor 404 but the data is ignored and illustrated with 974. This is because video compressor 404 is configured to ignore further uncompressed video frames that arrive while it is still transmitting a prior compressed frame. Of course client 415's video decompressor will fail to receive frame 4, but it simply continues to display on display device 422 frame 3 for 2 frame times (i.e., briefly reduces the frame rate from 60 fps to 30 fps).

For the next frame 5, server 402 outputs uncompressed frame 5 965, is compressed to compressed frame 5 985 and transmitted within 1 frame during transmit time 995. Client 415's video decompressor decompresses frame 5 and displays it on display device 422. Next, server 402 outputs uncompressed frame 6 966, video compressor 404 compresses it to compressed frame 6 986, but this time the resulting data is very large. The compressed frame is transmitted during transmit time (4× peak) 996 at the peak data rate 941, but it takes almost 4 frame times to transmit the frame. During the next 3 frame times, video compressor 404 ignores 3 frames from server 402, and client 415's decompressor holds frame 6 steadily on the display device 422 for 4 frames times (i.e., briefly reduces the frame rate from 60 fps to 15 fps). Then finally, server 402 outputs frame 10 970, video compressor 404 compresses it into compressed frame 10 987, and it is transmitted during transmit time 997, and client 415's decompressor decompresses frame 10 and displays it on display device 422 and once again the video resumes at 60 fps.

Note that although video compressor 404 drops video frames from the video stream generated by server 402, it does not drop audio data, regardless of what form the audio comes in, and it continues to compress the audio data when video frames are dropped and transmit them to client 415, which continues to decompress the audio data and provide the audio to whatever device is used by the user to playback the audio. Thus audio continues unabated during periods when frames are dropped. Compressed audio consumes a relatively small percentage of bandwidth, compared to compressed video, and as result does not have a major impact on the overall data rate. Although it is not illustrated in any of the data rate diagrams, there is always data rate capacity reserved for the compressed audio stream within the peak data rate 941.

The example just described in FIG. 9*b* was chosen to illustrate how the frame rate drops during data rate peaks, but what it does not illustrate is that when the cyclic I/P tile techniques described previously are used, such data rate peaks, and the consequential dropped frames are rare, even during high scene complexity/high action sequences such as those that occur in video games, motion pictures and some application software. Consequently, the reduced frame rates are infrequent and brief, and the human visual system does not detect them.

Figure 9C:
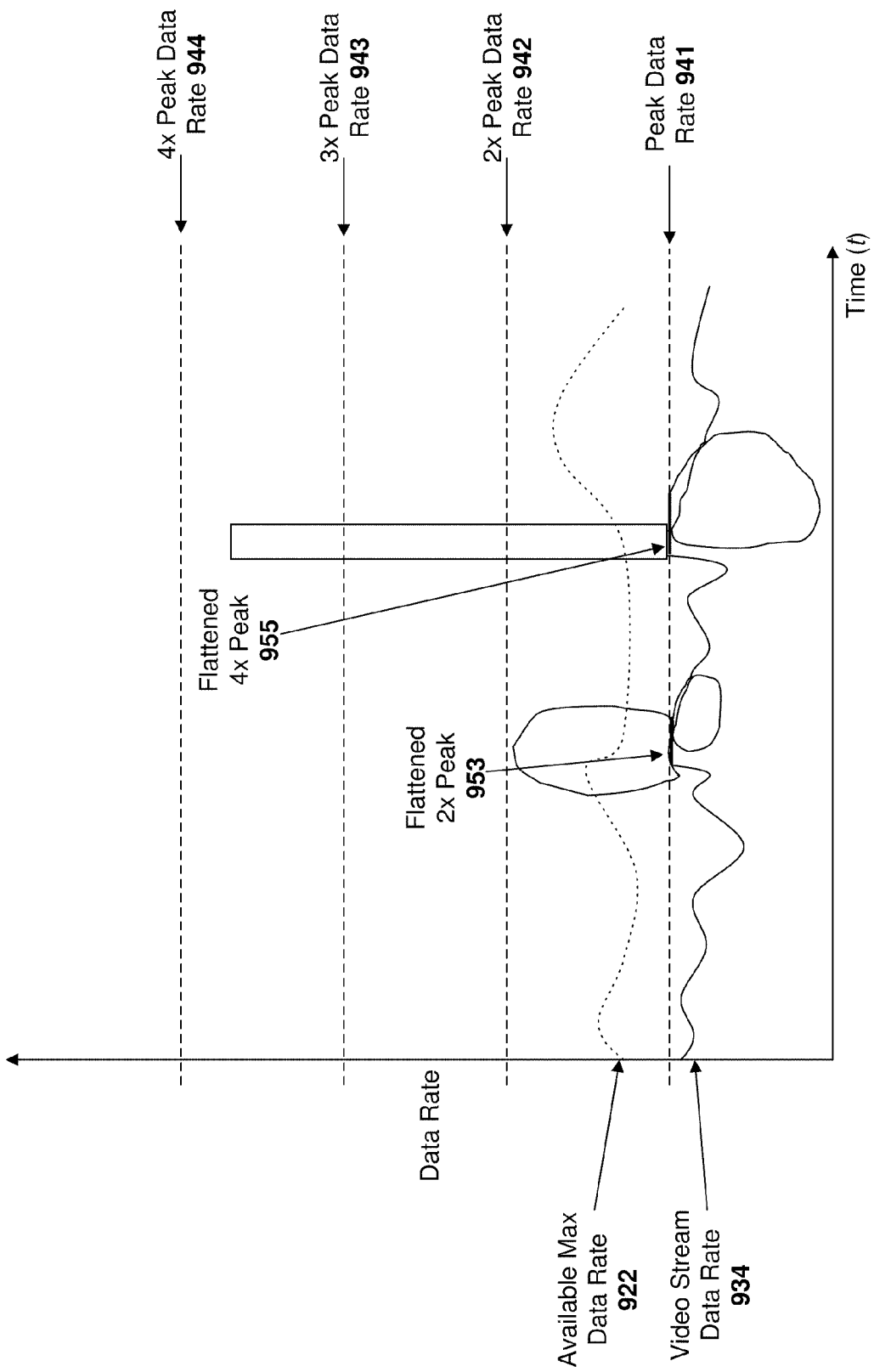

If the frame rate reduction mechanism just described is applied to the video stream data rate illustrated in FIG. 9*a*, the resulting video stream data rate is illustrated in FIG. 9*c*. In this example, 2× peak 952 has been reduced to flattened 2× peak 953, and 4× peak 955 has been reduced to flattened 4× peak 955, and the entire video stream data rate 934 remains at or below the peak data rate 941.

Thus, using the techniques described above, a high action video stream can be transmitted with low latency through the general Internet and through a consumer-grade Internet connection. Further, in an office environment on a LAN (e.g., 100 Mbs Ethernet or 802.11g wireless) or on a private network (e.g., 100 Mbps connection between a data center an offices) a high action video stream can be transmitted without peaks so that multiple users (e.g., transmitting 1920×1080 at 60 fps at 4.5 Mbps) can use the LAN or shared private data connection without having overlapping peaks overwhelming the network or the network switch backplanes.

Data Rate Adjustment

In one embodiment, the hosting service 210 initially assesses the available maximum data rate 622 and latency of the channel to determine an appropriate data rate for the video stream and then dynamically adjusts the data rate in response. To adjust the data rate, the hosting service 210 may, for example, modify the image resolution and/or the number of frames/second of the video stream to be sent to the client 415. Also, the hosting service can adjust the quality level of the compressed video. When changing the resolution of the video stream, e.g., from a 1280×720 resolution to a 640×360 the video decompression logic 412 on the client 415 can scale up the image to maintain the same image size on the display screen.

In one embodiment, in a situation where the channel completely drops out, the hosting service 210 pauses the game. In the case of a multiplayer game, the hosting service reports to the other users that the user has dropped out of the game and/or pauses the game for the other users.

Dropped or Delayed Packets

In one embodiment, if data is lost due to packet loss between the video compressor 404 and client 415 in FIG. 4*a* or 4*b*, or due to a packet being received out of order that arrives too late to decompress and meet the latency requirements of the decompressed frame, the video decompression logic 412 is able to mitigate the visual artifacts. In a streaming I/P frame implementation, if there is a lost/delayed packet, the entire screen is impacted, potentially causing the screen to completely freeze for a period of time or show other screenwide visual artifacts. For example, if a lost/delayed packet causes the loss of an I frame, then the decompressor will lack a reference for all of the P frames that follow until a new I frame is received. If a P frame is lost, then it will impact the P frames for the entire screen that follow. Depending on how long it will be before an I frame appears, this will have a longer or shorter visual impact. Using interleaved I/P tiles as shown in FIGS. 7*a* and 7*b*, a lost/delayed packet is much less likely to impact the entire screen since it will only affect the tiles contained in the affected packet. If each tile's data is sent within an individual packet, then if a packet is lost, it will only affect one tile. Of course, the duration of the visual artifact will depend on whether an I tile packet is lost and, if a P tile is lost, how many frames it will take until an I tile appears. But, given that different tiles on the screen are being updated with I frames very frequently (potentially every frame), even if one tile on the screen is affected, other tiles may not be. Further, if some event cause a loss of several packets at once (e.g., a spike in power next to a DSL line that briefly disrupts the data flow), then some of the tiles will be affected more than others, but because some tiles will quickly be renewed with a new I tile, they will be only briefly affected. Also, with a streaming I/P frame implementation, not only are the I frames the most critical frame, but the I frames are extremely large, so if there is an event that causes a dropped/delayed packet, there is a higher probability that an I frame will be affected (i.e., if any part of an I frame is lost, it is unlikely that the I frame can be decompressed at all) than a much smaller I tile. For all of these reasons, using I/P tiles results in far fewer visual artifacts when packets are dropped/delayed than with I/P frames.

Figure 10A:
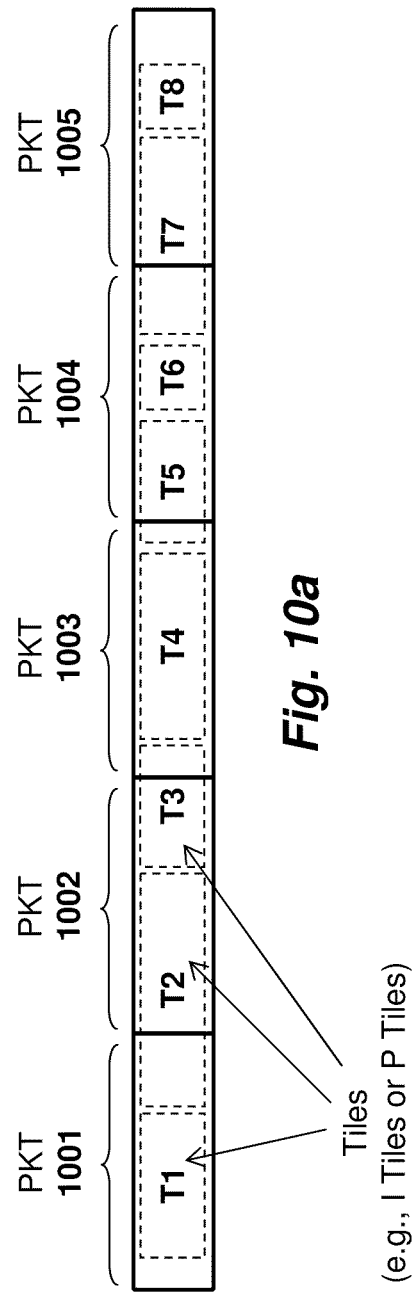
FIGS. 10a-b illustrate one embodiment which efficiently packs image tiles within packets.

One embodiment attempts to reduce the effect of lost packets by intelligently packaging the compressed tiles within the TCP (transmission control protocol) packets or UDP (user datagram protocol) packets. For example, in one embodiment, tiles are aligned with packet boundaries whenever possible. FIG. 10*a* illustrates how tiles might be packed within a series of packets 1001-1005 without implementing this feature. Specifically, in FIG. 10*a*, tiles cross packet boundaries and are packed inefficiently so that the loss of a single packet results in the loss of multiple frames. For example, if packets 1003 or 1004 are lost, three tiles are lost, resulting in visual artifacts.

Figure 10B:
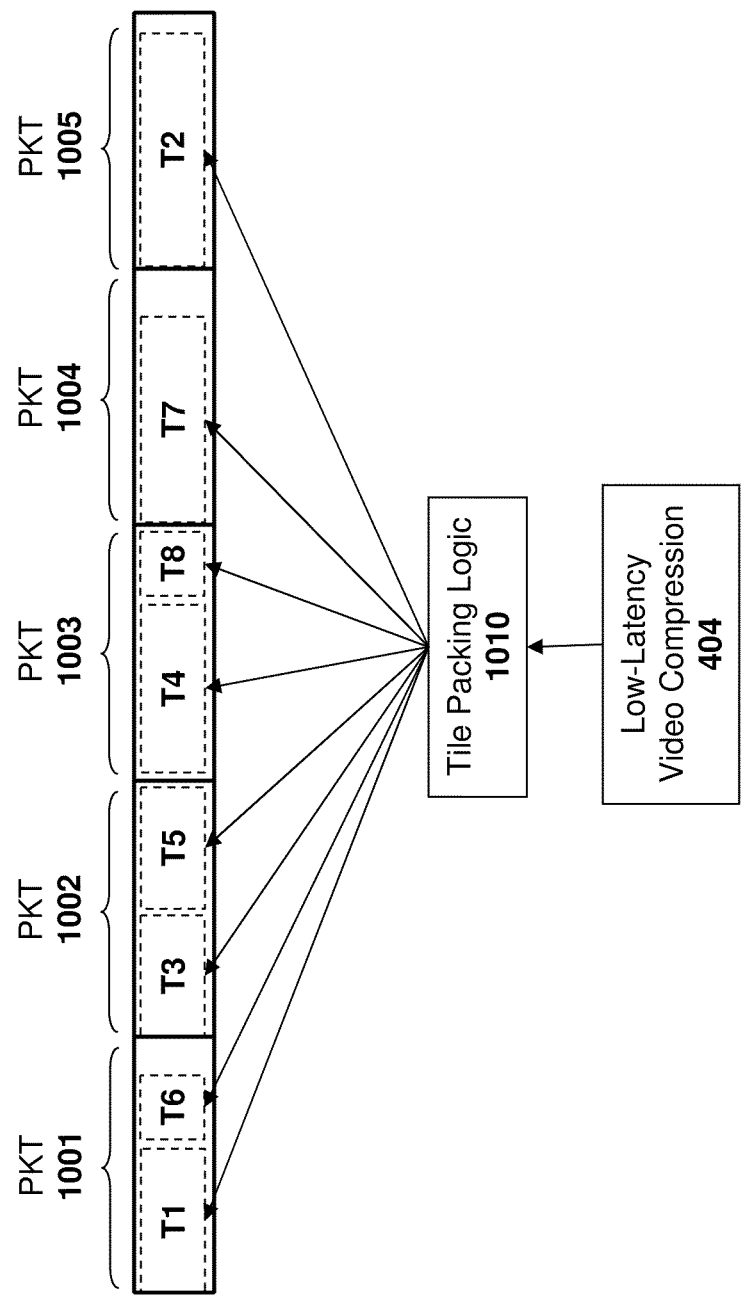

By contrast, FIG. 10*b* illustrates tile packing logic 1010 for intelligently packing tiles within packets to reduce the effect of packet loss. First, the tile packing logic 1010 aligns tiles with packet boundaries. Thus, tiles T1, T3, T4, T7, and T2 are aligned with the boundaries of packets 1001-1005, respectively. The tile packing logic also attempts to fit tiles within packets in the most efficient manner possible, without crossing packet boundaries. Based on the size of each of the tiles, tiles T1 and T6 are combined in one packet 1001; T3 and T5 are combined in one packet 1002; tiles T4 and T8 are combined in one packet 1003; tile T8 is added to packet 1004; and tile T2 is added to packet 1005. Thus, under this scheme, a single packet loss will result in the loss of no more than 2 tiles (rather than 3 tiles as illustrated in FIG. 10*a*).

One additional benefit to the embodiment shown in FIG. 10*b* is that the tiles are transmitted in a different order in which they are displayed within the image. This way, if adjacent packets are lost from the same event interfering with the transmission it will affect areas which are not near each other on the screen, creating a less noticeable artifacting on the display.

One embodiment employs forward error correction (FEC) techniques to protect certain portions of the video stream from channel errors. As is known in the art, FEC techniques such as Reed-Solomon and Viterbi generate and append error correction data information to data transmitted over a communications channel. If an error occurs in the underlying data (e.g., an I frame), then the FEC may be used to correct the error.

FEC codes increase the data rate of the transmission, so ideally, they are only used where they are most needed. If data is being sent that would not result in a very noticeable visual artifact, it may be preferable to not use FEC codes to protect the data. For example, a P tile that immediately precedes an I tile that is lost will only create a visual artifact (i.e., on tile on the screen will not be updated) for $\frac{1}{60}^{th}$ of second on the screen. Such a visual artifact is barely detectable by the human eye. As P tiles are further back from an I tile, losing a P tile becomes increasingly more noticeable. For example, if a tile cycle pattern is an I tile followed by 15 P tiles before an I tile is available again, then if the P tile immediately following an I tile is lost, it will result in that tile showing an incorrect image for 15 frame times (at 60 fps, that would be 250 ms). The human eye will readily detect a disruption in a stream for 250 ms. So, the further back a P tile is from a new I tile (i.e., the closer a P tiles follows an I tile), the more noticeable the artifact. As previously discussed, though, in general, the closer a P tile follows an I tile, the smaller the data for that P tile. Thus, P tiles following I tiles not only are more critical to protect from being lost, but they are smaller in size. And, in general, the smaller the data is that needs to be protected, the smaller the FEC code needs to be to protect it.

So, as illustrated in FIG. 11a, in one embodiment, because of the importance of I tiles in the video stream, only I tiles are provided with FEC codes. Thus, FEC 1101 contains error correction code for I tile 1100 and FEC 1104 contains error correction code for I tile 1103. In this embodiment, no FEC is generated for the P tiles.

In one embodiment illustrated in FIG. 11b FEC codes are also generated for P tiles which are most likely to cause visual artifacts if lost. In this embodiment, FECs 1105 provide error correction codes for the first 3 P tiles, but not for the P tiles that follow. In another embodiment, FEC codes are generated for P tiles which are smallest in data size (which will tend to self-select P tiles occurring the soonest after an I tile, which are the most critical to protect).

In another embodiment, rather than sending an FEC code with a tile, the tile is transmitted twice, each time in a different packet. If one packet is lost/delayed, the other packet is used.

In one embodiment, shown in FIG. 11c, FEC codes 1111 and 1113 are generated for audio packets, 1110 and 1112, respectively, transmitted from the hosting service concurrently with the video. It is particularly important to maintain the integrity of the audio in a video stream because distorted audio (e.g., clicking or hissing) will result in a particularly undesirable user experience. The FEC codes help to ensure that the audio content is rendered at the client computer 415 without distortion.

In another embodiment, rather than sending an FEC code with audio data, the audio data is transmitted twice, each time in a different packet. If one packet is lost/delayed, the other packet is used.

In addition, in one embodiment illustrated in FIG. 11d, FEC codes 1121 and 1123 are used for user input commands 1120 and 1122, respectively (e.g., button presses) transmitted upstream from the client 415 to the hosting service 210. This is important because missing a button press or a mouse movement in a video game or an application could result in an undesirable user experience.

In another embodiment, rather than sending an FEC code with user input command data, the user input command data is transmitted twice, each time in a different packet. If one packet is lost/delayed, the other packet is used.

In one embodiment, the hosting service 210 assesses the quality of the communication channel with the client 415 to determine whether to use FEC and, if so, what portions of the video, audio and user commands to which FEC should be applied. Assessing the "quality" of the channel may include functions such as evaluating packet loss, latency, etc, as described above. If the channel is particularly unreliable, then the hosting service 210 may apply FEC to all of I tiles, P tiles, audio and user commands. By contrast, if the channel is reliable, then the hosting service 210 may apply FEC only to audio and user commands, or may not apply FEC to audio or video, or may not use FEC at all. Various other permutations of the application of FEC may be employed while still complying with these underlying principles. In one embodiment, the hosting service 210 continually monitors the conditions of the channel and changes the FEC policy accordingly.

In another embodiment, referring to FIGS. 4a and 4b, when a packet is lost/delayed resulting in the loss of tile data or if, perhaps because of a particularly bad packet loss, the FEC is unable to correct lost tile data, the client 415 assesses how many frames are left before a new I tile will be received and compares it to the round-trip latency from the client 415 to hosting service 210. If the round-trip latency is less than the number of frames before a new I tile is due to arrive, then the client 415 sends a message to the hosting service 210 requesting a new I tile. This message is routed to the video compressor 404, and rather than generating a P tile for the tile whose data had been lost, it generates an I tile. Given that the system shown in FIGS. 4a and 4b is designed to provide a round-trip latency that is typically less than 80 ms, this results in a tile being corrected within 80 ms (at 60 fps, frames are 16.67 ms of duration, thus in full frame times, 80 ms latency would result in a corrected a tile within 83.33 ms, which is 5 frame times—a noticeable disruption, but far less noticeable than, for example, a 250 ms disruption for 15 frames). When the compressor 404 generates such an I tile out of its usual cyclic order, if the I tile would cause the bandwidth of that frame to exceed the available bandwidth, then the compressor 404 will delay the cycles of the other tiles so that the other tiles receive P tiles during that frame time (even if one tile would normally be due an I tile during that frame), and then starting with the next frame the usual cycling will continue, and the tile that normally would have received an I tile in the preceding frame will receive an I tile. Although this action briefly delays the phase of the R frame cycling, it normally will not be noticeable visually.

Video and Audio Compressor/Decompressor Implementation

Figure 12:
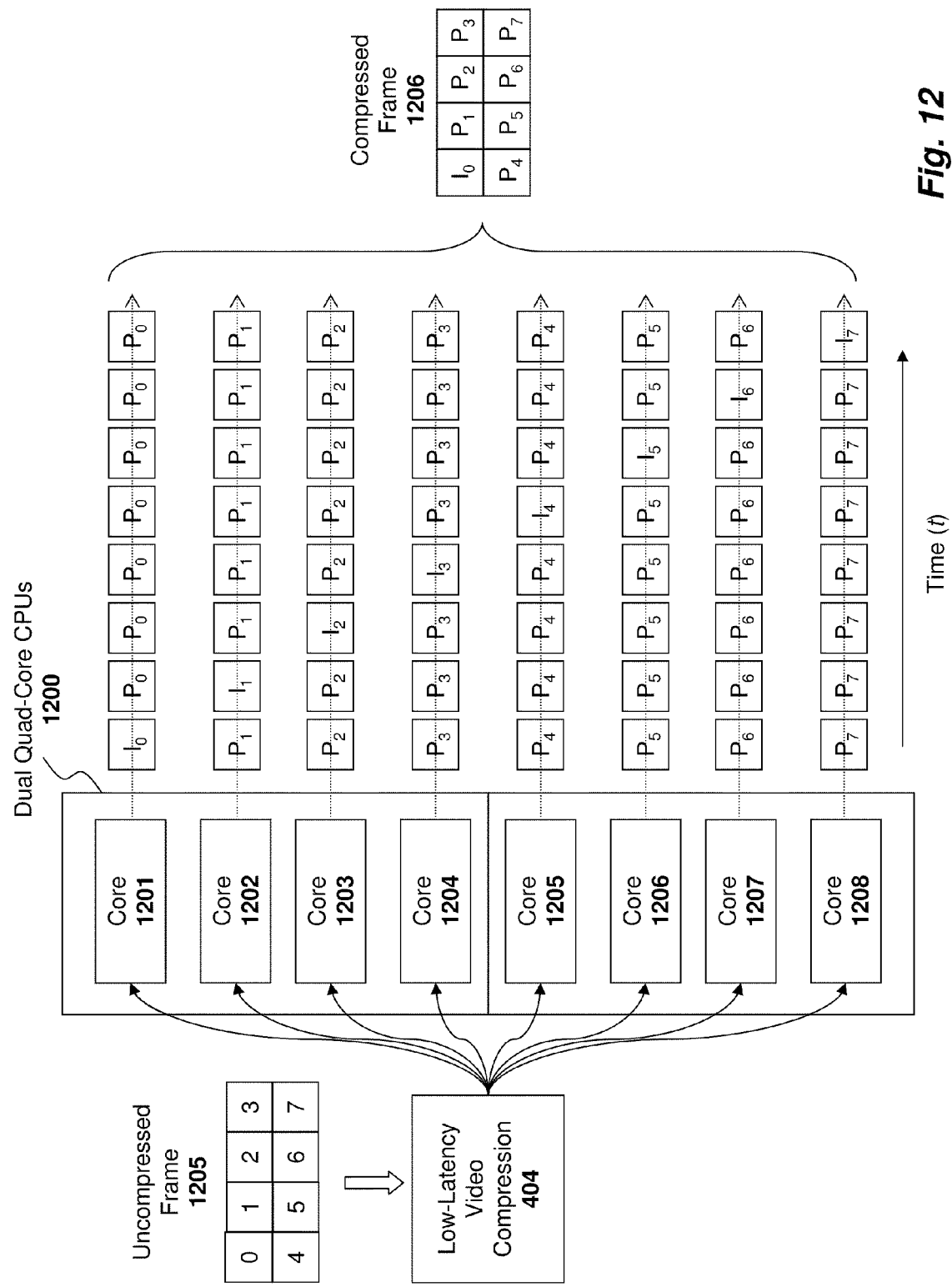
FIG. 12 illustrates one embodiment which uses multi-core processing units for compression.

FIG. 12 illustrates one particular embodiment in which a multi-core and/or multi-processor 1200 is used to compress 8 tiles in parallel. In one embodiment, a dual processor, quad core Xeon CPU computer system running at 2.66 GHz or higher is used, with each core implementing the open source x264 H.264 compressor as an independent process. However, various other hardware/software configurations may be used while still complying with these underlying principles. For example, each of the CPU cores can be replaced with an H.264 compressor implemented in an FPGA. In the example shown in FIG. 12, cores 1201-1208 are used to concurrently process the I tiles and P tiles as eight independent threads. As is well known in the art, current multi-core and multi-processor computer systems are inherently capable of multi-threading when integrated with multi-threading operating systems such as Microsoft Windows XP Professional Edition (either 64-bit or the 32-bit edition) and Linux.

In the embodiment illustrated in FIG. 12, since each of the 8 cores is responsible for just one tile, it operates largely independently from the other cores, each running a separate instantiation of x264. A PCI Express x1-based DVI capture card, such as the Sendero Video Imaging IP Development Board from Microtronix of Oosterhout, The Netherlands is used to capture uncompressed video at 640×480, 800×600, or 1280×720 resolution, and the FPGA on the card uses Direct Memory Access (DMA) to transfer the captured video through the DVI bus into system RAM. The tiles are arranged in a 4×2 arrangement 1205 (although they are illustrated as square tiles, in this embodiment they are of 160×240 resolution). Each instantiation of x264 is configured to compress one of the 8 160×240 tiles, and they are synchronized such that, after an initial I tile compression, each core enters into a cycle, each one frame out of phase with the other, to compress one I tile followed by seven P tiles, and illustrated in FIG. 12.

Each frame time, the resulting compressed tiles are combined into a packet stream, using the techniques previously described, and then the compressed tiles are transmitted to a destination client 415.

Although not illustrated in FIG. 12, if the data rate of the combined 8 tiles exceeds a specified peak data rate 941, then all 8 x264 processes are suspended for as many frame times as are necessary until the data for the combined 8 tiles has been transmitted.

In one embodiment, client 415 is implemented as software on a PC running 8 instantiations of FFmpeg. A receiving process receives the 8 tiles, and each tile is routed to an FFmpeg instantiation, which decompresses the tile and renders it to an appropriate tile location on the display device 422.

The client 415 receives keyboard, mouse, or game controller input from the PC's input device drivers and transmits it to the server 402. The server 402 then applies the received input device data and applies it to the game or application running on the server 402, which is a PC running Windows using an Intel 2.16 GHz Core Duo CPU. The server 402 then produces a new frame and outputs it through its DVI output, either from a motherboard-based graphics system, or through a NVIDIA 8800GTX PCI Express card's DVI output.

Simultaneously, the server 402 outputs the audio produced by game or applications through its digital audio output (e.g., S/PDIF), which is coupled to the digital audio input on the dual quad-core Xeon-based PC that is implementing the video compression. A Vorbis open source audio compressor is used to compress the audio simultaneously with the video using whatever core is available for the process thread. In one embodiment, the core that completes compressing its tile first executes the audio compression. The compressed audio is then transmitted along with the compressed video, and is decompressed on the client 415 using a Vorbis audio decompressor.

Hosting Service Server Center Distribution

Figure 13A:
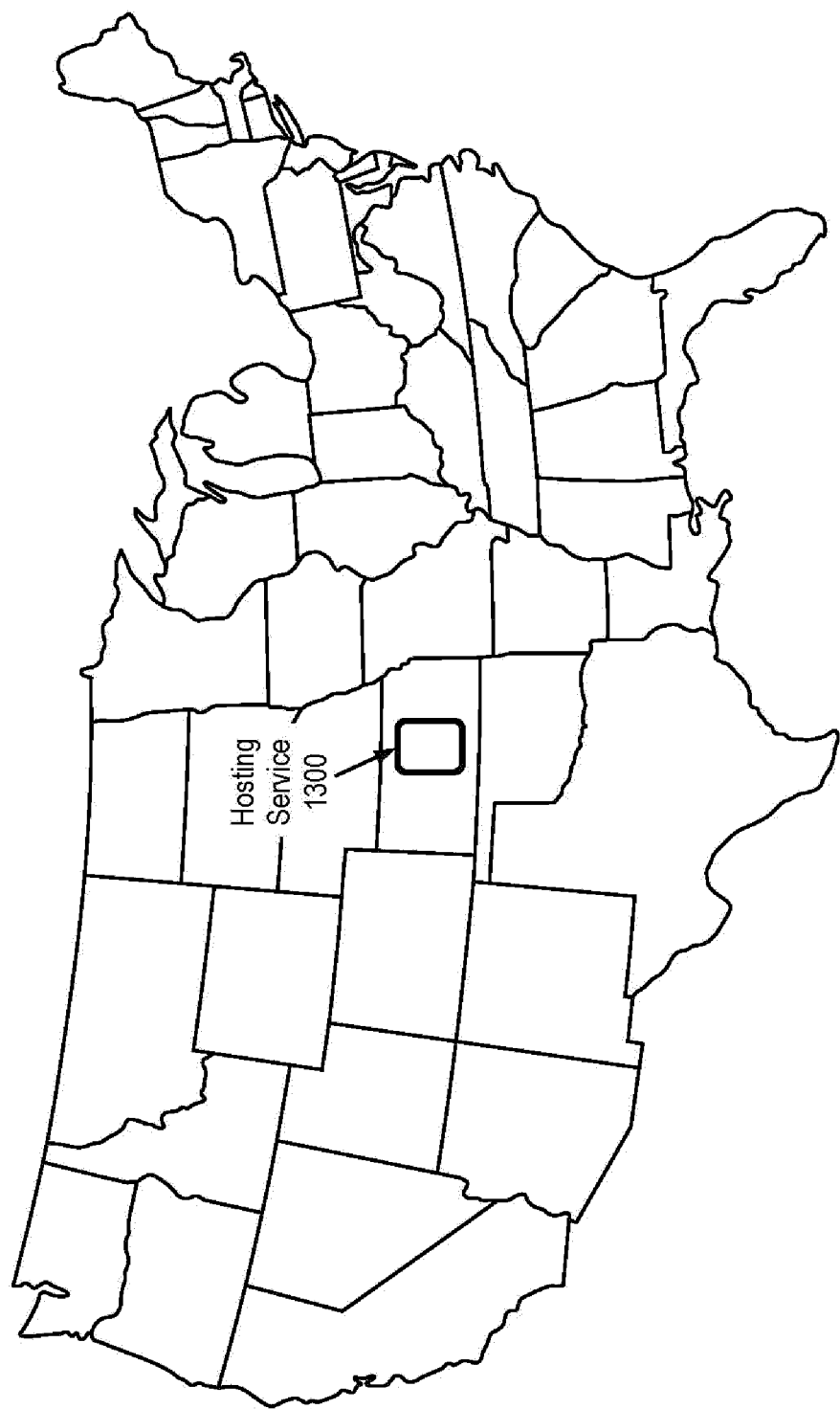
FIGS. 13a-b illustrate geographical positioning and communication between hosting services according to various embodiments.

Light through glass, such as optical fiber, travels at some fraction of the speed of light in a vacuum, and so an exact propagation speed for light in optical fiber could be determined. But, in practice, allowing time for routing delays, transmission inefficiencies, and other overhead, we have observed that optimal latencies on the Internet reflect transmission speeds closer to 50% the speed of light. Thus, an optimal 1000 mile round trip latency is approximately 22 ms, and an optimal 3000 mile round trip latency is about 64 ms. Thus, a single server on one US coast will be too far away to serve clients on the other coast (which can be as far as 3000 miles away) with the desired latency. However, as illustrated in FIG. 13*a*, if the hosting service 210 server center 1300 is located in the center of the US (e.g., Kansas, Nebraska, etc.), such that the distance to any point in the continental US is approximately 1500 miles or less, the round trip Internet latency could be as low as 32 ms. Referring to FIG. 4*b*, note that although the worst-case latencies allowed for the user ISP 453 is 25 ms, typically, we have observed latencies closer to 10-15 ms with DSL and cable modem systems. Also, FIG. 4*b* assumes a maximum distance from the user premises 211 to the hosting center 210 of 1000 miles. Thus, with a typical user ISP round trip latency of 15 ms used and a maximum Internet distance of 1500 miles for a round trip latency of 32 ms, the total round trip latency from the point a user actuates input device 421 and sees a response on display device 422 is 1+1+15+32+1+16+6+8=80 ms. So, the 80 ms response time can be typically achieved over an Internet distance of 1500 miles. This would allow any user premises with a short enough user ISP latency 453 in the continental US to access a single server center that is centrally located.

Figure 13B:
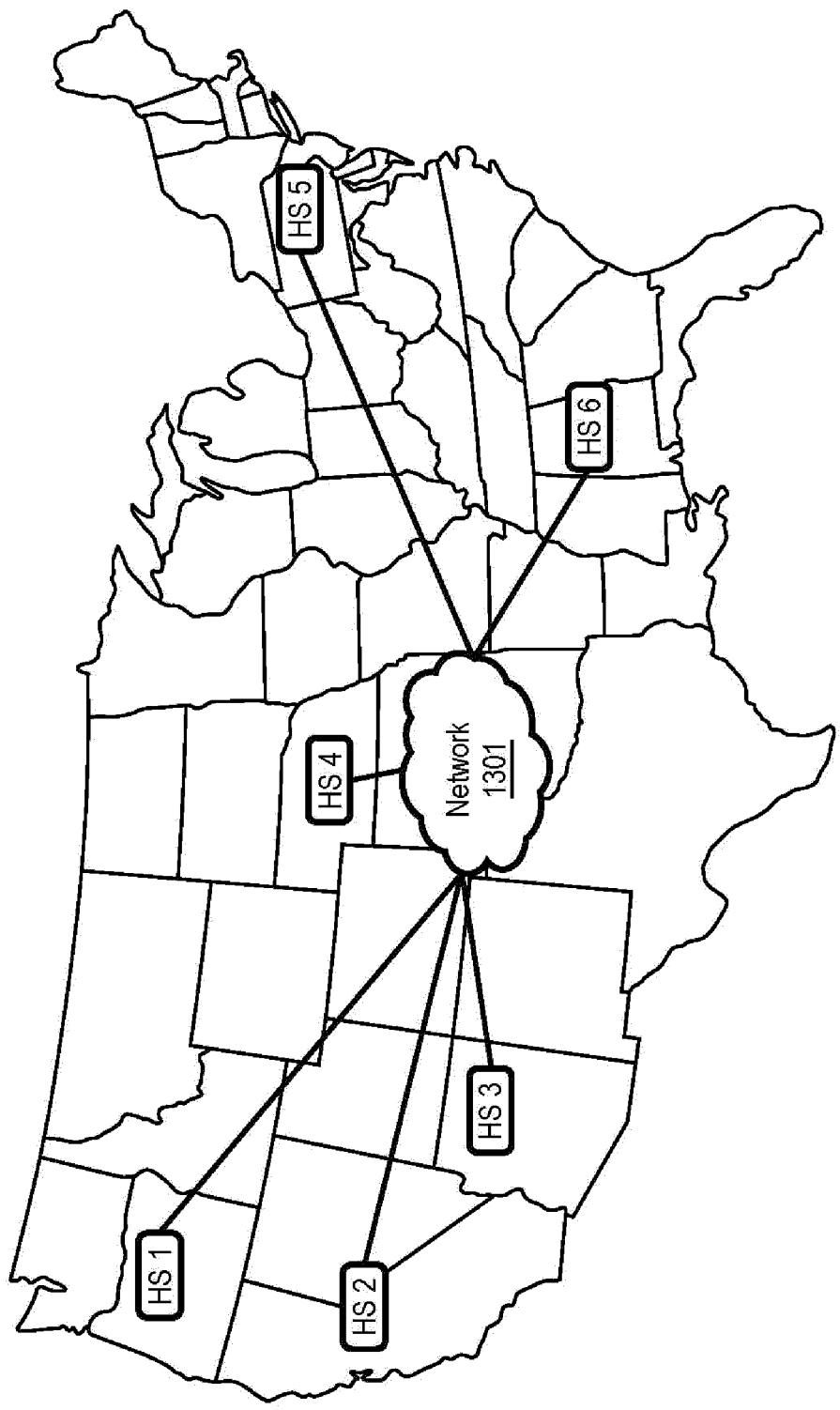

In another embodiment, illustrated in FIG. 13*b*, the hosting service 210 server centers, HS1-HS6, are strategically positioned around the United States (or other geographical region), with certain larger hosting service server centers positioned close to high population centers (e.g., HS2 and HS5). In one embodiment, the server centers HS1-HS6 exchange information via a network 1301 which may be the Internet or a private network or a combination of both. With multiple server centers, services can be provided at lower latency to users that have high user ISP latency 453.

Although distance on the Internet is certainly a factor that contributes to round trip latency through the Internet, sometimes other factors come into play that are largely unrelated to latency. Sometimes a packet stream is routed through the Internet to a far away location and back again, resulting in latency from the long loop. Sometimes there is routing equipment on the path that is not operating properly, resulting in a delay of the transmission. Sometimes there is a traffic overloading a path which introduces delay. And, sometimes, there is a failure that prevents the user's ISP from routing to a given destination at all. Thus, while the general Internet usually provides connections from one point to another with a fairly reliable and optimal route and latency that is largely determined by distance (especially with long distance connections that result in routing outside of the user's local area) such reliability and latency is by no means guaranteed and often cannot be achieved from a user's premises to a given destination on the general Internet.

In one embodiment, when a user client 415 initially connects to the hosting service 210 to play a video game or use an application, the client communicates with each of the hosting service server centers HS1-HS6 available upon startup (e.g., using the techniques described above). If the latency is low enough for a particular connection, then that connection is used. In one embodiment, the client communicates with all, or a subset, of the hosting service server centers and the one with the lowest latency connection is selected. The client may select the service center with the lowest latency connection or the service centers may identify the one with the lowest latency connection and provide this information (e.g., in the form of an Internet address) to the client.

If a particular hosting service server center is overloaded and/or the user's game or application can tolerate the latency to another, less loaded hosting service server center, then the client 415 may be redirected to the other hosting service server center. In such a situation, the game or application the user is running would be paused on the server 402 at the user's overloaded server center, and the game or application state data would be transferred to a server 402 at another hosting service server center. The game or application would then be resumed. In one embodiment, the hosting service 210 would wait until the game or application has either reached a natural pausing point (e.g., between levels in a game, or after the user initiates a "save" operation in application) to do the transfer. In yet another embodiment, the hosting service 210 would wait until user activity ceases for a specified period of time (e.g., 1 minute) and then would initiate the transfer at that time.

Figure 14:
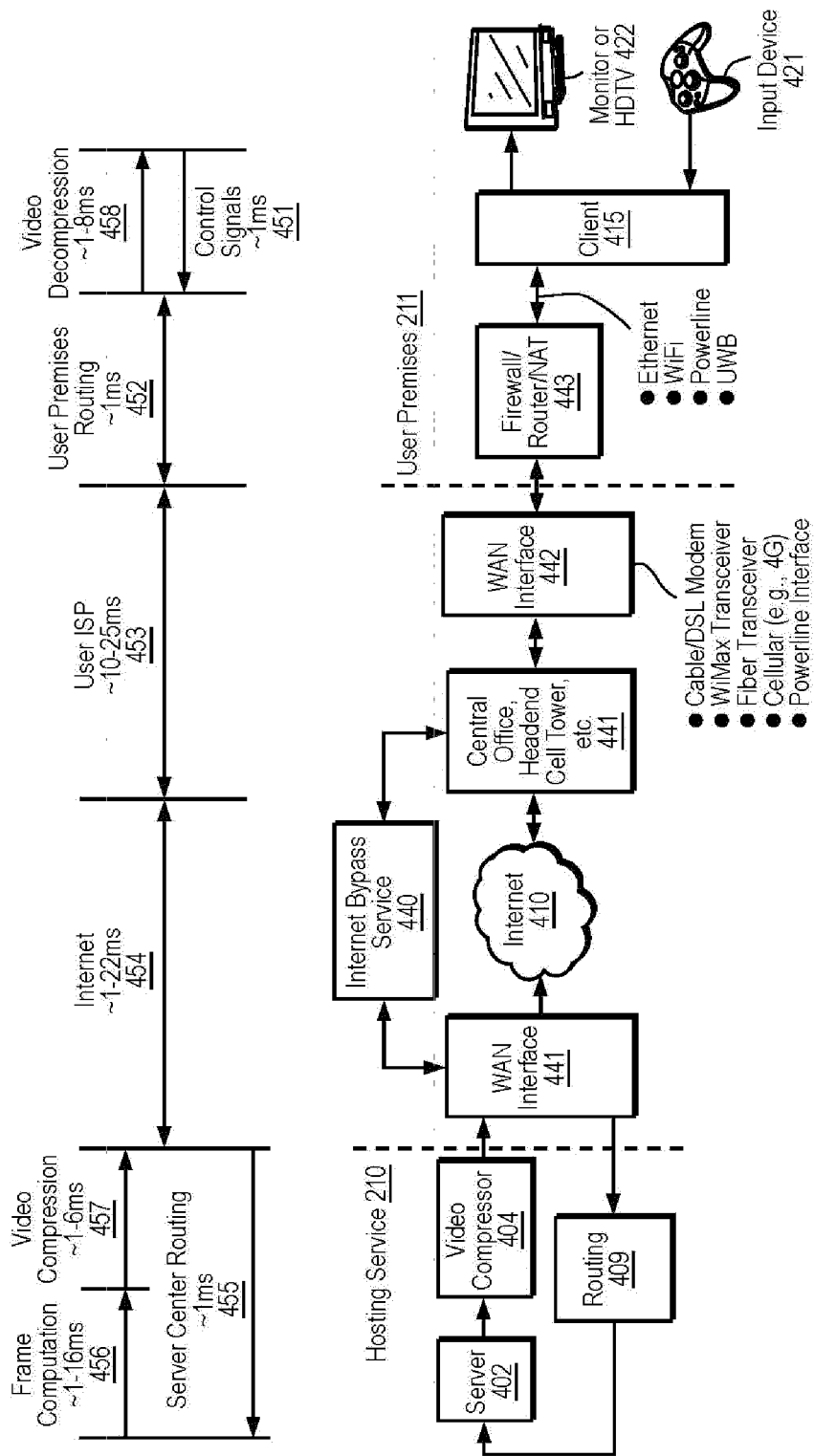
FIG. 14 illustrates exemplary latencies associated with communication between a client and a hosting service.

As described above, in one embodiment, the hosting service 210 subscribes to an Internet bypass service 440 of FIG. 14 to attempt to provide guaranteed latency to its clients. Internet bypass services, as used herein, are services that provide private network routes from one point to another on the Internet with guaranteed characteristics (e.g., latency, data rate, etc.). For example, if the hosting service 210 was receiving large amount of traffic from users using AT&T's DSL service offering in San Francisco, rather than routing to AT&T's San Francisco-based central offices, the hosting service 210 could lease a high-capacity private data connection from a service provider (perhaps AT&T itself or another provider) between the San Francisco-based central offices and one or more of the server centers for hosting service 210. Then, if routes from all hosting service server centers HS1-HS6 through the general Internet to a user in San Francisco using AT&T DSL result in too high latency, then private data connection could be used instead. Although private data connections are generally more expensive than the routes through the general Internet, so long as they remain a small percentage of the hosting service 210 connections to users, the overall cost impact will be low, and users will experience a more consistent service experience.

Server centers often have two layers of backup power in the event of power failure. The first layer typically is backup power from batteries (or from an alternative immediately available energy source, such a flywheel that is kept running and is attached to a generator), which provides power immediately when the power mains fail and keeps the server center running. If the power failure is brief, and the power mains return quickly (e.g., within a minute), then the batteries are all that is needed to keep the server center running. But if the power failure is for a longer period of time, then typically generators (e.g., diesel-powered) are started up that take over for the batteries and can run for as long as they have fuel. Such generators are extremely expensive since they must be capable of producing as much power as the server center normally gets from the power mains.

In one embodiment, each of the hosting services HS1-HS5 share user data with one another so that if one server center has a power failure, it can pause the games and applications that are in process, and then transfer the game or application state data from each server 402 to servers 402 at other server centers, and then will notify the client 415 of each user to direct it communications to the new server 402. Given that such situations occur infrequently, it may be acceptable to transfer a user to a hosting service server center which is not able to provide optimal latency (i.e., the user will simply have to tolerate higher latency for the duration of the power failure), which will allow for a much wider range of options for transferring users. For example, given the time zone differences across the US, users on the East Coast may be going to sleep at 11:30 PM while users on the West Coast at 8:30 PM are starting to peak in video game usage. If there is a power failure in a hosting service server center on the West Coast at that time, there may not be enough West Coast servers 402 at other hosting service server centers to handle all of the users. In such a situation, some of the users can be transferred to hosting service server centers on the East Coast which have available servers 402, and the only consequence to the users would be higher latency. Once the users have been transferred from the server center that has lost power, the server center can then commence an orderly shutdown of its servers and equipment, such that all of the equipment has been shut down before the batteries (or other immediate power backup) is exhausted. In this way, the cost of a generator for the server center can be avoided.

In one embodiment, during times of heavy loading of the hosting service 210 (either due to peak user loading, or because one or more server centers have failed) users are transferred to other server centers on the basis of the latency requirements of the game or application they are using. So, users using games or applications that require low latency would be given preference to available low latency server connections when there is a limited supply.

Hosting Service Features

Figure 15:
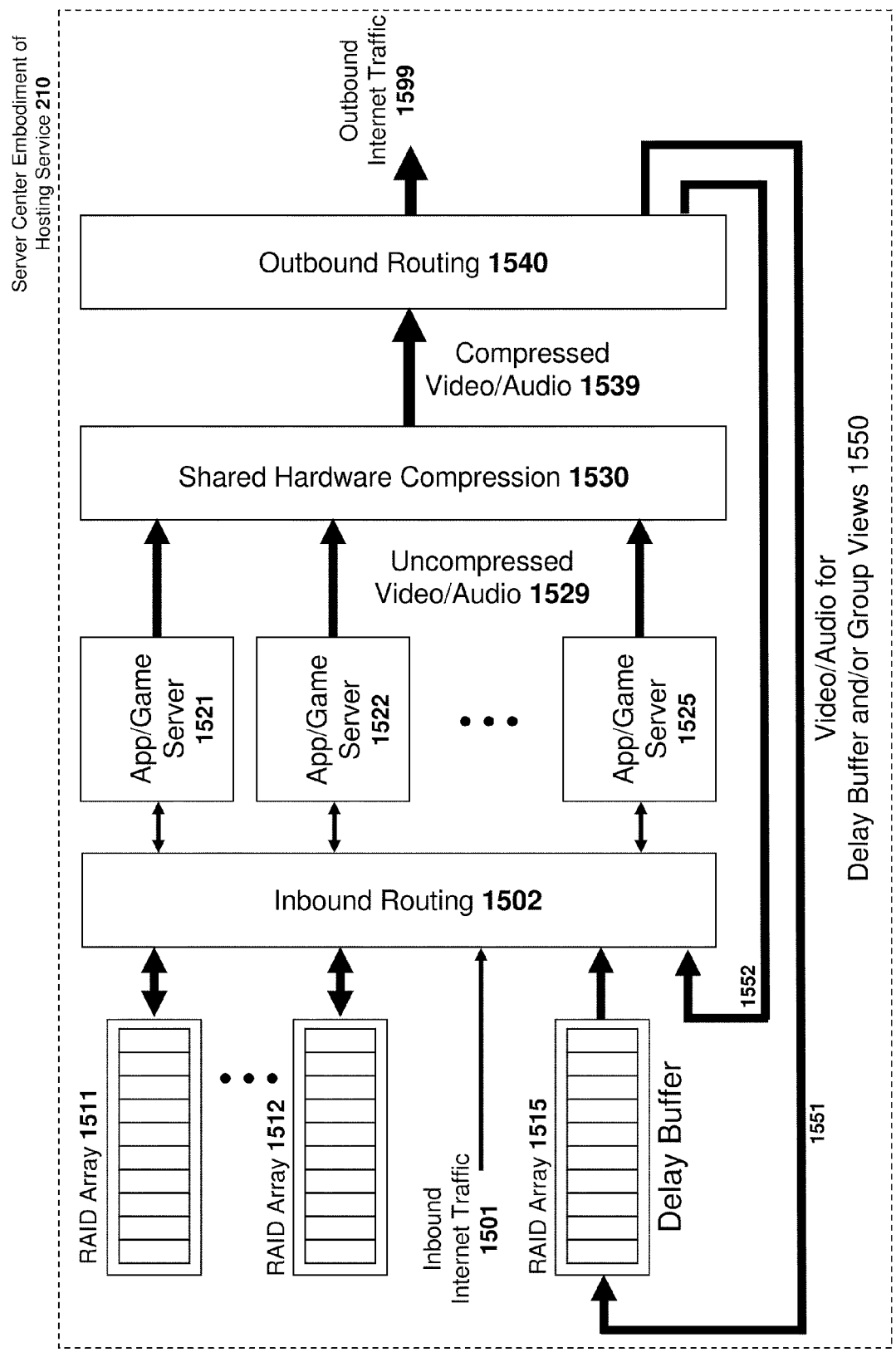
FIG. 15 illustrates an example hosting service server center architecture.

FIG. 15 illustrates an embodiment of components of a server center for hosting service 210 utilized in the following feature descriptions. As with the hosting service 210 illustrated in FIG. 2a, the components of this server center are controlled and coordinated by a hosting service 210 control system 401 unless otherwise qualified.

Inbound internet traffic 1501 from user clients 415 is directed to inbound routing 1502. Typically, inbound internet traffic 1501 will enter the server center via a high-speed fiber optic connection to the Internet, but any network connection means of adequate bandwidth, reliability and low latency will suffice. Inbound routing 1502 is a system of network (the network can be implemented as an Ethernet network, a fiber channel network, or through any other transport means) switches and routing servers supporting the switches which takes the arriving packets and routes each packet to the appropriate application/game ("app/game") server 1521-1525. In one embodiment, a packet which is delivered to a particular app/game server represents a subset of the data received from the client and/or may be translated/changed by other components (e.g., networking components such as gateways and routers) within the data center. In some cases, packets will be routed to more than one server 1521-1525 at a time, for example, if a game or application is running on multiple servers at once in parallel. RAID arrays 1511-1512 are connected to the inbound routing network 1502, such that the app/game servers 1521-1525 can read and write to the RAID arrays 1511-1512. Further, a RAID array 1515 (which may be implemented as multiple RAID arrays) is also connected to the inbound routing 1502 and data from RAID array 1515 can be read from app/game servers 1521-1525. The inbound routing 1502 may be implemented in a wide range of prior art network architectures, including a tree structure of switches, with the inbound internet traffic 1501 at its root; in a mesh structure interconnecting all of the various devices; or as an interconnected series of subnets, with concentrated traffic amongst intercommunicating device segregated from concentrated traffic amongst other devices. One type of network configuration is a SAN which, although typically used for storage devices, it can also be used for general high-speed data transfer among devices. Also, the app/game servers 1521-1525 may each have multiple network connections to the inbound routing 1502. For example, a server 1521-1525 may have a network connection to a subnet attached to RAID Arrays 1511-1512 and another network connection to a subnet attached to other devices.

The app/game servers 1521-1525 may all be configured the same, some differently, or all differently, as previously described in relation to servers 402 in the embodiment illustrated in FIG. 4a. In one embodiment, each user, when using the hosting service is typically using at least one app/game server 1521-1525. For the sake of simplicity of explanation, we shall assume a given user is using app/game server 1521, but multiple servers could be used by one user, and multiple users could share a single app/game server 1521-1525. The user's control input, sent from client 415 as previously described is received as inbound Internet traffic 1501, and is routed through inbound routing 1502 to app/game server 1521. App/game server 1521 uses the user's control input as control input to the game or application running on the server, and computes the next frame of video and the audio associated with it. App/game server 1521 then outputs the uncompressed video/audio 1529 to shared video compression 1530. App/game server may output the uncompressed video via any means, including one or more Gigabit Ethernet connections, but in one embodiment the video is output via a DVI connection and the audio and other compression and communication channel state information is output via a Universal Serial Bus (USB) connection.

The shared video compression 1530 compresses the uncompressed video and audio from the app/game servers 1521-1525. The compression maybe implemented entirely in hardware, or in hardware running software. There may a dedicated compressor for each app/game server 1521-1525, or if the compressors are fast enough, a given compressor can be used to compress the video/audio from more than one app/game server 1521-1525. For example, at 60 fps a video frame time is 16.67 ms. If a compressor is able to compress a frame in 1 ms, then that compressor could be used to compress the video/audio from as many as 16 app/game servers 1521-1525 by taking input from one server after another, with the compressor saving the state of each video/audio compression process and switching context as it cycles amongst the video/audio streams from the servers. This results in substantial cost savings in compression hardware. Since different servers will be completing frames at different times, in one embodiment, the compressor resources are in a shared pool 1530 with shared storage means (e.g., RAM, Flash) for storing the state of each compression process, and when a server 1521-1525 frame is complete and ready to be compressed, a control means determines which compression resource is available at that time, provides the compression resource with the state of the server's compression process and the frame of uncompressed video/audio to compress.

Note that part of the state for each server's compression process includes information about the compression itself, such as the previous frame's decompressed frame buffer data which may be used as a reference for P tiles, the resolution of the video output; the quality of the compression; the tiling structure; the allocation of bits per tiles; the compression quality, the audio format (e.g., stereo, surround sound, Dolby® AC-3). But the compression process state also includes communication channel state information regarding the peak data rate 941 and whether a previous frame (as illustrated in FIG. 9b) is currently being output (and as result the current frame should be ignored), and potentially whether there are channel characteristics which should be considered in the compression, such as excessive packet loss, which affect decisions for the compression (e.g., in terms of the frequency of I tiles, etc). As the peak data rate 941 or other channel characteristics change over time, as determined by an app/game server 1521-1525 supporting each user monitoring data sent from the client 415, the app/game server 1521-1525 sends the relevant information to the shared hardware compression 1530.

The shared hardware compression 1530 also packetizes the compressed video/audio using means such as those previously described, and if appropriate, applying FEC codes, duplicating certain data, or taking other steps to as to adequately ensure the ability of the video/audio data stream to be received by the client 415 and decompressed with as high a quality and reliability as feasible.

Some applications, such as those described below, require the video/audio output of a given app/game server 1521-1525 to be available at multiple resolutions (or in other multiple formats) simultaneously. If the app/game server 1521-1525 so notifies the shared hardware compression 1530 resource, then the uncompressed video audio 1529 of that app/game server 1521-1525 will be simultaneously compressed in different formats, different resolutions, and/or in different packet/error correction structures. In some cases, some compression resources can be shared amongst multiple compression processes compressing the same video/audio (e.g., in many compression algorithms, there is a step whereby the image is scaled to multiple sizes before applying compression. If different size images are required to be output, then this step can be used to serve several compression processes at once). In other cases, separate compression resources will be required for each format. In any case, the compressed video/audio 1539 of all of the various resolutions and formats required for a given app/game server 1521-1525 (be it one or many) will be output at once to outbound routing 1540. In one embodiment the output of the compressed video/audio 1539 is in UDP format, so it is a unidirectional stream of packets.

The outbound routing network 1540 comprises a series of routing servers and switches which direct each compressed video/audio stream to the intended user(s) or other destinations through outbound Internet traffic 1599 interface (which typically would connect to a fiber interface to the Internet) and/or back to the delay buffer 1515, and/or back to the inbound routing 1502, and/or out through a private network (not shown) for video distribution. Note that (as described below) the outbound routing 1540 may output a given video/audio stream to multiple destinations at once. In one embodiment this is implemented using Internet Protocol (IP) multicast in which a given UDP stream intended to be streamed to multiple destinations at once is broadcasted, and the broadcast is repeated by the routing servers and switches in the outbound routing 1540. The multiple destinations of the broadcast may be to multiple users' clients 415 via the Internet, to multiple app/game servers 1521-1525 via inbound routing 1502, and/or to one or more delay buffers 1515. Thus, the output of a given server 1521-1522 is compressed into one or multiple formats, and each compressed stream is directed to one or multiple destinations.

Further, in another embodiment, if multiple app/game servers 1521-1525 are used simultaneously by one user (e.g., in a parallel processing configuration to create the 3D output of a complex scene) and each server is producing part of the resulting image, the video output of multiple servers 1521-1525 can be combined by the shared hardware compression 1530 into a combined frame, and from that point forward it is handled as described above as if it came from a single app/game server 1521-1525.

Note that in one embodiment, a copy (in at least the resolution or higher of video viewed by the user) of all video generated by app/game servers 1521-1525 is recorded in delay buffer 1515 for at least some number of minutes (15 minutes in one embodiment). This allows each user to "rewind" the video from each session in order to review previous work or exploits (in the case of a game). Thus, in one embodiment, each compressed video/audio output 1539 stream being routed to a user client 415 is also being multicasted to a delay buffer 1515. When the video/audio is stored on a delay buffer 1515, a directory on the delay buffer 1515 provides a cross reference between the network address of the app/game server 1521-1525 that is the source of the delayed video/audio and the location on the delay buffer 1515 where the delayed video/audio can be found.

Live, Instantly-Viewable, Instantly-Playable Games

Figure 16:
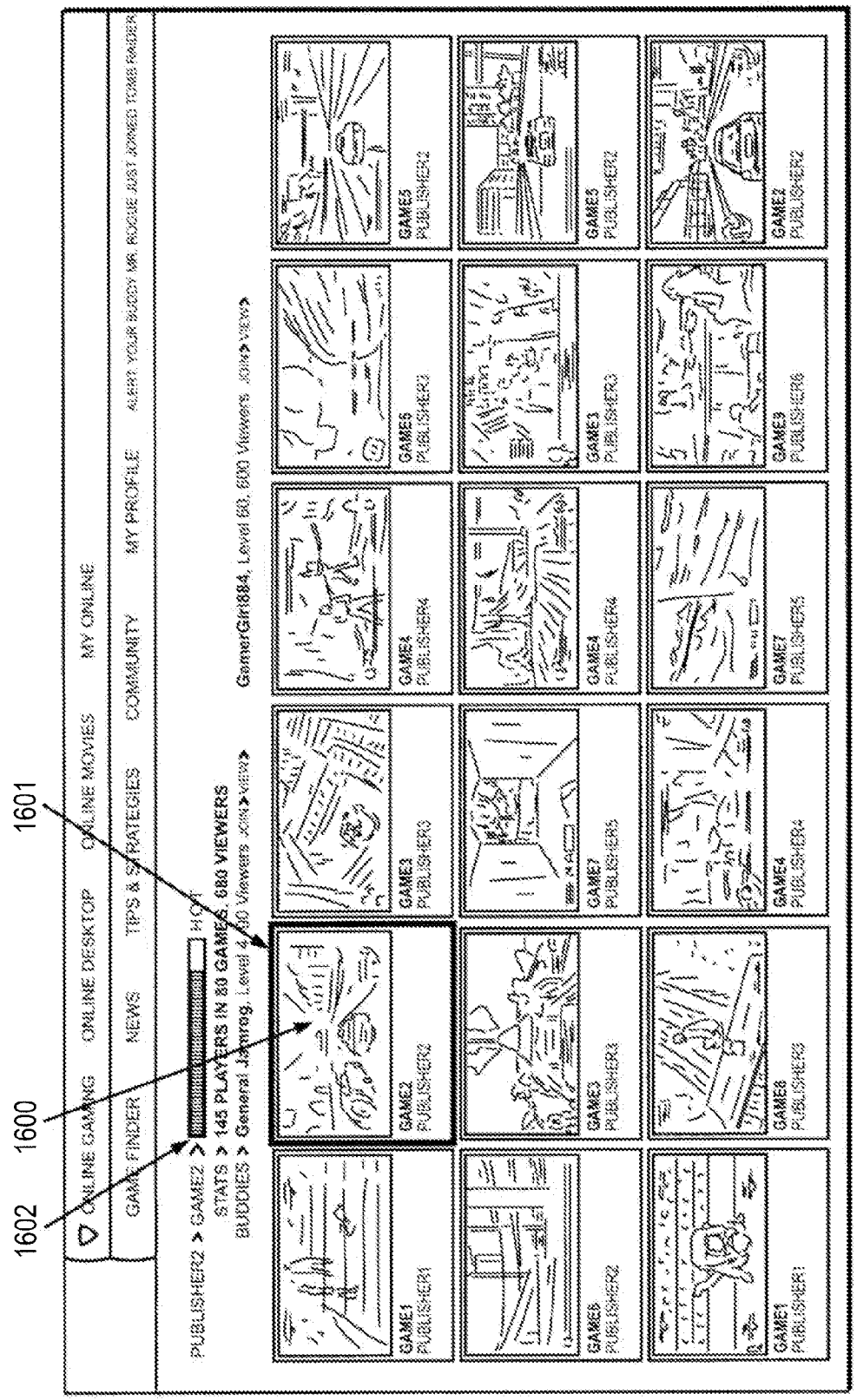
FIG. 16 illustrates an example screen shot of one embodiment of a user interface which includes a plurality of live video windows.

App/game servers 1521-1525 may not only be used for running a given application or video game for a user, but they may also be used for creating the user interface applications for the hosting service 210 that supports navigation through hosting service 210 and other features. A screen shot of one such user interface application is shown in FIG. 16, a "Game Finder" screen. This particular user interface screen allows a user to watch 15 games that are being played live (or delayed) by other users. Each of the "thumbnail" video windows, such as 1600 is a live video window in motion showing the video from one user's game. The view shown in the thumbnail may be the same view that the user is seeing, or it may be a delayed view (e.g., if a user is playing a combat game, a user may not want other users to see where she is hiding and she may choose to delay any view of her gameplay by a period of time, say 10 minutes). The view may also be a camera view of a game that is different from any user's view. Through menu selections (not shown in this illustration), a user may choose a selection of games to view at once, based on a variety of criteria. As a small sampling of exemplary choices, the user may select a random selection of games (such as those shown in FIG. 16), all of one kind of games (all being played by different players), only the top-ranked players of a game, players at a given level in the game, or lower-ranked players (e.g., if the player is learning the basics), players who are "buddies" (or are rivals), games that have the most number of viewers, etc.

Note that generally, each user will decide whether the video from his or her game or application can be viewed by others and, if so, which others, and when it may be viewed by others, whether it is only viewable with a delay.

The app/game server 1521-1525 that is generating the user interface screen shown in FIG. 16 acquires the 15 video/audio feeds by sending a message to the app/game server 1521-1525 for each user whose game it is requesting from. The message is sent through the inbound routing 1502 or another network. The message will include the size and format of the video/audio requested, and will identify the user viewing the user interface screen. A given user may choose to select "privacy" mode and not permit any other users to view video/audio of his game (either from his point of view or from another point of view), or as described in the previous paragraph, a user may choose to allow viewing of video/audio from her game, but delay the video/audio viewed. A user app/game server 1521-1525 receiving and accepting a request to allow its video/audio to be viewed will acknowledge as such to the requesting server, and it will also notify the shared hardware compression 1530 of the need to generate an additional compressed video stream in the requested format or screen size (assuming the format and screen size is different than one already being generated), and it will also indicate the destination for the compressed video (i.e., the requesting server). If the requested video/audio is only delayed, then the requesting app/game server 1521-1525 will be so notified, and it will acquire the delayed video/audio from a delay buffer 1515 by looking up the video/audio's location in the directory on the delay buffer 1515 and the network address of the app/game server 1521-1525 that is the source of the delayed video/audio. Once all of these requests have been generated and handled, up to 15 live thumbnail-sized video streams will be routed from the outbound routing 1540 to the inbound routing 1502 to the app/game server 1521-1525 generating the user interface screen, and will be decompressed and displayed by the server. Delayed video/audio streams may be in too large a screen size, and if so, the app/game server 1521-1525 will decompress the streams and scale down the video streams to thumbnail size. In one embodiment, requests for audio/video are sent to (and managed by) a central "management" service similar to the hosting service control system of FIG. 4a (not shown in FIG. 15) which then redirects the requests to the appropriate app/game server 1521-1525. Moreover, in one embodiment, no request may be required because the thumbnails are "pushed" to the clients of those users that allow it.

The audio from 15 games all mixed simultaneously might create a cacophony of sound. The user may choose to mix all of the sounds together in this way (perhaps just to get a sense of the "din" created by all the action being viewed), or the user may choose to just listen to the audio from one game at a time. The selection of a single game is accomplished by moving the yellow selection box 1601 (appearing as a black rectangular outline in the black-and-white rendering of FIG. 16) to a given game (the yellow box movement can be accomplished by using arrow keys on a keyboard, by moving a mouse, by moving a joystick, or by pushing directional buttons on another device such as a mobile phone). Once a single game is selected, just the audio from that game plays. Also, game information 1602 is shown. In the case of this game, for example, the publisher logo (e.g., "EA" for "Electronic Arts") and the game logo, "e.g., Need for Speed Carbon" and an orange horizontal bar (rendered in FIG. 16 as a bar with vertical stripes) indicates in relative terms the number of people playing or viewing the game at that particular moment (many, in this case, so the game is "Hot"). Further "Stats" (i.e. statistics) are provided, indicating that there are 145 players actively playing 80 different instantiations of the Need for Speed Game (i.e., it can be played either by an individual player game or multiplayer game), and there are 680 viewers (of which this user is one). Note that these statistics (and other statistics) are collected by hosting service control system 401 and are stored on RAID arrays 1511-1512, for keeping logs of the hosting service 210 operation and for appropriately billing users and paying publishers who provide content. Some of the statistics are recorded due to actions by the service control system 401, and some are reported to the service control system 401 by the individual app/game server 1521-1525. For example, the app/game server 1521-1525 running this Game Finder application sends messages to the hosting service control system 401 when games are being viewed (and when they are ceased to be viewed) so that it may update the statistics of how many games are in view. Some of the statistics are available for user interface applications such as this Game Finder application.

Figure 17:
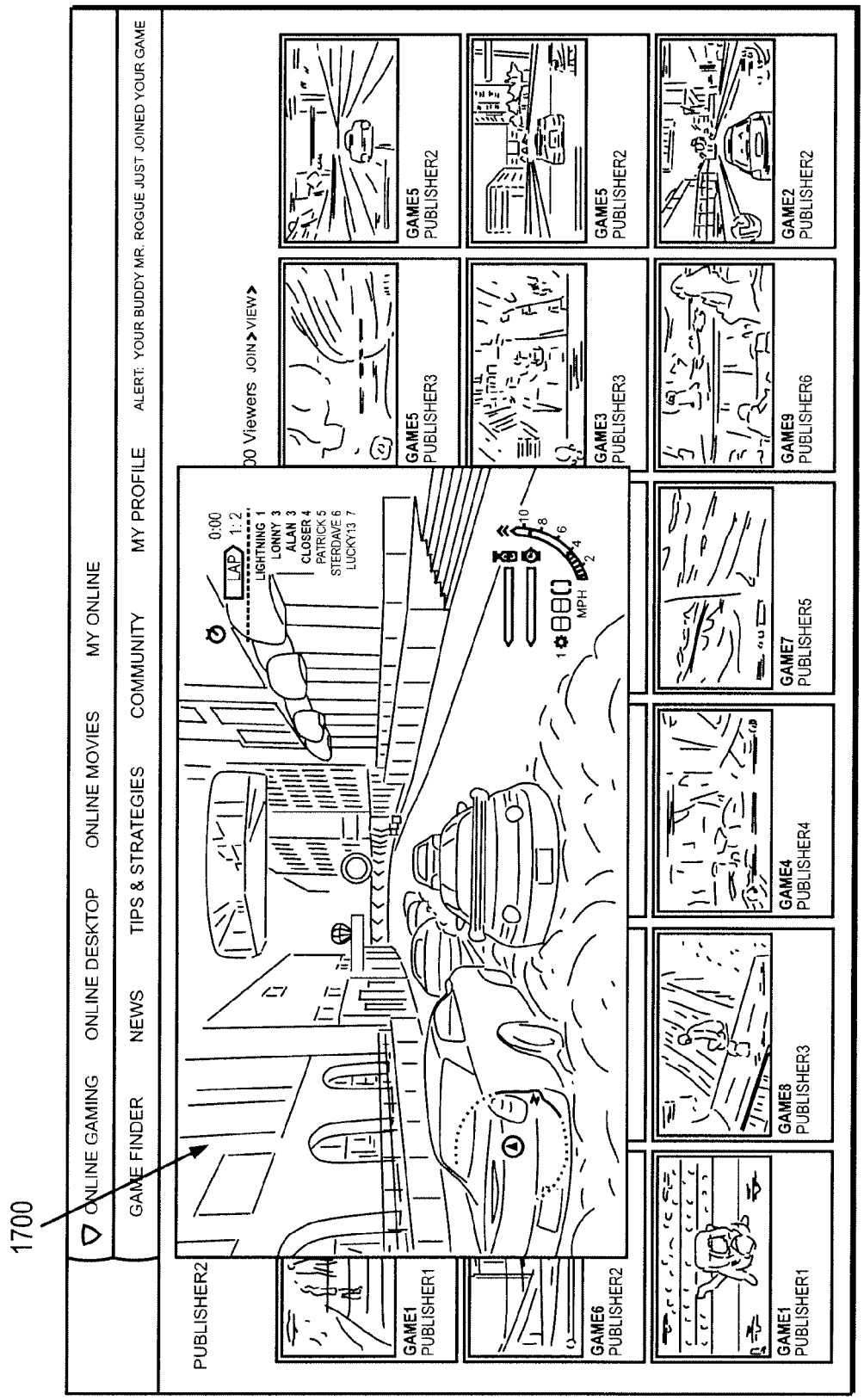
FIG. 17 illustrates the user interface of FIG. 16 following the selection of a particular video window.

If the user clicks an activation button on their input device, they will see the thumbnail video in the yellow box zoom up while continuing to play live video to full screen size. This effect is shown in process in FIG. 17. Note that video window 1700 has grown in size. To implement this effect, the app/game server 1521-1525 requests from the app/game server 1521-1525 running the game selected to have a copy of the video stream for a full screen size (at the resolution of the user's display device 422) of the game routed to it. The app/game server 1521-1525 running the game notifies the shared hardware compressor 1530 that a thumbnail-sized copy of the game is no longer needed (unless another app/game server 1521-1525 requires such a thumbnail), and then it directs it to send a full-screen size copy of the video to the app/game server 1521-1525 zooming the video. The user playing the game may or may not have a display device 422 that is the same resolution as that of the user zooming up the game. Further, other viewers of the game may or may not have display devices 422 that are the same resolution as the user zooming up the game (and may have different audio playback means, e.g., stereo or surround sound). Thus, the shared hardware compressor 1530 determines whether a suitable compressed video/audio stream is already being generated that meets the requirements of the user requesting the video/audio stream and if one does exist, it notifies the outbound routing 1540 to route a copy of the stream to the app/game server 1521-1525 zooming the video, and if not compresses another copy of the video that is suitable for that user and instructs the outbound routing to send the stream back to the inbound routing 1502 and the app/game server 1521-1525 zooming the video. This server, now receiving a full screen version of the selected video will decompress it and gradually scale it up to full size.

Figure 18:
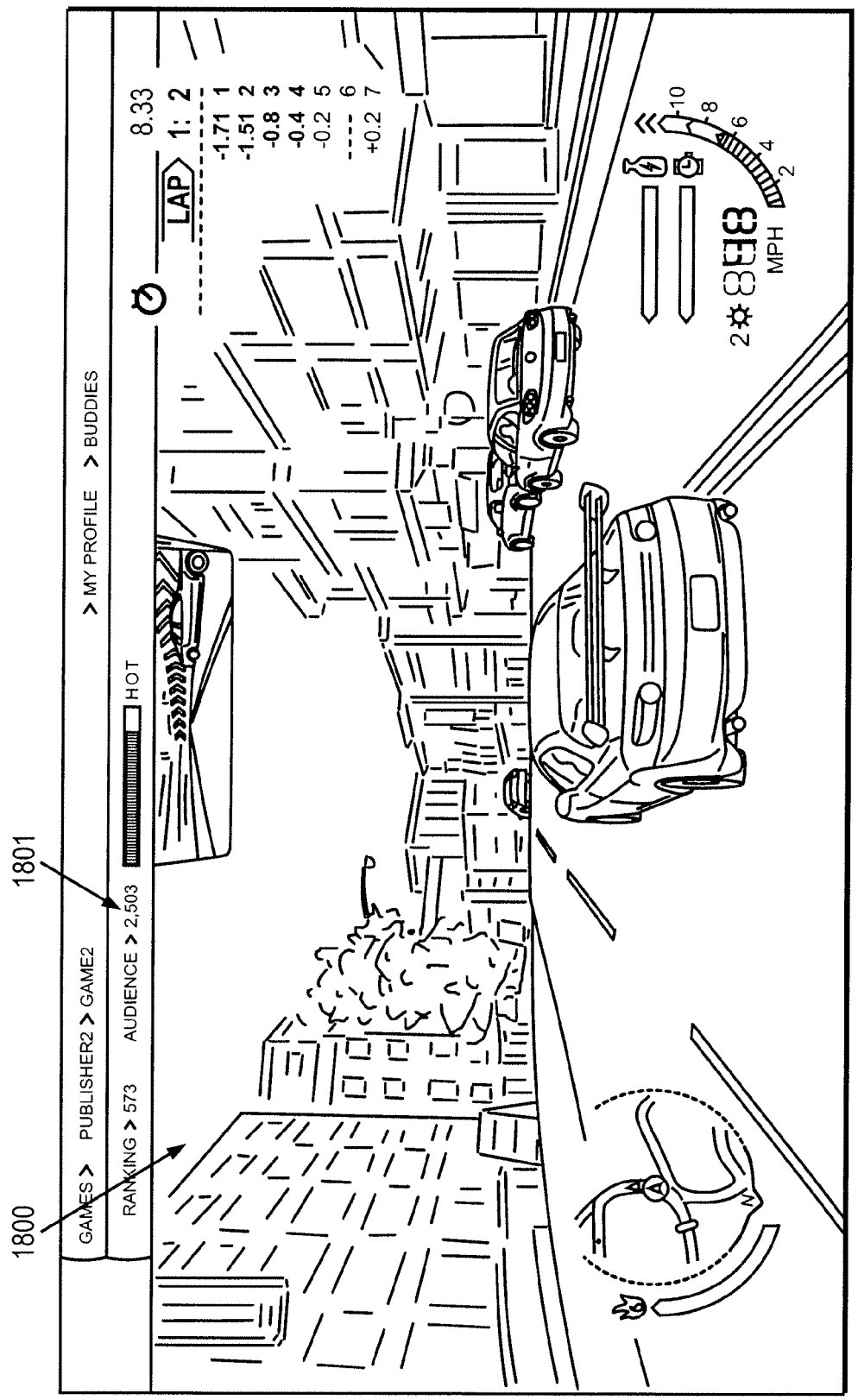
FIG. 18 illustrates the user interface of FIG. 17 following zooming of the particular video window to full screen size.

FIG. 18 illustrates how the screen looks after the game has completely zoomed up to full screen and the game is shown at the full resolution of the user's display device 422 as indicated by the image pointed to by arrow 1800. The app/game server 1521-1525 running the game finder application sends messages to the other app/game servers 1521-1525 that had been providing thumbnails that they are no longer needed and messages to the hosting service control server 401 that the other games are no longer being viewed. At this point the only display it is generating is an overlay 1801 at the top of the screen which provides information and menu controls to the user. Note that as this game has progressed, the audience has grown to 2,503 viewers. With so many viewers, there are bound to be many viewers with display devices 422 that have the same or nearly the same resolution (each app/game server 1521-1525 has the ability to scale the video for adjusting the fitting).

Because the game shown is a multiplayer game, the user may decide to join the game at some point. The hosting service 210 may or may not allow the user to join the game for a variety of reasons. For example, the user may have to pay to play the game and choose not to, the user may not have sufficient ranking to join that particular game (e.g., it would not be competitive for the other players), or the user's Internet connection may not have low enough latency to allow the user to play (e.g., there is not a latency constraint for viewing games, so a game that is being played far away (indeed, on another continent) can be viewed without latency concerns, but for a game to be played, the latency must be low enough for the user to (a) enjoy the game, and (b) be on equal footing with the other players who may have lower latency connections). If the user is permitted to play, then app/game server 1521-1525 that had been providing the Game Finder user interface for the user will request that the hosting service control server 401 initiate (i.e., locate and start up) an app/game server 1521-1525 that is suitably configured for playing the particular game to load the game from a RAID array 1511-1512, and then the hosting service control server 401 will instruct the inbound routing 1502 to transfer the control signals from the user to the app/game game server now hosting the game and it will instruct the shared hardware compression 1530 to switch from compressing the video/audio from the app/game server that had been hosting the Game Finder application to compressing the video/audio from the app/game server now hosting the game. The vertical sync of the Game Finder app/game service and the new app/game server hosting the game are not synchronized, and as a result there is likely to be a time difference between the two syncs. Because the shared video compression hardware 1530 will begin compressing video upon an app/game server 1521-1525 completing a video frame, the first frame from the new server may be completed sooner than a full frame time of the old server, which may be before the prior compressed frame completing its transmission (e.g., consider transmit time 992 of FIG. 9*b*: if uncompressed frame 3 963 were completed half a frame time early, it would impinge upon the transmit time 992). In such a situation the shared video compression hardware 1530 will ignore the first frame from the new server (e.g., like Frame 4 964 is ignored 974), and the client 415 will hold the last frame from the old server an extra frame time, and the shared video compression hardware 1530 will begin compressing the next frame time video from the new app/game server hosting the game. Visually, to the user, the transition from one app/game server to the other will be seamless. The hosting service control server 401 will then notify app/game game server 1521-1525 that had been hosting the Game Finder to switch to an idle state, until it is needed again.

The user then is able to play the game. And, what is exceptional is the game will play perceptually instantly (since it will have loaded onto the app/game game server 1521-1525 from a RAID array 1511-1512 at gigabit/second speed), and the game will be loaded onto a server exactly suited for the game together with an operating system exactly configured for the game with the ideal drivers, registry configuration (in the case of Windows), and with no other applications running on the server that might compete with the game's operation.

Also, as the user progresses through the game, each of the segments of the game will load into the server at gigabit/second speed (i.e., 1 gigabyte loads in 8 seconds) from the RAID array 1511-1512, and because of the vast storage capacity of the RAID array 1511-1512 (since it is a shared resource among many users, it can be very large, yet still be cost effective), geometry setup or other game segment setup can be pre-computed and stored on the RAID array 1511-1512 and loaded extremely rapidly. Moreover, because the hardware configuration and computational capabilities of each app/game server 1521-1525 is known, pixel and vertex shaders can be pre-computed.

Thus, the game will start up almost instantly, it will run in an ideal environment, and subsequent segments will load almost instantly.

But, beyond these advantages, the user will be able to view others playing the game (via the Game Finder, previously described and other means) and both decide if the game is interesting, and if so, learn tips from watching others. And, the user will be able to demo the game instantly, without having to wait for a large download and/or installation, and the user will be able to play the game instantly, perhaps on a trial basis for a smaller fee, or on a longer term basis. And, the user will be able to play the game on a Windows PC, a Macintosh, on a television set, at home, when traveling, and even on a mobile phone, with a low enough latency wireless connection (although latency will not be an issue for just spectating). And, this can all be accomplished without ever physically owning a copy of the game.

As mentioned previously, the user can decide to not allow his gameplay to be viewable by others, to allow his game to be viewable after a delay, to allow his game to be viewable by selected users, or to allow his game to be viewable by all users. Regardless, the video/audio will be stored, in one embodiment, for 15 minutes in a delay buffer 1515, and the user will be able to "rewind" and view his prior game play, and pause, play it back slowly, fast forward, etc., just as he would be able to do had he been watching TV with a Digital Video Recorder (DVR). Although in this example, the user is playing a game, the same "DVR" capability is available if the user is using an application. This can be helpful in reviewing prior work and in other applications as detailed below. Further, if the game was designed with the capability of rewinding based on utilizing game state information, such that the camera view can be changed, etc., then this "3D DVR" capability will also be supported, but it will require the game to be designed to support it. The "DVR" capability using a delay buffer 1515 will work with any game or application, limited of course, to the video that was generated when the game or application was used, but in the case of games with 3D DVR capability, the user can control a "fly through" in 3D of a previously played segment, and have the delay buffer 1515 record the resulting video and have the game state of the game segment recorded. Thus, a particular "fly-through" will be recorded as compressed video, but since the game state will also be recorded, a different fly-through will be possible at a later date of the same segment of the game.

As described below, users on the hosting service 210 will each have a User Page, where they can post information about themselves and other data. Among of the things that users will be able to post are video segments from game play that they have saved. For example, if the user has overcome a particularly difficult challenge in a game, the user can "rewind" to just before the spot where they had their great accomplishment in the game, and then instruct the hosting service 210 to save a video segment of some duration (e.g., 30 seconds) on the user's User Page for other users to watch. To implement this, it is simply a matter of the app/game server 1521-1525 that the user is using to playback the video stored in a delay buffer 1515 to a RAID array 1511-1512 and then index that video segment on the user's User Page.

If the game has the capability of 3D DVR, as described above, then the game state information required for the 3D DVR can also be recorded by the user and made available for the user's User Page.

In the event that a game is designed to have "spectators" (i.e., users that are able to travel through the 3D world and observe the action without participating in it) in addition to active players, then the Game Finder application will enable users to join games as spectators as well as players. From an implementation point of view, there is no difference to the hosting system 210 to if a user is a spectator instead of an active player. The game will be loaded onto an app/game server 1521-1525 and the user will be controlling the game (e.g., controlling a virtual camera that views into the world). The only difference will be the game experience of the user.

Multiple User Collaboration

Another feature of the hosting service 210 is the ability to for multiple users to collaborate while viewing live video, even if using widely disparate devices for viewing. This is useful both when playing games and when using applications.

Many PCs and mobile phones are equipped with video cameras and have the capability to do real-time video compression, particularly when the image is small. Also, small cameras are available that can be attached to a television, and it is not difficult to implement real-time compression either in software or using one of many hardware compression devices to compress the video. Also, many PCs and all mobile phones have microphones, and headsets are available with microphones.

Figure 19:
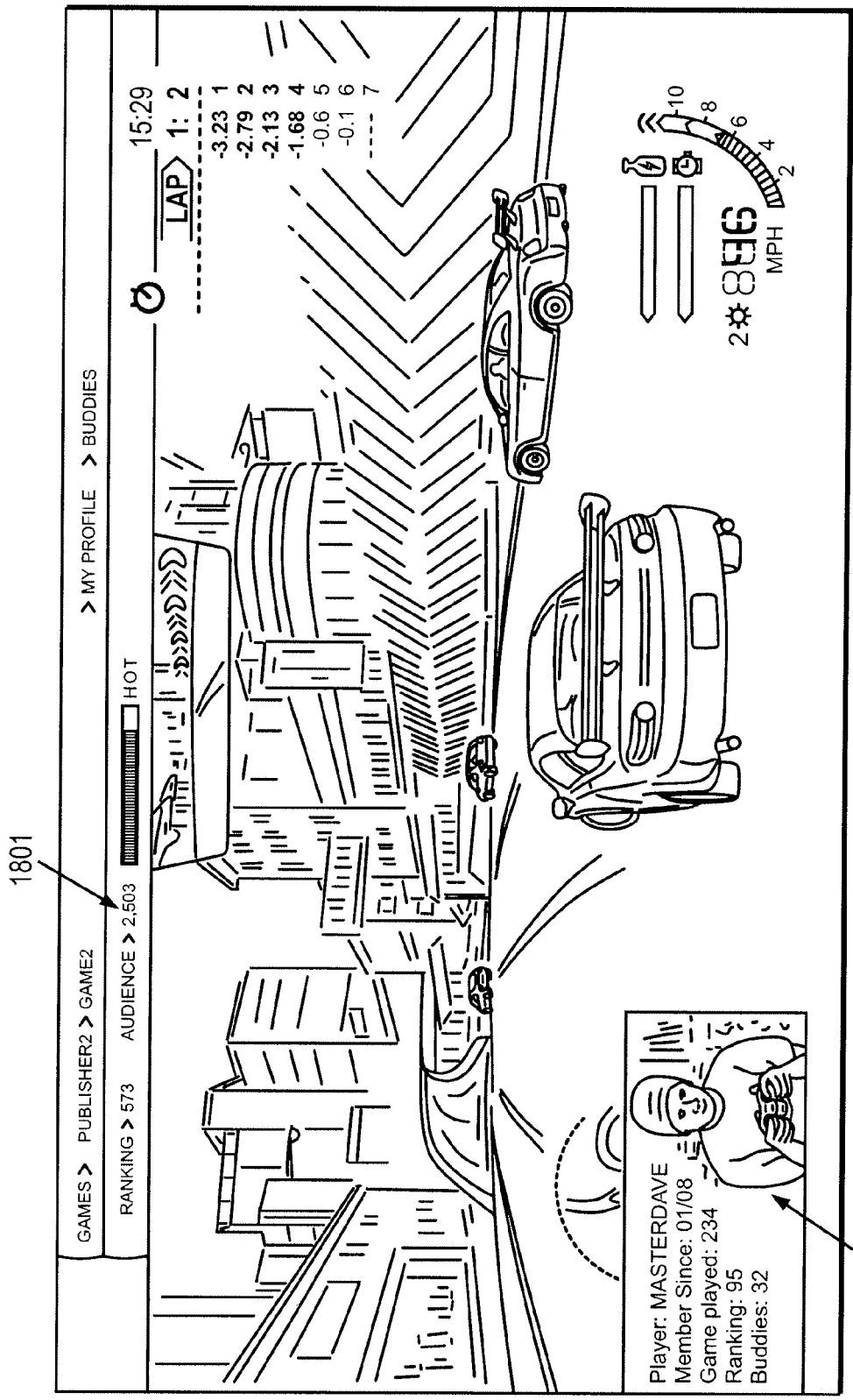
FIG. 19 illustrates an example collaborative user video data overlaid on the screen of a multiplayer game.

Such cameras and/or microphones, combined with local video/audio compression capability (particularly employing the low latency video compression techniques described herein) will enable a user to transmit video and/or audio from the user premises 211 to the hosting service 210, together with the input device control data. When such techniques are employed, then a capability illustrated in FIG. 19 is achievable: a user can have his video and audio 1900 appear on the screen within another user's game or application. This example is a multiplayer game, where teammates collaborate in a car race. A user's video/audio could be selectively viewable/hearable only by their teammates. And, since there would be effectively no latency, using the techniques described above the players would be able to talk or make motions to each other in real-time without perceptible delay.

This video/audio integration is accomplished by having the compressed video and/or audio from a user's camera/microphone arrive as inbound internet traffic 1501. Then the inbound routing 1502 routes the video and/or audio to the app/game game servers 1521-1525 that are permitted to view/hear the video and/or audio. Then, the users of the respective app/game game servers 1521-1525 that choose to use the video and/or audio decompress it and integrate as desired to appear within the game or application, such as illustrated by 1900.

The example of FIG. 19 shows how such collaboration is used in a game, but such collaboration can be an immensely powerful tool for applications. Consider a situation where a large building is being designed for New York city by architects in Chicago for a real estate developer based in New York, but the decision involves a financial investor who is traveling and happens to be in an airport in Miami, and a decision needs to be made about certain design elements of the building in terms of how it fits in with the buildings near it, to satisfy both the investor and the real estate developer. Assume the architectural firm has a high resolution monitor with a camera attached to a PC in Chicago, the real estate developer has a laptop with a camera in New York, and the investor has a mobile phone with a camera in Miami. The architectural firm can use the hosting service 210 to host a powerful architectural design application that is capable of highly realistic 3D rendering, and it can make use of a large database of the buildings in New York City, as well as a database of the building under design. The architectural design application will execute on one, or if it requires a great deal of computational power on several, of the app/game servers 1521-1525. Each of the 3 users at disparate locations will connect to the hosting service 210, and each will have a simultaneous view of the video output of the architectural design application, but it will be will appropriately sized by the shared hardware compression 1530 for the given device and network connection characteristics that each user has (e.g., the architectural firm may see a 2560×1440 60 fps display through a 20 Mbps commercial Internet connection, the real estate developer in New York may see a 1280×720 60 fps image over a 6 Mbps DSL connection on his laptop, and the investor may see a 320×180 60 fps image over a 250 Kbps cellular data connection on her mobile phone. Each party will hear the voice of the other parties (the conference calling will be handled by any of many widely available conference calling software package in the app/game server(s) 1521-1525) and, through actuation of a button on a user input device, a user will be able to make video appear of themselves using their local camera. As the meeting proceeds, the architects will be able to show what the build looks like as they rotate it and fly by it next to the other building in the area, with extremely photorealistic 3D rendering, and the same video will be visible to all parties, at the resolution of each party's display device. It won't matter that none of the local devices used by any party is incapable of handling the 3D animation with such realism, let alone downloading or even storing the vast database required to render the surrounding buildings in New York City. From the point of view of each of the users, despite the distance apart, and despite the disparate local devices they simply will have a seamless experience with an incredible degree of realism.

And, when one party wants their face to be seen to better convey their emotional state, they can do so. Further, if either the real estate develop or the investor want to take control of the architectural program and use their own input device (be it a keyboard, mouse, keypad or touch screen), they can, and it will respond with no perceptual latency (assuming their network connection does not have unreasonable latency). For example, in the case of the mobile phone, if the mobile phone is connected to a WiFi network at the airport, it will have very low latency. But if it is using the cellular data networks available today in the US, it probably will suffer from a noticeable lag. Still, for most of the purposes of the meeting, where the investor is watching the architects control the building fly-by or for talking of video teleconferencing, even cellular latency should be acceptable.

Finally, at the end of the collaborative conference call, the real estate developer and the investor will have made their comments and signed off from the hosting service, the architectural firm will be able to "rewind" the video of the conference that has been recorded on a delay buffer 1515 and review the comments, facial expressions and/or actions applied to the 3D model of the building made during the meeting. If there are particular segments they want to save, those segments of video/audio can be moved from delay buffer 1515 to a RAID array 1511-1512 for archival storage and later playback.

Also, from a cost perspective, if the architects only need to use the computation power and the large database of New York City for a 15 minute conference call, they need only pay for the time that the resources are used, rather than having to own high powered workstations and having to purchase an expensive copy of a large database.

Video-Rich Community Services

Figure 20:
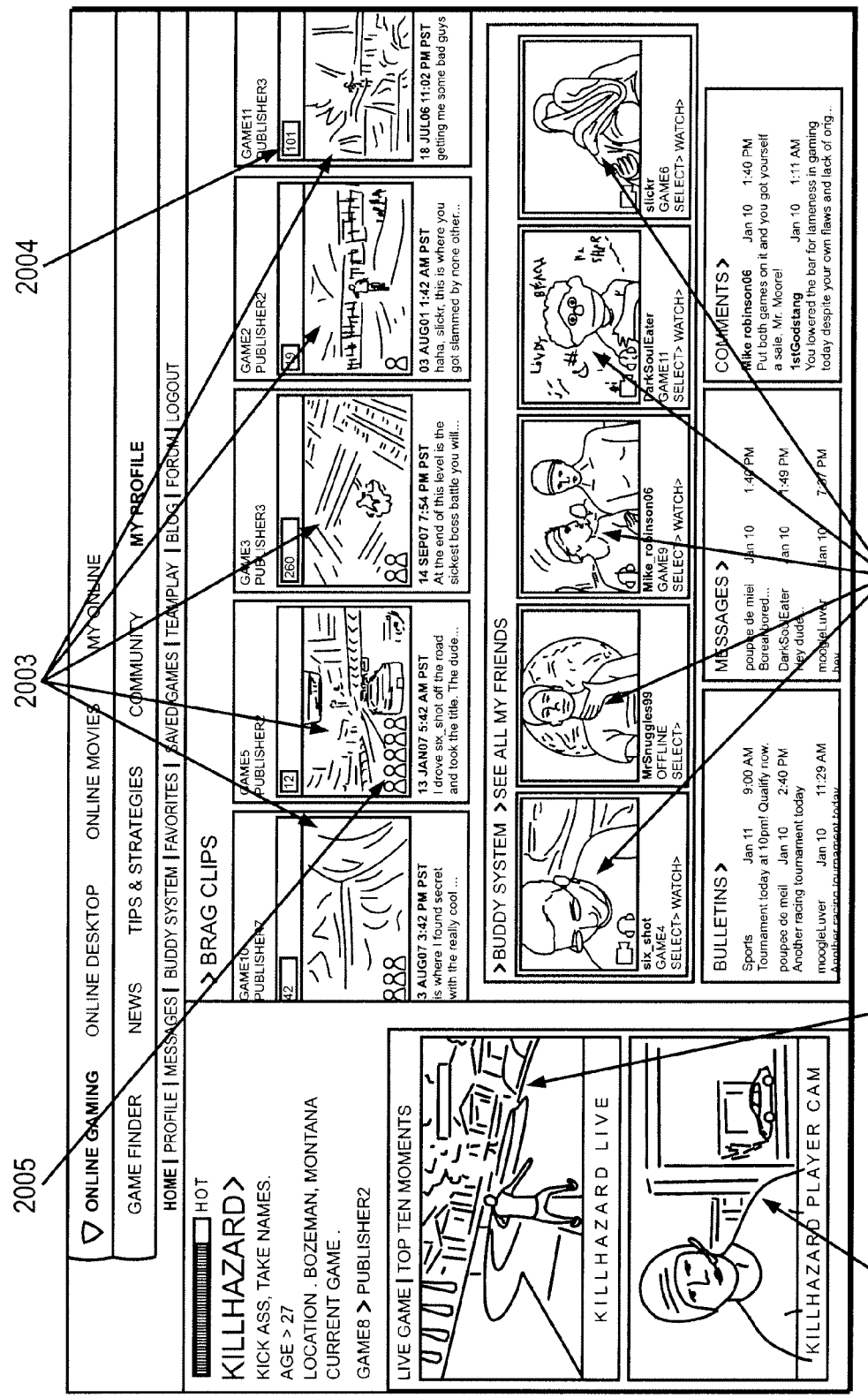
FIG. 20 illustrates an example user page for a game player on a hosting service.

The hosting service 210 enables an unprecedented opportunity for establishing video-rich community services on the Internet. FIG. 20 shows an exemplary User Page for a game player on the hosting service 210. As with the Game Finder application, the User Page is an application that runs on one of the app/game servers 1521-1525. All of the thumbnails and video windows on this page show constantly moving video (if the segments are short, they loop).

Using a video camera or by uploading video, the user (whose username is "KILLHAZARD") is able to post a video of himself 2000 that other users can view. The video is stored on a RAID array 1511-1512. Also, when other users come to KILLHAZARD's User Page, if KILLHAZARD is using the hosting service 210 at the time, live video 2001 of whatever he is doing (assuming he permits users viewing his User Page to watch him) will be shown. This will be accomplished by app/game server 1521-1525 hosting the User Page application requesting from the service control system 401 whether KILLHAZARD is active and if so, the app/game server 1521-1525 he is using. Then, using the same methods used by the Game Finder application, a compressed video stream in a suitable resolution and format will be sent to the app/game server 1521-1525 running the User Page application and it will be displayed. If a user selects the window with KILLHAZARD's live gameplay, and then appropriately clicks on their input device, the window will zoom up (again using the same methods as the Game Finder applications, and the live video will fill the screen, at the resolution of the watching user's display device 422, appropriate for the characteristics of the watching user's Internet connection.

A key advantage of this over prior art approaches is the user viewing the User Page is able to see a game played live that the user does not own, and may very well not have a local computer or game console capable of playing the game. It offers a great opportunity for the user to see the user shown in the User Page "in action" playing games, and it is an opportunity to learn about a game that the viewing user might want to try or get better at.

Camera-recorded or uploaded video clips from KILLHAZARD's buddies 2002 are also shown on the User Page, and underneath each video clip is text that indicates whether the buddy is online playing a game (e.g., six_shot is playing the game "Eragon" (shown here as Game4) and MrSnuggles99 is Offline, etc.). By clicking on a menu item (not shown) the buddy video clips switch from showing recorded or uploaded videos to live video of what the buddies who are currently playing games on the hosting service 210 are doing at that moment in their games. So, it becomes a Game Finder grouping for buddies. If a buddy's game is selected and the user clicks on it, it will zoom up to full screen, and the user will be able to watch the game played full screen live.

Again, the user viewing the buddy's game does not own a copy of the game, nor the local computing/game console resources to play the game. The game viewing is effectively instantaneous.

As previously described above, when a user plays a game on the hosting service 210, the user is able to "rewind" the game and find a video segment he wants to save, and then saves the video segment to his User Page. These are called "Brag Clips™". The video segments 2003 are all Brag Clips 2003 saved by KILLHAZARD from previous games that he has played. Number 2004 shows how many times a Brag Clip has been viewed, and when the Brag Clip is viewed, users have an opportunity to rate them, and the number of orange (shown here as black outlines) keyhole-shaped icons 2005 indicate how high the rating is. The Brag Clips 2003 loop constantly when a user views the User Page, along with the rest of the video on the page. If the user selects and clicks on one of the Brag Clips 2003, it zooms up to present the Brag Clip 2003, along with DVR controls to allow the clip to be played, paused, rewound, fast-forwarded, stepped through, etc.

The Brag Clip 2003 playback is implemented by the app/game server 1521-1525 loading the compressed video segment stored on a RAID array 1511-1512 when the user recorded the Brag Clip and decompressing it and playing it back.

Brag Clips 2003 can also be "3D DVR" video segments (i.e., a game state sequence from the game that can be replayed and allows the user to change the camera viewpoint) from games that support such capability. In this case the game state information is stored, in addition to a compressed video recording of the particular "fly through" the user made when the game segment was recorded. When the User Page is being viewed, and all of the thumbnails and video windows are constantly looping, a 3D DVR Brag Clip 2003 will constantly loop the Brag Clip 2003 that was recorded as compressed video when the user recorded the "fly through" of the game segment. But, when a user selects a 3D DVR Brag Clip 2003 and clicks on it, in addition to the DVR controls to allow the compressed video Brag Clip to be played, the user will be able to click on a button that gives them 3D DVR capability for the game segment. They will be able to control a camera "fly through" during the game segment on their own, and, if they wish (and the user who owns the user page so allows it) they will be able to record an alternative Brag Clip "fly through" in compressed video form will then be available to other viewers of the user page (either immediately, or after the owner of the user page has a chance to the review the Brag Clip).

This 3D DVR Brag Clip 2003 capability is enabled by activating the game that is about to replay the recorded game state information on another app/game server 1521-1525. Since the game can be activated almost instantaneously (as previously described) it is not difficult to activate it, with its play limited to the game state recorded by the Brag Clip segment, and then allow the user to do a "fly through" with a camera while recording the compressed video to a delay buffer 1515. Once the user has completed doing the "fly through" the game is deactivated.

From the user's point of view, activating a "fly through" with a 3D DVR Brag Clip 2003 is no more effort than controlling the DVR controls of a linear Brag Clip 2003. They may know nothing about the game or even how to play the game. They are just a virtual camera operator peering into a 3D world during a game segment recorded by another.

Users will also be able to overdub their own audio onto Brag Clips that is either recorded from microphones or uploaded. In this way, Brag Clips can be used to create custom animations, using characters and actions from games. This animation technique is commonly known as "machinima".

As users progress through games, they will achieve differing skill levels. The games played will report the accomplishments to the service control system 401, and these skill levels will be shown on User Pages.

Interactive Animated Advertisements

Online advertisements have transitioned from text, to still images, to video, and now to interactive segments, typically implemented using animation thin clients like Adobe Flash. The reason animation thin clients are used is that users typically have little patience to be delayed for the privilege of having a product or service pitched to them. Also, thin clients run on very low-performance PCs and as such, the advertiser can have a high degree of confidence that the interactive ad will work properly. Unfortunately, animation thin clients such as Adobe Flash are limited in the degree of interactivity and the duration of the experience (to mitigate download time and to be operable on almost all user devices, including low-performance PCs and Macs without GPUs or high-performance CPUs).

Figure 21:
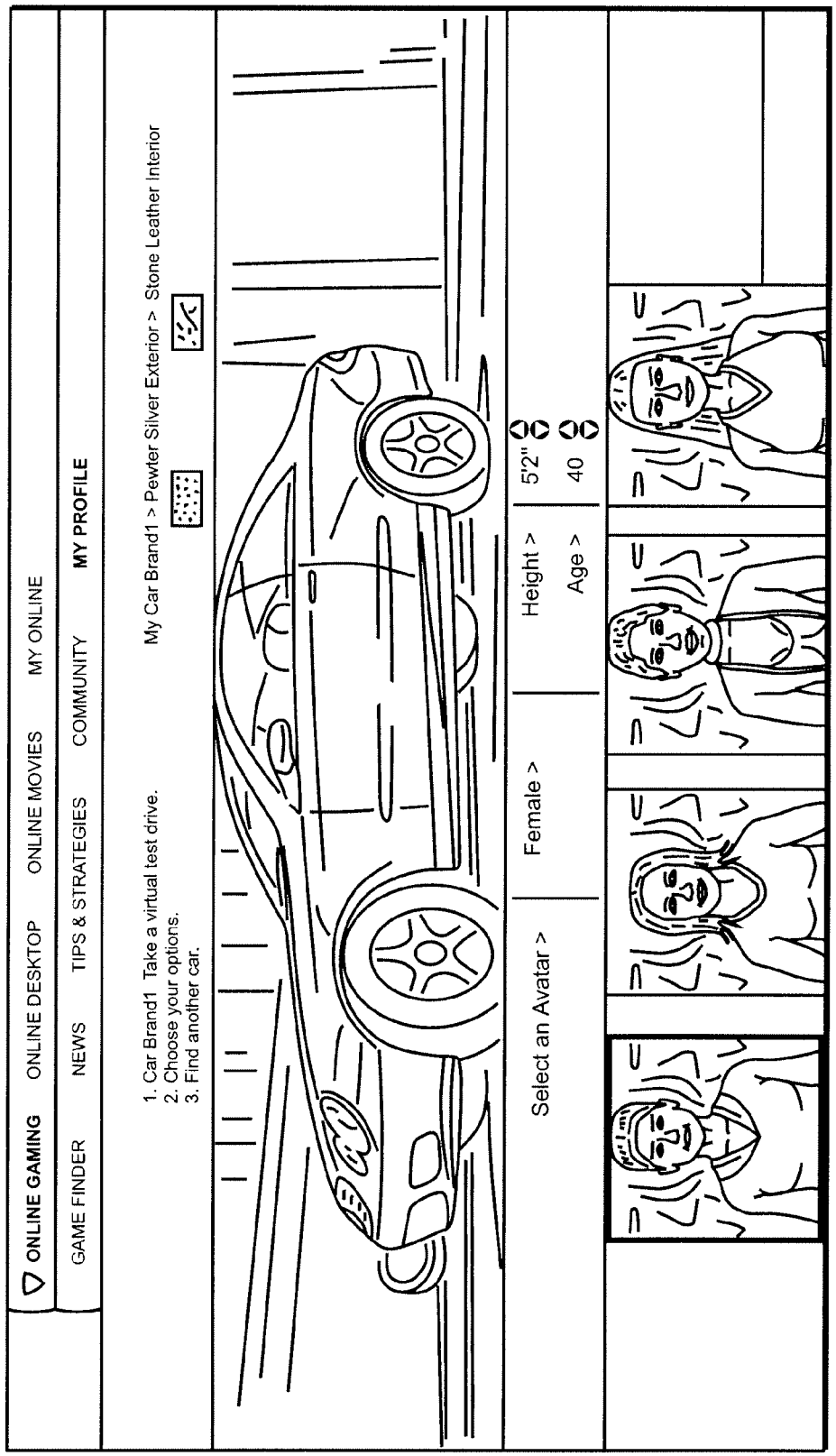
FIG. 21 illustrates an example 3D interactive advertisement.

FIG. 21 illustrates an interactive advertisement where the user is to select the exterior and interior colors of a car while the car rotates around in a showroom, while real-time ray tracing shows how the car looks. Then the user chooses an avatar to drive the car, and then the user can take the car for a drive either on a race track, or through an exotic locale such as Monaco. The user can select a larger engine, or better tires, and then can see how the changed configuration affects the ability of the car to accelerate or hold the road.

Of course, the advertisement is effectively a sophisticated 3D video game. But for such an advertisement to be playable on a PC or a video game console it would require perhaps a 100 MB download and, in the case of the PC, it might require the installation of special drivers, and might not run at all if the PC lacks adequate CPU or GPU computing capability. Thus, such advertisements are impractical in prior art configurations.

In the hosting service 210, such advertisements launch almost instantly, and run perfectly, no matter what the user's client 415 capabilities are. So, they launch more quickly than thin client interactive ads, are vastly richer in the experience, and are highly reliable.

Streaming Geometry During Real-Time Animation

RAID array 1511-1512 and the inbound routing 1502 can provide data rates that are so fast and with latencies so low that it is possible to design video games and applications that rely upon the RAID array 1511-1512 and the inbound routing 1502 to reliably deliver geometry on-the-fly in the midst of game play or in an application during real-time animation (e.g., a fly-through with a complex database.)

Figure 1:
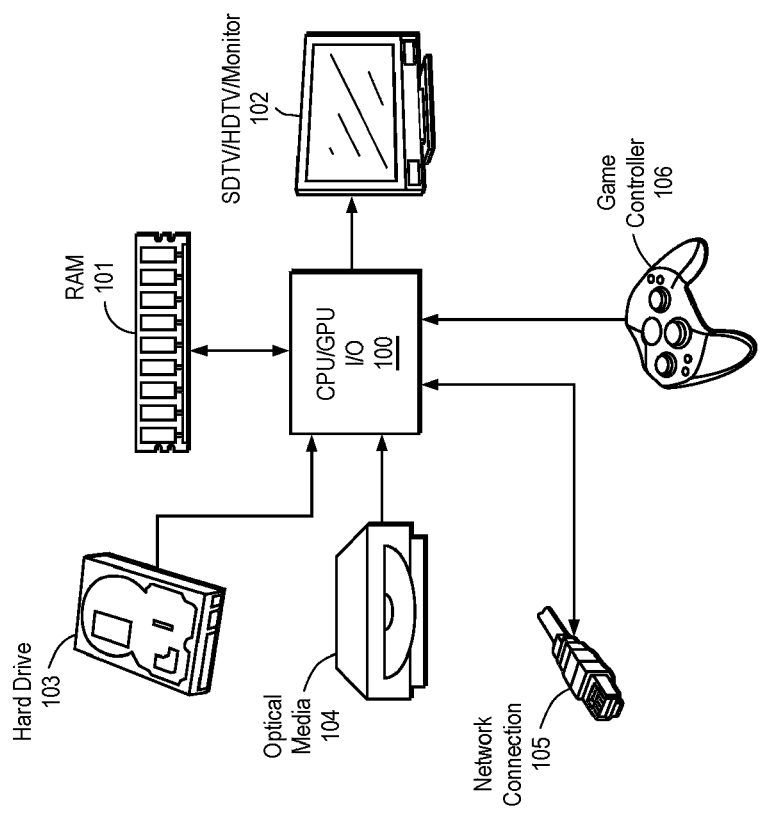
FIG. 1 illustrates an architecture of a prior art video gaming system.

With prior art systems, such as the video game system shown in FIG. 1, the mass storage devices available, particularly in practical home devices, are far too slow to stream geometry in during game play except in situations where the required geometry was somewhat predictable. For example, in a driving game where there is a specified roadway, geometry for buildings that are coming into view can be reasonable well predicted and the mass storage devices can seek in advance to the location where the upcoming geometry is located.

But in a complex scene with unpredictable changes (e.g., in a battle scene with complex characters all around) if RAM on the PC or video game system is completely filled with geometry for the objects currently in view, and then the user suddenly turns their character around to view what is behind their character, if the geometry has not been pre-loaded into RAM, then there may be a delay before it can be displayed.

In the hosting service 210, the RAID arrays 1511-1512 can stream data in excess of Gigabit Ethernet speed, and with a SAN network, it is possible to achieve 10 gigabit/second speed over 10 Gigabit Ethernet or over other network technologies. 10 gigabits/second will load a gigabyte of data in less than a second. In a 60 fps frame time (16.67 ms), approximately 170 megabits (21 MB) of data can be loaded. Rotating media, of course, even in a RAID configuration will still incur latencies greater than a frame time, but Flash-based RAID storage will eventually be as large as rotating media RAID arrays and will not incur such high latency. In one embodiment, massive RAM write-through caching is used to provide very low latency access.

Thus, with sufficiently high network speed, and sufficiently low enough latency mass storage, geometry can be streamed into app/game game servers 1521-1525 as fast as the CPUs and/or GPUs can process the 3D data. So, in the example given previously, where a user turns their character around suddenly and looks behind, the geometry for all of the characters behind can be loaded before the character completes the rotation, and thus, to the user, it will seem as if he or she is in a photorealistic world that is as real as live action.

Figure 22:
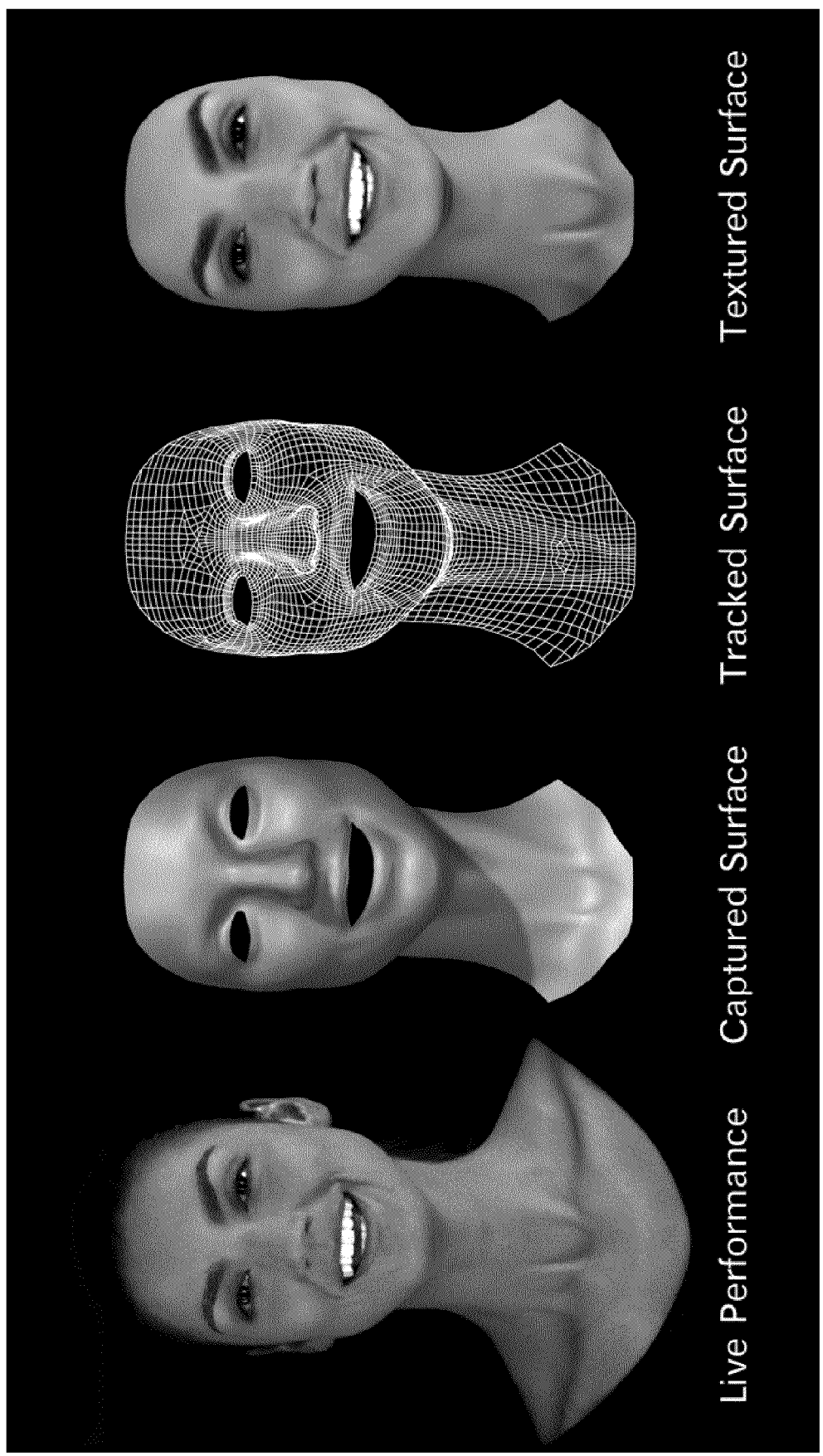
FIG. 22 illustrates an example sequence of steps for producing a photoreal image having a textured surface from surface capture of a live performance.

As previously discussed, one of the last frontiers in photorealistic computer animation is the human face, and because of the sensitivity of the human eye to imperfections, the slightest error from a photoreal face can result in a negative reaction from the viewer. FIG. 22 shows how a live performance captured using Contour™ Reality Capture Technology (subject of co-pending applications: "Apparatus and method for capturing the motion of a performer," Ser. No. 10/942,609, Filed Sep. 15, 2004; "Apparatus and method for capturing the expression of a performer," Ser. No. 10/942,413 Filed Sep. 15, 2004; "Apparatus and method for improving marker identification within a motion capture system," Ser. No. 11/066,954, Filed Feb. 25, 2005; "Apparatus and method for performing motion capture using shutter synchronization," Ser. No. 11/077,628, Filed Mar. 10, 2005; "Apparatus and method for performing motion capture using a random pattern on capture surfaces," Ser. No. 11/255,854, Filed Oct. 20, 2005; "System and method for performing motion capture using phosphor application techniques," Ser. No. 11/449,131, Filed Jun. 7, 2006; "System and method for performing motion capture by strobing a fluorescent lamp," Ser. No. 11/449,043, Filed Jun. 7, 2006; "System and method for three dimensional capture of stop-motion animated characters," Ser. No. 11/449,127, Filed Jun. 7, 2006", each of which is assigned to the assignee of the present CIP application) results in a very smooth captured surface, then a high polygon-count tracked surface (i.e., the polygon motion follows the motion of the face precisely). Finally, when the video of the live performance is mapped on the tracked surface to produce a textured surface, a photoreal result is produced.

Although current GPU technology is able to render the number of polygons in the tracked surface and texture and light the surface in real-time, if the polygons and textures are changing every frame time (which will produce the most photoreal results) it will quickly consume all the available RAM of a modern PC or video game console.

Using the streaming geometry techniques described above, it becomes practical to continuously feed geometry into the app/game game servers 1521-1525 so that they can animate photoreal faces continuously, allowing the creation of video games with faces that are almost indistinguishable from live action faces.

Integration of Linear Content with Interactive Features

Motion pictures, television programming and audio material (collectively, "linear content") is widely available to home and office users in many forms. Linear content can be acquired on physical media, like CD, DVD and Blu-ray media. It also can be recorded by DVRs from satellite and cable TV broadcast. And, it is available as pay-per-view (PPV) content through satellite and cable TV and as video-on-demand (VOD) on cable TV.

Increasingly linear content is available through the Internet, both as downloaded and as streaming content. Today, there really is not one place to go to experience all of the features associated with linear media. For example, DVDs and other video optical media typically have interactive features not available elsewhere, like director's commentaries, "making of" featurettes, etc. Online music sites have cover art and song information generally not available on CDs, but not all CDs are available online. And Web sites associated with television programming often have extra features, blogs and sometimes comments from the actors or creative staff.

Further, with many motion pictures or sports events, there are often video games that are released (in the case of motion pictures) often together with the linear media or (in the case of sports) may be closely tied to real-world events (e.g., the trading of players).

Figure 23:
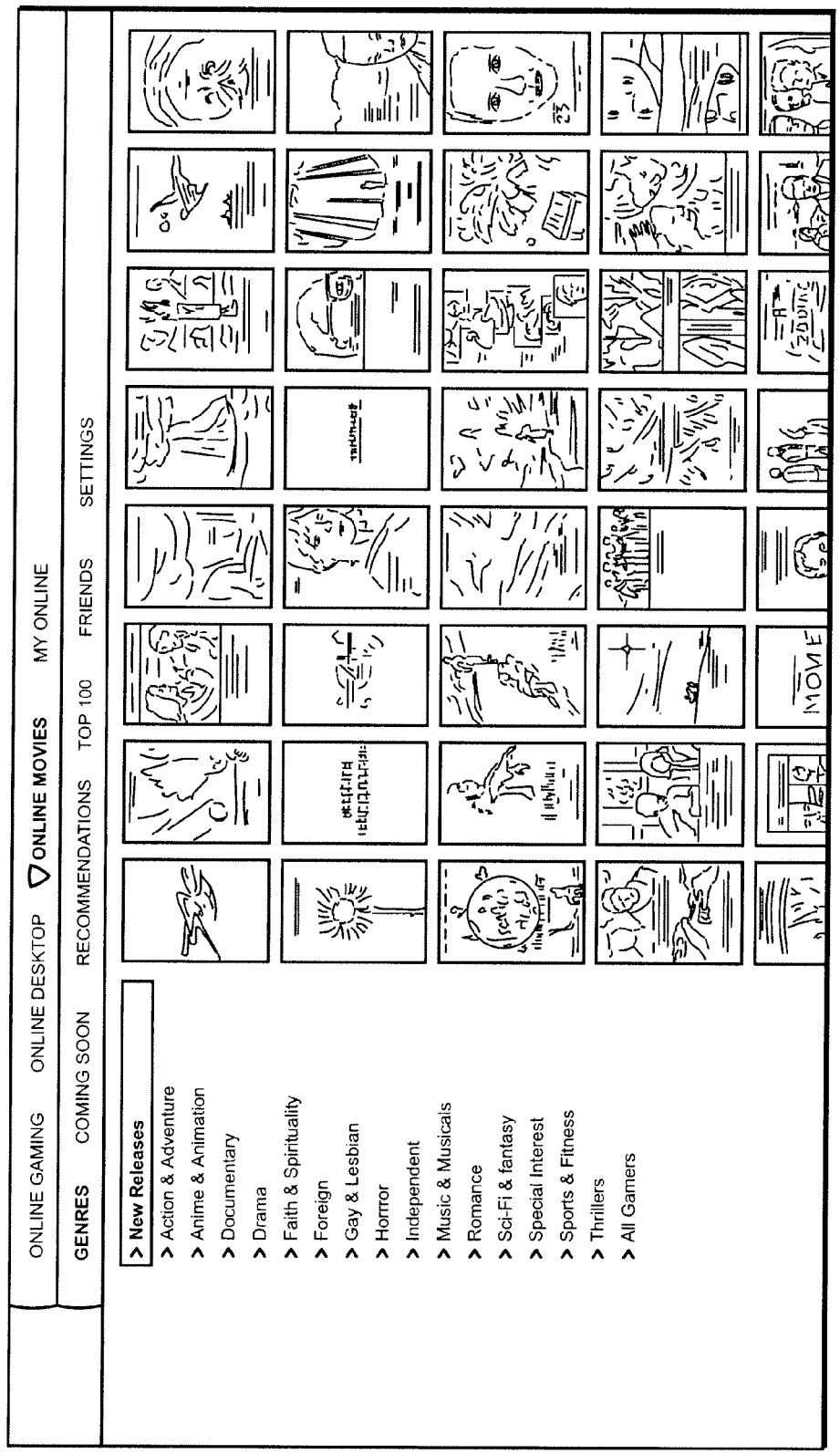
FIG. 23 illustrates an example user interface page that allows for selection of linear media content.

Hosting service 210 is well suited for the delivery of linear content in linking together the disparate forms of related content. Certainly, delivering motion pictures is no more challenging than delivering highly interactive video games, and the hosting service 210 is able to deliver linear content to a wide range of devices, in the home or office, or to mobile devices. FIG. 23 shows an exemplary user interface page for hosting service 210 that shows a selection of linear content.

But, unlike most linear content delivery system, hosting service 210 is also able to deliver related interactive components (e.g., the menus and features on DVDs, the interactive overlays on HD-DVDs, and the Adobe Flash animation (as explained below) on Web sites). Thus, the client device 415 limitations no longer introduce limitations as to which features are available.

Further, the hosting system 210 is able to link together linear content with video game content dynamically, and in real-time. For example, if a user is watching a Quidditch match in a Harry Potter movie, and decides she would like to try playing Quidditch, she can just click a button and the movie will pause and immediately she will be transported to the Quidditch segment of a Harry Potter video game. After playing the Quidditch match, another click of a button, and the movie will resume instantly.

With photoreal graphics and production technology, where the photographically-captured video is indistinguishable from the live action characters, when a user makes a transition from a Quidditch game in a live action movie to a Quidditch game in a video game on a hosting service as described herein, the two scenes are virtually indistinguishable. This provides entirely new creative options for directors of both linear content and interactive (e.g., video game) content as the lines between the two worlds become indistinguishable.

Utilizing the hosting service architecture shown in FIG. 14 the control of the virtual camera in a 3D movie can be offered to the viewer. For example, in a scene that takes place within a train car, it would be possible to allow the viewer to control the virtual camera and look around the car while the story progresses. This assumes that all of the 3D objects ("assets") in the car are available as well as an adequate a level of computing power capable of rendering the scenes in real-time as well as the original movie.

And even for non-computer generated entertainment, there are very exciting interactive features that can be offered. For example, the 2005 motion picture "Pride and Prejudice" had many scenes in ornate old English mansions. For certain mansion scenes, the user may pause the video and then control the camera to take a tour of the mansion, or perhaps the surrounding area. To implement this, a camera could be carried through the mansion with a fish-eye lens as it keeps track of its position, much like prior art Apple, Inc. QuickTime VR is implemented. The various frames would then be transformed so the images are not distorted, and then stored on RAID array 1511-1512 along with the movie, and played back when the user chooses to go on a virtual tour.

With sports events, a live sports event, such as a basketball game, may be streamed through the hosting service 210 for users to watch, as they would for regular TV. After users watched a particular play, a video game of the game (eventually with basketball players looking as photoreal as the real players) could come up with the players starting in the same position, and the users (perhaps each taking control of one player) could redo the play to see if they could do better than the players.

The hosting service 210 described herein is extremely well-suited to support this futuristic world because it is able to bring to bear computing power and mass storage resources that are impractical to install in a home or in most office settings, and also its computing resources are always up-to-date, with the latest computing hardware available, whereas in a home setting, there will always be homes with older generation PCs and video games. And, in the hosting service 210, all of this computing complexity is hidden from the user, so even though they may be using very sophisticated systems, from the user's point of view, it is a simple as changing channels on a television. Further, the users would be able to access all of the computing power and the experiences the computing power would bring from any client 415.

Multiplayer Games

To the extent a game is a multiplayer game, then it will be able communicate both to app/game game servers 1521-1525 through the inbound routing 1502 network and, with a network bridge to the Internet (not shown) with servers or game machines that are not running in the hosting service 210. When playing multiplayer games with computers on the general Internet, then the app/game game servers 1521-1525 will have the benefit of extremely fast access to the Internet (compared to if the game was running on a server at home), but they will be limited by the capabilities of the other computers playing the game on slower connections, and also potentially limited by the fact that the game servers on the Internet were designed to accommodate the least common denominator, which would be home computers on relatively slow consumer Internet connections.

But when a multiplayer game is played entirely within a hosting service 210 server center, then a world of difference is achievable. Each app/game game server 1521-1525 hosting a game for a user will be interconnected with other app/game game servers 1521-1525 as well as any servers that are hosting the central control for the multiplayer game with extremely high speed, extremely low latency connectivity and vast, very fast storage arrays. For example, if Gigabit Ethernet is used for the inbound routing 1502 network, then the app/game game servers 1521-1525 will be communicating among each other and communicating to any servers hosting the central control for the multiplayer game at gigabit/second speed with potentially only 1 ms of latency or less. Further, the RAID arrays 1511-1512 will be able to respond very rapidly and then transfer data at gigabit/second speeds. As an example, if a user customizes a character in terms of look and accoutrements such that the character has a large amount of geometry and behaviors that are unique to the character, with prior art systems limited to the game client running in the home on a PC or game console, if that character were to come into view of another user, the user would have to wait until a long, slow download completes so that all of the geometry and behavior data loads into their computer. Within the hosting service 210, that same download could be over Gigabit Ethernet, served from a RAID array 1511-1512 at gigabit/second speed. Even if the home user had an 8 Mbps Internet connection (which is extremely fast by today's standards), Gigabit Ethernet is 100 times faster. So, what would take a minute over a fast Internet connection, would take less than a second over Gigabit Ethernet.

Top Player Groupings and Tournaments

The Hosting Service 210 is extremely well-suited for tournaments. Because no game is running in a local client, there is no opportunity for users to cheat (e.g., as they might have in a prior art tournament by modifying the copy of the game running on their local PC to give them an unfair advantage). Also, because of the ability of the output routing 1540 to multicast the UDP streams, the Hosting Service is 210 is able to broadcast the major tournaments to thousands or more of people in the audience at once.

In fact, when there are certain video streams that are so popular that thousands of users are receiving the same stream (e.g., showing views of a major tournament), it may be more efficient to send the video stream to a Content Delivery Network (CDN) such as Akamai or Limelight for mass distribution to many client devices 415.

A similar level of efficiency can be gained when a CDN is used to show Game Finder pages of top player groupings.

For major tournaments, a live celebrity announcer can be used to provide commentary during certain matches. Although a large number of users will be watching a major tournament, and relatively small number will be playing in the tournament. The audio from the celebrity announcer can be routed to the app/game game servers 1521-1525 hosting the users playing in the tournament and hosting any spectator-mode copies of the game in the tournament, and the audio can be overdubbed on top of the game audio. Video of a celebrity announcer can be overlaid on the games, perhaps just on spectator views, as well.

Acceleration of Web Page Loading

The World Wide Web and its primary transport protocol, Hypertext Transfer Protocol (HTTP), were conceived and defined in an era where only businesses had high speed Internet connections, and the consumers who were online were using dialup modems or ISDN. At the time, the "gold standard" for a fast connection was a T1 line which provided 1.5 Mbps data rate symmetrically (i.e., with equal data rate in both directions).

Today, the situation is completely different. The average home connection speed through DSL or cable modem connections in much of the developed world has a far higher downstream data rate than a T1 line. In fact, in some parts of the world, fiber-to-the-curb is bringing data rates as high as 50 to 100 Mbps to the home.

Unfortunately, HTTP was not architected (nor has it been implemented) to effectively take advantage of these dramatic speed improvements. A web site is a collection of files on a remote server. In very simple terms, HTTP requests the first file, waits for the file to be downloaded, and then requests the second file, waits for the file to be downloaded, etc. In fact, HTTP allows for more than one "open connection", i.e., more than one file to be requested at a time, but because of agreed-upon standards (and a desire to prevent web servers from being overloaded) only very few open connections are permitted. Moreover, because of the way Web pages are constructed, browsers often are not aware of multiple simultaneous pages that could be available to download immediately (i.e., only after parsing a page does it become apparent that a new file, like an image, needs to be downloaded). Thus, files on website are essentially loaded one-by-one. And, because of the request-and-response protocol used by HTTP, there is roughly (accessing typical web servers in the US) a 100 ms latency associated with each file that is loaded.

With relatively low speed connections, this does not introduce much of a problem because the download time for the files themselves dominates the waiting time for the web pages. But, as connection speeds grow, especially with complex web pages, problems begin to arise.

Figure 24:
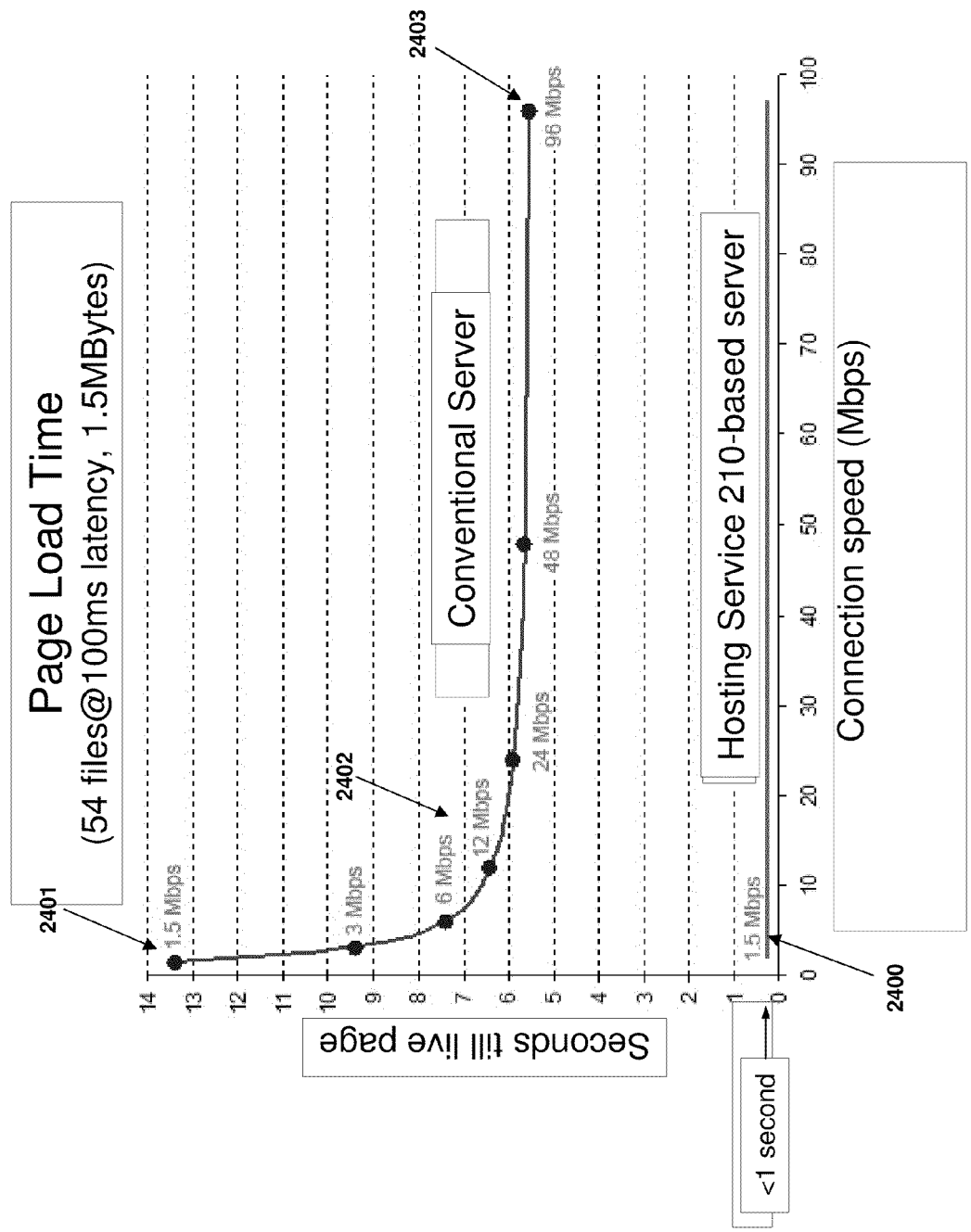
FIG. 24 is a graph that illustrates the amount of time that elapses before the web page is live versus connection speed.

In the example shown in FIG. 24, a typical commercial website is shown (this particular website was from a major athletic shoe brand). The website has 54 files on it. The files include HTML, CSS, JPEG, PHP, JavaScript and Flash files, and include video content. A total of 1.5 MBytes must be loaded before the page is live (i.e., the user can click on it and begin to use it). There are a number of reasons for the large number of files. For one thing, it is a complex and sophisticated webpage, and for another, it is a webpage that is assembled dynamically based on the information about the user accessing the page (e.g., what country the user is from, what language, whether the user has made purchases before, etc.), and depending on all of these factors, different files are downloaded. Still, it is a very typical commercial web page.

FIG. 24 shows the amount of time that elapses before the web page is live as the connection speed grows. With a 1.5 Mbps connection speed 2401, using a conventional web server with a convention web browser, it takes 13.5 seconds until the web page is live. With a 12 Mbps connection speed 2402, the load time is reduced to 6.5 seconds, or about twice as fast. But with a 96 Mbps connection speed 2403, the load time is only reduced to about 5.5 seconds. The reason why is because at such a high download speed, the time to download the files themselves is minimal, but the latency per file, roughly 100 ms each, still remains, resulting in 54 files*100 ms=5.4 seconds of latency. Thus, no matter how fast the connection is to the home, this web site will always take at least 5.4 seconds until it is live. Another factor is the server-side queuing; every HTTP request is added in the back of the queue, so on a busy server this will have a significant impact because for every small item to get from the web server, the HTTP requests needs to wait for its turn.

One way to solve these issues is to discard or redefine HTTP. Or, perhaps to get the website owner to better consolidate its files into a single file (e.g., in Adobe Flash format). But, as a practical matter, this company, as well as many others has a great deal of investment in their web site architecture. Further, while some homes have 12-100 Mbps connections, the majority of homes still have slower speeds, and HTTP does work well at slow speed.

One alternative is to host web browsers on app/game servers 1521-1525, and host the files for the web servers on the RAID arrays 1511-1512 (or potentially in RAM or on local storage on the app/game servers 1521-1525 hosting the web browsers. Because of the very fast interconnect through the inbound routing 1502 (or to local storage), rather than have 100 ms of latency per file using HTTP, there will be de minimis latency per file using HTTP. Then, instead of having the user in her home accessing the web page through HTTP, the user can access the web page through client 415. Then, even with a 1.5 Mbps connection (because this web page does not require much bandwidth for its video), the webpage will be live in less than 1 second per line 2400. Essentially, there will be no latency before the web browser running on an app/game server 1521-1525 is displaying a live page, and there will be no detectable latency before the client 415 displays the video output from the web browser. As the user mouses around and/or types on the web page, the user's input information will be sent to the web browser running on the app/game server 1521-1525, and the web browser will respond accordingly.

One disadvantage to this approach is if the compressor is constantly transmitting video data, then bandwidth is used, even if the web page becomes static. This can be remedied by configuring the compressor to only transmit data when (and if) the web page changes, and then, only transmit data to the parts of the page that change. While there are some web pages with flashing banners, etc. that are constantly changing, such web pages tend to be annoying, and usually web pages are static unless there is a reason for something to be moving (e.g., a video clip). For such web pages, it is likely the case the less data will be transmitted using the hosting service 210 than a conventional web server because only the actual displayed images will be transmitted, no thin client executable code, and no large objects that may never be viewed, such as rollover images.

Thus, using the hosting service 210 to host legacy web pages, web page load times can be reduced to the point where opening a web page is like changing channels on a television: the web page is live effectively instantly.

Facilitating Debugging of Games and Applications

As mentioned previously, video games and applications with real-time graphics are very complex applications and typically when they are released into the field they contain bugs. Although software developers will get feedback from users about bugs, and they may have some means to pass back machine state after crashes, it is very difficult to identify exactly what has caused a game or real-time application to crash or to perform improperly.

When a game or application runs in the hosting service 210, the video/audio output of the game or application is constantly recorded on a delay buffer 1515. Further, a watchdog process runs on each app/game server 1521-1525 which reports regularly to the hosting service control system 401 that the app/game server 1521-1525 is running smoothly. If the watchdog process fails to report in, then the server control system 401 will attempt to communicate with the app/game server 1521-1525, and if successful, will collect whatever machine state is available. Whatever information is available, along with the video/audio recorded by the delay buffer 1515 will be sent to the software developer.

Thus, when the game or application software developer gets notification of a crash from the hosting service 210, it gets a frame-by-frame record of what led up to the crash. This information can be immensely valuable in tracking down bugs and fixing them.

Note also, that when an app/game server 1521-1525 crashes, the server is restarted at the most recent restartable point, and a message is provided to the user apologizing for the technical difficulty.

Resource Sharing and Cost Savings

The system shown in FIGS. 4a and 4b provide a variety of benefits for both end users and game and application developers. For example, typically, home and office client systems (e.g., PCs or game consoles) are only in use for a small percentage of the hours in a week. According to an Oct. 5, 2006 press release by the Nielsen Entertainment "Active Gamer Benchmark Study" (http://www.prnewswire.com/cgi-bin/stories.pl?ACCT=104&STORY=/www/story/10-05-2006/0004446115&EDATE=) active gamers spend on average 14 hours a week playing on video game consoles and about 17 hours a week on handhelds. The report also states that for all game playing activity (including console, handheld and PC game playing) Active Gamers average 13 hours a week. Taking into consideration the higher figure of console video game playing time, there are 24*7=168 hours in a week, that implies that in an active gamer's home, a video game console is in use only 17/168=10% of the hours of a week. Or, 90% of the time, the video game console is idle. Given the high cost of video game consoles, and the fact that manufacturers subsidize such devices, this is a very inefficient use of an expensive resource. PCs within businesses are also typically used only a fraction of the hours of the week, especially non-portable desktop PCs often required for high-end applications such as Autodesk Maya. Although some businesses operate at all hours and on holidays, and some PCs (e.g., portables brought home for doing work in the evening) are used at all hours and holidays, most business activities tend to center around 9 AM to 5 PM, in a given business' time zone, from Monday to Friday, less holidays and break times (such as lunch), and since most PC usage occurs while the user is actively engaged with the PC, it follows that desktop PC utilization tends to follow these hours of operation. If we were to assume that PCs are utilized constantly from 9 AM to 5 PM, 5 days a week, that would imply PCs are utilized 40/168=24% of the hours of the week. High-performance desktop PCs are very expensive investments for businesses, and this reflects a very low level of utilization. Schools that are teaching on desktop computers may use computers for an even smaller fraction of the week, and although it varies depending upon the hours of teaching, most teaching occurs during the daytime hours from Monday through Friday. So, in general, PCs and video game consoles are utilized only a small fraction of the hours of the week.

Notably, because many people are working at businesses or at school during the daytime hours of Monday through Friday on non-holidays, these people generally are not playing video games during these hours, and so when they do play video games it is generally during other hours, such as evenings, weekends and on holidays.

Given the configuration of the hosting service shown in FIG. 4a, the usage patterns described in the above two paragraphs result in very efficient utilization of resources. Clearly, there is a limit to the number of users who can be served by the hosting service 210 at a given time, particularly if the users are requiring real-time responsiveness for complex applications like sophisticated 3D video games. But, unlike a video game console in a home or a PC used by a business, which typically sits idle most of the time, servers 402 can be re-utilized by different users at different times. For example, a high-performance server 402 with high performance dual CPUs and dual GPUs and a large quantity of RAM can be utilized by a businesses and schools from 9 AM to 5 PM on non-holidays, but be utilized by gamers playing a sophisticated video game in the evenings, weekends and on holidays. Similarly, low-performance applications can be utilized by businesses and schools on a low-performance server 402 with a Celeron CPU, no GPU (or a very low-end GPU) and limited RAM during business hours and a low-performance game can utilize a low-performance server 402 during non-business hours.

Further, with the hosting service arrangement described herein, resources are shared efficiently among thousands, if not millions, of users. In general, online services only have a small percentage of their total user base using the service at a given time. If we consider the Nielsen video game usage statistics listed previously, it is easy to see why. If active gamers play console games only 17 hours of a week, and if we assume that the peak usage time for game is during the typical non-work, non-business hours of evenings (5-12 AM, 7*5 days=35 hours/week) and weekend (8 AM-12 AM, 16*2=32 hours/week), then there are 35+32=65 peak hours a week for 17 hours of game play. The exact peak user load on the system is difficult to estimate for many reasons: some users will play during off-peak times, there may be certain day times when there are clustering peaks of users, the peak times can be affected by the type of game played (e.g., children's games will likely be played earlier in the evening), etc. But, given that the average number of hours played by a gamer is far less than the number of hours of the day when a gamer is likely to play a game, only a fraction of the number of users of the hosting service 210 will be using it at a given time. For the sake of this analysis, we shall assume the peak load is 12.5%. Thus, only 12.5% of the computing, compression and bandwidth resources are used at a given time, resulting in only 12.5% of the hardware cost to support a given user to play a given level of performance game due to reuse of resources.

Moreover, given that some games and applications require more computing power than others, resources may be allocated dynamically based on the game being played or the applications executed by users. So, a user selecting a low-performance game or application will be allocated a low-performance (less expensive) server 402, and a user selecting a high-performance game or applications will be allocated a high-performance (more expensive) server 402. Indeed, a given game or application may have lower-performance and higher-performance sections of the game or applications, and the user can be switched from one server 402 to another server 402 between sections of the game or application to keep the user running on the lowest-cost server 402 that meets the game or application's needs. Note that the RAID arrays 405, which will be far faster than a single disk, will be available to even low-performance servers 402, that will have the benefit of the faster disk transfer rates. So, the average cost per server 402 across all of the games being played or applications being used is much less than the cost of the most expensive server 402 that plays the highest performance game or applications, yet even the low-performance servers 402, will derive disk performance benefits from the RAID arrays 405.

Further, a server 402 in the hosting service 210 may be nothing more than a PC motherboard without a disk or peripheral interfaces other than a network interface, and in time, may be integrated down to a single chip with just a fast network interface to the SAN 403. Also, RAID Arrays 405 likely will be shared amongst far many more users than there are disks, so the disk cost per active user will be far less than one disk drive. All of this equipment will likely reside in a rack in an environmentally-controlled server room environment. If a server 402 fails, it can be readily repaired or replaced at the hosting service 210. In contrast, a PC or game console in the home or office must be a sturdy, standalone appliance that has to be able to survive reasonable wear and tear from being banged or dropped, requires a housing, has at least one disk drive, has to survive adverse environment conditions (e.g., being crammed into an overheated AV cabinet with other gear), requires a service warranty, has to be packaged and shipped, and is sold by a retailer who will likely collect a retail margin. Further, a PC or game console must be configured to meet the peak performance of the most computationally-intensive anticipated game or application to be used at some point in the future, even though lower performance games or application (or sections of games or applications) may be played most of the time. And, if the PC or console fails, it is an expensive and time-consuming process (adversely impacting the manufacturer, user and software developer) to get it repaired.

Thus, given that the system shown in FIG. 4a provides an experience to the user comparable to that of a local computing resource, for a user in the home, office or school to experience a given level of computing capability, it is much less expensive to provide that computing capability through the architecture shown in FIG. 4a.

Eliminating the Need to Upgrade

Further, users no longer have to worry about upgrading PCs and/or consoles to play new games or handle higher performance new applications. Any game or applications on the hosting service 210, regardless of what type of server 402 is required for that game or applications, is available to the user, and all games and applications run nearly instantly (e.g., loading rapidly from the RAID Arrays 405 or local storage on a servers 402) and properly with the latest updates and bug fixes (i.e., software developers will be able to choose an ideal server configuration for the server(s) 402 that run(s) a given game or application, and then configure the server(s) 402 with optimal drivers, and then over time, the developers will be able to provide updates, bug fixes, etc. to all copies of the game or application in the hosting service 210 at once). Indeed, after the user starts using the hosting service 210, the user is likely to find that games and applications continue to provide a better experience (e.g., through updates and/or bug fixes) and it may be the case that a user discovers a year later that a new game or application is made available on the service 210 that is utilizing computing technology (e.g., a higher-performance GPU) that did not even exist a year before, so it would have been impossible for the user to buy the technology a year before that would play the game or run the applications a year later. Since the computing resource that is playing the game or running the application is invisible to the user (i.e., from the user's perspective the user is simply selecting a game or application that begins running nearly instantly—much as if the user had changed channels on a television), the user's hardware will have been "upgraded" without the user even being aware of the upgrade.

Eliminating the Need for Backups

Another major problem for users in businesses, schools and homes are backups. Information stored in a local PC or video game console (e.g., in the case of a console, a user's game achievements and ranking) can be lost if a disk fails, or if there is an inadvertent erasure. There are many applications available that provide manual or automatic backups for PCs, and game console state can be uploaded to an online server for backup, but local backups are typically copied to another local disk (or other non-volatile storage device) which has to be stored somewhere safe and organized, and backups to online services are often limited because of the slow upstream speed available through typical low-cost Internet connections. With the hosting service 210 of FIG. 4a, the data that is stored in RAID arrays 405 can be configured using prior art RAID configuration techniques well-known to those skilled in the art such that if a disk fails, no data will be lost, and a technician at the server center housing the failed disk will be notified, and then will replace the disk, which then will be automatically updated so that the RAID array is once again failure tolerant. Further, since all of the disk drives are near one another and with fast local networks between them through the SAN 403 it is not difficult in a server center to arrange for all of the disk systems to be backed up on a regular basis to secondary storage, which can be either stored at the server center or relocated offsite. From the point of view of the users of hosting service 210, their data is simply secure all the time, and they never have to think about backups.

Access to Demos

Users frequently want to try out games or applications before buying them. As described previously, there are prior art means by which to demo (the verb form of "demo" means to try out a demonstration version, which is also called a "demo", but as a noun) games and applications, but each of them suffers from limitations and/or inconveniences. Using the hosting service 210, it is easy and convenient for users to try out demos. Indeed, all the user does is select the demo through a user interface (such as one described below) and try out the demo. The demo will load almost instantly onto a server 402 appropriate for the demo, and it will just run like any other game or application. Whether the demo requires a very high performance server 402, or a low performance server 402, and no matter what type of home or office client 415 the user is using, from the point of view of the user, the demo will just work. The software publisher of either the game or application demo will be able to control exactly what demo the user is permitted to try out and for how long, and of course, the demo can include user interface elements that offer the user an opportunity to gain access to a full version of the game or application demonstrated.

Since demos are likely to be offered below cost or free of charge, some users may try to use demos repeated (particularly game demos, which may be fun to play repeatedly). The hosting service 210 can employ various techniques to limit demo use for a given user. The most straightforward approach is to establish a user ID for each user and limit the number of times a given user ID is allowed to play a demo. A user, however, may set up multiple user IDs, especially if they are free. One technique for addressing this problem is to limit the number of times a given client 415 is allowed to play a demo. If the client is a standalone device, then the device will have a serial number, and the hosting service 210 can limit the number of times a demo can be accessed by a client with that serial number. If the client 415 is running as software on a PC or other device, then a serial number can be assigned by the hosting service 210 and stored on the PC and used to limit demo usage, but given that PCs can be reprogrammed by users, and the serial number erased or changed, another option is for the hosting service 210 to keep a record of the PC network adapter Media Access Control (MAC) address (and/or other machine specific identifiers such as hard-drive serial numbers, etc.) and limit demo usage to it. Given that the MAC addresses of network adapters can be changed, however, this is not a foolproof method. Another approach is to limit the number of times a demo can be played to a given IP address. Although IP addresses may be periodically reassigned by cable modem and DSL providers, it does not happen in practice very frequently, and if it can be determined (e.g., by contacting the ISP) that the IP is in a block of IP addresses for residential DSL or cable modem accesses, then a small number of demo uses can typically be established for a given home. Also, there may be multiple devices at a home behind a NAT router sharing the same IP address, but typically in a residential setting, there will be a limited number of such devices. If the IP address is in a block serving businesses, then a larger number of demos can be established for a business. But, in the end, a combination of all of the previously mentioned approaches is the best way to limit the number of demos on PCs. Although there may be no foolproof way that a determined and technically adept user can be limited in the number of demos played repeatedly, creating a large number of barriers can create a sufficient deterrent such that it's not worth the trouble for most PC users to abuse the demo system, and rather they will use the demos as they were intended to be used: to try out new games and applications.

Benefits to Schools, Businesses and Other Institutions

Significant benefits accrue particularly to businesses, schools and other institutions that utilize the system shown in FIG. 4a. Businesses and schools have substantial costs associated with installing, maintaining and upgrading PCs, particularly when it comes to PCs for running high-performance applications, such a Maya. As stated previously, PCs are generally utilized only a fraction of the hours of the week, and as in the home, the cost of PC with a given level of performance capability is far higher in an office or school environment than in a server center environment.

In the case of larger businesses or schools (e.g., large universities), it may be practical for the IT departments of such entities to set up server centers and maintain computers that are remotely accessed via LAN-grade connections. A number of solutions exist for remote access of computers over a LAN or through a private high bandwidth connection between offices. For example, with Microsoft's Windows Terminal Server, or through virtual network computing applications like VNC, from RealVNC, Ltd., or through thin client means from Sun Microsystems, users can gain remote access to PCs or servers, with a range of quality in graphics response time and user experience. Further, such self-managed server centers are typically dedicated for a single business or school and as such, are unable to take advantage of the overlap of usage that is possible when disparate applications (e.g., entertainment and business applications) utilize the same computing resources at different times of the week. So, many businesses and schools lack the scale, resources or expertise to set up a server center on their own that has a LAN-speed network connection to each user. Indeed, a large percentage of schools and businesses have the same Internet connections (e.g., DSL, cable modems) as homes.

Yet such organizations may still have the need for very high-performance computing, either on a regular basis or on a periodic basis. For example, a small architectural firm may have only a small number of architects, with relatively modest computing needs when doing design work, but it may require very high-performance 3D computing periodically (e.g., when creating a 3D fly-through of a new architectural design for a client). The system shown in FIG. 4a is extremely well suited for such organizations. The organizations need nothing more than the same sort of network connection that are offered to homes (e.g., DSL, cable modems) and are typically very inexpensive. They can either utilize inexpensive PCs as the client 415 or dispense with PCs altogether and utilize inexpensive dedicated devices which simply implement the control signal logic 413 and low-latency video decompression 412. These features are particularly attractive for schools that may have problems with theft of PCs or damage to the delicate components within PCs.

Such an arrangement solves a number of problems for such organizations (and many of these advantages are also shared by home users doing general-purpose computing). For one, the operating cost (which ultimately must be passed back in some form to the users in order to have a viable business) can be much lower because (a) the computing resources are shared with other applications that have different peak usage times during the week, (b) the organizations can gain access to (and incur the cost of) high performance computing resources only when needed, (c) the organizations do not have to provide resources for backing up or otherwise maintaining the high performance computing resources.

Elimination of Piracy

In addition, games, applications, interactive movies, etc, can no longer be pirated as they are today. Because each game is stored and executed at the hosting service 210, users are not provided with access to the underlying program code, so there is nothing to pirate. Even if a user were to copy the source code, the user would not be able to execute the code on a standard game console or home computer. This opens up markets in places of the world such as China, where standard video gaming is not made available. The re-sale of used games is also not possible because there are no copies of a games distributed to users.

For game developers, there are fewer market discontinuities as is the case today when new generations of game consoles or PCs are introduced to the market. The hosting service 210 can be gradually updated with more advanced computing technology over time as gaming requirements change, in contrast to the current situation where a completely new generation of console or PC technology forces users and developers to upgrade and the game developer is dependent on the timely delivery of the hardware platform to the user (e.g. in the case of the PlayStation 3, its introduction was delayed by more than a year, and developers had to wait until it was available and significant numbers of units were purchased).

Streaming Interactive Video

The above descriptions provide a wide range of applications enabled by the novel underlying concept of general Internet-based, low-latency streaming interactive video (which implicitly includes audio together with the video as well, as used herein). Prior art systems that have provided streaming video through the Internet only have enabled applications which can be implemented with high latency interactions. For example, basic playback controls for linear video (e.g. pause, rewind, fast forward) work adequately with high latency, and it is possible to select among linear video feeds. And, as stated previously, the nature of some video games allow them to be played with high latency. But the high latency (or low compression ratio) of prior art approaches for streaming video have severely limited the potential applications of streaming video or narrowed their deployments to specialized network environments, and even in such environments, prior art techniques introduce substantial burdens on the networks. The technology described herein opens the door for the wide range of applications possible with low-latency streaming interactive video through the Internet, particularly those enabled through consumer-grade Internet connections.

Indeed, with client devices as small as client 465 of FIG. 4c sufficient to provide an enhanced user experience with an effectively arbitrary amount of computing power, arbitrary amount of fast storage, and extremely fast networking amongst powerful servers, it enables a new era of computing. Further, because the bandwidth requirements do not grow as the computing power of the system grows (i.e., because the bandwidth requirements are only tied to display resolution, quality and frame rate), once broadband Internet connectivity is ubiquitous (e.g., through widespread low-latency wireless coverage), reliable, and of sufficiently high bandwidth to meet the needs of the display devices 422 of all users, the question will be whether thick clients(such as PCs or mobile phones running Windows, Linux, OSX, etc.,) or even thin clients (such as Adobe Flash or Java) are necessary for typical consumer and business applications.

The advent of streaming interactive video results in a rethinking of assumptions about the structure of computing architectures. An example of this is the hosting service 210 server center embodiment shown in FIG. 15. The video path for delay buffer and/or group video 1550 is a feedback loop where the multicasted streaming interactive video output of the app/game servers 1521-1525 is fed back into the app/game servers 1521-1525 either in real-time via path 1552 or after a selectable delay via path 1551. This enables a wide range of practical applications (e.g. such as those illustrated in FIGS. 16, 17 and 20) that would be either impossible or infeasible through prior art server or local computing architectures. But, as a more general architectural feature, what feedback loop 1550 provides is recursion at the streaming interactive video level, since video can be looped back indefinitely as the application requires it. This enables a wide range of application possibilities never available before.

Another key architectural feature is that the video streams are unidirectional UDP streams. This enables effectively an arbitrary degree of multicasting of streaming interactive video (in contrast, two-way streams, such as TCP/IP streams, would create increasingly more traffic logjams on the networks from the back-and-forth communications as the number of users increased). Multicasting is an important capability within the server center because it allows the system to be responsive to the growing needs of Internet users (and indeed of the world's population) to communicate on a one-to-many, or even a many-to-many basis. Again, the examples discussed herein, such as FIG. 16 which illustrates the use of both streaming interactive video recursion and multicasting are just the tip of a very large iceberg of possibilities.

Non-Transit Peering

In one embodiment, the hosting service 210 has one or more peering connections to one or more Internet Service Providers (ISP) who also provide Internet service to users, and in this way the hosting service 210 may be able to communicate with the user through a non-transit route that stays within that ISP's network. For example, if the hosting service 210 WAN Interface 441 directly connected to Comcast Cable Communications, Inc.'s network, and the user premises 211 was provisioned with broadband service with a Comcast cable modem, a route between the hosting service 210 and client 415 may be established entirely within Comcast's network. The potential advantages of this would include lower cost for the communications (since the IP transit costs between two or more ISP networks might be avoided), a potentially more reliable connection (in case there were congestion or other transit disruptions between ISP networks), and lower latency (in case there were congestion, inefficient routes or other delays between ISP networks).

In this embodiment, when the client 415 initially contacts the hosting service 210 at the beginning of a session, the hosting service 210 receives the IP address of the user premises 211. It then uses available IP address tables, e.g., from ARIN (American Registry for Internet Numbers), to see if the IP address is one allocated to a particular ISP connected to the hosting service 210 that can route to the user premises 211 without IP transit to through another ISP. For example, if the IP address was between 76.21.0.0 and 76.21.127.255, then the IP address is assigned to Comcast Cable Communications, Inc. In this example, if the hosting service 210 maintains connections to Comcast, AT&T and Cox ISPs, then it selects Comcast as the ISP most likely to provide an optimal route to the particular user.

Video Compression Using Feedback

In one embodiment, feedback is provided from the client device to the hosting service to indicate successful (or unsuccessful) tile and/or frame delivery. The feedback information provided from the client is then used to adjust the video compression operations at the hosting service.

Figure 25A:
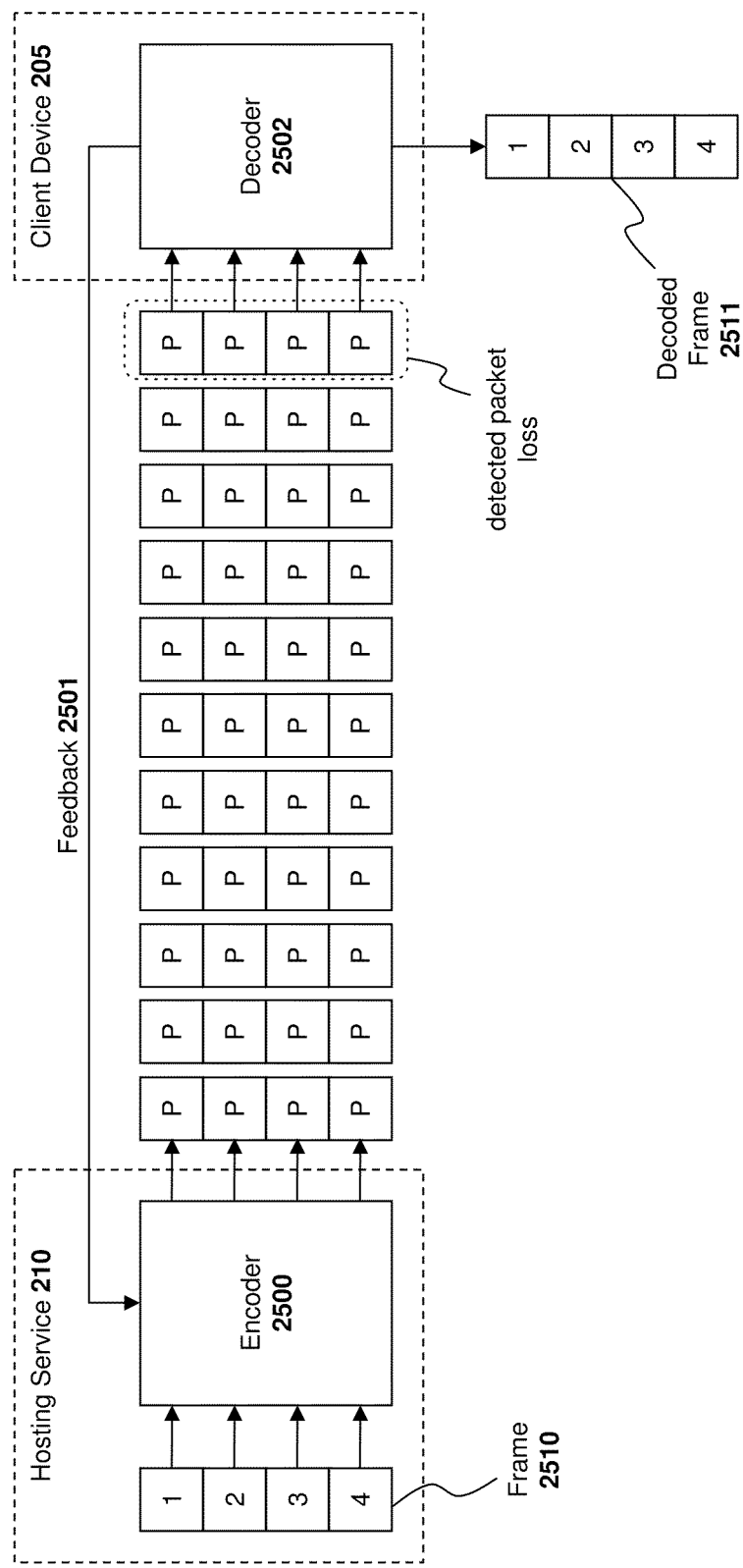
FIGS. 25a-b illustrates embodiments of the invention which employ a feedback channel from the client device to the hosting service.
Figure 25B:
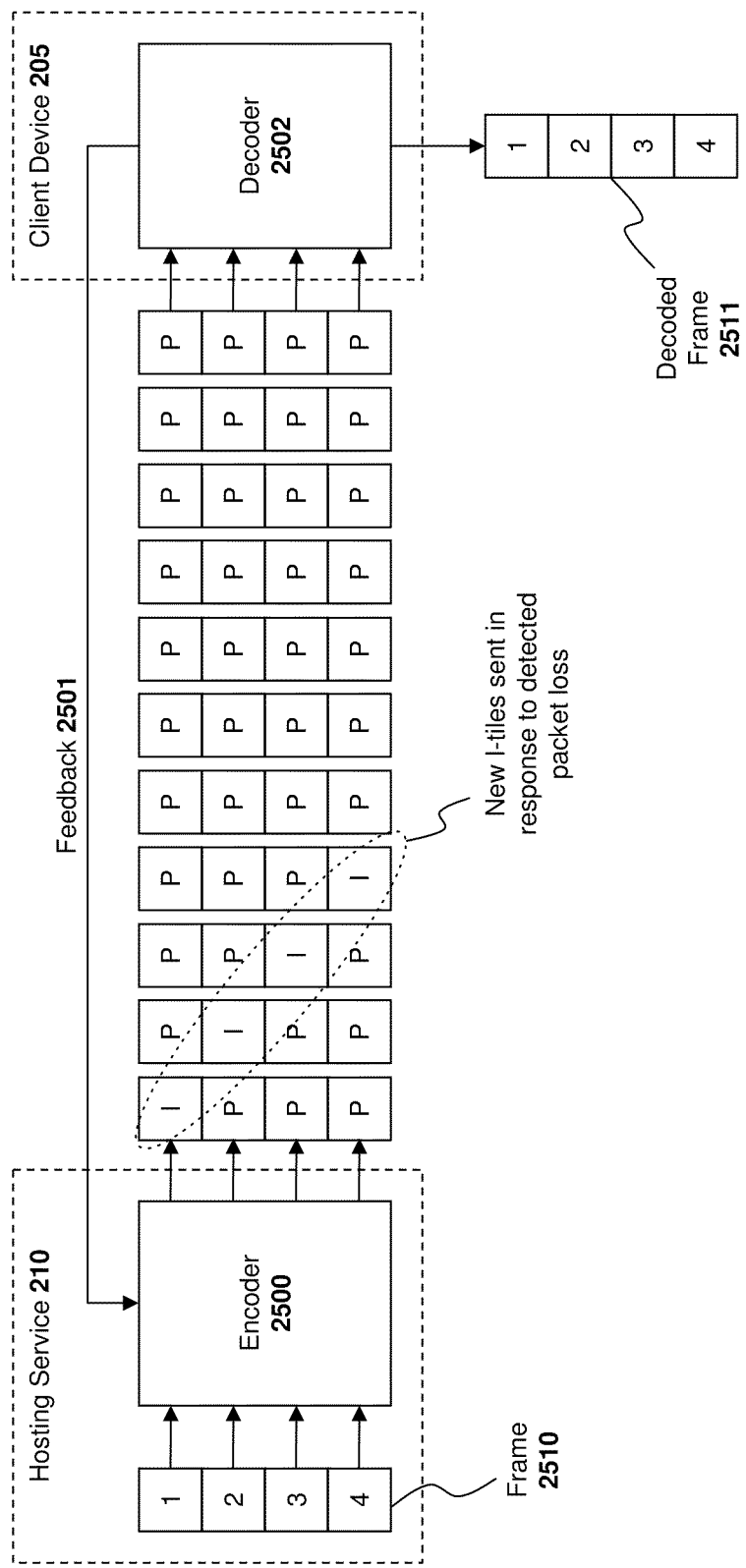

For example, FIGS. 25*a*-*b* illustrate one embodiment of the invention in which a feedback channel 2501 is established between the client device 205 and the hosting service 210. The feedback channel 2501 is used by the client device 205 to send packetized acknowledgements of successfully received tiles/frames and/or indications of unsuccessfully received tiles/frames.

In one embodiment, after successfully receiving each tile/frame, the client transmits an acknowledgement message to the hosting service 210. In this embodiment, the hosting service 210 detects a packet loss if it does not receive an acknowledgement after a specified period of time and/or if it receives an acknowledgement that the client device 205 has received a subsequent tile/frame than one that had been sent. Alternatively, or in addition, the client device 205 may detect the packet loss and transmit an indication of the packet loss to the hosting service 210 along with an indication of the tiles/frames affected by the packet loss. In this embodiment, continuous acknowledgement of successfully delivered tiles/frames is not required.

Regardless of how a packet loss is detected, in the embodiment illustrated in FIGS. 25*a*-*b*, after generating an initial set of I-tiles for an image (not shown in FIG. 25*a*), the encoder subsequently generates only P-tiles until a packet loss is detected. Note that in FIG. 25*a*, each frame, such as 2510 is illustrated as 4 vertical tiles. The frame may be tiled in a different configuration, such as a 2×2, 2×4, 4×4, etc., or the frame may be encoded in its entirety with no tiles (i.e. as 1 large tile). The foregoing examples of frame tiling configurations are provided for the purpose of illustration of this embodiment of the invention. The underlying principles of the invention are not limited to any particular frame tiling configuration.

Transmitting only P-tiles reduces the bandwidth requirements of the channel for all of the reasons set forth above (i.e., P-tiles are generally smaller than I-tiles). When a packet loss is detected via the feedback channel 2501, new I-tiles are generated by the encoder 2500, as illustrated in FIG. 25*b*, to re-initialize the state of the decoder 2502 on the client device 205. As illustrated, in one embodiment, the I-tiles are spread across multiple encoded frames to limit the bandwidth consumed by each individual encoded frame. For example, in FIG. 25, in which each frame includes 4 tiles, a single I-tile is transmitted at a different position within 4 successive encoded frames.

The encoder 2500 may combine the techniques described with respect to this embodiment with other encoding techniques described herein. For example, in addition to generating I-tiles in response to a detected packet loss the encoder 2500 may generate I-tiles in other circumstances in which I-tiles may be beneficial to properly render the sequence of images (such as in response to sudden scene transitions).

Figure 26A:
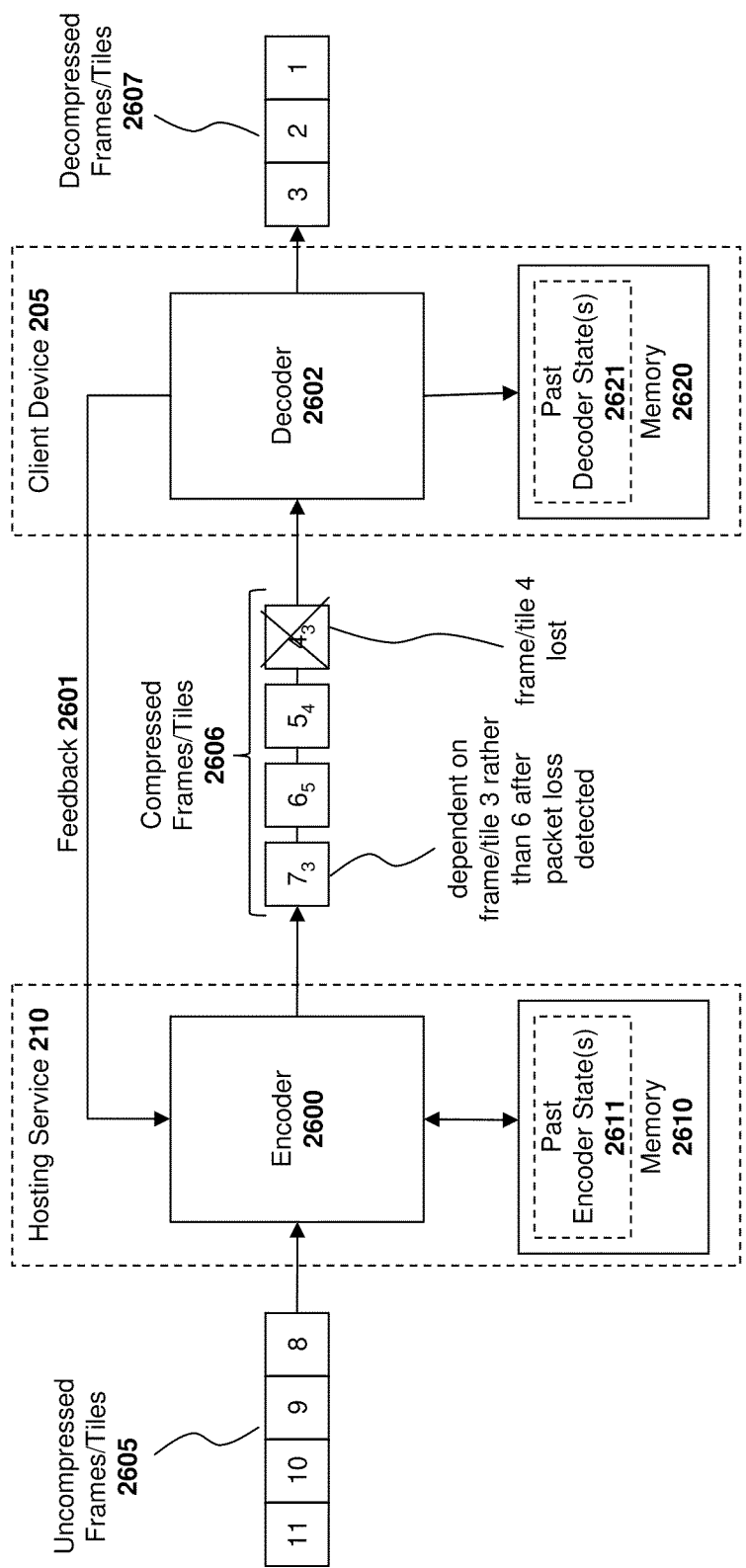
FIGS. 26a-b illustrate an embodiment in which encodes tiles/frames based on the last known tile/frame to have been successfully received.

FIG. 26*a* illustrates another embodiment of the invention which relies on a feedback channel 2601 between the client device 205 and the hosting service 210. Rather than generating new I-tiles/frames in response to a detected packet loss, the encoder 2600 of this embodiment adjusts the dependencies of the P-tiles/frames. As an initial matter, it should be noted that the specific details set forth in this example are not required for complying with the underlying principles of the invention. For example, while this example will be described using P-tiles/frames, the underlying principles of the invention are not limited to any particular encoding format.

In FIG. 26*a*, the encoder 2600 encodes a plurality of uncompressed tiles/frames 2605 into a plurality of P-tiles/frames 2606 and transmits the P-tiles/frames over a communication channel (e.g., the Internet) to a client device 205. A decoder 2602 on the client device 205 decodes the P-tiles/frames 2606 to generate a plurality of decompressed tiles/frames 2607. The past state(s) 2611 of the encoder 2600 is stored within a memory device 2610 on the hosting service 210 and the past state(s) 2621 of the decoder 2602 is stored within a memory device 2620 on the client device 205. The "state" of a decoder is a well known term of art in video coding systems such as MPEG-2 and MPEG-4. In one embodiment, the past "state" stored within the memories comprises the combined data from prior P-tiles/frames. The memories 2611 and 2621 may be integrated within the encoder 2600 and decoder 2602, respectively, rather than being detached from the encoder 2600 and decoder 2602, as shown in FIG. 26*a*. Moreover, various types of memory may be used including, by way of example and not limitation, random access memory.

In one embodiment, when no packet loss occurs, the encoder 2600 encodes each P-tile/frame to be dependent on the previous P-tile/frame. Thus, as indicated by the notation used in FIG. 26*a*, P-tile/frame 4 is dependent on P-tile/frame 3 (identified using the notation $4_3$); P-tile/frame 5 is dependent on P-tile/frame 4 (identified using the notation $5_4$); and P-tile/frame 6 is dependent on P-tile/frame 5 (identified using the notation $6_5$). In this example, P-tile/frame $4_3$ has been lost during transmission between the encoder 2600 and the decoder 2602. The loss may be communicated to the encoder 2600 in various ways including, but not limited to, those described above. For example, each time the decoder 2606 successfully receives and/or decodes a tile/frame, this information may be communicated from the decoder 2602 to the encoder 2600. If the encoder 2600 does not receive an indication that a particular tile/frame has been received and/or decoded after a period of time, then the encoder 2600 will assume that the tile/frame has not been successfully received. Alternatively, or in addition, the decoder 2602 may notify the encoder 2600 when a particular tile/frame is not successfully received.

In one embodiment, regardless of how the lost tile/frame is detected, once it is, the encoder 2600 encodes the next tile/frame using the last tile/frame known to have been successfully received by the decoder 2602. In the example shown in FIG. 26*a*, tiles/frames 5 and 6 are not considered "successfully received" because they cannot be properly decoded by the decoder 2602 due to the loss of tile/frame 4 (i.e., the decoding of tile/frame 5 depends on tile/frame 4 and the decoding of tile/frame 6 depends on tile/frame 5). Thus, in the example shown in FIG. 26*a*, the encoder 2600 encodes tile/frame 7 to be dependent on tile/frame 3 (the last successfully received tile/frame) rather than tile/frame 6 which the decoder 2602 cannot properly decode. Although not illustrated in FIG. 26a, tile/frame 8 will subsequently be encoded to be dependent on tile/frame 7 and tile/frame 9 will be encoded to be dependent on tile/frame 8, assuming that no additional packet losses are detected.

As mentioned above, both the encoder 2600 and the decoder 2602 maintain past encoder and decoder states, 2611 and 2621, within memories 2610 and 2620, respectively. Thus, when encoding tile/frame 7, the encoder 2600 retrieves the prior encoder state associated with tile/frame 3 from memory 2610. Similarly, the memory 2620 associated with decoder 2602 stores at least the last known good decoder state (the state associated with P-tile/frame 3 in the example). Consequently, the decoder 2602 retrieves the past state information associated with tile/frame 3 so that tile/frame 7 can be decoded.

As a result of the techniques described above, real-time, low latency, interactive video can be encoded and streamed using relatively small bandwidth because no I-tiles/frames are ever required (except to initialize the decoder and encoder at the start of the stream). Moreover, while the video image produced by the decoder may temporarily include undesirable distortion resulting from lost tile/frame 4 and tiles/frames 5 and 6 (which cannot be properly decoded due to the loss of tile/frame 4), this distortion will be visible for a very short duration. Moreover, if tiles are used (rather than full video frames), the distortion will be limited to a particular region of the rendered video image.

Figure 26B:
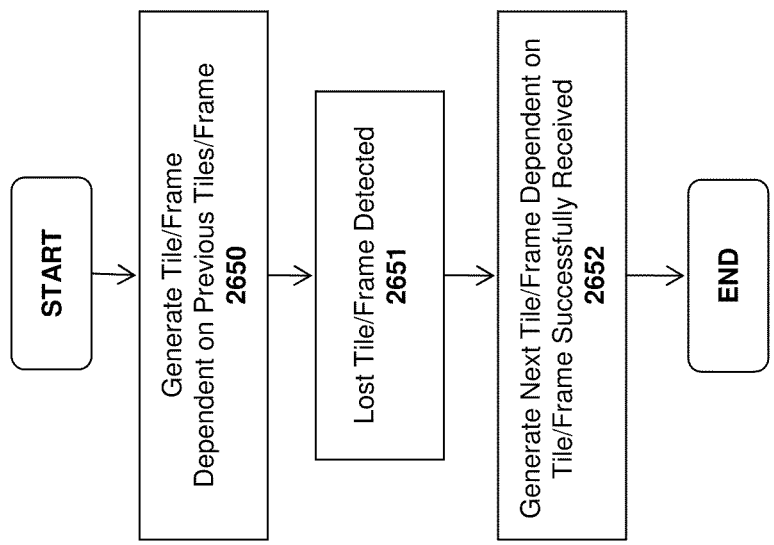

A method according to one embodiment of the invention is illustrated in FIG. 26b. At 2650, a tile/frame is generated based on a previously-generated tile/frame. At 2651, a lost tile/frame is detected. In one embodiment, the lost tile/frame is detected based on information communicated from the encoder to the decoder, as described above. At 2652, the next tile/frame is generated based on a tile/frame which is known to have been successfully received and/or decoded at the decoder. In one embodiment, the encoder generates the next tile/frame by loading the state associated with the successfully received and/or decoded tile/frame from memory. Similarly, when the decoder receives the new tile/frame, it decodes the tile/frame by loading the state associated with the successfully received and/or decoded tile/frame from memory.

In one embodiment the next tile/frame is generated based upon the last tile/frame successfully received and/or decoded at the encoder. In another embodiment, the next tile/frame generated is an I tile/frame. In yet another embodiment, the choice of whether to generate the next tile/frame based on a previously successfully received tile/frame or as an I frame is based on the how many tile/frames were lost and/or the latency of the channel. In a situation where a relatively small number (e.g., 1 or 2) tile/frames are lost and the round-trip latency is relatively low (e.g. 1 or 2 frame times), then it may be optimal to generate a P tile/frame since the difference between the last successfully received tile/frame and the newly generated one may be relatively small. If several tile/frames are lost or the round-trip latency is high, then it may be optimal to generate an I tile/frame since the difference between the last successfully received tile/frame and the newly generated one may be large. In one embodiment, a tile/frame loss threshold and/or a latency threshold value is set to determine whether to transmit an I tile/frame or a P tile/frame. If the number of lost tiles/frames is below the tile/frame loss threshold and/or if the round trip latency is below the latency threshold value, then a new I tile/frame is generated; otherwise, a new P tile/frame is generated.

In one embodiment, the encoder always attempts to generate a P tile/frame relative to the last successfully received tile/frame, and if in the encoding process the encoder determines that the P tile/frame will likely be larger than an I tile/frame (e.g. if it has compressed $\frac{1}{8}^{th}$ of the tile/frame and the compressed size is larger than $\frac{1}{8}^{th}$ of the size of the average I tile/frame previously compressed), then the encoder will abandon compressing the P tile/frame and will instead compress an I tile/frame.

If lost packets occur infrequently, the systems described above using feedback to report a dropped tile/frame typically results in a very slight disruption in the video stream to the user because a tile/frame that was disrupted by a lost packet is replaced in roughly the time of one round trip between the client device 205 and hosting service 210 assuming the encoder 2600 compresses the tile/frame in a short amount of time. And, because the new tile/frame that is compressed is based upon a later frame in the uncompressed video stream, the video stream does not fall behind the uncompressed video stream. But, if a packet containing the new tile/frame also is lost, then this results in a delay of least two round trips to yet again request and send another new tile/frame, which in many practical situations will result in a noticeable disruption to the video stream. As a consequence, it is very important that the newly-encoded tile/frame sent after dropped tile/frame is successfully sent from the hosting service 210 to the client device 205.

In one embodiment, forward-error correction (FEC) coding techniques, such as those previously described and illustrated in FIGS. 11a, 11b, 11c and 11d, are used to mitigate the probability of losing the newly-encoded tile/frame. If FEC coding is already being used when transmitting tiles/frames, then a stronger FEC code is used for the newly-encoded tile/frame.

One potential cause of dropped packets is a sudden loss in channel bandwidth, for example, if some other user of the broadband connection at the user premises 211 starts using a large amount of bandwidth. If a newly-generated tile/frame also is lost due to dropped packets (even if FEC is used), then in one embodiment when hosting service 210 is notified by client 415 that a second newly encoded tile/frame is dropped, video compressor 404 reduces the data rate when it encodes a subsequent newly encoded tile/frame. Different embodiments reduce the data rate using different techniques. For example, in one embodiment, this data rate reduction is accomplished by lowering the quality of the encoded tile/frame by increasing the compression ratio. In another embodiment, the data rate is reduced by lowering the frame rate of the video (e.g. from 60 fps to 30 fps) and accordingly slowing the rate of data transmission. In one embodiment, both techniques for reducing the data rate are used (e.g., both reducing the frame rate and increasing the compression ratio). If this lower rate of data transmission is successful at mitigating the dropped packets, then in accordance the channel data rate detection and adjustment methods previously described, the hosting service 210 will continue encoding at a lower data rate, and then gradually adjust the data rate upward or downward as the channel will allow. The continuous receipt of feedback data related to dropped packets and/or latency allow the hosting service 210 to dynamically adjust the data rate based on current channel conditions.

State Management in an Online Gaming System

Figure 27A:
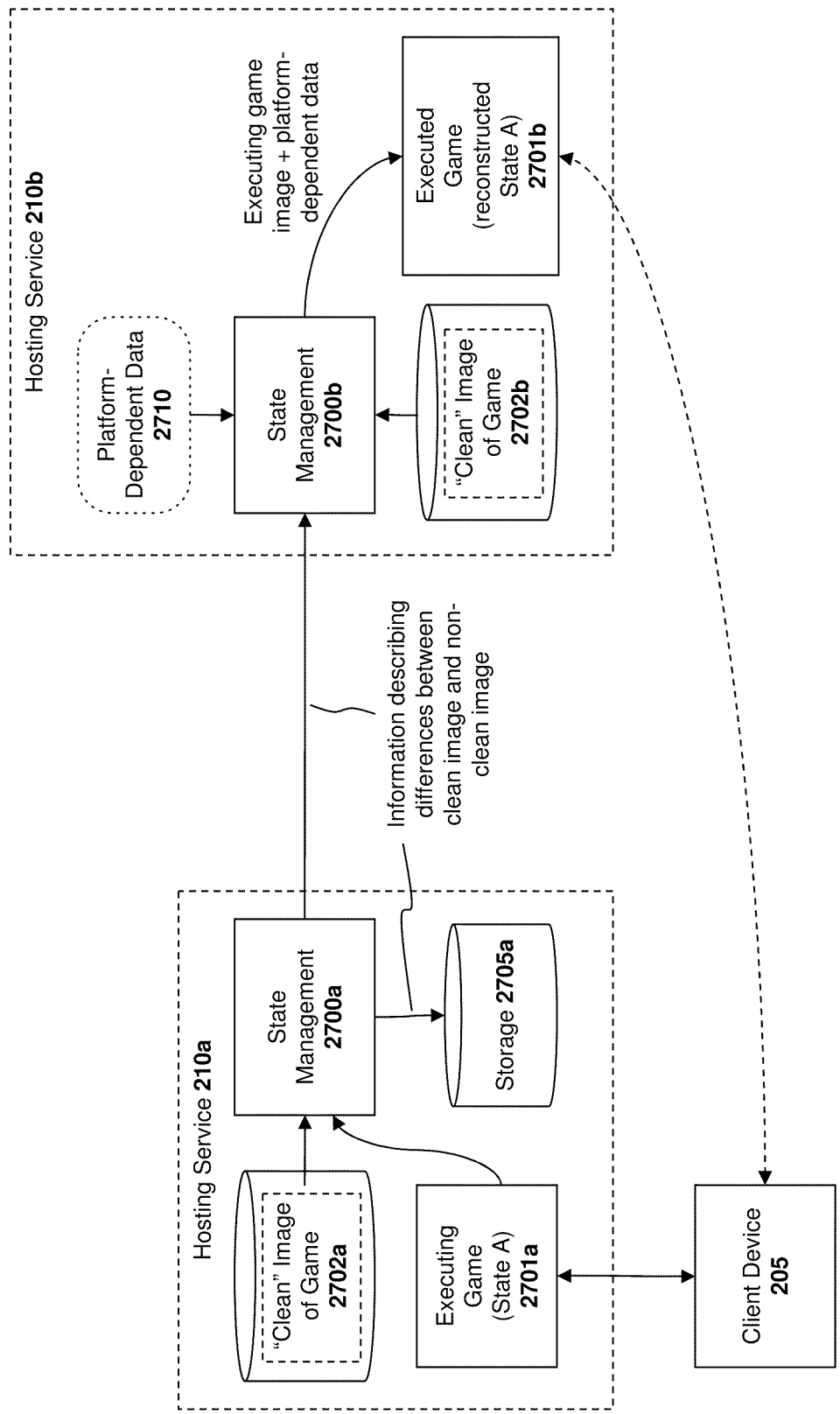
FIGS. 27a-b illustrate an embodiment in which the state of a game or application is ported from a first hosting service or server to a second hosting service or server.
Figure 27B:
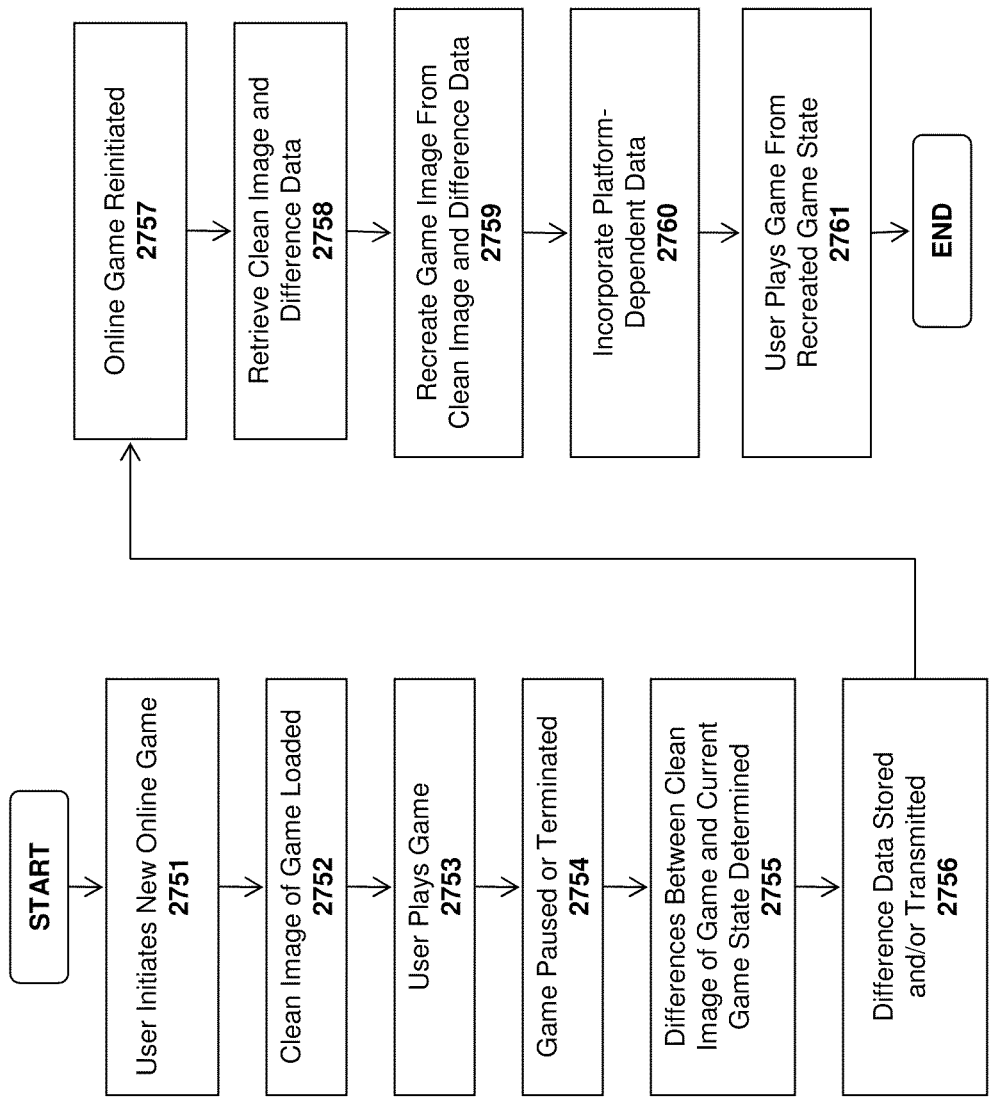

One embodiment of the invention employs techniques to efficiently store and port the current state of an active game between servers. While the embodiments described herein are related to online gaming, the underlying principles of the invention may be used for various other types of applications (e.g., design applications, word processors, communication software such as email or instant messaging, etc). FIG. 27a illustrates an exemplary system architecture for implementing this embodiment and FIG. 27b illustrates an exemplary method. While the method and system architecture will be described concurrently, the method illustrated in FIG. 27b is not limited to any particular system architecture.

At 2751 of FIG. 27b, a user initiates a new online game on a hosting service 210a from a client device 205. In response, at 2752, a "clean" image of the game 2702a is loaded from storage (e.g., a hard drive, whether connected directly to a server executing the game, or connected to a server through a network) to memory (e.g., RAM) on the hosting service 210a. The "clean" image comprises the runtime program code and data for the game prior to the initiation of any game play (e.g., as when the game is executed for the first time). The user then plays the game at 2753, causing the "clean" image to change to a non-clean image (e.g., an executing game represented by "State A" in FIG. 27a). At 2754, the game is paused or terminated, either by the user or the hosting service 210a. At 2755, state management logic 2700a on the hosting service 210a determines the differences between the "clean" image of the game and the current game state ("State A"). Various known techniques may be used to calculate the difference between two binary images including, for example, those used in the well known "diff" utility available on the Unix operating system. Of course, the underlying principles of the invention are not limited to any particular techniques for difference calculation.

Regardless of how the differences are calculated, once they are, the difference data is stored locally within a storage device 2705a and/or transmitted to a different hosting service 210b. If transmitted to a different hosting service 210b, the difference data may be stored on a storage device (not shown) at the new hosting service 210b. In either case, the difference data is associated with the user's account on the hosting services so that it may be identified the next time the user logs in to the hosting services and initiates the game. In one embodiment, rather than being transmitted immediately, the difference data is not transmitted to a new hosting service until the next time the user attempts to play the game (and a different hosting service is identified as the best choice for hosting the game).

Returning to the method shown in FIG. 27b, at 2757, the user reinitiates the game from a client device, which may be the same client device 205 from which the user initially played the game or a different client device (not shown). In response, at 2758, state management logic 2700b on the hosting service 210b retrieves the "clean" image of the game from a storage device and the difference data. At 2759, the state management logic 2700b combines the clean image and difference data to reconstruct the state that the game was in on the original hosting service 210a ("State A"). Various known techniques may be used to recreate the state of a binary image using the difference data including, for example, those used in the well known "patch" utility available on the Unix operating system. The difference calculation techniques used in well known backup programs such as PC Backup may also be used. The underlying principles of the invention are not limited to any particular techniques for using difference data to recreate a binary image.

In addition, at 2760, platform-dependent data 2710 is incorporated into the final game image 2701 b. The platform-dependent data 2710 may include any data which is unique to the destination server platform. By way of example, and not limitation, the platform-dependent data 2710 may include the Medium Access Control (MAC) address of the new platform, the TCP/IP address, the time of day, hardware serial numbers (e.g., for the hard drive and CPU), network server addresses (e.g., DHCP/Wins servers), and software serial number(s)/activation code(s) (including Operating System serial number(s)/activation code(s)).

Other platform-dependent data related to the client/user may include (but is not limited to) the following:

1. The user's screen resolution. When the user resumes the game, the user may be using a different device with a different resolution.

2. The user's controller configuration. When game resumes, the user may have switched from a game controller to a keyboard/mouse.

3. User entitlements, such as whether a discount rate has expired (e.g., if the user was playing the game during a promotional period and is now playing during a normal period at higher cost) or whether the user or device has certain age restrictions (e.g., the parents of the user may have changed the settings for a child so the child is not allowed to see mature material, or if the device playing the game (e.g., a computer at a public library) has certain restrictions on whether mature material can be displayed).

4. The user's ranking. The user may have been allowed to play a multiplayer game in a certain league, but because some other users had exceeded the user's ranking, the user may have been downgraded to a lesser league.

The foregoing examples of platform-dependent data 2710 are provided for the purpose of illustration of this embodiment of the invention. The underlying principles of the invention are not limited to any particular set of platform-dependent data.

Figure 28:
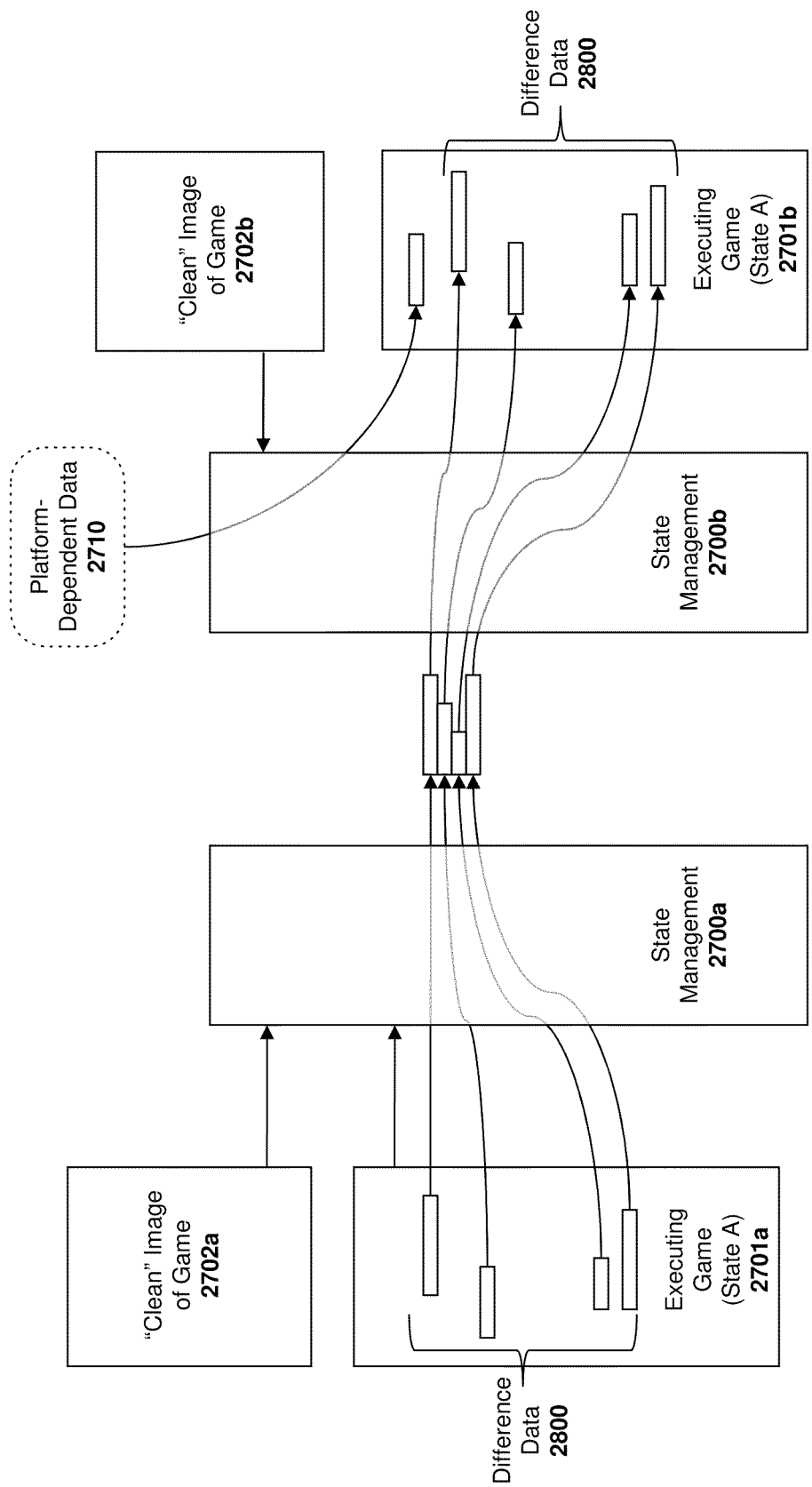
FIG. 28 illustrates one embodiment in which the state of a game or application is ported using difference data.

FIG. 28 graphically illustrates how the state management logic 2700a at the first hosting service extracts difference data 2800 from the executing game 2701a. The state management logic 2700b at the second hosting service then combines the clean image 2702b with the difference data 2800 and platform-dependent data 2710 to regenerate the state of the executing game 2701b. As shown generally in FIG. 28, the size of the difference data is significantly smaller than the size of the entire game image 2701a and, consequently, a significant amount of storage space and bandwidth is conserved by storing/transmitting only difference data. Although not shown in FIG. 28, the platform-dependent data 2700 may overwrite some of the difference data when it is incorporated into the final game image 2701b.

While an online video gaming implementation is described above, the underlying principles of the invention are not limited to video games. For example, the foregoing state management techniques may be implemented within the context of any type of online-hosted application.

Techniques for Maintaining a Client Decoder

In one embodiment of the invention, the hosting service 210 transmits a new decoder to the client device 205 each time the user requests connect to hosting service 210. Consequently, in this embodiment, the decoder used by the client device is always up-to-date and uniquely tailored to the hardware/software implemented on the client device.

Figure 29:
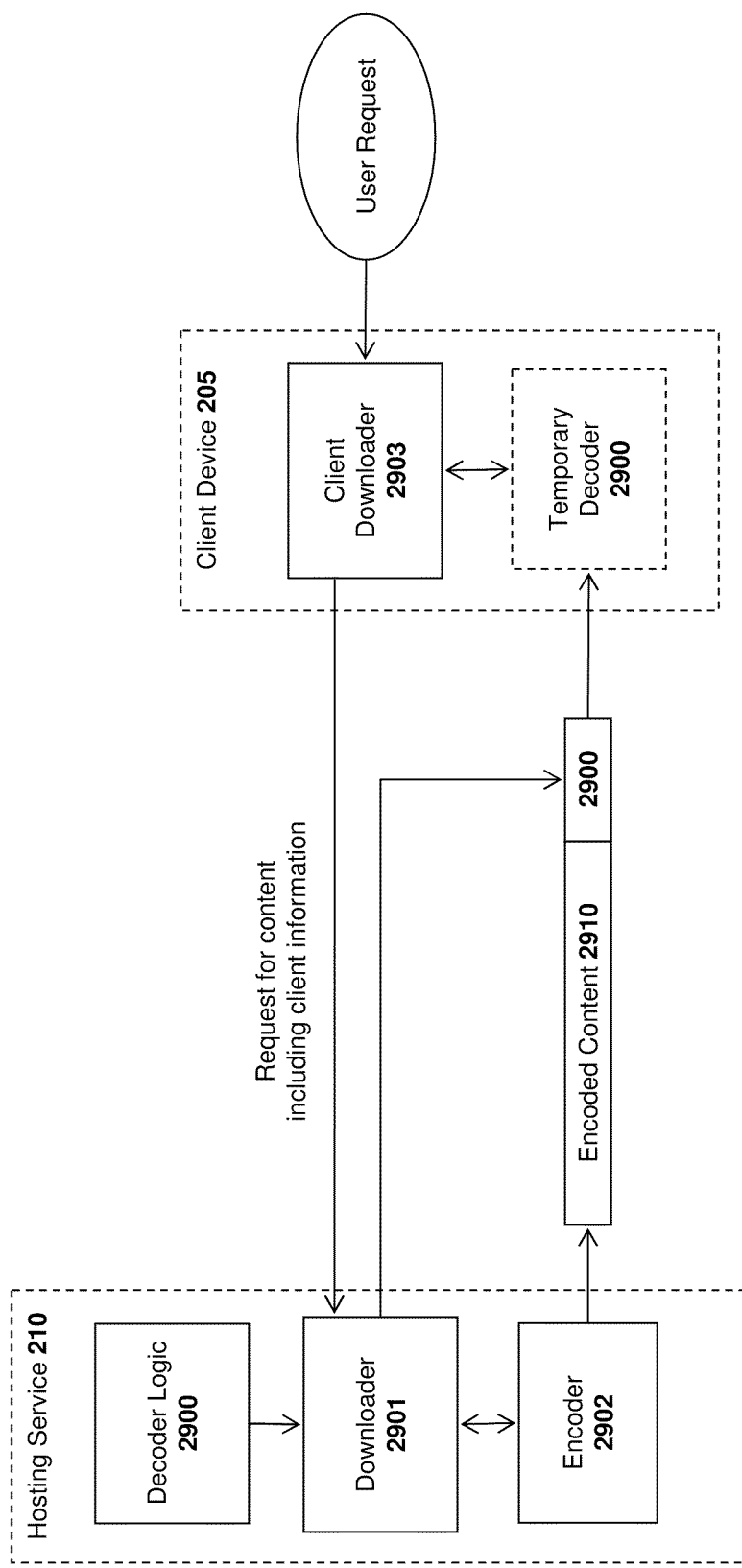
FIG. 29 illustrates one embodiment of the invention which employs a temporary decoder on the client device.

As illustrated in FIG. 29, in this embodiment, the application which is permanently installed on the client device 205 does not include a decoder. Rather, it is a client downloader application 2903 which manages the download and installation of a temporary decoder 2900 each time the client device 205 connects to the hosting service 210. The downloader application 2903 may be implemented in hardware, software, firmware, or any combination thereof. In response to a user request for a new online session, the downloader application 2903 transmits information related to the client device 205 over a network (e.g., the Internet). The information may include identification data identifying the client device and/or the client device's hardware/software configuration (e.g., processor, operating system, etc).

Based on this information, a downloader application 2901 on the hosting service 210 selects an appropriate temporary decoder 2900 to be used on the client device 205. The downloader application 2901 on the hosting service then transmits the temporary decoder 2900 and the downloader application 2903 on the client device verifies and/or installs the decoder on the client device 205. The encoder 2902 then encodes the audio/video content using any of the techniques described herein and transmits the content 2910 to the decoder 2900. Once the new decoder 2900 is installed, it decodes the content for the current online session (i.e., using one or more of the audio/video decompression techniques described herein). In one embodiment, when the session is terminated, the decoder 2900 is removed (e.g., uninstalled) from the client device 205.

In one embodiment the downloader application 2903 characterizes the channel as the temporary decoder 2900 is being downloaded by making channel assessments such as the data rate achievable on the channel (e.g. by determining how long it takes for data to download), the packet loss rate on the channel, and the latency of the channel. The downloader application 2903 generates channel characterization data describing the channel assessments. This channel characterization data is then transmitted from the client device 205 to the hosting service downloader 2901, which uses the channel characterization data to determine how best to utilize the channel to transmit media to the client device 205.

The client device 205 typically will send back messages to the hosting service 205 during the downloading of the temporary decoder 2900. These messages can include acknowledgement messages indicating whether packets were received without errors or with errors. In addition, the messages provide feedback to the downloader 2901 as to the data rate (calculated based on the rate at which packets are received), the packet error rate (based on the percentage of packets reported received with errors), and the round-trip latency of the channel (based on the amount of time that it takes before the downloader 2901 receives feedback about a given packet that has been transmitted).

By way of example, if the data rate is determined to be 2 Mbps, then the downloader may choose a smaller video window resolution for the encoder 2902 (e.g. 640×480 at 60 fps) than if the data rate is determined to be 5 Mbps (e.g. 1280× 720 at 60 fps). Different forward error correction (FEC) or packet structures may be chosen, depending on the packet loss rate.

If the packet loss is very low, then the compressed audio and video may be transmitted without any error correction. If the packet loss is medium, then the compressed audio and video may be transmitted with error correction coding techniques (e.g., such as those previously described and illustrated in FIGS. 11a, 11b, 11c and 11d). If the packet loss is very high, it may be determined that an audiovisual stream of adequate quality cannot be transmitted, and the client device 205 may either notify the user that the hosting service is not available through the communications channel (i.e. the "link"), or it may try to establish a different route to the hosting service that has a lower packet loss (as described below).

If the latency is low, then the compressed audio and video can be transmitted with low latency and a session can be established. If the latency is too high (e.g. higher than 80 ms) then, for games which require low latency, the client device 205 may either notify the user that the hosting service is not available through the link, that a link is available but the response time to user input will be sluggish or "laggy," or that the user can try to establish a different route to the hosting service that has a lower latency (as described below).

The Client Device 205 may try to connect to the Hosting Service 210 through another route through the network (e.g. the Internet) to see if impairments are reduced (e.g. the packet loss is lower, the latency is lower, or even if the data rate is higher). For example, the Hosting Service 210 may connect to the Internet from multiple locations geographically (e.g., a hosting center in Los Angeles and one in Denver), and perhaps there is high packet loss due to congestion in Los Angeles, but there is not congestion in Denver. Also, the Hosting Service 210 may connect to the Internet through multiple Internet service providers (e.g. AT&T and Comcast).

Because of congestion or other issues between the client device 205 and one of the service providers (e.g. AT&T), packet loss and/or high latency and/or constrained data rate may result. However, if the Client Device 205 connects to the hosting service 210 through another service provider (e.g., Comcast), it may be able to connect without congestion problems and/or lower packet loss and/or lower latency and/or higher data rate. Thus, if the client device 205 experiences packet loss above a specified threshold (e.g., a specified number of dropped packets over a specified duration), latency above a specified threshold and/or a data rate below a specified threshold while downloading the temporary decoder 2900, in one embodiment, it attempts to reconnect to the hosting service 210 through an alternate route (typically by connecting to a different IP address or different domain name) to determine if a better connection can be obtained.

If the connection is still experiencing unacceptable impairments after alternative connection options are exhausted, then it could be that the client device 205's local connection to the Internet is suffering from impairments, or that it is too far away from the hosting service 210 to achieve adequate latency. In such a case the client device 205 may notify the user that the Hosting Service is not available through the link or that it is only available with impairments, and/or the only certain types of low-latency games/applications are available.

Since this assessment and potential improvement of the link characteristics between the Hosting Service 210 and the Client Device 205 occurs while the temporary decoder is being downloaded, it reduces the amount of time that the client device 205 would need to spend separately downloading the temporary decoder 2900 and assessing the link characteristics. Nonetheless, in another embodiment, the assessment and potential improvement of the link characteristics is performed by the client device 205 separately from downloading the temporary decoder 2900 (e.g., by using dummy test data rather than the decoder program code). There are number of reasons why this may be a preferable implementation. For example, in some embodiments, the client device 205 is implemented partially or entirely in hardware. Thus, for these embodiments, there is no software decoder per se necessary to download.

Compression Using Standards-Based Tile Sizes

As mentioned above, when tile-based compression is used, the underlying principles of the invention are not limited to any particular tile size, shape, or orientation. For example, in a DCT-based compression system such as MPEG-2 and MPEG-4, tiles may be the size of macroblocks (components used in video compression which typically represent a block of 16 by 16 pixels). This embodiment provides a very fine level of granularity for working with tiles.

Figure 30:
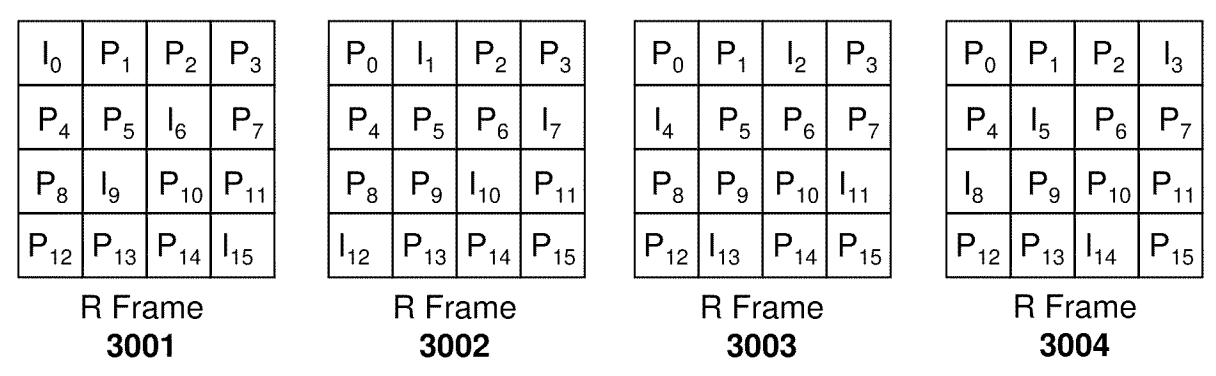

Moreover, regardless of tile size, various types of tiling patterns may be used. For example, FIG. 30 illustrates an embodiment in which multiple I-tiles are used in each R frame 3001-3004. A rotating pattern is used in which I-tiles are dispersed throughout each R frame so that a full I-frame is generated every four R frames. Dispersing the I-tiles in this manner will reduce the effects of a packet loss (limiting the loss to a small region of the display).

The tiles may also be sized to an integral native structure of the underlying compression algorithm. For example, if the H.264 compression algorithm is used, in one embodiment, tiles are set to be the size of H.264 "slices." This allows the techniques described herein to be easily integrated the context of various different standard compression algorithms such as H.264 and MPEG-4. Once the tile size is set to a native compression structure, the same techniques as those described above may be implemented.

Techniques for Stream Rewind and Playback Operations

As previously described in connection with FIG. 15, the uncompressed video/audio stream 1529 generated by an app/game server 1521-1525 may be compressed by shared hardware compression 1530 at multiple resolutions simultaneously resulting in multiple compressed video/audio streams 1539. For example, a video/audio stream generated by app/game server 1521 may be compressed at 1280×720× 60 fps by the shared hardware compression 1530 and transmitted to a user via outbound routing 1540 as outbound Internet traffic 1599. That same video/audio stream may be simultaneously scaled down to thumbnail size (e.g. 200×113) by the shared hardware compression 1530 via path 1552 (or through delay buffer 1515) to app/game server 1522 to be displayed as one thumbnail 1600 of a collection of thumbnails in FIG. 16. When thumbnail 1600 is zoomed through intermediate size 1700 in FIG. 17 to size 1800 (1280×720×60 fps) in FIG. 18, then rather than decompressing the thumbnail stream, app/game server 1522 can decompress a copy of the 1280×720×60 fps stream being sent to the user of app/game server 1521, and scale the higher resolution video as it is zoomed from thumbnail size to 1280×720 size. This approach has the advantage of reutilizing the 1280×720 compressed stream twice. But it has several disadvantages: (a) the compressed video stream sent to the user may vary in image quality if the data throughput of the user's Internet connection varies resulting in a varying image quality viewed by the "spectating" user of app/game server 1522, even if that user's Internet connection does not vary, (b) app/game server 1522 will have to use processing resources to decompress the entire 1280×720 image and then scale that image (and likely apply a resampling filter) to display much smaller sizes (e.g. 640× 360) during the zoom, (c) if frames are dropped due to limited Internet connection bandwidth and/or lost/corrupted packets, and the spectating user "rewinds" and "pauses" the video recorded in the delay buffer 1515, the spectating user will find the dropped frames are missing in the delay buffer (this will be particularly apparent if the user "steps" frame-by-frame), and (d) if the spectating user rewinds to find a particular frame in the video recorded in the delay buffer, then the app/game server 1522 will have to find an I frame or I tiles prior to the sought frame in the video stream recorded in the delay buffer, and then decompress all of the P frames/tiles until the desired frame is reached. This same limitations would not only apply to users "spectating" the video/audio stream live, but users (including the user that generated the video/audio stream) viewing an archived (e.g. "Brag Clip") copy of the video/ audio stream.

An alternative embodiment of the invention addresses these issues by compressing the video stream in more than one size and/or structure. One stream (the "Live" stream) is compressed optimally to stream to the end user, as described herein, based on the characteristics of the network connection (e.g. data bandwidth, packet reliability) and the user's local client capabilities (e.g., decompression capability, display resolution). Other streams (referred to herein as "HQ" streams) are compressed at high quality, at one or more resolutions, and in a structure amenable to video playback, and such HQ streams are routed and stored within the server center 210. For example, in one embodiment, the HQ compressed streams are stored on a RAID disk array 1515 and are used to provide functions such as pause, rewind, and other playback functions (e.g., "Brag Clips" which may be distributed to other users for viewing).

Figure 31A:
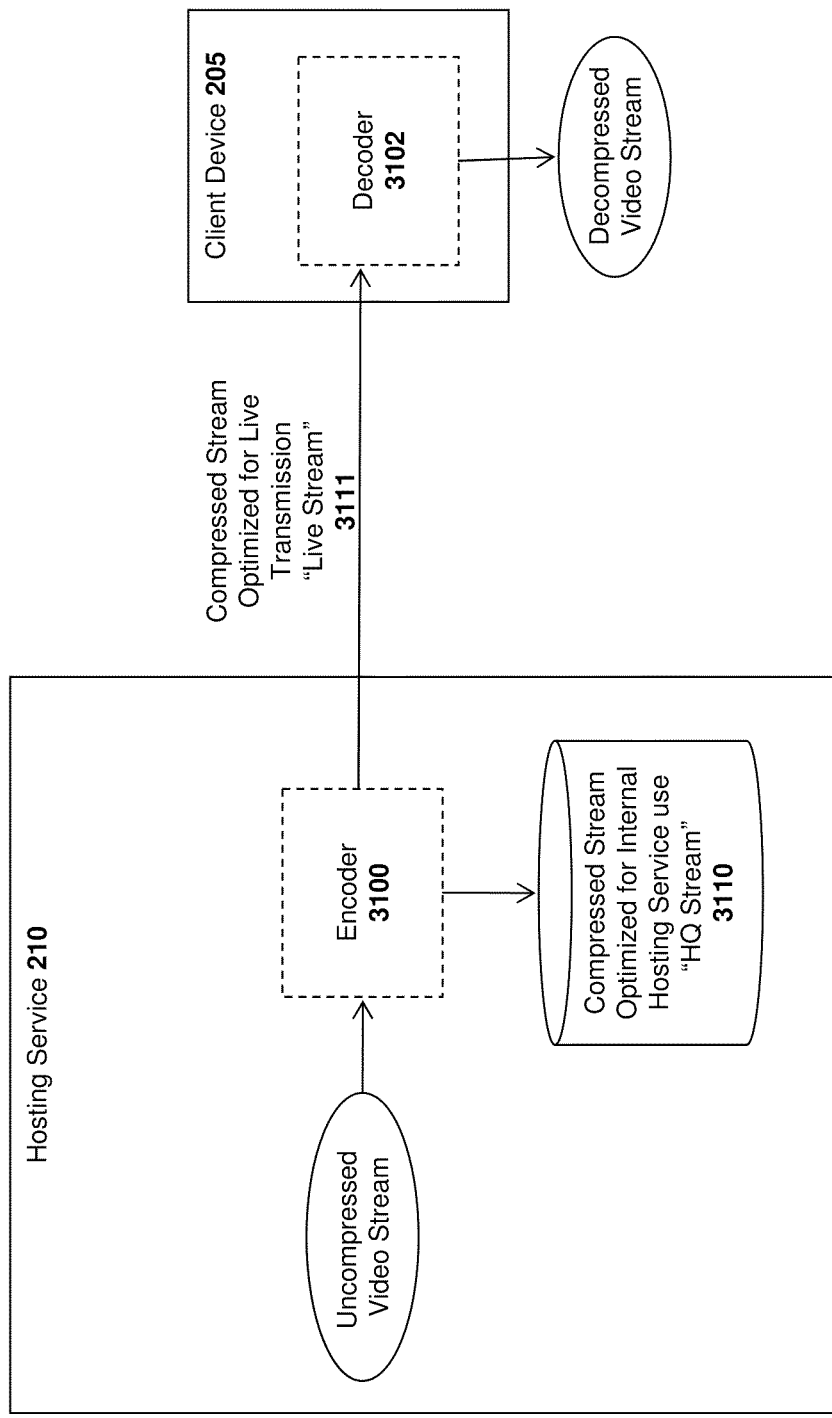
FIGS. 31a-h illustrate embodiments of the invention which generate a live stream and/or one or more HQ streams.

As illustrated in FIG. 31*a*, one embodiment of the invention comprises an encoder 3100 capable of compressing a video stream in at least two formats: one which periodically includes I-Tiles or I-Frames 3110 and one which does not include I-Tiles or I-Frames 3111, unless necessary due to a disruption of the stream or because an I-Tile or I-Frame is determined to likely be smaller than an I-Tile or I-Frame (as described above). For example, the "Live" stream 3111 transmitted to the user while playing a video game may be compressed using only P-Frames (unless I-Tiles or I-Frames are necessary or smaller as described above). In addition, the encoder 3100 of this embodiment concurrently compresses the Live video stream 3111 in a second format which, in one embodiment, periodically includes I-Tiles or I-Frames (or similar type of image format).

While the embodiments described above employ I-Tiles, I-Frames, P-Tiles and P-Frames, the underlying principles of the invention are not limited to any particular compression algorithm. For example, any type of image format in which frames are dependent on previous or subsequent frames may be used in place of P-Tiles or P-Frames. Similarly, any type of image format which is not dependent on previous or subsequent frames may be substituted in place of the I-Tiles or I-Frames described above.

As mentioned above, the HQ Stream 3110 includes periodic I-Frames (e.g., in one embodiment, every 12 frames or so). This is significant because if the user ever wants to quickly rewind the stored video stream to a particular point, I-Tiles or I-Frames are required. With a compressed stream of only P-Frames (i.e. without the first frame of the sequence being an I-Frame), it would be necessary for the decoder go back to the first frame of the sequence (which might be hours long) and decompress P frames up to the point to which the user wants to rewind. With an I-Frame every 12 frames stored in the HQ stream 3110, the user can decide to rewind to a particular spot and the nearest preceding I-Frame of the HQ stream is no more than 12 frames prior to the desired frame. Even if the decoder maximum decode rate is real-time (e.g. $\frac{1}{60}^{th}$ of a second for a 60 frame/sec stream), then 12 (frames)/ 60 (frames/sec)=⅕second away from an I-Frame. And, in many cases, decoders can operate much faster than real-time so, for example, at 2× real-time a decoder could decode 12 fames in 6 frames, which is just $\frac{1}{10}^{th}$ of a second delay for a "rewind". Needless to say, that even a fast decoder (e.g. 10× real-time) would have an unacceptable delay if the nearest preceding I-Frame were a large number of frames previous to a rewind point (e.g. it would take 1 hour/10=6 minutes to do a "rewind"). In another embodiment, periodic I-Tiles are used, and in this case when the user seeks to rewind the decoder will find the nearest preceding I-Tile prior to the rewind point, and then commence decoding of that tile from that point until all tiles are decoded through to the rewind point. Although periodic I-Tiles or I-Frames result in less efficient compression than eliminating I-Frames entirely, the hosting service 210 typically has more than enough locally available bandwidth and storage capacity to manage the HQ stream.

In another embodiment the encoder 3100 encodes the HQ stream with periodic I-Tile or I-Frames, followed by P-Tiles or P-Frames, as previously described, but also preceded by B-Tiles or B-Frames. B-Frames, as described previously are frames that precede an I-Frame and are based on frame differences from the I-Frame working backwards in time. B-Tiles are the tile counterpart, preceding an I-Tile and based on frame differences working backwards from the I-Tile. In this embodiment, if the desired rewind point is a B-Frame (or contains B-Tiles), then the decoder will find the nearest succeeding I-Frame or I-Tile and decode backwards in time until the desired rewind point is decoded, and then as video playback proceeds from that point forward, the decoder will decode B-Frames, I-Frames and P-Frames (or their tile counterparts) in successive frames going forward. An advantage of employing B-Frames or B-Tiles in addition to I and P types is that, often higher quality at a given compression ratio can be achieved.

In yet another embodiment, the encoder 3100 encodes the HQ stream as all I-Frames. An advantage of this approach is that every rewind point is an I-Frame, and as a result, no other frames need to be decoded in order to reach the rewind point. A disadvantage is the compressed data rate will be very high compared to I, P or I, P, B stream encoding.

Other video stream playback actions (e.g. fast or slow rewind, fast or slow forward, etc.), typically are much more practically accomplished with periodic I-Frames or I-Tiles (alone or combined with P and/or B counterparts), since in each case the stream is played back in a different frame order than frame-by-frame forward in time, and as a result, the decoder needs to find and decode a particular, often arbitrary, frame in the sequence. For example, in the case of very fast-forward (e.g. 100× speed), each successive frame displayed is 100 frames after the prior frame. Even with a decoder that runs at 10× real-time and decodes 10 frames in 1 frame time, it would still be 10× too slow to achieve 100× fast-forward. Whereas, with periodic I-Frames or I-Tiles as described above, the decoder is able to seek the nearest applicable I-Frame or I-Tiles to the frame it needs to display next and only decode the intervening frames or tiles to the point of the target frame.

In another embodiment I-Frames are encoded in the HQ stream at a consistent periodicity (e.g. always each 8 frames) and the speed multipliers made available to the user for fast forward and rewind that are faster than the I-Frame rate are exact multiples of the I-Frame periodicity. For example, if the I-Frame periodicity is 8 frames, then the fast-forward or rewind speeds made available to the user might be 1×, 2×, 3×, 4×, 8×, 16×, 64× and 128× and 256×. For speeds faster than the I-Frame periodicity, the decoder will first jump ahead to the closest I-Frame that is the number of frames ahead at the speed (e.g., if the currently displayed frame is 3 frames prior to an I-Frame, then at 128×, the decoder would jump to a frame 128+3 frames ahead), and then for each successive frame the decoder would jump the exact number of frames as the chosen speed (e.g. at the chosen speed of 128×, the decoder would jump 128 frames) which would land exactly on an I-Frame each time. Thus, given that all speeds faster than the I-Frame periodicity are exact multiples of the I-Frame periodicity, the decoder will never need to decode any preceding or following frames to seek the desired frame, and only will have to decode one I-Frame per displayed frame. For speeds slower than the I-Frame periodicity (e.g. 1×, 2×, 3×, 4×), or for speeds faster that are non-multiples of the I-Frame periodicity, for each frame displayed, the decoder seeks whichever frames require the least additional newly decoded frames to display the desired frame, be it an undecoded I-Frame or an already-decoded frame still available in decoded form (in RAM or other fast storage), and then decode intervening frames, as necessary, until the desired frame is decoded and displayed. For example, at 4× fast forward, in an I,P encoded sequence with 8× I-Frame periodicity, if the current frame is a P-frame that is 1 frame following an I-frame, then the desired frame to be displayed is 4 frames later, which would be the $5^{th}$ P-Frame following the preceding I-frame. If the currently displayed frame (which had just been decoded) is used as a starting point, the decoder will need to decode 4 more P-frames to display the desired frame if the preceding I-Frame is used, the decoder will need to decode 6 frames (the I-Frame and the succeeding 5 P-Frames) in order to display the desired frame. (Clearly, in this case, it is advantageous to use the currently displayed frame to minimize the additional frames to decode.). Then, the next frame to be decoded, 4 frames ahead, would be the $1^{st}$ P-Frame following an I-Frame. In this case, if the currently decoded frame were used as a starting point, the decoder would need to decode 4 more frames (2 P-Frames, an I-Frame and a P-Frame). But, if the next I-Frame were used instead, the decoder would only need to decode the I-Frame and the successive P-Frame. (Clearly, in this case, it is advantageous to use the next I-frame as a starting point to minimize the additional frames to decode.) Thus, in this example, the decoder would alternate between using the currently decoded frame as a starting point and using a subsequent I-Frame as a starting point. As a general principal, regardless of the HQ video stream playback mode (fast-forward, rewind or step) and speed, the decoder would start with whichever frame, be it an I-Frame or a previously decoded frame, requires the least number of newly decoded frames to display the desired frame for each successive frame displayed for that playback mode and speed.

Figure 31B:
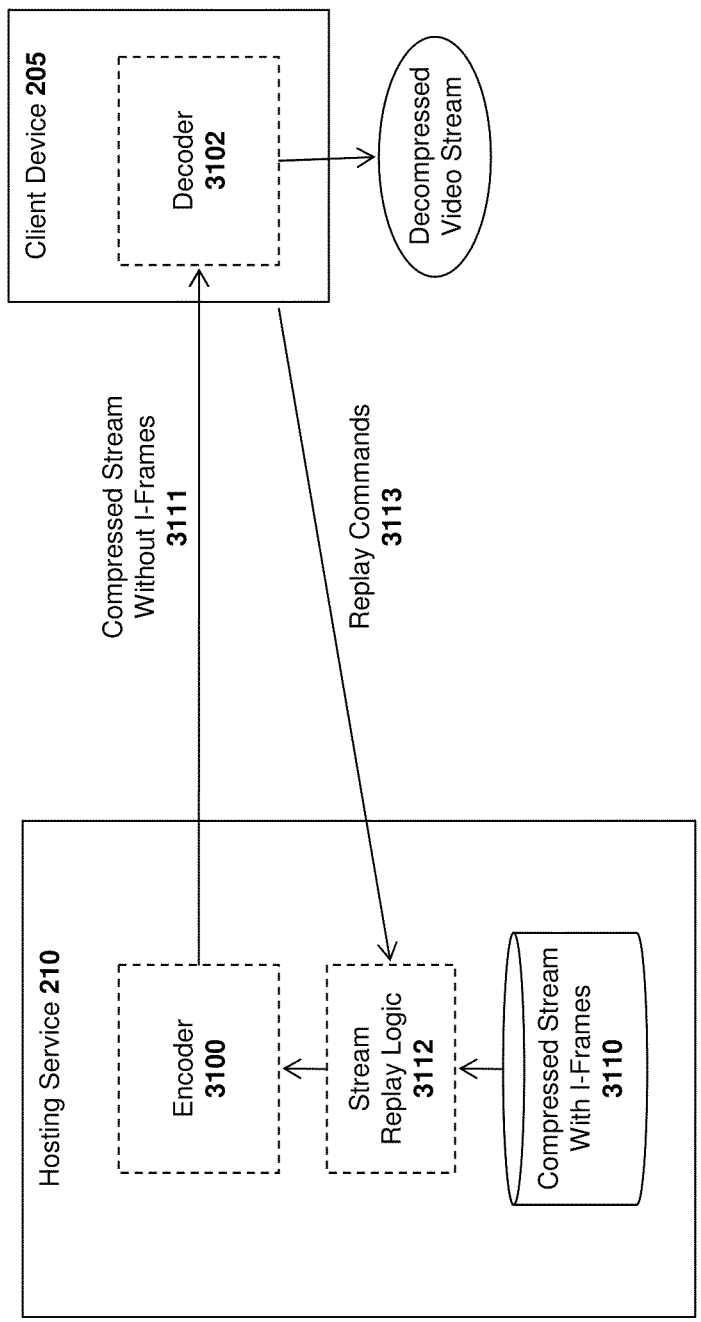

As illustrated in FIG. 31b, one embodiment of the hosting service 210 includes stream replay logic 3112 for managing user requests to replay the HQ stream 3110. The stream replay logic 3112 receives client requests containing video playback commands (e.g., pause, rewind, playback from a specified point, etc), interprets the commands, and decodes the HQ stream 3110 from the specified point (either starting with either an I-Frame or previously decoded frame, as appropriate, and then proceeding forward or backward to the specified point). In one embodiment, a decoded HQ stream is provided to an encoder 3100 (potentially the self-same encoder 3100, if capable of encoding more than one stream at once, or a separate encoder 3100) so that it may be recompressed (using the techniques described herein) and transmitted to the client device 205. The decoder 3102 on the client device then decodes and renders the stream as described above.

In one embodiment, the stream replay logic 3112 does not decode the HQ stream and then cause the encoder 3100 to re-encode the stream. Rather, it simply streams the HQ stream 3110 directly to the client device 205 from the specified point. The decoder 3102 on the client device 205 then decodes the HQ stream. Because the playback functions described herein do not typically have the same low-latency requirements as playing a real-time video game (e.g. if the player is simply reviewing prior gameplay, not actively playing), the added latency typically inherent in the usually higher-quality HQ stream may result in an acceptable end user experience (e.g., with higher latency but higher-quality video).

By way of example, and not limitation, if the user is playing a video game, the encoder 3100 is providing a Live stream of essentially all P-frames optimized for the user's connection and local client (e.g., approximately 1.4 Mbps at a 640×360 resolution). At the same time, the encoder 3100 is also compressing the video stream as an HQ stream 3110 within the hosting service 310 and storing the HQ stream on a local Digital Video Decoder RAID array at, for example, 1280× 720 at 10 Mbps with I-frames every 12 frames. If the user hits a "Pause" button, then game will be paused on the client's last decoded frame and the screen will freeze. Then if the user hits a "Rewind" button, the stream replay logic 3112 will read the HQ stream 3110 from the DVR RAID starting from the closest I-frame or available already-decoded frame, as described above. The stream replay logic 3112 will decompress the intervening P or B frames, as necessary, re-sequence the frames as necessary so that the playback sequence is backwards at the desired rewind speed, and then resize (using prior art image scaling techniques well-known in the art) the desired decoded intended to be displayed from 1280×720 to 640×360, and the Live stream encoder 3100 will re-compress the re-sequenced stream at 640×360 resolution and transmit it to the user. If the user pauses again, and then single-steps through the video to watch a sequence closely, the HQ stream 3110 on the DVR RAID will have every frame available for single stepping (even though the original Live stream may have dropped frames for any of the many reasons described herein). Further, the quality of the video playback will be quite high at every point in the HQ stream, whereas there may be points in the Live stream where, for example, the bandwidth had been impaired, resulting in a temporary reduction in compressed image quality. While impaired image quality for a brief period of time, or in a moving image, may be acceptable for the user, if the user stops at a particular frame (or single-steps slowly) and studies frames closely, impaired quality may not be acceptable. The user is also provided with the ability to fast forward, or jump to a particular spot, by specifying a point within the HQ stream (e.g., 2 minutes prior). All of these operations would be impractical in their full generality and at high quality with a Live video stream that was P-frame-only or rarely (or unpredictably) had I-Frames.

In one embodiment, the user is provided with a video window (not shown) such as a Apple QuickTime or Adobe Flash video window with a "scrubber" (i.e., a left-right slider control) that allows the user to sweep forward and backward through the video stream, as far back as the HQ stream has stored the video. Although it appears to the user as if he or she is "scrubbing" through the Live stream, in fact he or she is scrubbing through the stored HQ stream 3110, which is then resized and recompressed as a Live stream. In addition, as previously mentioned, if the HQ stream is watched by anyone else at the same time, or the user at a different time, it can be watched a higher (or lower) resolution than the Live stream's resolution while the HQ stream is simultaneously encoded, and the quality will be as high as the quality of the viewer's Live stream, potentially up to the quality of the HQ stream.

Thus, by simultaneously encoding both the Live stream (as described herein in an appropriate manner for its low-latency, bandwidth and packet error-tolerance requirements) and an HQ stream with its high-quality, stream playback action requirements, the user is thereby provided with desired configuration of both scenarios. And, in fact, it is effectively transparent to the user that there are two different streams being encoded differently. From the user's perspective, the experience is highly responsive with low-latency, despite running on an highly variable and relatively low bandwidth Internet connection, yet the Digital Video Recording (DVR) functionality is very high quality, with flexible actions and flexible speeds.

As a result of the techniques described above, the user receives the benefits of both Live and HQ video stream during online gameplay or other online interaction, without suffering from any of the limitations of either a Live stream or an HQ stream.

Figure 31C:
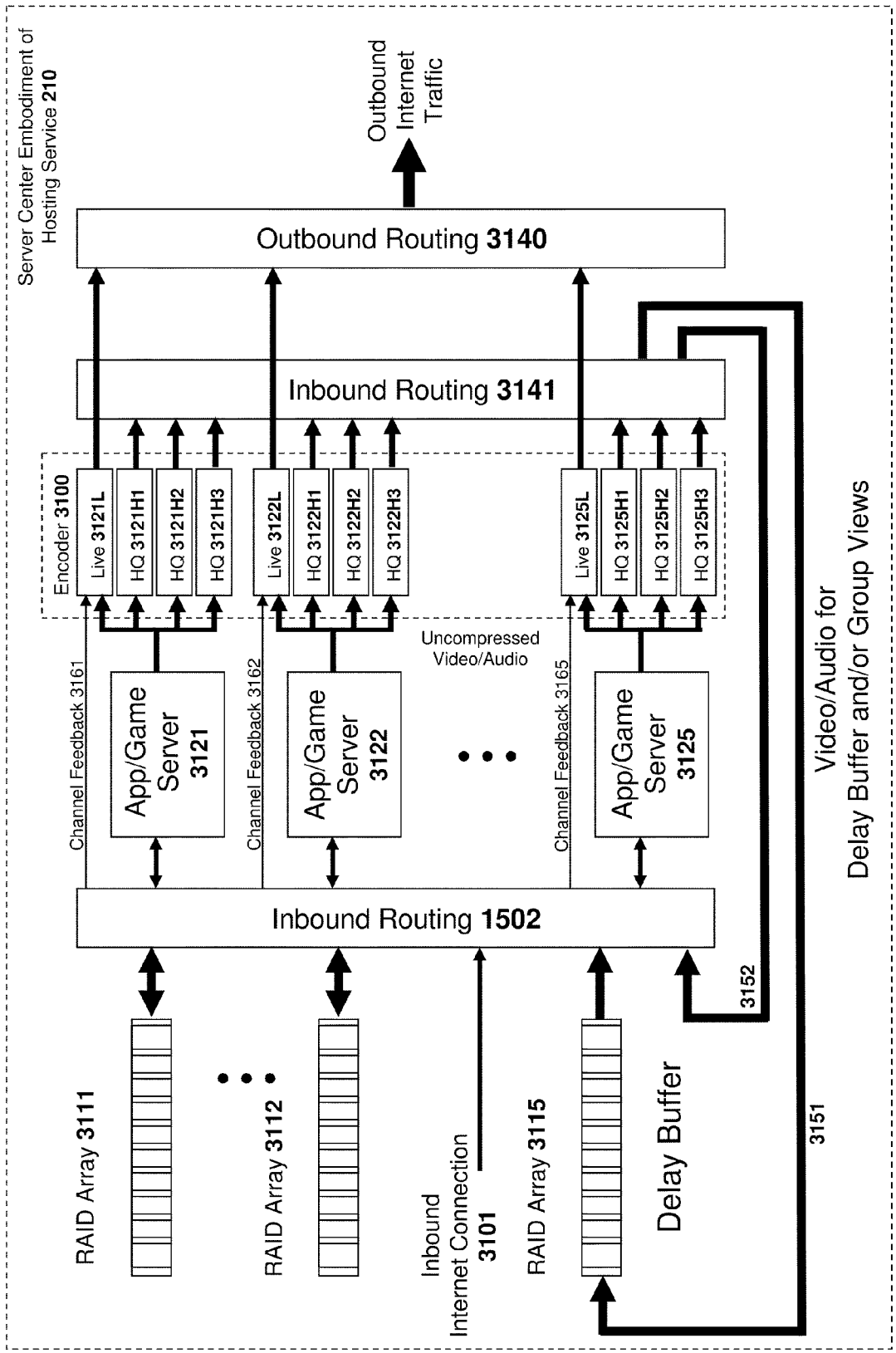

FIG. 31c illustrates one embodiment of a system architecture for performing the above operations. As illustrated, in this embodiment, the encoder 3100 encodes a series of "Live" streams 3121L, 3122L, and 3125L and a corresponding series of "HQ" streams 3121H1-H3, 3122H1-H3, and 3125H1-H3, respectively. Each HQ stream H1 is encoded at full resolution, while each encoder H2, and H3 scales to the video stream to a smaller size prior to encoding. For example, if the video stream were 1280×720 resolution, H1 would encode at 1280×720 resolution, while H2 could scale to 640×360 and encode at that resolution and H3 could scale to 320×180 and encode at that resolution. Any number of simultaneous Hn scaler/encoders could be used, providing multiple simultaneous HQ encodings at a variety of resolutions.

Each of the Live streams operate in response to channel feedback signals 3161, 3162, and 3165 received via an inbound Internet connection 3101, as described above (see, e.g., the discussion of feedback signals 2501 and 2601 in FIGS. 25-26). The Live streams are transmitted out over the Internet (or other network) via outbound routing logic 3140. The Live compressors 3121L-3125L include logic for adapting the compressed video streams (including scaling, dropping frames, etc.) based on channel feedback.

The HQ streams are routed by inbound routing logic 3141 and 1502 to internal delay buffers (e.g., RAID array 3115) or other data storage devices via signal path 3151 and/or are fed back via signal path 3152 into app/game servers and encoder 3100 for additional processing. As described above, the HQ streams 3121Hn-3125Hn are subsequently streamed to end users upon request (see, e.g., FIG. 31b and associated text).

In one embodiment, the encoder 3100 is implemented with the shared hardware compression logic 1530 shown in FIG. 15. In another embodiment some, or all of the encoders and scalers are individual subsystems. The underlying principles of the invention are not limited to any particular sharing of scaling or compression resources or hardware/software configuration.

An advantage of the configuration of FIG. 31c is that App/Game Servers 3121-3125 that require smaller that full-size video windows will not need to process and decompress a full-size window. Also, App/Game Services 3121-3125 that require in-between window sizes can receive a compressed stream that is near the desired window size, and then scale up or down to the desired window size. Also, if multiple App/Game Servers 3121-3125 request the same size video stream from another App/Game Server 3121-3125, Inbound Routing 3141 can implement IP multicast techniques, such as those well-known in the art, and broadcast the requested stream to multiple App/Game Servers 3121-3125 at once, without requiring an independent stream to each App/Game Server making a request. If an App/Game server receiving a broadcast changes the size of a video window, it can switch over to the broadcast of a different video size. Thus, an arbitrarily large number of users can simultaneously view a App/Game Server video stream, each with the flexibility of scaling their video windows and always getting the benefit of a video stream scaled closely to the desired window size.

One disadvantage with the approach shown in FIG. 31c is that in many practical implementations of the Hosting Service 210, there is never a time when all of the compressed HQ streams, let alone all of the sizes of all of the compressed HQ streams, are viewed at once. When encoder 3100 is implemented as a shared resource (e.g. a scaler/compressor, either implemented in software or hardware), this wastefulness is mitigated. But, there may be practical issues in connecting a large number of uncompressed streams to a common shared resource, due to the bandwidth involved. For example, each 1080p60 stream is almost 3 Gbps, which is far in excess of even Gigabit Ethernet. The following alternate embodiments address this issue.

Figure 31D:
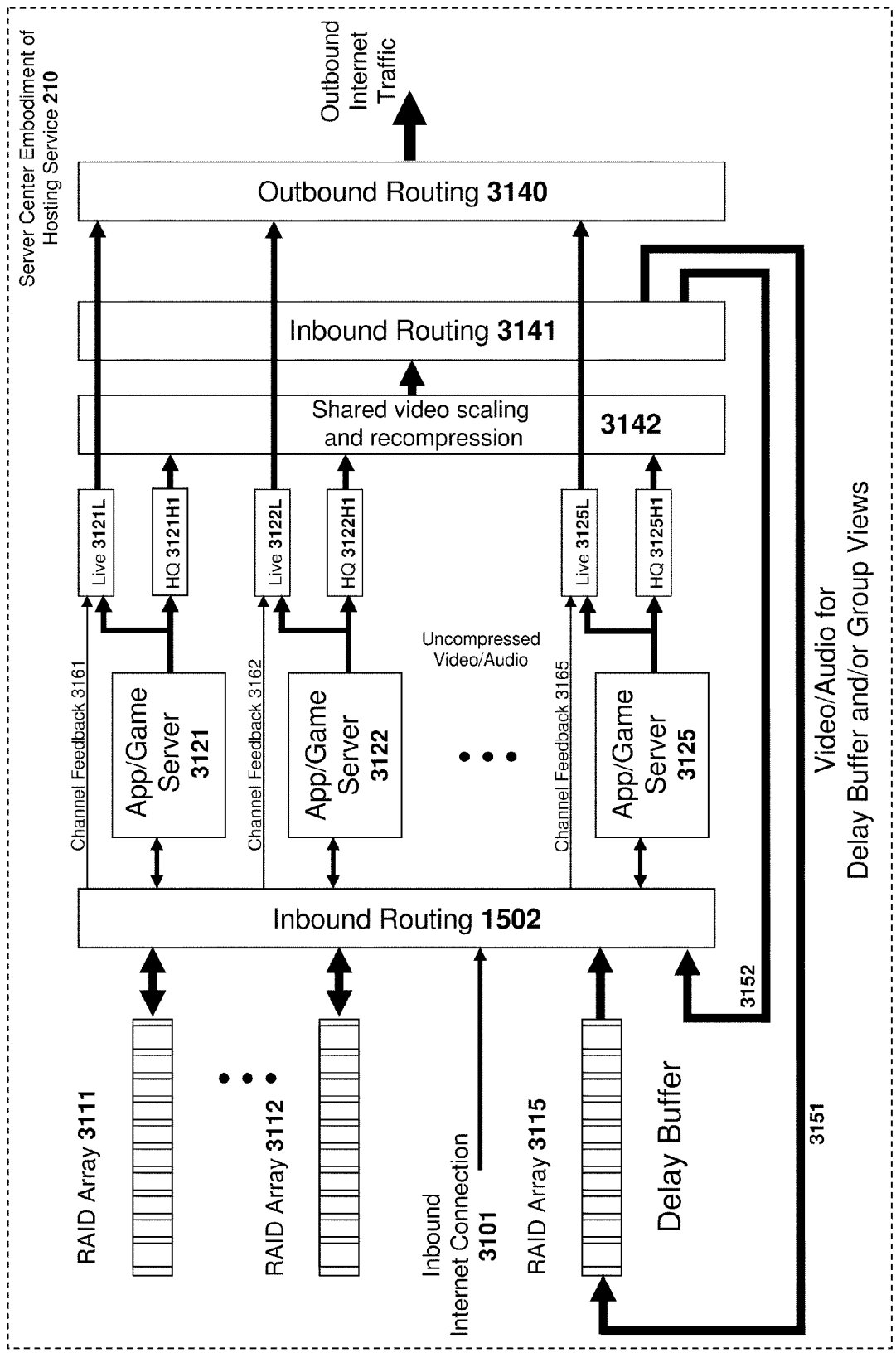

FIG. 31d shows an alternative embodiment of the Hosting Service 210 in which each App/Game Server 3121-3125 has two compressors allocated to it: (1) a Live stream compressor 3121L-3125L, that adapts the compressed video stream based on Channel Feedback 3161-3165, and (2) an HQ stream compressor that outputs a full-resolution HQ stream, as described above. Notably, the Live compressor is dynamic and adaptive, utilizing two-way communications with the client 205, while the HQ stream is non-adaptive and one-way. Other differences between the stream is the Live stream quality may vary dramatically, depending on the channel conditions and the nature of the video material. Some frames may be of poor quality, and there may be dropped frames. Also, the Live stream may be almost entirely P-frames or P-tiles, with I-frames or I-tiles appearing infrequently. The HQ stream typically will be much higher data rate than the Live Stream, and it will provide consistent high-quality, without dropping any frames. The HQ stream may be all I-frames, or may have frequent and/or regular I-frames or I-tiles. The HQ stream may also include B-frames or B-tiles.

In one embodiment, Shared video scaling and recompression 3142 (detailed below) selects only certain HQ video streams 3121H1-3125H1 to be scaled and recompressed at one or more different resolutions, before sent to Inbound Routing 3141 for routing as previously described. The other HQ video streams are either passed through at their full size to Inbound Routing 3141 for routing as previously described, or not passed through at all. In one embodiment the decision on which HQ streams are scaled and recompressed and/or which HQ streams are passed through at all is determined based on whether there is a App/Game Server 3121-3125 that is requesting that particular HQ stream at the particular resolution (or a resolution close to the scaled or full resolution). Through this means, the only HQ streams that are scaled and recompressed (or potentially passed through at all) are HQ streams that are actually needed. In many applications of Hosting Service 210, this results in a dramatic reduction of scaling and compression resources. Also, given that every HQ stream is at least compressed at its full resolution by compressors 3121H1-3125H1, the bandwidth needed to be routed to and within Shared video scaling and recompression 3142 is dramatically reduced than if it would be accepted uncompressed video. For example, a 3 GBps uncompressed 1080p60 stream could be compressed to 10 Mbps and still retain very high quality. Thus, with Gigabit Ethernet connectivity, rather than be unable to carry even one uncompressed 3 Gbps video stream, it would be possible to cary dozens of 10 Mbps video streams, with little apparent reduction in quality.

Figure 31E:
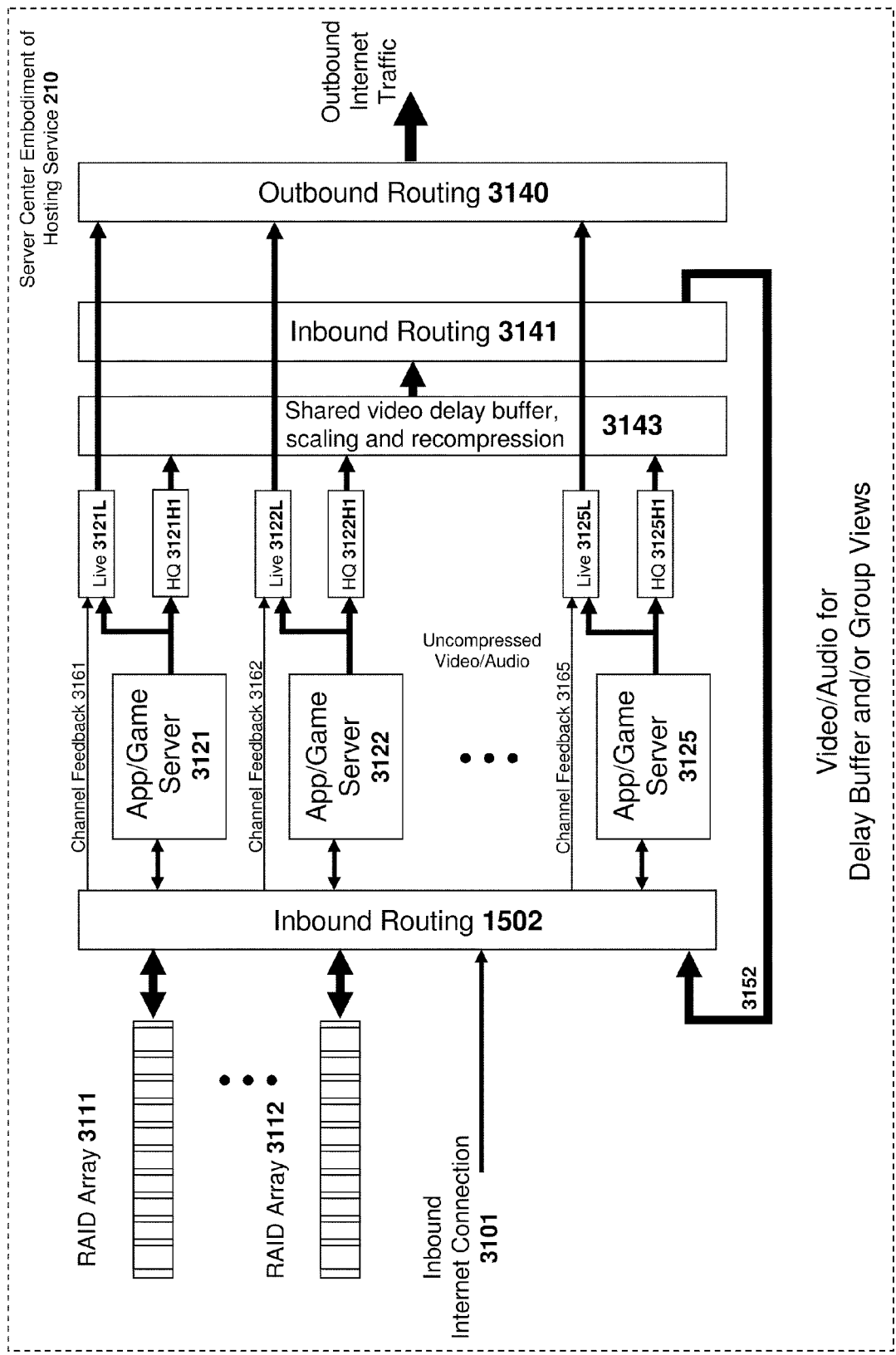
Figure 31F:
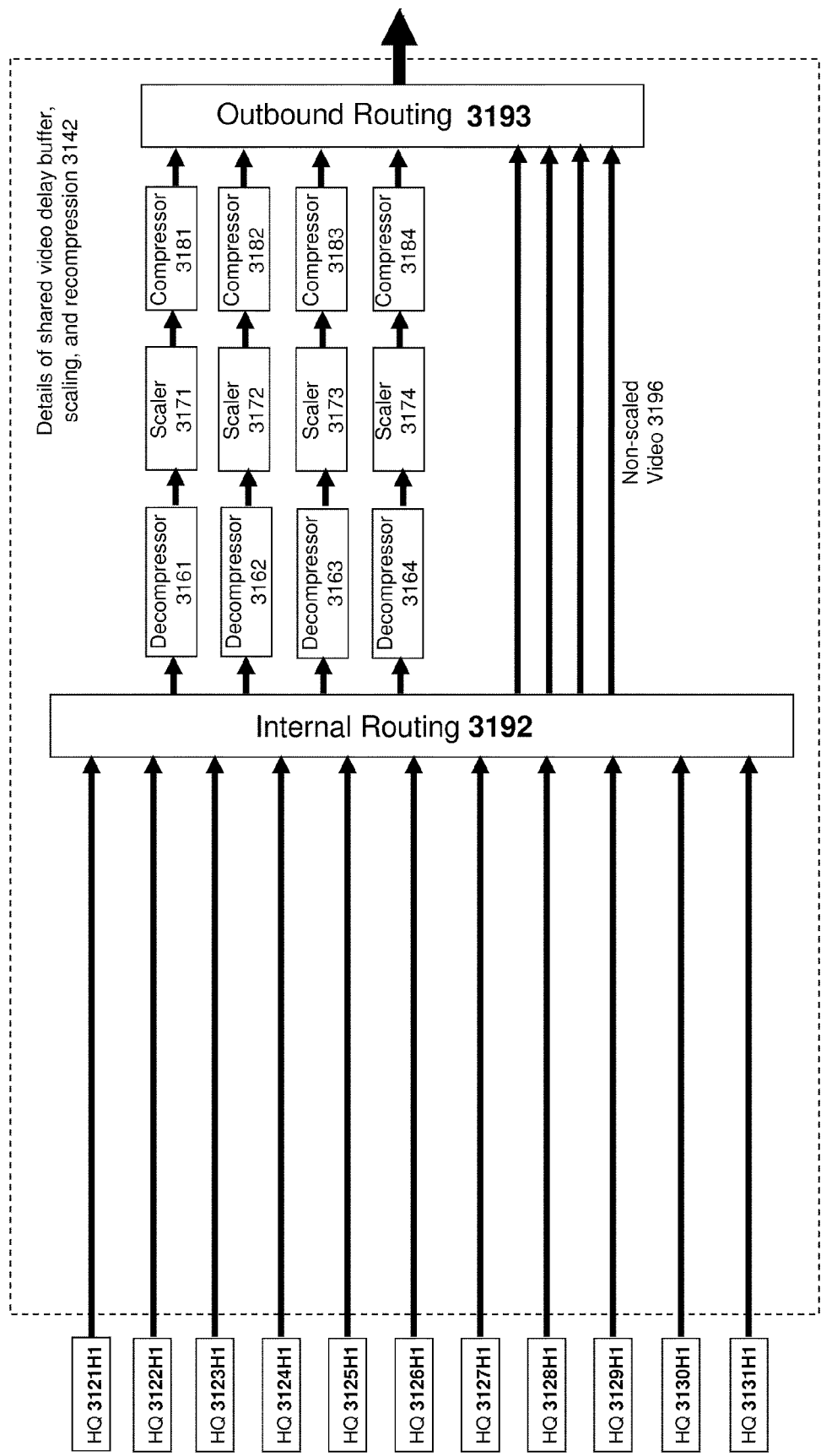

FIG. 31f shows details of Shared video scaling and recompression 3142, along with a larger number of HQ video compressors HQ 3121H1-3131H1. Internal routing 3192, per requests for particular video streams scaled to particular sizes from the App/Game Servers 3121-3125, selects typically a subset of compressed HQ streams from HQ video compressors HQ 3121H1-3131H1. A stream within this selected subset of streams is routed either through a Decompressor 3161-3164 if the stream requested is to be scaled, or routed on Non-scaled Video path 3196 if the stream requested is at full resolution. The streams to be scaled are decompressed to uncompressed video by Decompressors 3161-3164, then each scaled to the requested size by Scalers 3171-3174, then each compressed by Compressor 3181-3184. Note that if a particular HQ stream is requested at more than one resolution, then Internal Routing 3192 multicasts that stream (using IP multicasting technology that is well-known by practitioners in the art) to one or more Decompressors 3161-3164 and (if one a requested size if full resolution) to Outbound Routing 3193. All of the requested streams, whether scaled (from Compressors 3181-3184) or not (from Internal Routing 3192), are then sent to Outbound Routing 3193. Routing 3193 then sends each requested stream to the App/Game Server 3121-3125 that requested it. In one embodiment, if more than one App/Game server requests the same stream at the same resolution, then Outbound Routing 3193 multicasts the stream to all of the App/Game servers 3121-3125 that are making the request.

In the presently preferred embodiment of the Shared video scaling and recompression 3142, the routing is implemented using Gigabit Ethernet switches, and the decompression, scaling, and compression is implemented by discrete specialized semiconductor devices implementing each function. The same functionality could be implemented with a higher level of integration in hardware or by very fast processors.

Figure 31G:
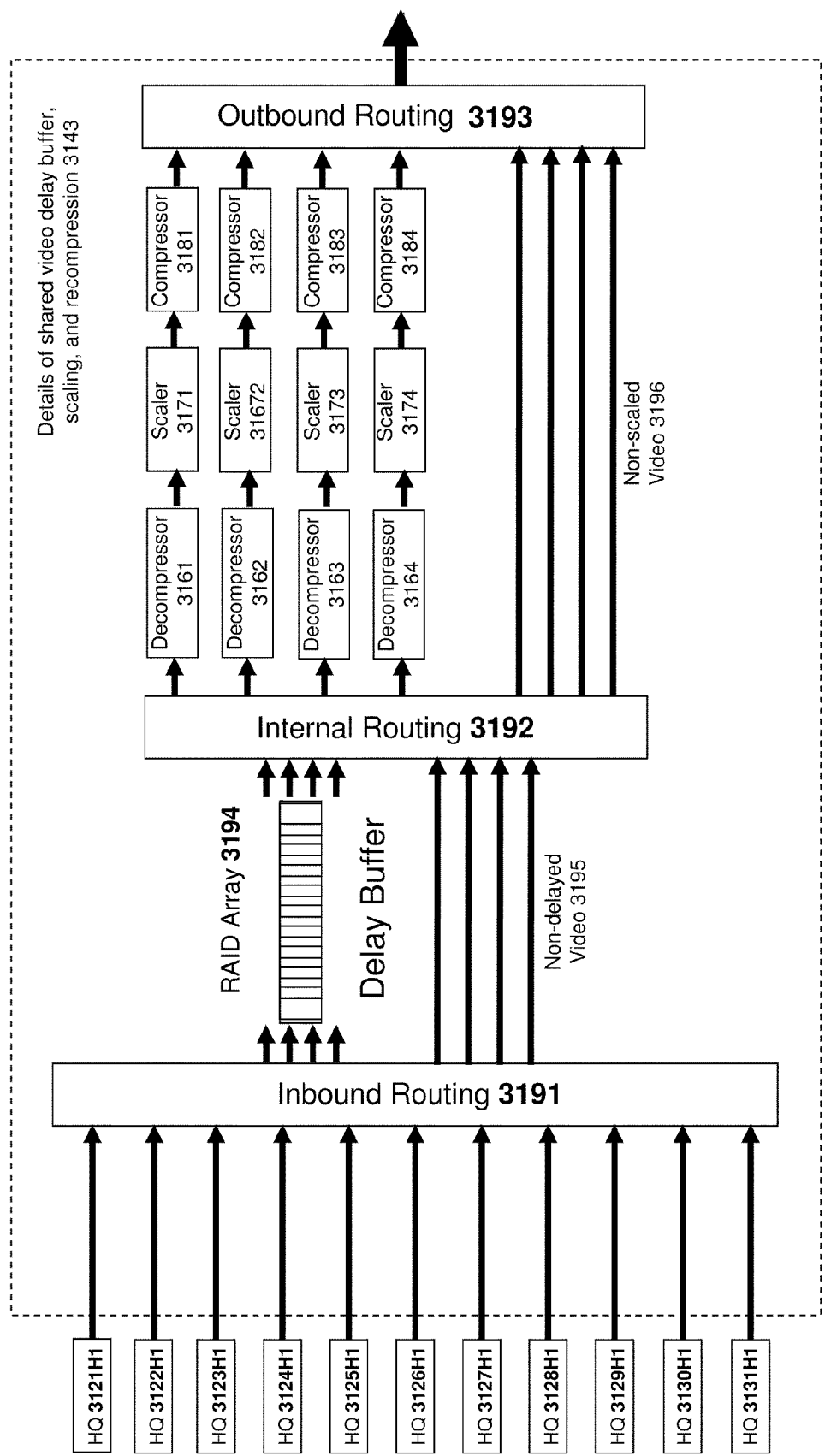

FIG. 31e shows another embodiment of Hosting Service 210, where the function of Delay Buffer 3115, previously described, is implemented in a Shared video delay buffer, scaling and decompression subsystem 3143. The details of subsystem 3143 is shown in FIG. 31g. The operation of subsystem 3143 is similar to that of subsystem 3142 shown in FIG. 31f, except 3191 first selects which HQ video streams are to be routed, per requests from App/Game Servers 3121-3125, and then, the HQ streams that are requested to be delayed are routed through Delay Buffer 3194, implemented as a RAID Array in the presently preferred embodiment (but could be implemented in any storage medium of sufficient bandwidth and capacity), and streams that are not requested to be delayed are routed through Non-delayed Video path 3195. The output of both the Delay Buffer 3194 and Non-delayed Video 3195 is then routed by Internal Routing 3192 based on whether requested streams are to be scaled or not scaled. Scaled streams are routed through Decompressors 3161-3164, Scalers 3171-3174 and Compressors 3181-3184 to Outbound Routing 3193, and Non-scaled Video 3196 also is sent to Outbound Routing 3193, and then Outbound Routing 3193 then sends the video in unicast or multicast mode to App/Game Servers in the same manner as previously described in subsystem 3142 of FIG. 31f.

Figure 31H:
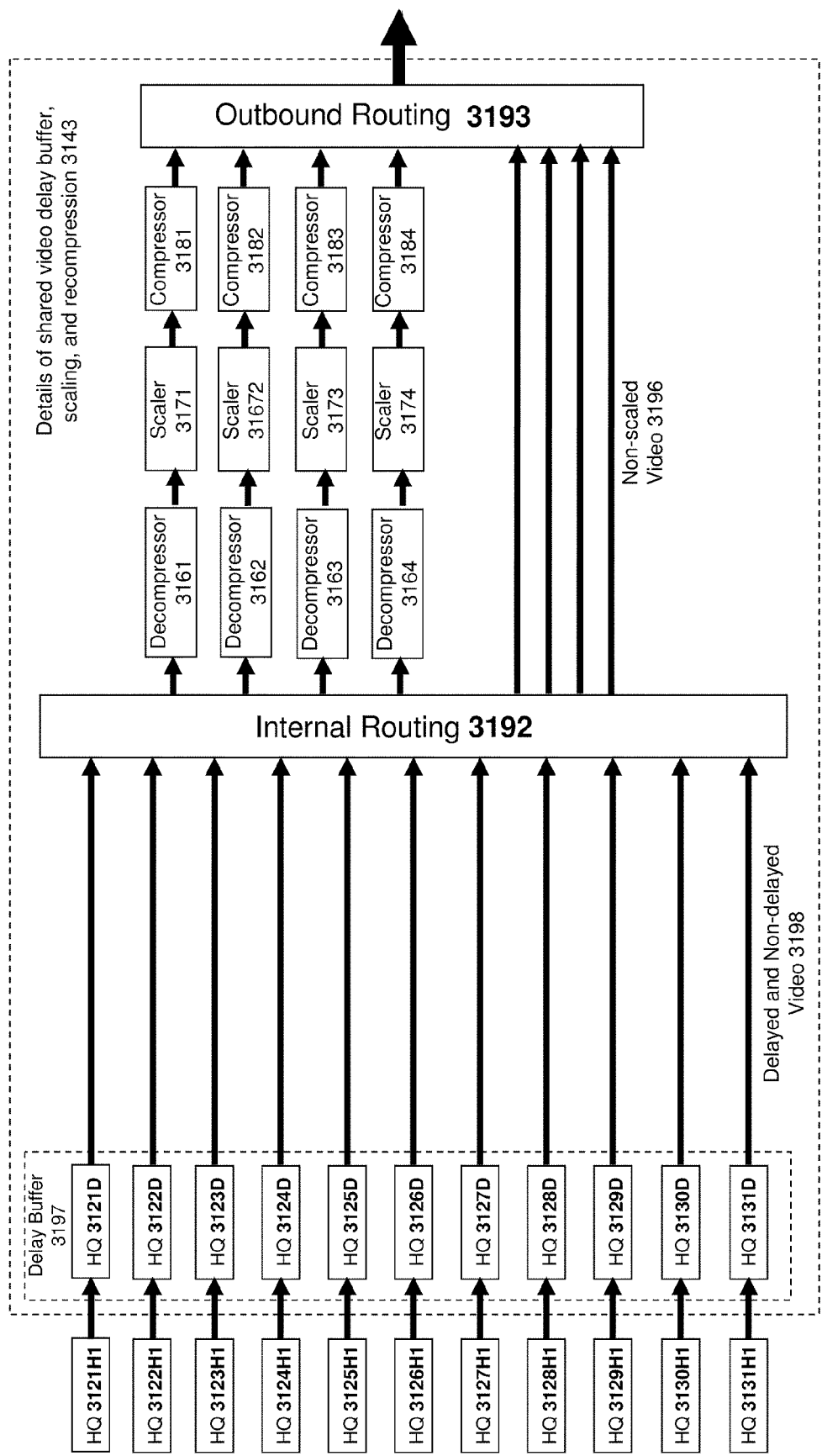

Another embodiment of video delay buffer, scaling and decompression subsystem 3143 is shown in FIG. 31h. In this embodiment, an individual Delay Buffer HQ 3121D-HQ 3131D is provided for each HQ stream. Given the rapidly declining cost of RAM and Flash ROM, which can be used to delay an individual compressed video stream, this may end up being less expensive and/or more flexible than having a shared Delay Buffer 3194. Or, in yet another embodiment, a single Delay Buffer 3197 (shown in dotted line) can provide delay for all of the HQ streams individually in a high-performance collective resource (e.g. very fast RAM, Flash or disk). In either scenario, each Delay Buffer HQ 3121D-3131D is able to variably delay a stream from the HQ video source, or pass the stream through undelayed. In another embodiment, each delay buffer is able to provide multiple streams with different delay amounts. All delays or non-delays are requested by App/Game Services 3121-3125. In all of these cases Delayed and Non-Delayed Video streams 3198 are sent to Internal Routing 3192, and proceeds through the rest of the subsystem 3143 as previously described relative to FIGS. 31g.

In the preceding embodiments relative to the various FIGS. 31 n note that the Live stream utilizes a two-way connection and is tailored for an particular user, with minimal latency. The HQ streams utilize one-way connections and are both unicast and multicast. Note that while the multicast function is illustrated in these Figures as a single unit, such as could be implemented in a Gigabit Ethernet switch, in a large scale system, the multicast function would likely be implemented through a tree of multiple switches. Indeed, in the case of a video stream from a top-ranked video game player, it may well be the case that the player's HQ stream is watched by millions of users simultaneously. In such a case, there would likely be a large number of individual switches in successive stages broadcasting the multicasted HQ stream.

For both diagnostic purposes, and so as to provide feedback to the user (e.g. to let the user know how popular his gameplay performance is), in one embodiment, the hosting service 210 would keep track of how many simultaneous viewers there are of each App/Game Server 3121-3125's video stream. This can be accomplished by keeping a running count of the number of active requests by App/Game servers for a particular video stream. Thus, a gamer who has 100,000 simultaneous viewers will know that his or her gameplay is very popular, and it will create incentive for gameplayers to do a better performance and attract viewers. When there is very large very viewership of video streams (e.g. of a championship video game match), it may be desirable for commentators to speak during the video game match such that some or all users watching the multicast can hear their commentary.

Applications and Games running on the App/Game servers will be provided with an Application Program Interface (API) in which the App and/or Game can submit requests for particular video streams with particular characteristics (e.g. resolution and amount of delay). Also, these APIs, submitted to an operating environment running on the App/Game Server, or to a Hosting Service Control System 401 of FIG. 4a may reject such requests for a variety of reasons. For example, the video stream requested may have certain licensing rights restrictions (e.g. such that it can only be viewed by a single viewer, not broadcast to others), there may be subscription restrictions (e.g. the viewer may have to pay for the right to view the stream), there may be age restrictions (e.g. the viewer may have to be 18 to view the stream), there may be privacy restrictions (e.g. the person using the App or playing the game may limit viewing to just a selected number or class of viewers (e.g. his or her "friends"), or may not allow viewing at all), and there may be restrictions requiring the material is delayed (e.g. if the user is playing a stealth game where his or her position might be revealed). There are any number of other restrictions that would limit viewing of the stream. In any of these cases, the request by the App/Game server would be rejected with a reason for the rejection, and in one embodiment, with alternatives by which the request would be accepted (e.g. stating what fee must be paid for a subscription).

HQ video streams that are stored in Delay Buffers in any of the preceding embodiments may be exported to other destinations outside of the Hosting Service 210. For example, a particularly interesting video stream can be requested by an App/Game server (typically by the request of a user), to be exported to YouTube. In such a case, the video stream would be transmitted through the Internet in a format agreed-upon with YouTube, together with appropriate descriptive information (e.g. the name of the user playing, the game, the time, the score, etc.). This could be implemented by multicasting in a separate stream the commentary audio to all of the Game/App Servers 3121-3125 requesting such commentary. The Game/App Servers would merge the audio of the commentary, using audio mixing techniques well-known by practitioners in the art, into the audio stream sent to the user premises 211. There could well be multiple commentators (e.g. with different viewpoints, or in different languages), and users could select among them.

In a similar manner, separate audio streams could be mixed in or serve as replacement for the audio track of particular video streams (or individual streams) in the Hosting Service 210, either mixing or replacing audio from video streaming in real-time or from a Delay Buffer. Such audio could be commentary or narration, or it could provide voices for characters in the video stream. This would enable Machinima (user-generation animations from video game video streams) to be readily created by users.

The video streams described throughout this document are shown as captured from the video output of App/Game servers, and then being streamed and/or delay and being reused or distributed in a variety of ways. The same Delay Buffers can be used to hold video material that has come from non-App/Game server sources and provide the same degree of flexibility for playback and distribution, with appropriate restrictions. Such sources include live feeds from television stations (either over-the-air, or non-over-the-air, such as CNN, and either for-pay, such as HBO, or free). Such sources also include pre-recorded movies or television shows, home movies, advertisements and also live video teleconference feeds. Live feeds would be handled like the live output of a Game/App Server. Pre-recorded material would be handled like the output of a Delay Buffer.

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, . . . etc). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, input devices, have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

What is claimed:

1. A computer-implemented method for performing video compression comprising:
   receiving control signals by a first server, the control signals received from a client device over a network to the first server, the control signals corresponding to user input from an input device of the client device being actuated by a user as the user is playing an online video game;
   executing the video game on the first server at a first hosting service center in response to the received control signals to generate video output comprising sequences of video frames of the video game;
   receiving feedback information by the first server, the feedback information received from the client device, the feedback information configured to be usable to determine whether data contained in the video frames or portions thereof has not been successfully received or decoded at the client device;
   encoding each of the video frames or portions thereof including:
      dividing each of the video frames into a plurality of tiles;
      selecting one of the plurality of tiles according to the feedback information received by the first server;
      encoding the selected one of the plurality of tiles using a first encoding format, the first encoding format being independent of previously encoded video frames;
      encoding remaining ones of the plurality of tiles using a second encoding format, the second encoding format being dependent on a previously encoded video frame;
      generating a sequence of low-latency video frames, each video frame having the encoded plurality of tiles;
   transmitting the sequence of low-latency video frames or portions thereof by the first server over the network to the client device.

2. The method as in claim 1 wherein, the feedback information includes an indication whether to encode a current video frame or portion thereof in the first encoding format or the second encoding format.

3. The method as in claim 2 wherein the feedback information is further usable to identify a previous frame or portion thereof successfully received by the client, wherein a new frame is encoded according to the second encoding format to be dependent on the previous successfully received frame.

4. The method as in claim 1 wherein the feedback information comprises an indication that the previously encoded frames or portions thereof have been successfully received or decoded at the client device.

5. The method as in claim 1 wherein the feedback information comprises an indication that the previously encoded frames or portions thereof have not been successfully received or decoded at the client device.

6. The method as in claim 1 wherein the sequence of low-latency video frames comprise images of a video game displayed by the display device coupled the client device.

7. The method as in claim 1
   wherein the feedback information includes an indication that the sequence of low-latency video frames or portion thereof have been decoded at the client device and an indication that
   images associated with each of the sequence of low-latency video frames or portions thereof have been displayed by a display device coupled to the client device.

8. The method as in claim 1 further comprising:
   determining a channel characteristic of a communication channel in the network between the first server and the client device.

9. The method as in claim 8 wherein the channel characteristic is determined from the feedback information received by the first server from the client device.

10. The method as in claim 8 wherein the channel characteristic comprises a maximum supported data rate of the communication channel.

11. The method as in claim 8 wherein the channel characteristic comprise at least one of a level of packet loss or a latency.

12. The method as in claim 8 further comprising:
    dynamically adjusting at least one of the data rate or the compression ratio for the low-latency video frames based on a detected change in the channel characteristic.

13. The method as in claim 12 wherein the data rate or the compression ratio is adjusted by modifying a frame rate of the low-latency video frames.

14. The method as in claim 12 wherein the data rate or the compression ratio is adjusted by modifying an image resolution of the low-latency video frames.

15. The method as in claim 8 wherein when the image resolution is modified, the decoder on the client device scales up the image to maintain the same image size on the display device coupled to the client device.

16. The method as in claim 8 wherein when the communication channel in the network between the first server and the client device becomes inoperative, the first server pauses the video game.

17. The method as in claim 16 wherein when the communication channel becomes inoperative and the first user of the client device is playing a multiplayer video game, other users playing the multiplayer video game are notified that the first user has dropped out.

18. The method as in claim 17 wherein the multiplayer video game is paused for the other users when the first user drops out.

19. The method as in claim 8 wherein determining the channel characteristic comprises:
    determining a maximum data rate capacity of the communication channel by sending an increasingly higher data rate stream to the client device until at least one of a packet loss or a higher latency indicates the maximum data rate capacity of the communication channel has been exceeded.

20. The method as in claim 19 further comprising:
determining that the maximum data rate capacity of the communication channel has decreased based on at least one of a detected increase in packet loss or an increase in latency while the low-latency video frames are being streamed to the client device; and
responsively and dynamically reducing the data rate or increasing the compression ratio of the low-latency video frames until at least one of the packet loss or latency have reached corresponding predetermined acceptable values.

21. The method as in claim 19 further comprising:
determining that the maximum data rate capacity of the communication channel has increased based on continued measurements of packet loss or latency; and
responsively and dynamically increasing the data rate or decreasing the compression ratio of the low-latency video frames until at least one of the packet loss or latency have reached a corresponding predetermined unacceptable level.

22. The method as in claim 8 wherein data packets containing the low-latency video frames are received by the client device in a different order than in which the received video frames are displayed on the display device coupled to the client device.

23. The method as in claim 1 further comprising:
employing forward error correction (FEC) techniques to protect at least one of a specified low-latency video frames or portions thereof or the control signals received by the first server from the client device.

24. The method as in claim 23 where the forward error correction (FEC) techniques are only employed to the extent required based on a detected maximum data rate capacity of the communication channel between the client device and the first server.

25. A system for playing an online video game comprising:
a hosting service center including a plurality of servers, the plurality of servers including a first server, the first server including:
a memory system,
a processor,
a video frame encoder,
the first server hosting and executing a video game according to a control signal received by the first server from a client device, the control signal corresponding to a user input to the client device, the client device coupled to the first server by a network, the first server configured to output a sequence of video frames of the executed video game and transmit to the client device, the first server configured to receive feedback information from the client device, the video frame encoder configured for encoding the sequence of video frames transmitted to the client device according to the feedback information wherein encoding the sequences of video frames includes:
dividing each of the sequence of video frames into a plurality of tiles,
selecting one of the plurality of tiles according to the feedback information received by the first server,
encoding the selected one of the plurality of tiles using a first encoding format, the first encoding format being independent of previously encoded video frames,
encoding remaining ones of the plurality of tiles using a second encoding format the encoded plurality of tiles, the second encoding format being dependent on a previously encoded video frame, and
generating a sequence of low-latency video frames with the encoded plurality of tiles.

26. The system as in claim 15 wherein, the feedback information includes an indication whether to encode a current video frame or portion thereof in the first encoding format or the second encoding format.

27. The system as in claim 26 wherein the feedback information is further usable to identify a previous frame successfully received by the client, wherein at least a portion of a new frame in the sequence of low-latency video frames is encoded according to the second encoding format to be dependent on a corresponding portion of the previous successfully received frame.

28. The system as in claim 25 wherein the feedback information comprises an indication that the previously encoded frames or portions thereof have been successfully received or decoded at the client device.

29. The system as in claim 25 wherein the feedback information comprises an indication that the previously encoded frames or portions thereof have not been successfully received or decoded at the client device.

30. The system as in claim 25 wherein the sequence of low-latency video frames comprise images of a video game displayed by the display device coupled to the client device.

31. The system as in claim 1 wherein the feedback information includes an indication that the sequence of low-latency video frames or portion thereof have been decoded at the client device and an indication that images associated with each of the sequence of low-latency video frames or portions thereof have been displayed by a display device coupled to the client device.

* * * * *